United States Patent
Kim et al.

(10) Patent No.: US 12,242,032 B2
(45) Date of Patent: Mar. 4, 2025

(54) OPTICAL IMAGING SYSTEM

(71) Applicant: Samsung Electro-Mechanics Co., Ltd., Suwon-si (KR)

(72) Inventors: Hag Chul Kim, Suwon-si (KR); Eun Chong Lee, Suwon-si (KR); Yong Joo Jo, Suwon-si (KR); Ga Young An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 497 days.

(21) Appl. No.: 17/406,298

(22) Filed: Aug. 19, 2021

(65) Prior Publication Data

US 2022/0413264 A1    Dec. 29, 2022

Related U.S. Application Data

(63) Continuation of application No. 16/423,218, filed on May 28, 2019, now Pat. No. 11,181,719.

(30) Foreign Application Priority Data

May 29, 2018  (KR) .................. 10-2018-0061410
Sep. 5, 2018   (KR) .................. 10-2018-0106171

(51) Int. Cl.
*G02B 3/02*    (2006.01)
*G02B 9/64*    (2006.01)
(Continued)

(52) U.S. Cl.
CPC ........... *G02B 13/0045* (2013.01); *G02B 9/64* (2013.01)

(58) Field of Classification Search
CPC . G02B 9/62; G02B 13/18; G02B 3/00; G02B 21/02; G02B 15/177; G02B 13/04; G02B 9/64
(Continued)

(56) References Cited

U.S. PATENT DOCUMENTS 8,599,495 B1 * 12/2013 Tsai .................. H04N 23/55
                                                       359/755
8,681,434 B2    3/2014 Chou
(Continued)

FOREIGN PATENT DOCUMENTS

CN     202886720 U    4/2013
CN     103529539 A    1/2014
(Continued)

OTHER PUBLICATIONS

Park, Optical Imaging System, 2020 Samsung Electro-Mechanics, U.S. Appl. No. 17/088,670 (Year: 2020).*

(Continued)

*Primary Examiner* — Dawayne Pinkney
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens sequentially disposed in numerical order along an optical axis of the optical imaging system from an object side of the optical imaging system toward an imaging plane of the optical imaging system, wherein the first to seventh lenses are spaced apart from each other along the optical axis, and the optical imaging system satisfies 0.4<L1TR/L7TR<1.9, where L1TR is an overall outer diameter of the first lens, L7TR is an overall outer diameter of the seventh lens, and L1TR and L7TR are expressed in a same unit of measurement.

13 Claims, 59 Drawing Sheets

(51) Int. Cl.
  *G02B 13/00* (2006.01)
  *G02B 15/14* (2006.01)
  *G02B 21/02* (2006.01)

(58) Field of Classification Search
  USPC ....... 359/708, 642, 657, 682, 751, 753, 755, 359/757
  See application file for complete search history.

(56) References Cited

U.S. PATENT DOCUMENTS

| | | | |
|---|---|---|---|
| 9,366,845 B2* | 6/2016 | Huang | G02B 27/0025 |
| 9,671,591 B2* | 6/2017 | Chen | G02B 3/04 |
| 9,678,309 B2 | 6/2017 | Tang et al. | |
| 10,185,127 B2 | 1/2019 | Jung et al. | |
| 11,002,943 B2 | 5/2021 | Jung et al. | |
| 11,009,678 B2 | 5/2021 | Son et al. | |
| 11,016,271 B2 | 5/2021 | Jung et al. | |
| 11,181,719 B2* | 11/2021 | Kim | G02B 9/64 |
| 11,249,280 B2* | 2/2022 | Yoo | G02B 9/64 |
| 11,644,641 B2* | 5/2023 | Jung | G02B 9/64 359/708 |
| 11,644,642 B2 | 5/2023 | Huh et al. | |
| 11,644,643 B2* | 5/2023 | Jung | G02B 27/0025 359/755 |
| 11,675,163 B2* | 6/2023 | Jung | G02B 27/0025 359/755 |
| 11,714,263 B2* | 8/2023 | Jung | G02B 3/02 359/708 |
| 11,789,239 B2* | 10/2023 | Baik | G02B 7/022 359/708 |
| 11,867,885 B2 | 1/2024 | Son et al. | |
| 11,960,145 B2 | 4/2024 | Jung et al. | |
| 2013/0010372 A1 | 1/2013 | Chou | |
| 2014/0009843 A1 | 1/2014 | Tsai et al. | |
| 2015/0103414 A1 | 4/2015 | Baik | |
| 2015/0192761 A1 | 7/2015 | Tsai et al. | |
| 2015/0378131 A1 | 12/2015 | Tang et al. | |
| 2016/0033742 A1* | 2/2016 | Huang | G02B 13/0045 359/708 |
| 2016/0131874 A1 | 5/2016 | Tang et al. | |
| 2016/0299319 A1 | 10/2016 | Tang et al. | |
| 2016/0341937 A1 | 11/2016 | Tsai et al. | |
| 2017/0059826 A1 | 3/2017 | Tang et al. | |
| 2018/0003926 A1 | 1/2018 | Huang | |
| 2018/0074298 A1 | 3/2018 | Jung et al. | |
| 2018/0100993 A1 | 4/2018 | Park | |
| 2018/0188493 A1 | 7/2018 | Huang | |
| 2018/0321471 A1* | 11/2018 | Chen | G02B 9/64 |
| 2019/0004285 A1* | 1/2019 | Tang | G02B 9/64 |
| 2019/0278055 A1 | 9/2019 | Lin et al. | |

FOREIGN PATENT DOCUMENTS

| | | |
|---|---|---|
| CN | 105589176 A | 5/2016 |
| CN | 106054353 A | 10/2016 |
| CN | 107817576 A | 3/2018 |
| CN | 107942475 A | 4/2018 |
| JP | 2015-72402 A | 4/2015 |
| KR | 10-2015-0043186 A | 4/2015 |
| KR | 10-2018-0029815 A | 3/2018 |
| TW | 201303353 A1 | 1/2013 |
| TW | I614517 B | 2/2018 |

OTHER PUBLICATIONS

Jung, Optical Imaging System, 2020 Samsung Electro-Mechanics, U.S. Appl. No. 17/088,665 (Year: 2020).*
Baik, Optical Imaging System, Samsung Electro-Mechanics, U.S. Appl. No. 17/088,675 (Year: 2020).*
Baik, Optical Imaging System, Samsung Electro-Mechanics, U.S. Appl. No. 18/187,874 (Year: 2023).*
Kim, Optical Imaging System, Samsung Electro-Mechanics, U.S. Appl. No. 18/127,956 (Year: 2023).*
Korean Office Action issued on Aug. 29, 2022, in counterpart Korean Patent Application No. 10-2022-0076387 (8 pages in English, 5 pages in Korean).
Chinese Office Action Issued on Feb. 14, 2023, in counterpart Chinese Patent Application No. 202111135551.5 (4 Pages in English, 6 Pages in Chinese).
Notice of Dismissal for Amendment issued on Jan. 21, 2020, in counterpart Korean Patent Application No. 10-2018-0106171 (5 pages in English and 3 pages in Korean).
Notice of Decision for Rejection issued on Jan. 21, 2020, in counterpart Korean Patent Application No. 10-2018-0106171 (2 pages in English and 2 pages in Korean).
Korean Office Action issued on Mar. 10, 2020, in counterpart Korean Patent Application No. 10-2020-0021240 (10 pages in English and 7 pages in Korean).
Korean Office Action issued on Nov. 3, 2020, in counterpart Korean Patent Application No. 10-2020-0125151 (12 pages in English and 7 pages in Korean).
Chinese Office Action issued on Apr. 2, 2021, in counterpart Chinese Patent Application No. 201910449780.0 (12 pages in English and 11 pages in Chinese).
U.S. Appl. No. 16/423,218, filed May 28, 2019, Hag Chul Kim et al., Samsung Electro-Mechanics Co., Ltd.
U.S. Appl. No. 16/424,540, filed May 29, 2019, Ho Sik Yoo et al., Samsung Electro-Mechanics Co., Ltd.
U.S. Appl. No. 16/424,708, filed May 29, 2019, Ju Hwa Son et al., Samsung Electro-Mechanics Co., Ltd.
U.S. Appl. No. 16/424,774, filed May 29, 2019, Jae Hyun Baik et al., Samsung Electro-Mechanics Co., Ltd.
U.S. Appl. No. 16/424,801, filed May 29, 2019, Il Yong Park et al., Samsung Electro-Mechanics Co., Ltd.
Chinese Office Action issued on Mar. 23, 2022, in counterpart Chinese Patent Application No. 201910449780.0 (8 pages in English, 8 pages in Chinese).
U.S. Office Action issued on Mar. 14, 2024, in related U.S. Appl. No. 18/127,956 (12 pages).

* cited by examiner

OPTICAL IMAGING SYSTEM

CROSS-REFERENCE TO RELATED APPLICATIONS

This application is a continuation of application Ser. No. 16/423,218 filed on May 28, 2019, now U.S. Pat. No. 11,181,719 issued on Nov. 23, 2021, and claims the benefit under 35 USC 119 (a) of Korean Patent Application Nos. 10-2018-0061410 filed on May 29, 2018, and 10-2018-0106171 filed on Sep. 5, 2018, in the Korean Intellectual Property Office, the entire disclosures of which are incorporated herein by reference for all purposes.

BACKGROUND

1. Field

This application relates to an optical imaging system.

2. Description of Related Art

Recently, mobile communications terminals have been provided with camera modules, enabling video calling and image capturing. In addition, as utilization of the camera modules mounted in the mobile communications terminals has increased, camera modules for the mobile communications terminals have gradually been required to have high resolution and performance.

Therefore, the number of lenses included in the camera module has increased. However, since the mobile communications terminal in which the camera module is mounted tends to be miniaturized, it is very difficult to arrange the lenses in the camera module.

Therefore, research into technology capable of performing aberration correction to achieve high resolution and arranging a plurality of lenses in a limited space has been ongoing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens sequentially disposed in numerical order along an optical axis of the optical imaging system from an object side of the optical imaging system toward an imaging plane of the optical imaging system, wherein the first to seventh lenses are spaced apart from each other along the optical axis, and the optical imaging system satisfies $0.4<L1TR/L7TR<1.9$, where L1TR is an overall outer diameter of the first lens, L7TR is an overall outer diameter of the seventh lens, and L1TR and L7TR are expressed in a same unit of measurement.

The optical imaging system may further satisfy $0.4<L1TR/L7TR<0.7$.

The optical imaging system may further satisfy $0.1<L1w/L7w<0.3$, where L1w is a weight of the first lens, L7w is a weight of the seventh lens, and L1w and L7w are expressed in a same unit of measurement.

The optical imaging system may further include a spacer disposed between the sixth and seventh lenses, and the optical imaging system may further satisfy $0.5<S6d/f<1.2$, where S6d is an inner diameter of the spacer, f is an overall focal length of the optical imaging system, and S6d and f are expressed in a same unit of measurement.

The optical imaging system may further satisfy $0.5<L1234TRavg/L7TR<0.75$, where L1234TRavg is an average value of overall outer diameters of the first to fourth lenses, L7TR is an overall diameter of the seventh lens, and L1234TRavg and L7TR are expressed in a same unit of measurement.

The optical imaging system may further satisfy $0.5<L12345TRavg/L7TR<0.76$, where L12345TRavg is an average value of overall outer diameters of the first to fifth lenses, L7TR is an overall diameter of the seventh lens, and L12345TRavg and L7TR are expressed in a same unit of measurement.

The optical imaging system may further satisfy $0.1<(1/f1+1/f2+1/f3+1/f4+1/f5+1/f6+1/f7)*f<0.8$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f is an overall focal length of the optical imaging system, and f1, f2, f3, f4, f5, f6, f7, and f are expressed in a same unit of measurement.

The optical imaging system may further satisfy $0.1<(1/f1+1/f2+1/f3+1/f4+1/f5+1/f6+1/f7)*TTL<1.0$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, TTL is a distance along the optical axis from an object-side surface of the first lens to the imaging plane, and f1, f2, f3, f4, f5, f6, f7, and TTL are expressed in a same unit of measurement.

The optical imaging system may further satisfy $0.2<TD1/D67<0.8$, where TD1 is a thickness along the optical axis of the first lens, D67 is a distance along the optical axis from an object-side surface of the sixth lens to an image-side surface of the seventh lens, and TD1 and D67 are expressed in a same unit of measurement.

The imaging plane may be an imaging plane of an image sensor, and the optical imaging system may further satisfy TTL 6.00 mm and $0.6<TTL/(2*IMG\ HT)<0.9$, where TTL is a distance along the optical axis from an object-side surface of the first lens to the imaging plane of the image sensor, IMG HT is one-half of a diagonal length of the imaging plane of the image sensor, and TTL and IMG HT are expressed in mm.

The optical imaging system may further satisfy $0.2<\Sigma SD/\Sigma TD<0.7$, where $\Sigma SD$ is a sum of air gaps along the optical axis between the first to seventh lenses, $\Sigma TD$ is a sum of thicknesses along the optical axis of the first to seventh lenses, and $\Sigma SD$ and $\Sigma TD$ are expressed in a same unit of measurement.

The optical imaging system may further satisfy $0<\min(f1:f3)/\max(f4:f7)<0.4$, where min(f1:f3) is a minimum value of absolute values of focal lengths of the first to third lenses, max(f4:f7) is a maximum value of absolute values of focal lengths of the fourth to seventh lenses, and min(f1:f3) and max(f4:f7) are expressed in a same unit of measurement.

The optical imaging system may further satisfy $0.4<\Sigma TD/TTL<0.7$, where $\Sigma TD$ is a sum of thicknesses along the optical axis of the first to seventh lenses, TTL is a distance along the optical axis from an object-side surface of the first lens to the imaging plane, and $\Sigma TD$ and TTL are expressed in a same unit of measurement.

The optical imaging system may further satisfy 0.81<f12/f123<0.96, where f12 is a composite focal length of the first and second lenses, f123 is a composite focal length of the first to third lenses, and f12 and f123 are expressed in a same unit of measurement.

The optical imaging system may further satisfy 0.6<f12/f1234<0.84, where f12 is a composite focal length of the first and second lenses, f1234 is a composite focal length of the first to fourth lenses, and f12 and f1234 are expressed in a same unit of measurement.

The second lens may have a positive refractive power, and the third lens may have a negative refractive power.

The fifth lens may have a negative refractive power, and a paraxial region of an object-side surface of the fifth lens may be concave or convex.

The fifth lens may have a negative refractive power, and a paraxial region of an image-side surface of the fifth lens may be concave or convex.

A paraxial region of an object-side surface of the sixth lens may be concave or convex.

A paraxial region of an object-side surface of the seventh lens may be concave.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
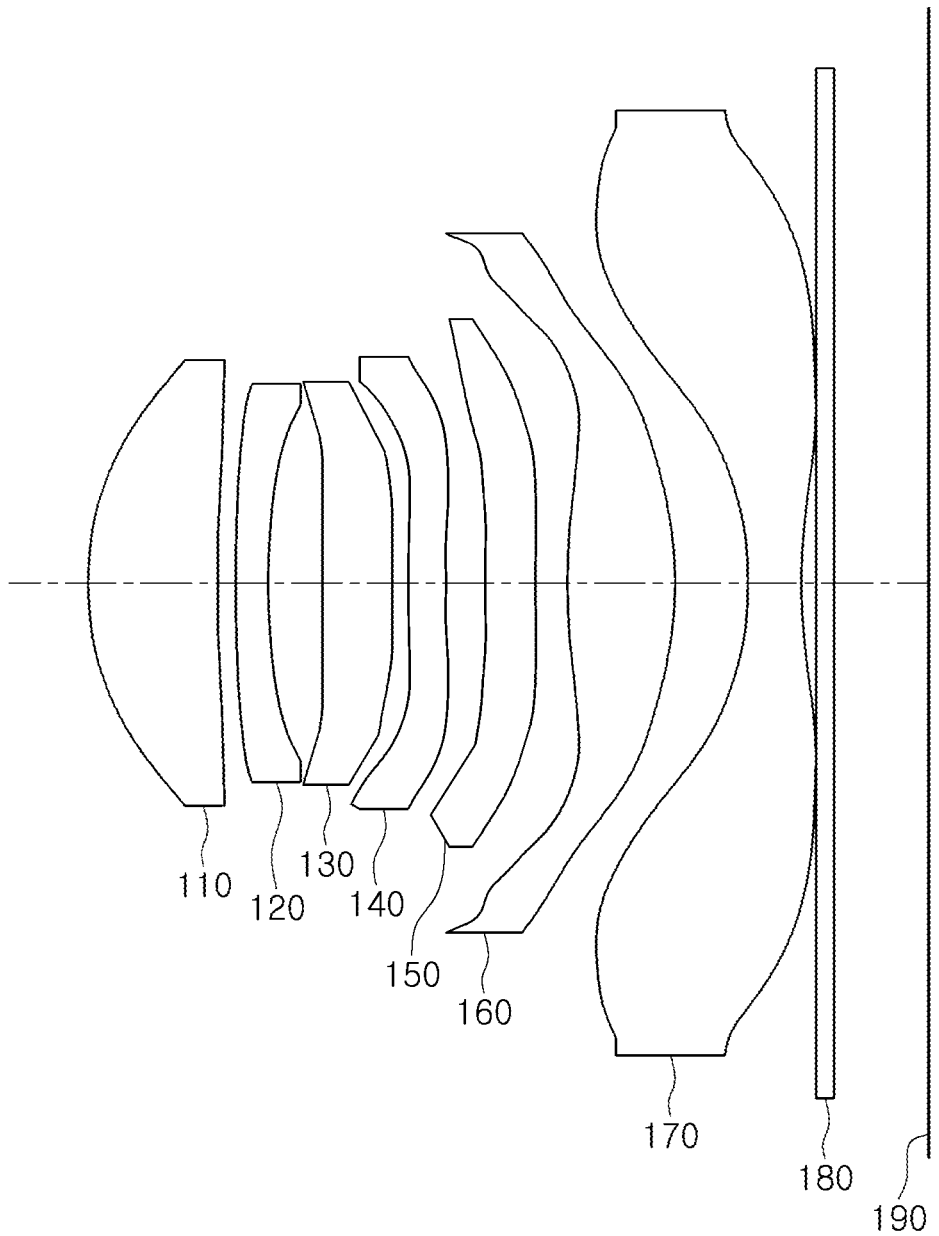
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Thicknesses, sizes, and shapes of lenses illustrated in the drawings may have been slightly exaggerated for convenience of explanation. In addition, the shapes of spherical surfaces or aspherical surfaces of the lenses described in the detailed description and illustrated in the drawings are merely examples. That is, the shapes of the spherical surfaces or the aspherical surfaces of the lenses are not limited to the examples described herein.

Numerical values of radii of curvature, thicknesses of lenses, distances between elements including lenses or surfaces, effective aperture radii of lenses, focal lengths, and diameters, thicknesses, and lengths of various elements are expressed in millimeters (mm), and angles are expressed in degrees. Thicknesses of lenses and distances between elements including lenses or surfaces are measured along the optical axis of the optical imaging system.

The term "effective aperture radius" as used in this application refers to a radius of a portion of a surface of a lens or other element (an object-side surface or an image-side surface of a lens or other element) through which light actually passes. The effective aperture radius is equal to a distance measured perpendicular to an optical axis of the surface between the optical axis of the surface and the outermost point on the surface through which light actually passes. Therefore, the effective aperture radius may be equal to a radius of an optical portion of a surface, or may be smaller than the radius of the optical portion of the surface if light does not pass through a peripheral portion of the optical portion of the surface. The object-side surface and the image-side surface of a lens or other element may have different effective aperture radii.

In this application, unless stated otherwise, a reference to the shape of a lens surface means the shape of a paraxial region of the lens surface. A paraxial region of a lens surface is a central portion of the lens surface surrounding the optical axis of the lens surface in which light rays incident to the lens surface make a small angle $\theta$ to the optical axis and the approximations $\sin\theta \approx \theta$, $\tan\theta \approx \theta$, and $\cos\theta \approx \theta$ are valid.

For example, a statement that the object-side surface of a lens is convex means that at least a paraxial region of the object-side surface of the lens is convex, and a statement that the image-side surface of the lens is concave means that at least a paraxial region of the image-side surface of the lens is concave. Therefore, even though the object side-surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

Figure 57:
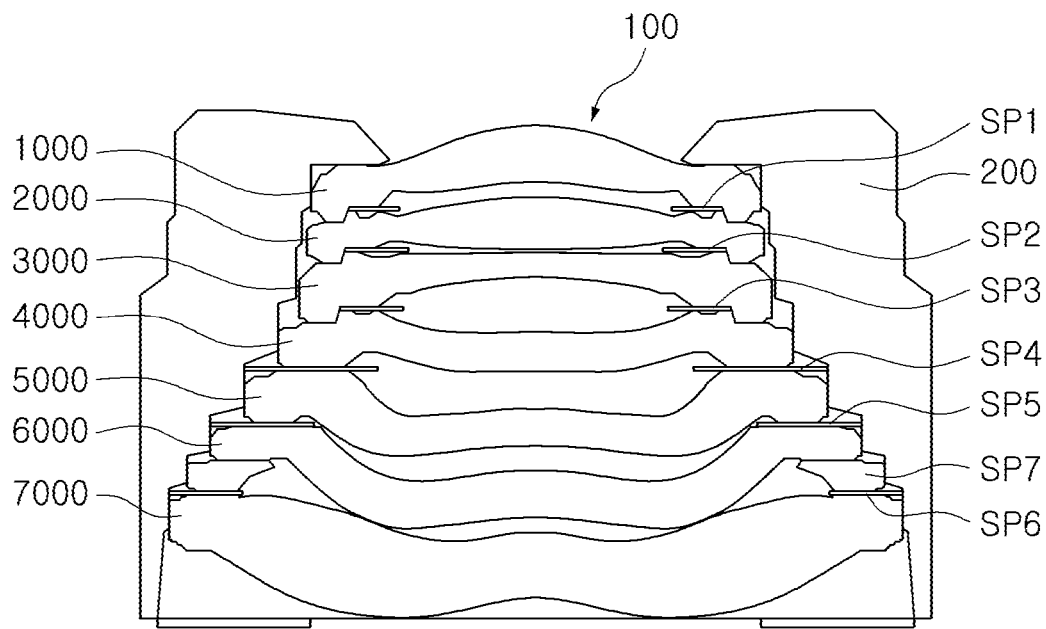
FIGS. 57 and 58 are cross-sectional views illustrating examples of an optical imaging system and a lens barrel coupled to each other.
Figure 58:
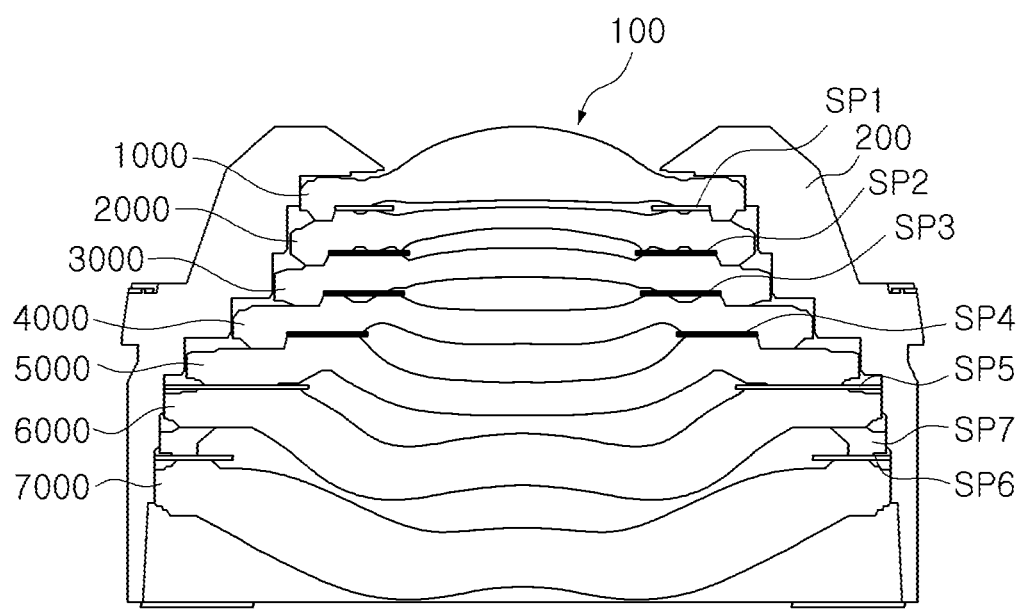

FIGS. 57 and 58 are cross-sectional views illustrating examples of an optical imaging system and a lens barrel coupled to each other.

Referring to FIGS. 57 and 58, an optical imaging system 100 includes a plurality of lenses disposed along an optical axis. In addition, the optical imaging system 100 further includes a lens barrel 200 accommodating the plurality of lenses therein. The plurality of lenses are spaced apart from each other by predetermined distances along the optical axis.

Each lens of the optical imaging system 100 includes an optical portion and a rib. The optical portion of the lens is a portion of the lens that is configured to refract light, and is generally formed in a central portion of the lens. The rib of the lens is an edge portion of the lens that enables the lens to be mounted in the lens barrel 200 and the optical axis of the lens to be aligned with the optical axis of the optical imaging system 100. The rib of the lens extends radially outward from the optical portion, and may be formed integrally with the optical portion. The optical portions of the lenses are generally not in contact with each other. For example, the first to seventh lenses are mounted in the lens barrel 200 so that they are spaced apart from one another by predetermined distances along the optical axis of the optical imaging system 100. The ribs of the lenses may be in selective contact with each other. For example, the ribs of the first to fourth lenses, or the first to fifth lenses, or the second to fourth lenses, may be in contact with each other so that the optical axes of these lenses may be easily aligned with the optical axis of the optical imaging system 100.

The examples of the optical imaging system 100 described in this application may include a self-alignment structure as illustrated in FIGS. 57 and 58.

In one example illustrated in FIG. 57, the optical imaging system 100 includes a self-alignment structure in which optical axes of four consecutive lenses 1000, 2000, 3000, and 4000 are aligned with an optical axis of the optical imaging system 100 by coupling the four lenses 1000, 2000, 3000, and 4000 to one another.

The first lens 1000 disposed closest to an object side of the optical imaging system 100 is disposed in contact with an inner surface of the lens barrel 200 to align the optical axis of the first lens 1000 with the optical axis of the optical imaging system 100, the second lens 2000 is coupled to the first lens 1000 to align the optical axis of the second lens 2000 with the optical axis of the optical imaging system 100, the third lens 3000 is coupled to the second lens 2000 to align the optical axis of the third lens 3000 with the optical axis of the optical imaging system 100, and the fourth lens 4000 is coupled to the third lens 3000 to align the optical axis of the fourth lens 4000 with the optical axis of the optical imaging system 100. The second lens 2000 to the fourth lens 4000 may not be disposed in contact with the inner surface of the lens barrel 200.

Although FIG. 57 illustrates that the first lens 1000 to the fourth lens 4000 are coupled to one another, the four consecutive lenses that are coupled to one another may be changed to the second lens 2000 to a fifth lens 5000, the third lens 3000 to a sixth lens 6000, or the fourth lens 4000 to a seventh lens 7000.

In another example illustrated in FIG. 58, the optical imaging system 100 includes a self-alignment structure in which optical axes of five consecutive lenses 1000, 2000, 3000, 4000, and 5000 are aligned with an optical axis of the optical imaging system 100 by coupling the five lenses 1000, 2000, 3000, 4000, and 5000 to one another.

The first lens 1000 disposed closest to an object side of the optical imaging system 100 is disposed in contact with an inner surface of the lens barrel 200 to align an optical axis of the first lens 1000 with the optical axis of the optical imaging system 100, the second lens 2000 is coupled to the first lens 1000 to align the optical axis of the second lens 2000 with the optical axis of the optical imaging system 100, the third lens 3000 is coupled to the second lens 2000 to align the optical axis of the third lens 3000 with the optical axis of the optical imaging system 100, the fourth lens 4000 is coupled to the third lens 3000 to align the optical axis of the fourth lens 4000 with the optical axis of the optical imaging system 100, and the fifth lens 5000 is coupled to the fourth lens 4000 to align the optical axis of the fifth lens 5000 with the optical axis of the optical imaging system 100. The second lens 2000 to the fifth lens 5000 may not be disposed in contact with the inner surface of the lens barrel 200.

Although FIG. 58 illustrates that the first lens 1000 to the fifth lens 5000 are coupled to one another, the five consecutive lenses that are coupled to one another may be changed to the second lens 2000 to a sixth lens 6000, or the third lens 3000 to a seventh lens 7000.

The first lens 1000 is a lens closest to an object (or a subject) to be imaged by the optical imaging system 100, while the seventh lens 7000 is a lens closest to an image sensor (not shown in FIGS. 57 and 58, but see the image sensor 190 in FIG. 1, for example).

In addition, an object-side surface of a lens is a surface of the lens facing the object, and an image-side surface of a lens is a surface of the lens facing the image sensor.

The examples of the optical imaging system 100 disclosed in this application include seven lenses.

For example, referring to FIGS. 57 and 58, the optical imaging system 100 includes a first lens 1000, a second lens 2000, a third lens 3000, a fourth lens 4000, a fifth lens 5000, a sixth lens 6000, and a seventh lens 7000 sequentially disposed in numerical order along an optical axis of the optical imaging system 100 from an object side of the optical imaging system 100 toward an imaging plane of the optical imaging system 100.

The optical imaging system 100 further includes an image sensor and a filter. The image sensor forms an imaging plane, and converts light refracted by the first to seventh lenses into an electric signal. The filter is disposed between the seventh lens and the imaging plane, and blocks infrared rays in the light refracted by the first to seventh lenses from being incident on the imaging plane.

In addition, the optical imaging system 100 further includes a stop to adjust an amount of light incident on the imaging plane. For example, the stop may be disposed in front of the first lens 1000, or between the first lens 1000 and the second lens 2000, or between the second lens 2000 and the third lens 3000, or at the position of either an object-side surface or an image-side surface of one of the first lens 1000 to the third lens 3000. The stop may be disposed relatively close to the first lens 1000 to reduce a total length (TTL) of the optical imaging system 100. Some examples may include two stops, one of which may be disposed in front of the first lens 1000, or at the position of the object-side surface of the first lens 1000, or between the object-side surface and the image-side surface of the first lens 1000.

In the examples illustrated in FIGS. 57 and 58, a spacer is disposed between each pair of adjacent lenses. At least a portion of the rib of each lens is in contact with one or two of the spacers. The spacers maintain spacings between the lenses, and block stray light from reaching the imaging plane.

The spacers include a first spacer SP1, a second spacer SP2, a third spacer SP3, a fourth spacer SP4, a fifth spacer SP5, and a sixth spacer SP6 disposed from the object side of the optical imaging system 100 toward the image sensor. In some examples, the spacers further include a seventh spacer SP7.

The first spacer SP1 is disposed between the first lens 1000 and the second lens 2000, the second spacer SP2 is disposed between the second lens 2000 and the third lens 3000, the third spacer SP3 is disposed between the third lens 3000 and the fourth lens 4000, the fourth spacer SP4 is disposed between the fourth lens 4000 and the fifth lens 5000, the fifth spacer SP5 is disposed between the fifth lens 5000 and the sixth lens 6000, and the sixth spacer SP6 is disposed between the sixth lens 6000 and the seventh lens 7000. When the seventh spacer SP7 is included, the seventh spacer SP7 is disposed between the sixth lens 6000 and the sixth spacer SP6. A thickness of the seventh spacer SP7 in an optical axis direction may be greater than a thickness of the sixth spacer SP6 in the optical axis direction.

The first lens has a positive refractive power or a negative refractive power. In addition, the first lens may have a meniscus shape of which an object-side surface is convex. In detail, an object-side surface of the first lens may be convex, and an image-side surface thereof may be concave.

At least one of the object-side surface and the image-side surface of the first lens may be aspherical. For example, both surfaces of the first lens may be aspherical.

The second lens has a positive refractive power or a negative refractive power. In addition, the second lens may have a meniscus shape of which an object-side surface is convex. In detail, an object-side surface of the second lens may be convex, and an image-side surface thereof may be concave.

Alternatively, both surfaces of the second lens may be convex. In detail, the object-side surface and the image-side surface of the second lens may be convex.

At least one of the object-side surface and the image-side surface of the second lens may be aspherical. For example, both surfaces of the second lens may be aspherical.

The third lens has a positive refractive power or a negative refractive power. In addition, the third lens may have a meniscus shape of which an object-side surface is convex. In detail, an object-side surface of the third lens may be convex, and an image-side surface thereof may be concave.

Alternatively, both surfaces of the third lens may be convex. In detail, the object-side surface and the image-side surface of the third lens may be convex.

Alternatively, the third lens may have a meniscus shape of which an image-side surface is convex. In detail, an object-side surface of the third lens may be concave, and an image-side surface thereof may be convex.

At least one of the object-side surface and the image-side surface of the third lens may be aspherical. For example, both surfaces of the third lens may be aspherical.

The fourth lens has a positive refractive power or a negative refractive power. In addition, the fourth lens may have a meniscus shape of which an object-side surface is convex. In detail, an object-side surface of the fourth lens may be convex, and an image-side surface thereof may be concave.

Alternatively, both surfaces of the fourth lens may be convex. In detail, the object-side surface and the image-side surface of the fourth lens may be convex.

Alternatively, the fourth lens may have a meniscus shape of which an image-side surface is convex. In detail, an object-side surface of the fourth lens may be concave, and an image-side surface thereof may be convex.

At least one of the object-side surface and the image-side surface of the fourth lens may be aspherical. For example, both surfaces of the fourth lens may be aspherical.

The fifth lens has a positive refractive power or a negative refractive power. In addition, the fifth lens may have a meniscus shape of which an object-side surface is convex. In detail, an object-side surface of the fifth lens may be convex, and an image-side surface thereof may be concave.

Alternatively, the fifth lens may have a meniscus shape of which an image-side surface is convex. In detail, an object-side surface of the fifth lens may be concave, and an image-side surface thereof may be convex.

At least one of the object-side surface and the image-side surface of the fifth lens may be aspherical. For example, both surfaces of the fifth lens may be aspherical.

The sixth lens has a positive refractive power or a negative refractive power. In addition, the sixth lens may have a meniscus shape of which an object-side surface is convex. In detail, an object-side surface of the sixth lens may be convex, and an image-side surface thereof may be concave.

Alternatively, both surfaces of the sixth lens may be convex. In detail, the object-side surface and the image-side surface of the sixth lens may be convex.

Alternatively, the sixth lens may have a meniscus shape of which an image-side surface is convex. In detail, an object-side surface of the sixth lens may be concave, and an image-side surface thereof may be convex.

Alternatively, both surfaces of the sixth lens may be concave. In detail, the object-side surface and the image-side surface of the sixth lens may be concave.

At least one of the object-side surface and the image-side surface of the sixth lens may be aspherical. For example, both surfaces of the sixth lens may be aspherical.

The seventh lens has a positive refractive power or a negative refractive power. In addition, the seventh lens may have a meniscus shape of which an object-side surface is convex. In detail, an object-side surface of the seventh lens may be convex, and an image-side surface thereof may be concave.

Alternatively, both surfaces of the seventh lens may be concave. In detail, the object-side surface and the image-side surface of the seventh lens may be concave.

At least one of the object-side surface and the image-side surface of the seventh lens may be aspherical. For example, both surfaces of the seventh lens may be aspherical.

In addition, at least one inflection point may be formed on at least one of the object-side surface and the image-side surface of the seventh lens. An inflection point is a point where a lens surface changes from convex to concave, or from concave to convex. A number of inflection points is counted from a center of the lens to an outer edge of the optical portion of the lens. For example, the object-side surface of the seventh lens may be convex in a paraxial region, and become concave toward an edge thereof. The image-side surface of the seventh lens may be concave in a paraxial region, and become convex toward an edge thereof.

Figure 59:
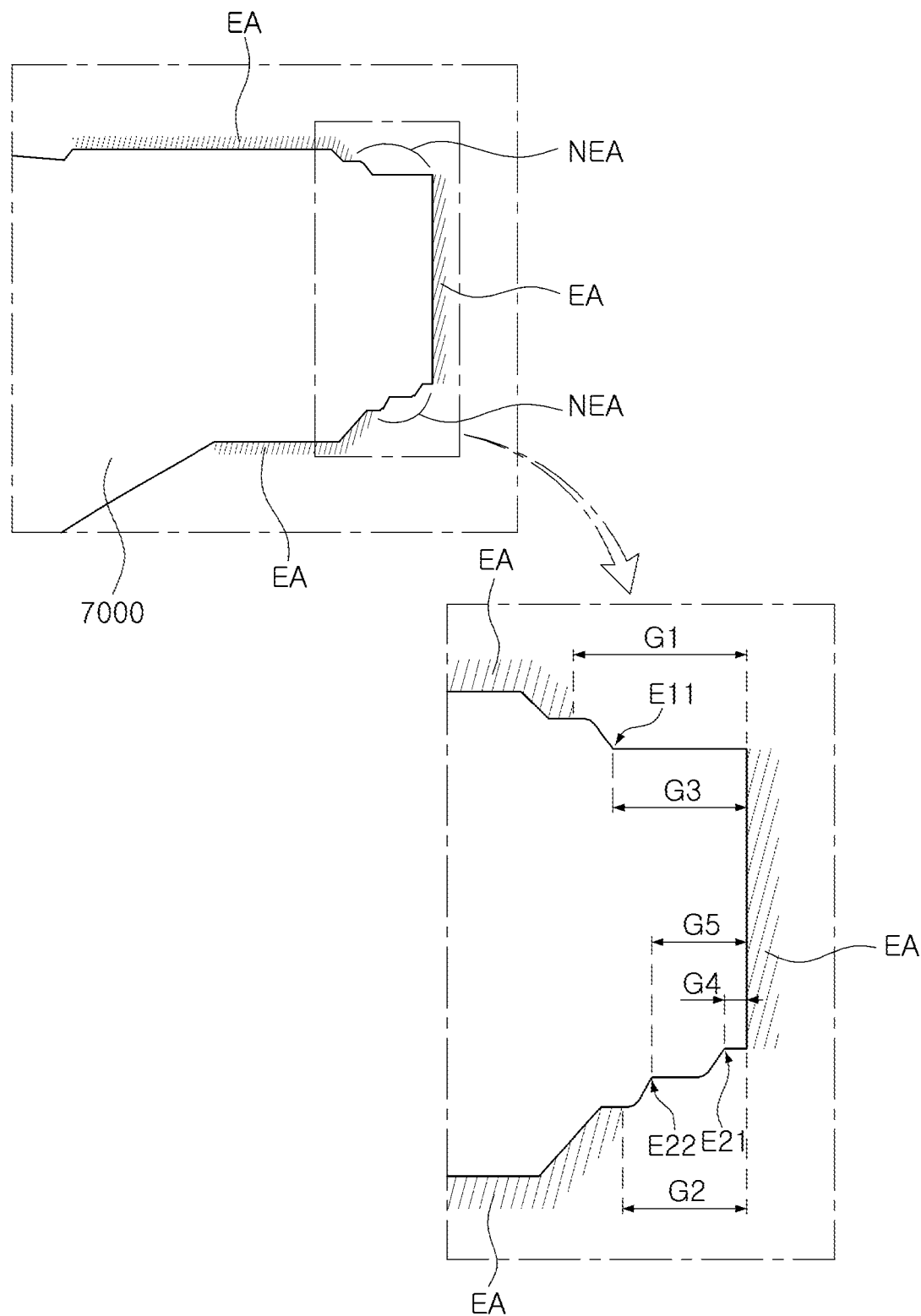
FIG. 59 is a cross-sectional view illustrating an example of a shape of a rib of a seventh lens.

FIG. 59 is a cross-sectional view illustrating an example of a shape of a rib of a seventh lens.

Light reflected from the object (or the subject) may be refracted by the first to seventh lenses. In this case, an unintended reflection of the light may occur. The unintended reflection of the light, which is light unrelated to formation of an image, may cause a flare phenomenon in a captured image.

The examples of the optical imaging system 100 described in this application may include a structure for preventing a flare phenomenon and reflection.

For example, as illustrated in FIG. 59, a rib of the seventh lens 7000 disposed closest to the image sensor includes a surface-treated area EA. The surface-treated area EA is a portion of a surface of the rib that has been surface-treated to be rougher than other portions of the surface of the rib. For example, the surface-treated area EA may be formed by chemical etching, physical grinding, or any other surface treatment method capable of increasing a roughness of a surface. The surface-treated area EA scatters reflected light.

Therefore, even though the unintended reflection of the light may occur, the reflected light is prevented from being concentrated at one point, and therefore the occurrence of the flare phenomenon may be suppressed.

The surface-treated area EA may be formed in an entire area from an edge of the optical portion of the seventh lens 7000 through which light actually passes to an outer end of the rib. However, as illustrated in FIG. 59, non-treated areas NEA including step portions E11, E21, and E22 may not be surface-treated, or may be surface-treated to have a roughness less than a roughness of the surface-treated area EA. The step portions E11, E21, and E22 are portions where the thickness of the rib abruptly changes. A first non-treated area NEA formed on an object-side surface of the seventh lens 7000 and including a first step portion E11 and a second non-treated area NEA formed on an image-side surface of the seventh lens 7000 and including a second step portion E12 and a third step portion E22 may overlap each other when viewed in the optical axis direction.

A width G1 of the first non-treated area NEA formed on the object-side surface of the seventh lens 7000 may be different from a width G2 of the second non-treated area NEA formed on the image-side surface of the seventh lens 7000. In the example illustrated in FIG. 59, G1 is greater than G2.

The width G1 of the first non-treated area NEA includes the first step portion E11, the second step portion E21, and the third step portion E22 when viewed in the optical axis direction, and the width G2 of the second non-treated area includes the second step portion E21 and the third step portion E22 but not the first step portion E11 when viewed in the optical axis direction. A distance G4 from the outer end of the rib to the second step portion E21 is smaller than a distance G3 from the outer end of the rib to the first step portion E11. Similarly, a distance G5 from the outer end of the rib to the third step portion E22 is smaller than the distance G3 from the outer end of the rib to the first step portion E11.

The positions at which the non-treated areas NEA and the step portions E11, E21, and E22 are formed as described above and shown in FIG. 59 may be advantageous for measuring a concentricity of the seventh lens 7000.

The lenses of the optical imaging system may be made of a light material having a high light transmittance. For example, the first to seventh lenses may be made of a plastic material. However, a material of the first to seventh lenses is not limited to the plastic material.

In addition, the first to seventh lenses may have at least one aspherical surface. That is, at least one of the object-side surface and the image-side surface of all of the first to seventh lenses may be aspherical. The aspherical surfaces of the first to seventh lenses may be represented by the following Equation 1:

$$Z = \frac{cY^2}{1 + \sqrt{1 - (1+K)c^2Y^2}} + AY^4 + BY^6 + CY^8 + DY^{10} + EY^{12} + FY^{14} + GY^{16} + HY^{18} + \ldots \quad (1)$$

In Equation 1, c is a curvature of a lens surface and is equal to an inverse of a radius of curvature of the lens surface at an optical axis of the lens surface, K is a conic constant, Y is a distance from a certain point on an aspherical surface of the lens to an optical axis of the lens in a direction perpendicular to the optical axis, A to H are aspherical constants, Z (or sag) is a distance between the certain point on the aspherical surface of the lens at the distance Y to the optical axis and a tangential plane perpendicular to the optical axis meeting the apex of the aspherical surface of the lens. Some of the examples disclosed in this application include an aspherical constant J. An additional term of $JY^{20}$ may be added to the right side of Equation 1 to reflect the effect of the aspherical constant J.

The optical imaging system may satisfy one or more of the following Conditional Expressions 1 to 5:

| | |
|---|---|
| 0.1<L1w/L7w<0.4 | (Conditional Expression 1) |
| 0.5<S6d/f<1.4 | (Conditional Expression 2) |
| 0.4<L1TR/L7TR<1.9 | (Conditional Expression 3) |
| 0.5<L1234TRavg/L7TR<0.9 | (Conditional Expression 4) |
| 0.5<L12345TRavg/L7TR<0.9 | (Conditional Expression 5) |

In the above Conditional Expressions, L1w is a weight of the first lens, and L7w is a weight of the seventh lens.

S6d is an inner diameter of the sixth spacer, and f is an overall focal length of the optical imaging system.

L1TR is an overall outer diameter of the first lens, and L7TR is an overall outer diameter of the seventh lens. The overall outer diameter of a lens is an outer diameter of the lens including both the optical portion of the lens and the rib of the lens.

L1234TRavg is an average value of overall outer diameters of the first to fourth lenses, and L12345TRavg is an average value of overall outer diameters of the first to fifth lenses.

Conditional Expression 1 is a conditional expression related to a weight ratio between the first lens and the seventh lens, and when Conditional Expression 1 is satisfied, optical axes may be easily aligned with one another through contact between the respective lenses and contact between the lenses and the lens barrel.

Conditional Expression 2 is a conditional expression related to a ratio between the inner diameter of the sixth spacer disposed between the sixth lens and the seventh lens and the overall focal length of the optical imaging system, and when Conditional Expression 2 is satisfied, the flare phenomenon due to the unintended reflection of the light may be suppressed.

Conditional Expression 3 is a conditional expression related to a ratio between the overall outer diameter of the first lens and the overall outer diameter of the seventh lens, and when Conditional Expression 3 is satisfied, optical axes may be easily aligned with one another through contact between the respective lenses and contact between the lenses and the lens barrel.

Conditional Expression 4 is a conditional expression related to a ratio between the average value of the overall outer diameters of the first to fourth lenses and the overall outer diameter of the seventh lens, and when Conditional Expression 4 is satisfied, aberration may be easily corrected to improve resolution.

Conditional Expression 5 is a conditional expression related to a ratio between the average value of the overall outer diameters of the first to fifth lenses and the overall outer diameter of the seventh lens, and when Conditional Expression 5 is satisfied, aberration may be easily corrected to improve resolution.

The optical imaging system may also satisfy one or more of the following Conditional Expressions 6 to 10:

$0.1 < L1w/L7w < 0.3$  (Conditional Expression 6)

$0.5 < S6d/f < 1.2$  (Conditional Expression 7)

$0.4 < L1TR/L7TR < 0.7$  (Conditional Expression 8)

$0.5 < L1234TRavg/L7TR < 0.75$  (Conditional Expression 9)

$0.5 < L12345TRavg/L7TR < 0.76$  (Conditional Expression 10)

Conditional Expressions 6 to 10 are the same as Conditional Expressions 1 to 5, except that Conditional Expressions 6 to 10 specify narrower ranges.

The optical imaging system may also satisfy one or more of the following Conditional Expressions 11 to 32:

$0.01 < R1/R4 < 1.3$  (Conditional Expression 11)

$0.1 < R1/R5 < 0.7$  (Conditional Expression 12)

$0.05 < R1/R6 < 0.9$  (Conditional Expression 13)

$0.2 < R1/R11 < 1.2$  (Conditional Expression 14)

$0.8 < R1/R14 < 1.2$  (Conditional Expression 15)

$0.6 < (R11+R14)/(2*R1) < 3.0$  (Conditional Expression 16)

$0.4 < D13/D57 < 1.2$  (Conditional Expression 17)

$0.1 < (1/f1+1/f2+1/f3+1/f4+1/f5+1/f6+1/f7)(f) < 2.0$  (Conditional Expression 18)

$0.1 < (1/f1+1/f2+1/f3+1/f4+1/f5+1/f6+1/f7)(TTL) < 2.0$  (Conditional Expression 19)

$0.2 < TD1/D67 < 0.8$  (Conditional Expression 20)

$0.1 < (R11+R14)/(R5+R6) < 1.0$  (Conditional Expression 21)

$SD12 < SD34$  (Conditional Expression 22)

$SD56 < SD67$  (Conditional Expression 23)

$SD56 < SD34$  (Conditional Expression 24)

$0.6 < TTL/(2*IMG\ HT) < 0.9$  (Conditional Expression 25)

$0.2 < \Sigma SD/\Sigma TD < 0.7$  (Conditional Expression 26)

$0 < \min(f1:f3)/\max(f4:f7) < 0.4$  (Conditional Expression 27)

$0.4 < \Sigma TD/TTL < 0.7$  (Conditional Expression 28)

$0.7 < SL/TTL < 1.0$  (Conditional Expression 29)

$0.81 < f12/f123 < 0.96$  (Conditional Expression 30)

$0.6 < f12/f1234 < 0.84$  (Conditional Expression 31)

$TTL \leq 6.00$  (Conditional Expression 32)

In the above Conditional Expressions, R1 is a radius of curvature of an object-side surface of the first lens, R4 is a radius of curvature of an image-side surface of the second lens, R5 is a radius of curvature of an object-side surface of the third lens, R6 is a radius of curvature of an image-side surface of the third lens, R11 is a radius of curvature of an object-side surface of the sixth lens, R14 is a radius of curvature of an image-side surface of the seventh lens.

D13 is a distance along an optical axis of the optical imaging system from the object-side surface of the first lens to the image-side surface of the third lens, and D57 is a distance along the optical axis from an object-side surface of the fifth lens to the image-side surface of the seventh lens.

f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f is an overall focal length of the optical imaging system, and TTL is a distance along the optical axis from the object-side surface of the first lens to an imaging plane of an image sensor of the optical imaging system.

TD1 is a thickness along the optical axis of the first lens, and D67 is a distance along the optical axis from the object-side surface of the sixth lens to the image-side surface of the seventh lens.

SD12 is a distance along the optical axis from an image-side surface of the first lens to an object-side surface of the second lens, SD34 is a distance along the optical axis from the image-side surface of the third lens to an object-side surface of the fourth lens, SD56 is a distance along the optical axis from an image-side surface of the fifth lens to the object-side surface of the sixth lens, and SD67 is a distance along the optical axis from an image-side surface of the sixth lens to an object-side surface of the seventh lens.

IMG HT is one-half of a diagonal length of the imaging plane of the image sensor.

$\Sigma SD$ is a sum of air gaps along the optical axis between the first to seventh lenses, and $\Sigma TD$ is a sum of thicknesses along the optical axis of the first to seventh lenses. An air gap is a distance along the optical axis between adjacent ones of the first to seventh lenses.

min(f1:f3) is a minimum value of absolute values of the focal lengths of the first to third lenses, and max(f4:f7) is a maximum value of absolute values of the focal lengths of the fourth to seventh lenses.

SL is a distance along the optical axis from the stop to the imaging plane of the image sensor.

f12 is a composite focal length of the first and second lenses, f123 is a composite focal length of the first to third lenses, and f1234 is a composite focal length of the first to fourth lenses.

When Conditional Expression 11 is satisfied, correction effects of longitudinal spherical aberration and astigmatic field curves may be improved, and resolution may thus be improved.

When Conditional Expression 12 is satisfied, correction effects of longitudinal spherical aberration and astigmatic field curves may be improved, and resolution may thus be improved.

When Conditional Expression 13 is satisfied, correction effects of longitudinal spherical aberration and astigmatic field curves may be improved, and resolution may thus be improved.

When Conditional Expression 14 is satisfied, a correction effect of longitudinal spherical aberration may be improved, and the flare phenomenon may be prevented. Therefore, resolution may be improved.

When Conditional Expression 15 is satisfied, a correction effect of longitudinal spherical aberration may be improved, and an imaging plane curvature phenomenon may be suppressed. Therefore, resolution may be improved.

When Conditional Expression 16 is satisfied, a correction effect of longitudinal spherical aberration may be improved, an imaging plane curvature phenomenon may be suppressed, and the flare phenomenon may be prevented. Therefore, resolution may be improved.

When Conditional Expression 17 is satisfied, a slim optical imaging system may be implemented.

When Conditional Expression 18 is satisfied, sensitivity of each lens may be improved to improve mass productivity.

When Conditional Expression 20 is satisfied, a slim optical imaging system may be implemented.

When Conditional Expression 22 is satisfied, a chromatic aberration correction effect may be improved.

When Conditional Expression 25 is satisfied, a slim optical imaging system may be implemented.

When Conditional Expression 26 is satisfied, mass productivity of each lens may be improved, and a slim optical imaging system may be implemented.

When Conditional Expression 27 is satisfied, a slim optical imaging system may be implemented.

When Conditional Expression 28 is satisfied, mass productivity of each lens may be improved, and a slim optical imaging system may be implemented.

When Conditional Expression 29 is satisfied, a slim optical imaging system may be implemented.

When Conditional Expression 30 is satisfied, a slim optical imaging system may be implemented.

When Conditional Expression 31 is satisfied, a slim optical imaging system may be implemented.

Next, various examples of the optical imaging system will be described. In the tables that appear in the following examples, S1 denotes an object-side surface of a first lens, S2 denotes an image-side surface of the first lens, S3 denotes an object-side surface of a second lens, S4 denotes an image-side surface of the second lens, S5 denotes an object-side surface of a third lens, S6 denotes an image-side surface of the third lens, S7 denotes an object-side surface of a fourth lens, S8 denotes an image-side surface of the fourth lens, S9 denotes an object-side surface of a fifth lens, S10 denotes an image-side surface of the fifth lens, S11 denotes an object-side surface of a sixth lens, S12 denotes an image-side surface of the sixth lens, S13 denotes an object-side surface of a seventh lens, S14 denotes an image-side surface of the seventh lens, S15 denotes an object-side surface of a filter, S16 denotes an image-side surface of the filter, and S17 denotes an imaging plane.

First Example

Figure 2:
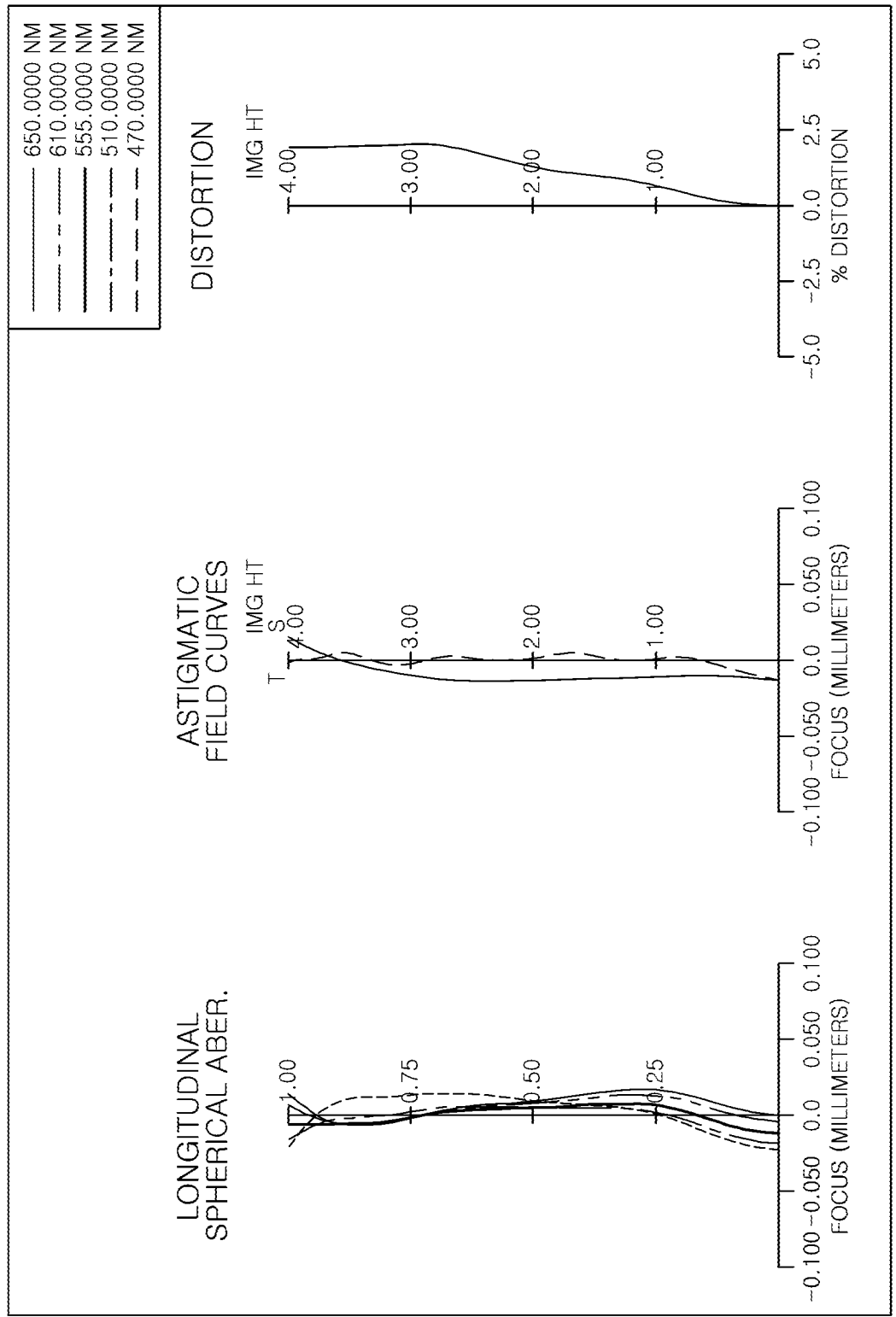
FIG. 2 illustrates aberration curves of the optical imaging system of FIG. 1.

FIG. 1 is a view illustrating a first example of an optical imaging system, and FIG. 2 illustrates aberration curves of the optical imaging system of FIG. 1.

The first example of the optical imaging system includes a first lens 110, a second lens 120, a third lens 130, a fourth lens 140, a fifth lens 150, a sixth lens 160, a seventh lens 170, a filter 180, an image sensor 190, and a stop (not shown) disposed between the first lens 110 and the second lens 120.

The first lens 110 has a positive refractive power, a paraxial region of an object-side surface thereof is convex, and a paraxial region of an image-side surface thereof is concave.

The second lens 120 has a negative refractive power, a paraxial region of an object-side surface thereof is convex, and a paraxial region of an image-side surface thereof is concave.

The third lens 130 has a positive refractive power, and a paraxial region of each of an object-side surface and an image-side surface thereof is convex.

The fourth lens 140 has a negative refractive power, a paraxial region of an object-side surface thereof is convex, and a paraxial region of an image-side surface thereof is concave.

The fifth lens 150 has a negative refractive power, a paraxial region of an object-side surface thereof is convex, and a paraxial region of an image-side surface thereof is concave.

The sixth lens 160 has a positive refractive power, and a paraxial region of each of an object-side surface and an image-side surface thereof is convex.

The seventh lens 170 has a negative refractive power, and a paraxial region of each of an object-side surface and an image-side surface thereof is concave.

One inflection point is formed on the object-side surface of the seventh lens 170. In particular, the object-side surface of the seventh lens 170 is concave in the paraxial region, and becomes convex toward an edge thereof.

In addition, one inflection point is formed on the image-side surface of the seventh lens 170. In particular, the image-side surface of the seventh lens 170 is concave in the paraxial region, and becomes convex toward an edge thereof.

Although not illustrated in FIG. 1, the stop is disposed at a distance of 0.929 mm from the object-side surface of the first lens 110 toward the imaging plane of the optical imaging system. This distance is equal to TTL-SL and can be calculated from the values of TTL and SL for Example 1 listed in Table 57 that appears later in this application.

Table 1 below shows physical properties of the lenses and other elements of the optical imaging system of FIG. 1, and Table 2 below shows aspherical surface coefficients of the lenses of FIG. 1. Both surfaces of all of the lenses of FIG. 1 are aspherical except for the object-side surface of the second lens 120, which is spherical.

TABLE 1

| Surface No. | Element | Radius of Curvature | Thickness/ Distance | Index of Refraction | Abbe Number | Effective Aperture Radius |
|---|---|---|---|---|---|---|
| S1 | First | 2.0856092 | 0.9292118 | 1.546 | 56.114 | 1.59 |
| S2 | Lens | 8.93043513 | 0.1200399 | | | 1.53 |

TABLE 1-continued

| Surface No. | Element | Radius of Curvature | Thickness/ Distance | Index of Refraction | Abbe Number | Effective Aperture Radius |
|---|---|---|---|---|---|---|
| S3 | Second | 5.86244103 | 0.23 | 1.669 | 20.353 | 1.43 |
| S4 | Lens | 3.38051351 | 0.3866461 | | | 1.26 |
| S5 | Third | 18.3857198 | 0.5076267 | 1.546 | 56.114 | 1.35 |
| S6 | Lens | −65.41545 | 0.1166172 | | | 1.43 |
| S7 | Fourth | 7.98746366 | 0.26 | 1.669 | 20.353 | 1.45 |
| S8 | Lens | 6.4766936 | 0.2853054 | | | 1.61 |
| S9 | Fifth | 58.6668676 | 0.3539979 | 1.644 | 23.516 | 1.74 |
| S10 | Lens | 7.23744347 | 0.2316773 | | | 2.00 |
| S11 | Sixth | 3.60524352 | 0.7682194 | 1.546 | 56.114 | 2.24 |
| S12 | Lens | −2.4011013 | 0.5228213 | | | 2.49 |
| S13 | Seventh | −2.5241007 | 0.38 | 1.546 | 56.114 | 3.26 |
| S14 | Lens | 3.01958733 | 0.107837 | | | 3.38 |
| S15 | Filter | Infinity | 0.11 | 1.519 | 64.197 | 3.66 |
| S16 | | Infinity | 0.69 | | | 3.69 |
| S17 | Imaging Plane | Infinity | | | | 4.00 |

TABLE 2

| | K | A | B | C | D |
|---|---|---|---|---|---|
| S1 | −1.08941 | 0.013187 | 0.009962 | −0.01583 | 0.018971 |
| S2 | 12.57642 | −0.04786 | 0.041598 | −0.02674 | 0.011876 |
| S3 | 0 | 0 | 0 | 0 | 0 |
| S4 | −1.83147 | −0.06555 | 0.065057 | −0.0107 | −0.02653 |
| S5 | 0 | −0.02189 | −0.00092 | −0.021 | 0.023433 |
| S6 | −95 | −0.0632 | −0.00174 | 0.021978 | −0.05295 |
| S7 | 0 | −0.1339 | 0.057694 | −0.15773 | 0.257112 |
| S8 | 0 | −0.1017 | 0.077852 | −0.15614 | 0.199503 |
| S9 | 0 | −0.12052 | 0.152814 | −0.15655 | 0.114747 |
| S10 | 3.458235 | −0.18471 | 0.140789 | −0.10891 | 0.070568 |
| S11 | −19.5338 | −0.01378 | −0.01807 | 0.002094 | 0.001582 |
| S12 | −0.75818 | 0.09278 | −0.06699 | 0.021292 | −0.0052 |
| S13 | −14.2476 | −0.09472 | −0.00377 | 0.015632 | −0.00476 |
| S14 | −0.57988 | −0.09619 | 0.026231 | −0.00426 | 0.000309 |

| | E | F | G | H | J |
|---|---|---|---|---|---|
| S1 | −0.01385 | 0.006018 | −0.00143 | 0.000134 | 0 |
| S2 | −0.00481 | 0.001502 | −0.00027 | 1.69E−05 | 0 |
| S3 | 0 | 0 | 0 | 0 | 0 |
| S4 | 0.029888 | −0.01246 | 0.001484 | 0.000416 | 0 |
| S5 | −0.0118 | −0.00341 | 0.005424 | −0.00134 | 0 |
| S6 | 0.060706 | −0.04155 | 0.015887 | −0.00255 | 0 |
| S7 | −0.23831 | 0.127642 | −0.03688 | 0.004447 | 0 |
| S8 | −0.15311 | 0.069086 | −0.01708 | 0.001797 | 0 |
| S9 | −0.05967 | 0.019523 | −0.00362 | 0.000296 | 0 |
| S10 | −0.03223 | 0.008954 | −0.00133 | 8.01E−05 | 0 |
| S11 | −0.0008 | 0.00013 | −2.5E−06 | −6.7E−07 | 0 |
| S12 | 0.001388 | −0.00027 | 2.7E−05 | −1.1E−06 | 0 |
| S13 | 0.000702 | −5.8E−05 | 2.53E−06 | −4.7E−08 | 0 |
| S14 | 8.85E−06 | −3.9E−06 | 3.28E−07 | −1.2E−08 | 1.61E−10 |

Second Example

Figure 3:
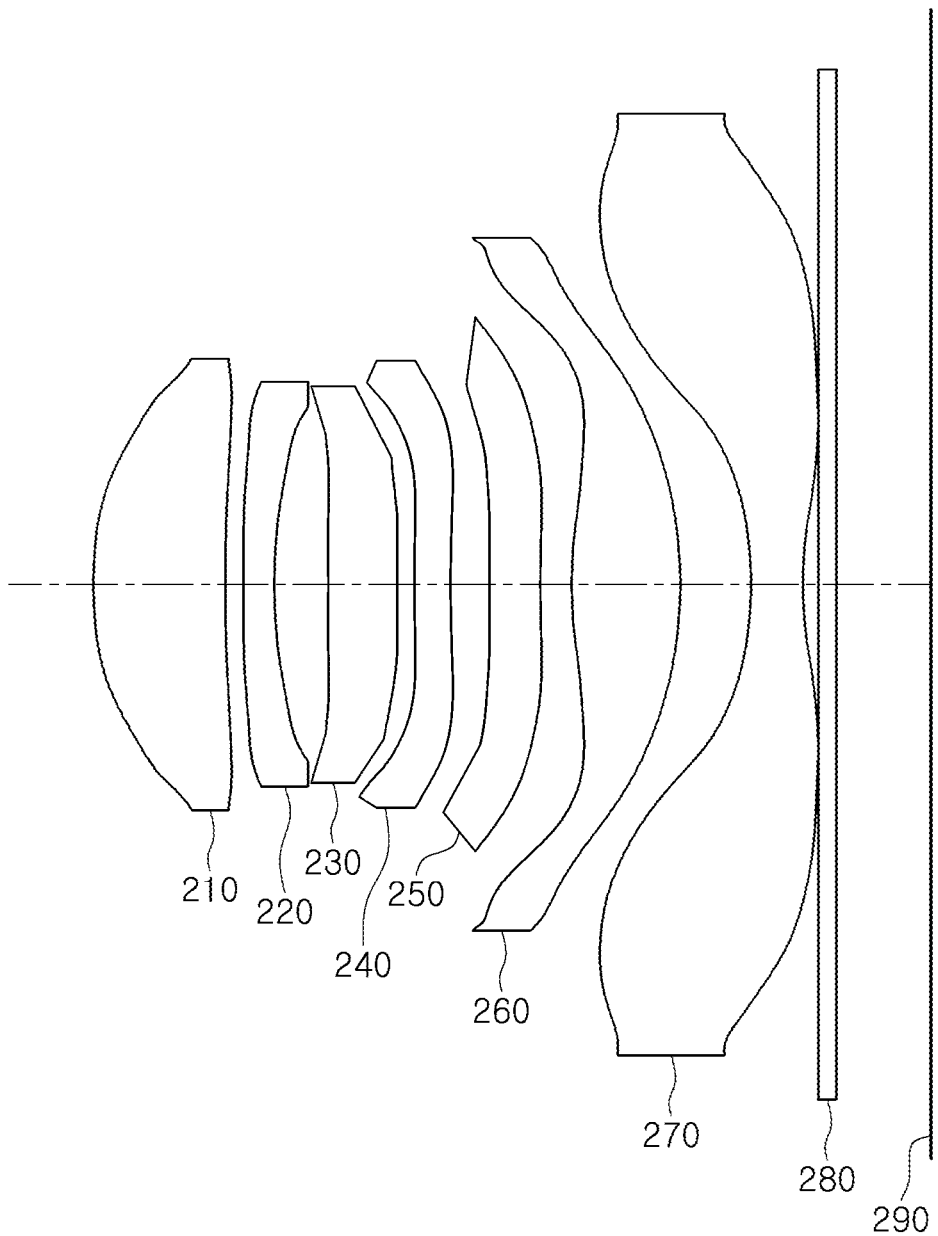
FIG. 3 is a view illustrating a second example of an optical imaging system.
Figure 4:
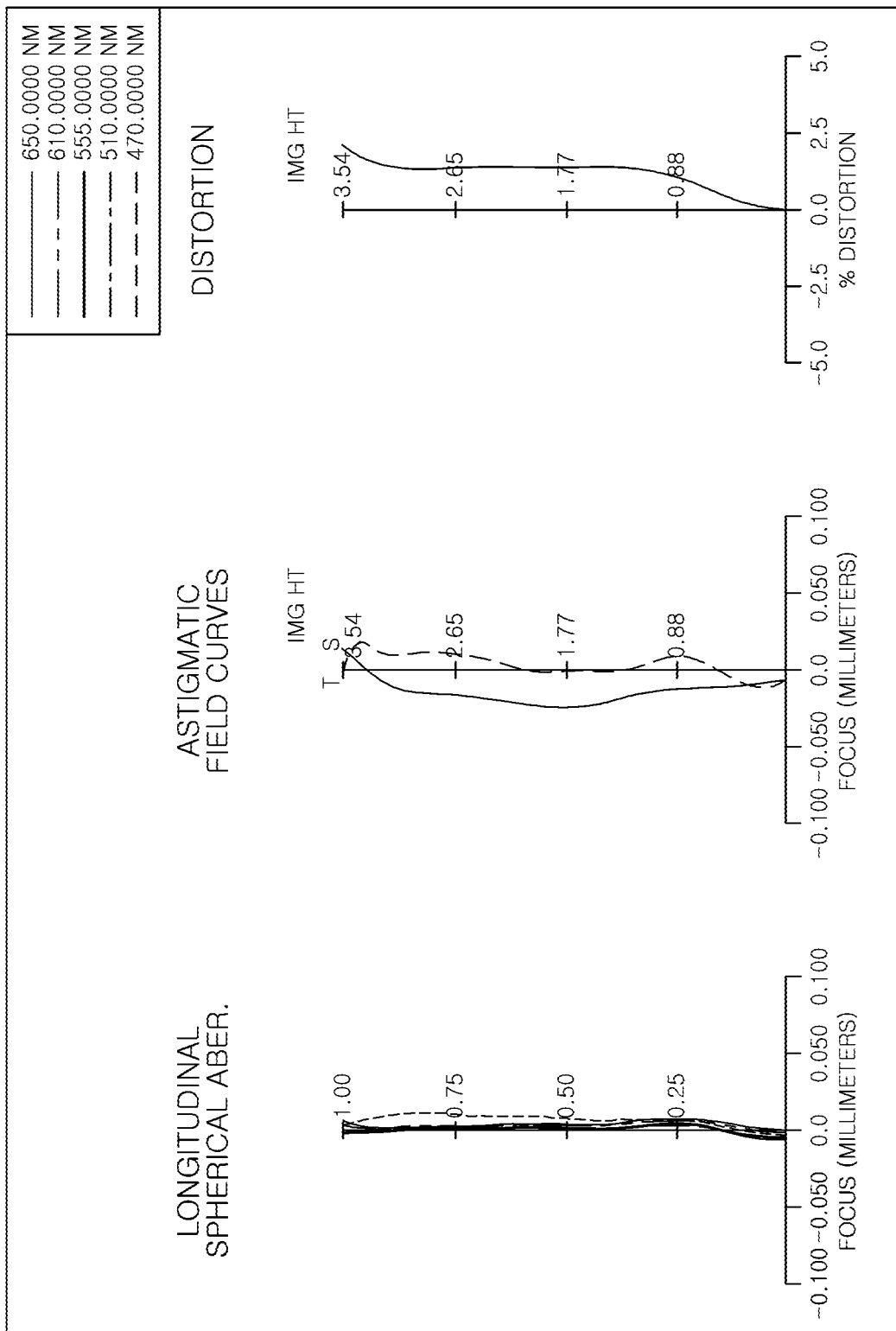
FIG. 4 illustrates aberration curves of the optical imaging system of FIG. 3.

FIG. 3 is a view illustrating a second example of an optical imaging system, and FIG. 4 illustrates aberration curves of the optical imaging system of FIG. 3.

The second example of the optical imaging system includes a first lens 210, a second lens 220, a third lens 230, a fourth lens 240, a fifth lens 250, a sixth lens 260, a seventh lens 270, a filter 280, an image sensor 290, and a stop (not shown) disposed between the first lens 210 and the second lens 220.

The first lens 210 has a positive refractive power, a paraxial region of an object-side surface thereof is convex, and a paraxial region of an image-side surface thereof is concave.

The second lens 220 has a negative refractive power, a paraxial region of an object-side surface thereof is convex, and a paraxial region of an image-side surface thereof is concave.

The third lens 230 has a positive refractive power, and a paraxial region of each of an object-side surface and an image-side surface thereof is convex.

The fourth lens 240 has a negative refractive power, a paraxial region of an object-side surface thereof is convex, and a paraxial region of an image-side surface thereof is concave.

The fifth lens 250 has a negative refractive power, a paraxial region of an object-side surface thereof is convex, and a paraxial region of an image-side surface thereof is concave.

The sixth lens 260 has a positive refractive power, and a paraxial region of each of an object-side surface and an image-side surface thereof is convex.

The seventh lens 270 has a negative refractive power, a paraxial region of an object-side surface thereof is concave, and a paraxial region of an image-side surface thereof is concave.

One inflection point is formed on the object-side surface of the seventh lens 270. In particular, the object-side surface of the seventh lens 270 is concave in the paraxial region, and becomes convex toward an edge thereof.

In addition, one inflection point is formed on the image-side surface of the seventh lens 270. In particular, the image-side surface of the seventh lens 270 is concave in the paraxial region, and becomes convex toward an edge thereof.

Although not illustrated in FIG. 3, the stop is disposed at a distance of 0.954 mm from the object-side surface of the first lens 210 toward the imaging plane of the optical imaging system. This distance is equal to TTL-SL and can be calculated from the values of TTL and SL for Example 2 listed in Table 57 that appears later in this application.

Table 3 below shows physical properties of the lenses and other elements of the optical imaging system of FIG. 3, and Table 4 below shows aspherical surface coefficients of the lenses of FIG. 3. Both surfaces of all of the lenses of FIG. 3 are aspherical except for the object-side surface of the second lens 220, which is spherical.

TABLE 3

| Surface No. | Element | Radius of Curvature | Thickness/ Distance | Index of Refraction | Abbe Number | Effective Aperture Radius |
|---|---|---|---|---|---|---|
| S1 | First | 2.09523177 | 0.9535556 | 1.546 | 56.114 | 1.63 |
| S2 | Lens | 8.9751949 | 0.1222166 | | | 1.56 |
| S3 | Second | 5.87072709 | 0.23 | 1.669 | 20.353 | 1.45 |
| S4 | Lens | 3.37511591 | 0.3824262 | | | 1.28 |
| S5 | Third | 16.2065401 | 0.4972101 | 1.546 | 56.114 | 1.35 |
| S6 | Lens | −139.89462 | 0.1167997 | | | 1.43 |
| S7 | Fourth | 7.40791882 | 0.26 | 1.669 | 20.353 | 1.44 |
| S8 | Lens | 6.08803731 | 0.2808933 | | | 1.61 |
| S9 | Fifth | 38.3058612 | 0.3659631 | 1.644 | 23.516 | 1.74 |
| S10 | Lens | 6.70285435 | 0.2283896 | | | 2.00 |
| S11 | Sixth | 3.49003116 | 0.7733843 | 1.546 | 56.114 | 2.23 |
| S12 | Lens | −2.3502414 | 0.5034976 | | | 2.49 |
| S13 | Seventh | −2.464576 | 0.38 | 1.546 | 56.114 | 3.26 |
| S14 | Lens | 3.03579165 | 0.1056639 | | | 3.37 |
| S15 | Filter | Infinity | 0.11 | 1.519 | 64.197 | 3.67 |
| S16 | | Infinity | 0.69 | | | 3.70 |
| S17 | Imaging Plane | Infinity | | | | 4.00 |

TABLE 4

| | K | A | B | C | D |
|---|---|---|---|---|---|
| S1 | −1.10381 | 0.012898 | 0.009879 | −0.01571 | 0.018687 |
| S2 | 13.09551 | −0.04765 | 0.043287 | −0.03135 | 0.017346 |
| S3 | 0 | 0 | 0 | 0 | 0 |
| S4 | −1.83331 | −0.06675 | 0.070325 | −0.02257 | −0.00885 |
| S5 | 0 | −0.02215 | 0.000148 | −0.02237 | 0.025134 |
| S6 | −95 | −0.06308 | −0.00187 | 0.021015 | −0.04859 |
| S7 | 0 | −0.13364 | 0.059514 | −0.16508 | 0.269468 |
| S8 | 0 | −0.10179 | 0.07915 | −0.15722 | 0.198605 |
| S9 | 0 | −0.11882 | 0.149294 | −0.14949 | 0.107127 |
| S10 | 2.859774 | −0.18537 | 0.141763 | −0.11055 | 0.071846 |
| S11 | −19.5338 | −0.01212 | −0.01555 | −0.00129 | 0.003885 |
| S12 | −0.81308 | 0.09292 | −0.06559 | 0.020026 | −0.00471 |
| S13 | −13.479 | −0.09591 | −0.0047 | 0.016588 | −0.00506 |
| S14 | −0.59135 | −0.09685 | 0.02646 | −0.00421 | 0.000279 |

| | E | F | G | H | J |
|---|---|---|---|---|---|
| S1 | −0.01362 | 0.005924 | −0.00141 | 0.000134 | 0 |
| S2 | −0.00841 | 0.002867 | −0.00055 | 4.24E−05 | 0 |
| S3 | 0 | 0 | 0 | 0 | 0 |
| S4 | 0.012981 | −0.00247 | −0.00187 | 0.000889 | 0 |
| S5 | −0.01334 | −0.00223 | 0.00481 | −0.00122 | 0 |
| S6 | 0.053351 | −0.03506 | 0.013045 | −0.00206 | 0 |
| S7 | −0.25157 | 0.136766 | −0.0403 | 0.00497 | 0 |
| S8 | −0.15112 | 0.067755 | −0.01665 | 0.00174 | 0 |
| S9 | −0.05474 | 0.017607 | −0.00319 | 0.000255 | 0 |
| S10 | −0.03276 | 0.009077 | −0.00134 | 8.07E−05 | 0 |
| S11 | −0.00177 | 0.000369 | −3.4E−05 | 9.95E−07 | 0 |

TABLE 4-continued

| S12 | 0.001294 | −0.00026 | 2.67E−05 | −1.1E−06 | 0 |
|---|---|---|---|---|---|
| S13 | 0.00075 | −6.2E−05 | 2.73E−06 | −5E−08 | 0 |
| S14 | 1.49E−05 | −4.5E−06 | 3.64E−07 | −1.3E−08 | 1.67E−10 |

Third Example

Figure 5:
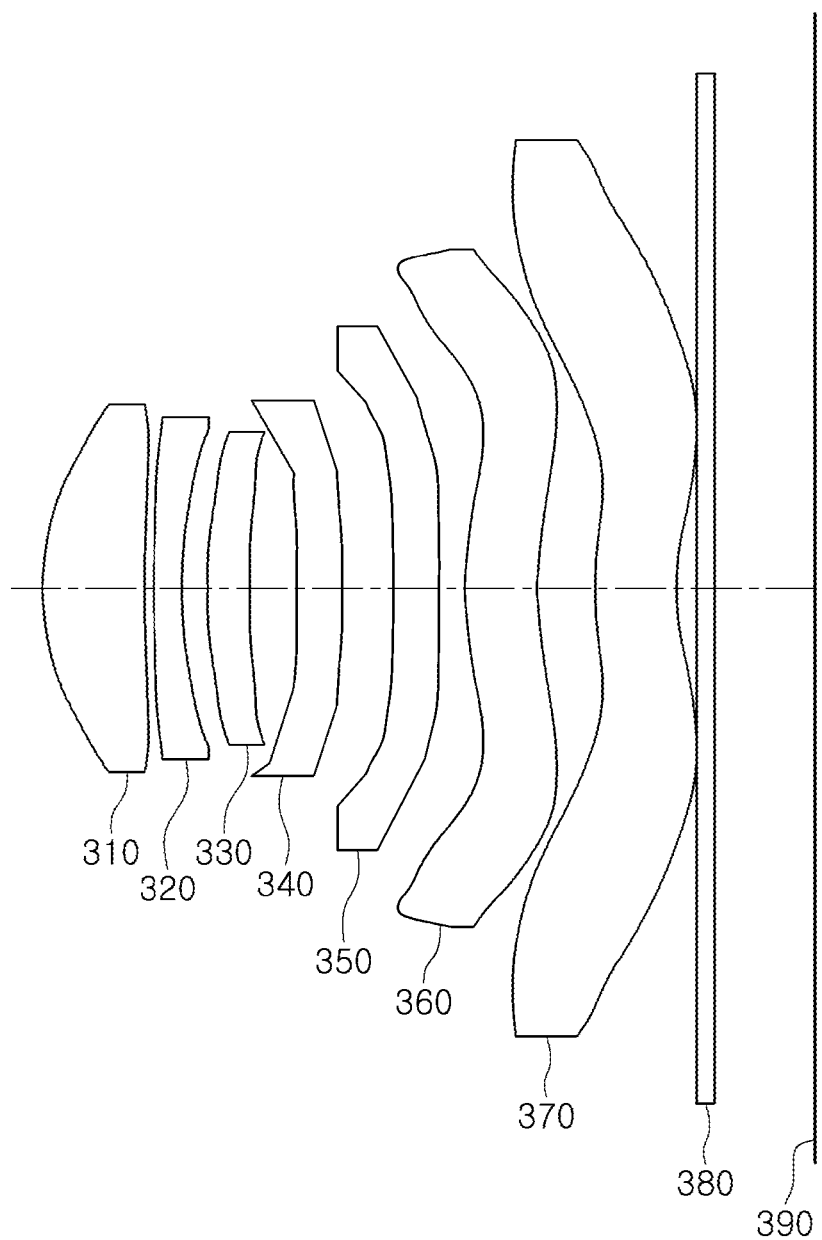
FIG. 5 is a view illustrating a third example of an optical imaging system.
Figure 6:
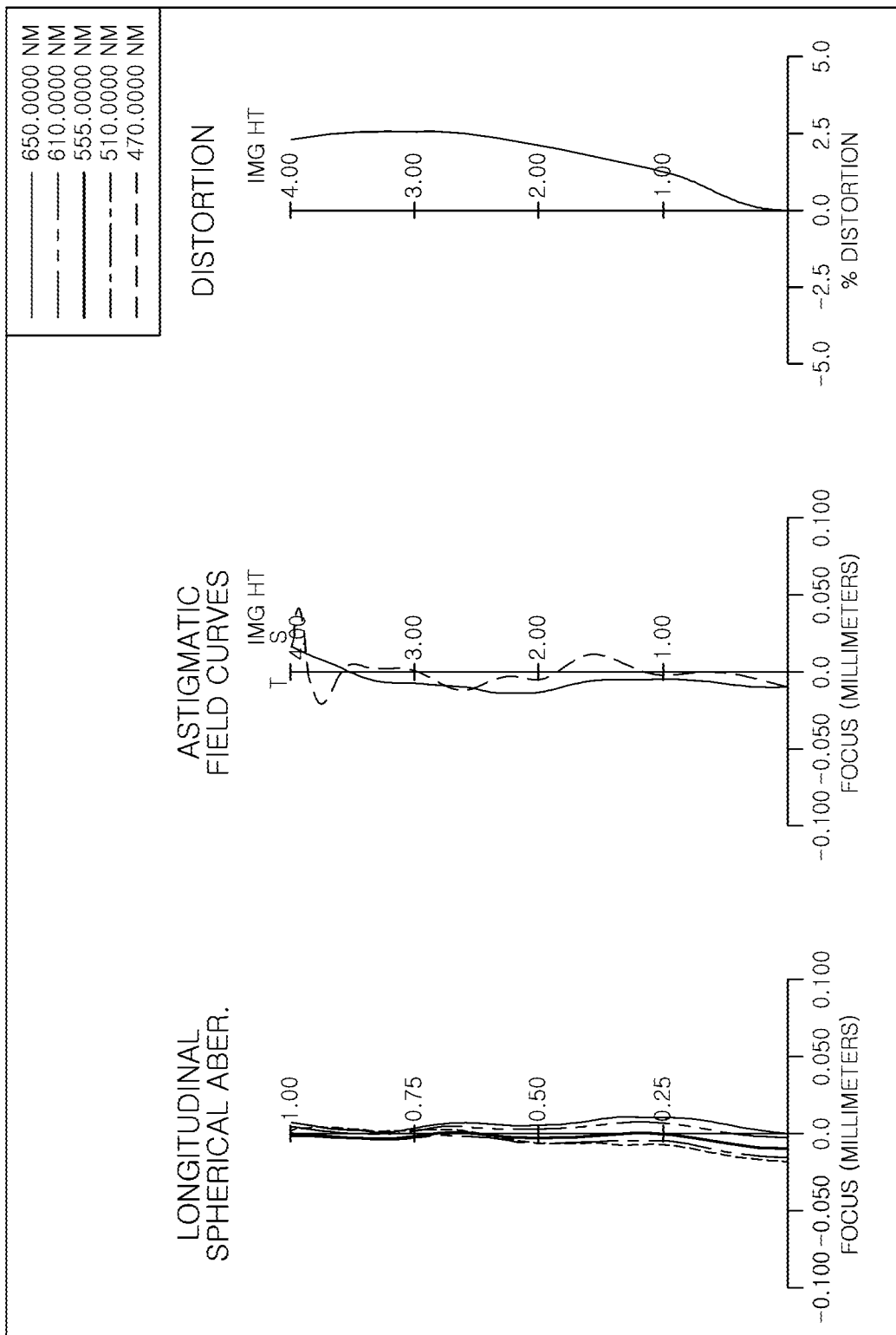
FIG. 6 illustrates aberration curves of the optical imaging system of FIG. 5.

FIG. 5 is a view illustrating a third example of an optical imaging system, and FIG. 6 illustrates aberration curves of the optical imaging system of FIG. 5.

The third example of the optical imaging system includes a first lens 310, a second lens 320, a third lens 330, a fourth lens 340, a fifth lens 350, a sixth lens 360, a seventh lens 370, a filter 380, an image sensor 390, and a stop (not shown) disposed between the second lens 320 and the third lens 330.

The first lens 310 has a positive refractive power, a paraxial region of an object-side surface thereof is convex, and a paraxial region of an image-side surface thereof is concave.

The second lens 320 has a negative refractive power, a paraxial region of an object-side surface thereof is convex, and a paraxial region of an image-side surface thereof is concave.

The third lens 330 has a positive refractive power, a paraxial region of an object-side surface thereof is convex, and a paraxial region of an image-side surface thereof is concave.

The fourth lens 340 has a positive refractive power, and a paraxial region of each of an object-side surface and an image-side surface thereof is convex.

The fifth lens 350 has a negative refractive power, a paraxial region of an object-side surface thereof is concave, and a paraxial region of an image-side surface thereof is convex.

The sixth lens 360 has a positive refractive power, a paraxial region of an object-side surface thereof is convex, and a paraxial region of an image-side surface thereof is concave.

The seventh lens 370 has a negative refractive power, a paraxial region of an object-side surface thereof is convex, and a paraxial region of an image-side surface thereof is concave.

Two inflection points are formed on the object-side surface of the seventh lens 370. In particular, the object-side surface of the seventh lens 370 is convex in the paraxial region, becomes concave in a region outside the paraxial region, and becomes convex toward an edge thereof.

In addition, one inflection point is formed on the image-side surface of the seventh lens 370. In particular, the image-side surface of the seventh lens 370 is concave in the paraxial region, and becomes convex toward an edge thereof.

Although not illustrated in FIG. 5, the stop is disposed at a distance of 0.977 mm from the object-side surface of the first lens 310 toward the imaging plane of the optical imaging system. This distance is equal to TTL-SL and can be calculated from the values of TTL and SL for Example 3 listed in Table 57 that appears later in this application.

Table 5 below shows physical properties of the lenses and other elements of the optical imaging system of FIG. 5, and Table 6 below shows aspherical surface coefficients of the lenses of FIG. 5. Both surfaces of all of the lenses of FIG. 5 are aspherical.

TABLE 5

| Surface No. | Element | Radius of Curvature | Thickness/ Distance | Index of Refraction | Abbe Number | Effective Aperture Radius |
|---|---|---|---|---|---|---|
| S1 | First | 1.82391792 | 0.7125976 | 1.546 | 56.114 | 1.29 |
| S2 | Lens | 7.84659281 | 0.0641189 | | | 1.24 |
| S3 | Second | 7.25645695 | 0.2 | 1.669 | 20.353 | 1.19 |
| S4 | Lens | 3.22746768 | 0.1833442 | | | 1.11 |
| S5 | Third | 3.55978049 | 0.289782 | 1.546 | 56.114 | 1.07 |
| S6 | Lens | 5.37540447 | 0.3323457 | | | 1.09 |
| S7 | Fourth | 108.917864 | 0.3185673 | 1.546 | 56.114 | 1.14 |
| S8 | Lens | −25.473189 | 0.3581803 | | | 1.31 |
| S9 | Fifth | −10.246565 | 0.32 | 1.658 | 21.494 | 1.52 |
| S10 | Lens | −2511.6237 | 0.1796019 | | | 1.82 |
| S11 | Sixth | 2.24163583 | 0.5032143 | 1.658 | 21.494 | 2.09 |
| S12 | Lens | 2.29949488 | 0.405792 | | | 2.46 |
| S13 | Seventh | 2.25160113 | 0.563893 | 1.537 | 55.711 | 3.10 |
| S14 | Lens | 1.62924582 | 0.1385632 | | | 3.13 |
| S15 | Filter | Infinity | 0.11 | 1.519 | 64.197 | 3.58 |
| S16 | | Infinity | 0.7200239 | | | 3.61 |
| S17 | Imaging Plane | Infinity | | | | 4.00 |

TABLE 6

|  | K | A | B | C | D | E | F | G | H |
|---|---|---|---|---|---|---|---|---|---|
| S1 | −0.05681 | −0.00382 | 0.005709 | −0.01903 | 0.017159 | −0.00924 | 0.001372 | −9.6E−05 | 0 |
| S2 | −25.6173 | −0.01646 | −0.07616 | 0.132063 | −0.11427 | 0.054558 | −0.01426 | 0.001526 | 0 |
| S3 | −23.4928 | −0.03092 | −0.07642 | 0.205444 | −0.20566 | 0.115946 | −0.03485 | 0.004323 | 0 |
| S4 | −2.4185 | −0.029 | −0.02587 | 0.11758 | −0.1178 | 0.048002 | 0.01085 | −0.00984 | 0 |
| S5 | 1.638831 | −0.0558 | 0.001053 | −0.0238 | 0.077823 | −0.07273 | 0.054265 | −0.01613 | 0 |
| S6 | −1.64854 | −0.03653 | −0.00816 | 0.035786 | −0.0842 | 0.148028 | −0.10368 | 0.031151 | 0 |
| S7 | 99 | −0.07525 | 0.043317 | −0.2362 | 0.448729 | −0.47604 | 0.273589 | −0.06373 | 0 |
| S8 | 87.32309 | −0.04708 | 0.003053 | −0.09209 | 0.13981 | −0.10712 | 0.045592 | −0.00772 | 0 |
| S9 | 3.284997 | 0.045871 | −0.12833 | 0.159561 | −0.16448 | 0.094896 | −0.0278 | 0.003303 | 0 |
| S10 | −99 | −0.03644 | −0.03317 | 0.063386 | −0.06646 | 0.033384 | −0.00763 | 0.000644 | 0 |
| S11 | −16.0412 | 0.004354 | −0.06522 | 0.059141 | −0.0406 | 0.014529 | −0.00241 | 0.000149 | 0 |
| S12 | −18.2699 | −0.02906 | 0.016429 | −0.01576 | 0.005873 | −0.00116 | 0.000124 | −5.6E−06 | 0 |
| S13 | −0.89844 | −0.33707 | 0.157271 | −0.04452 | 0.007967 | −0.00085 | 4.89E−05 | −1.1E−06 | −5.4E−09 |
| S14 | −0.82188 | −0.26788 | 0.125454 | −0.04542 | 0.011249 | −0.00179 | 0.000173 | −9.2E−06 | 2.05E−07 |

Fourth Example

Figure 7:
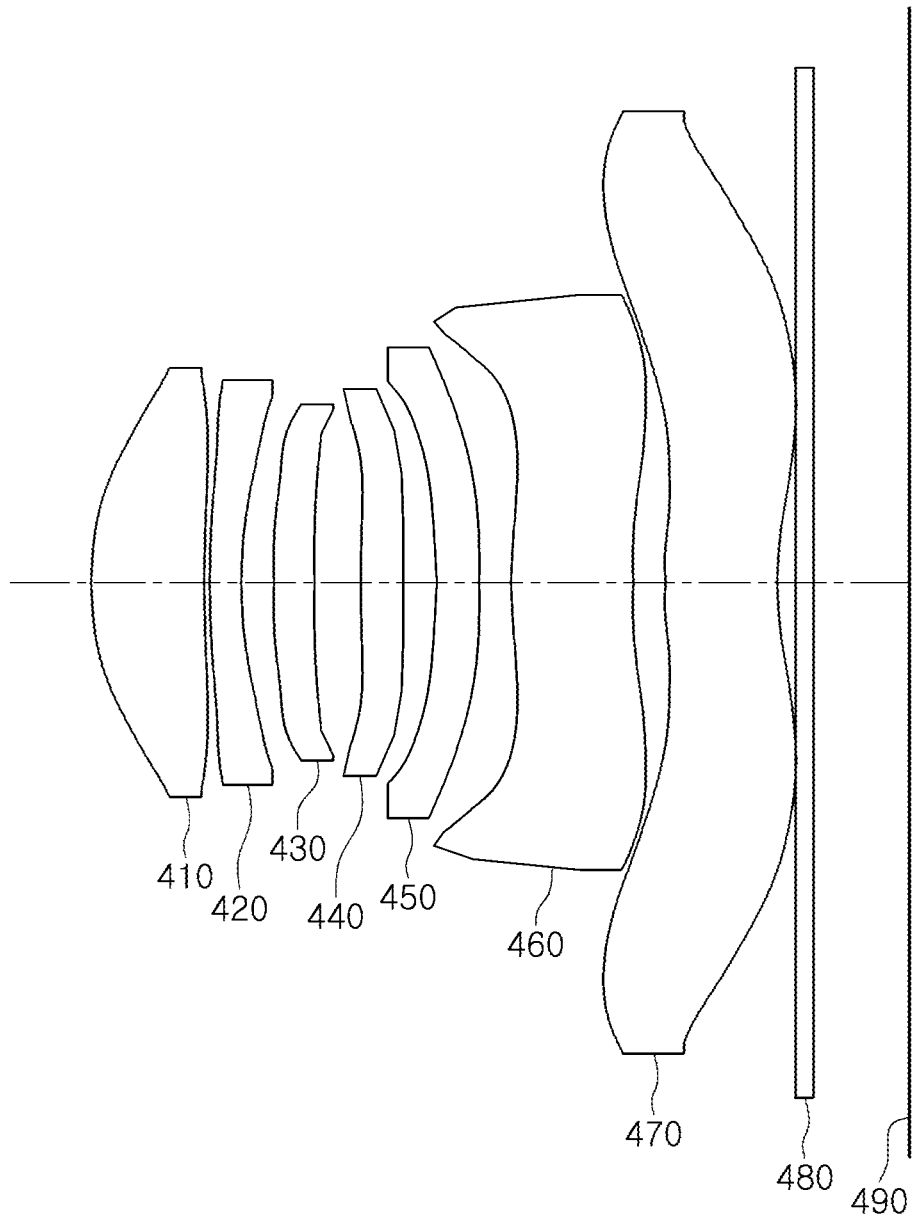
FIG. 7 is a view illustrating a fourth example of an optical imaging system.
Figure 8:
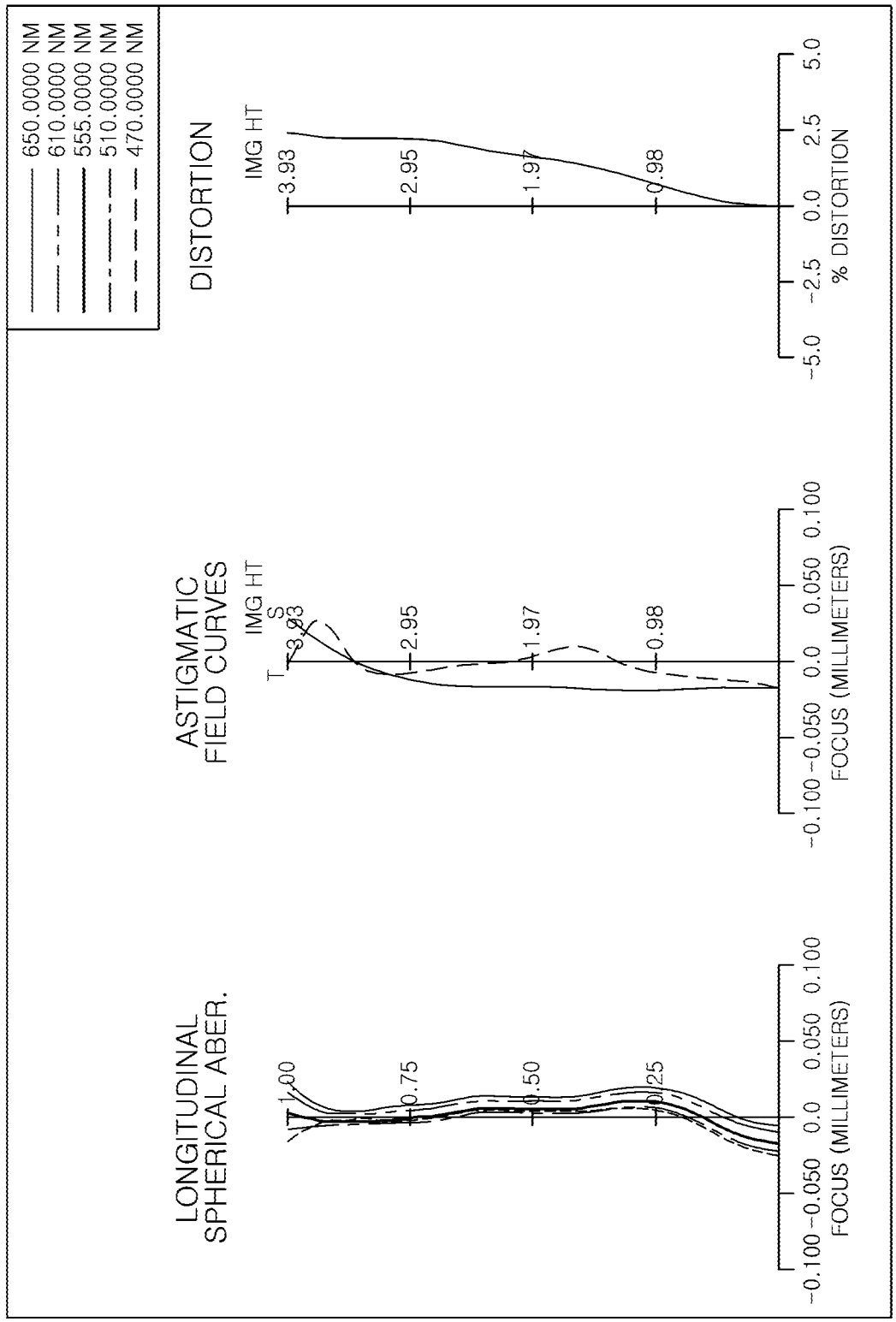
FIG. 8 illustrates aberration curves of the optical imaging system of FIG. 7.

FIG. 7 is a view illustrating a fourth example of an optical imaging system, and FIG. 8 illustrates aberration curves of the optical imaging system of FIG. 7.

The fourth example of the optical imaging system includes a first lens 410, a second lens 420, a third lens 430, a fourth lens 440, a fifth lens 450, a sixth lens 460, a seventh lens 470, a filter 480, an image sensor 490, and a stop (not shown) disposed between the second lens 420 and the third lens 430.

The first lens 410 has a positive refractive power, a paraxial region of an object-side surface thereof is convex, and a paraxial region of an image-side surface thereof is concave.

The second lens 420 has a negative refractive power, a paraxial region of an object-side surface thereof is convex, and a paraxial region of an image-side surface thereof is concave.

The third lens 430 has a positive refractive power, a paraxial region of an object-side surface thereof is convex, and a paraxial region of an image-side surface thereof is concave.

The fourth lens 440 has a positive refractive power, a paraxial region of an object-side surface thereof is convex, and a paraxial region of an image-side surface thereof is concave.

The fifth lens 450 has a negative refractive power, a paraxial region of an object-side surface thereof is concave, and a paraxial region of an image-side surface thereof is convex.

The sixth lens 460 has a positive refractive power, a paraxial region of an object-side surface thereof is convex, and a paraxial region of an image-side surface thereof is concave.

The seventh lens 470 has a negative refractive power, a paraxial region of an object-side surface thereof is convex, and a paraxial region of an image-side surface thereof is concave.

Two inflection points are formed on the object-side surface of the seventh lens 470. In particular, the object-side surface of the seventh lens 470 is convex in the paraxial region, becomes concave in a region outside the paraxial region, and becomes convex toward an edge thereof.

In addition, one inflection point is formed on the image-side surface of the seventh lens 470. In particular, the image-side surface of the seventh lens 470 is concave in the paraxial region, and becomes convex toward an edge thereof.

Although not illustrated in FIG. 7, the stop is disposed at a distance of 1.062 mm from the object-side surface of the first lens 410 toward the imaging plane of the optical imaging system. This distance is equal to TTL-SL and can be calculated from the values of TTL and SL for Example 4 listed in Table 57 that appears later in this application.

Table 7 below shows physical properties of the lenses and other elements of the optical imaging system of FIG. 7, and Table 8 below shows aspherical surface coefficients of the lenses of FIG. 7. Both surfaces of all of the lenses of FIG. 7 are aspherical.

TABLE 7

| Surface No. | Element | Radius of Curvature | Thickness/ Distance | Index of Refraction | Abbe Number | Effective Aperture Radius |
|---|---|---|---|---|---|---|
| S1 | First | 2.02988734 | 0.8071808 | 1.546 | 56.114 | 1.50 |
| S2 | Lens | 13.3648006 | 0.03 | | | 1.47 |
| S3 | Second | 4.79376157 | 0.225 | 1.669 | 20.353 | 1.41 |
| S4 | Lens | 2.78744479 | 0.2223433 | | | 1.30 |
| S5 | Third | 4.82360261 | 0.2898759 | 1.546 | 56.114 | 1.24 |
| S6 | Lens | 8.14950885 | 0.3234802 | | | 1.21 |
| S7 | Fourth | 7.95169453 | 0.2896338 | 1.546 | 56.114 | 1.24 |
| S8 | Lens | 13.2949054 | 0.2359829 | | | 1.35 |
| S9 | Fifth | −5.3395632 | 0.3051644 | 1.658 | 21.494 | 1.41 |
| S10 | Lens | −10.758919 | 0.2260567 | | | 1.65 |
| S11 | Sixth | 4.03734585 | 0.85 | 1.658 | 21.494 | 1.75 |
| S12 | Lens | 4.00738375 | 0.2243888 | | | 2.57 |
| S13 | Seventh | 3.39858655 | 0.7824535 | 1.537 | 55.711 | 3.30 |
| S14 | Lens | 2.20528309 | 0.1384397 | | | 3.22 |
| S15 | Filter | Infinity | 0.11 | 1.519 | 64.197 | 3.59 |

TABLE 7-continued

| Surface No. | Element | Radius of Curvature | Thickness/ Distance | Index of Refraction | Abbe Number | Effective Aperture Radius |
|---|---|---|---|---|---|---|
| S16 | | Infinity | 0.6900019 | | | 3.62 |
| S17 | Imaging Plane | Infinity | | | | 3.94 |

TABLE 8

| | K | A | B | C | D | E | F | G | H |
|---|---|---|---|---|---|---|---|---|---|
| S1 | 0.055002 | −0.00862 | 0.019719 | −0.04878 | 0.061416 | −0.04738 | 0.021289 | −0.00524 | 0.000528 |
| S2 | −26.0973 | −0.04292 | 0.055554 | −0.07536 | 0.066566 | −0.03618 | 0.01155 | −0.00207 | 0.000165 |
| S3 | −36.1351 | −0.04162 | 0.048893 | −0.07864 | 0.079391 | −0.04337 | 0.014109 | −0.00297 | 0.000356 |
| S4 | −7.66553 | −0.0165 | 0.01116 | −0.03292 | 0.043974 | −0.05263 | 0.056504 | −0.0304 | 0.005911 |
| S5 | 3.337325 | −0.04652 | 0.049134 | −0.1038 | 0.167627 | −0.19024 | 0.165026 | −0.07793 | 0.014471 |
| S6 | −0.02412 | −0.05207 | 0.019764 | 0.012674 | −0.00403 | −0.04206 | 0.094388 | −0.06504 | 0.015741 |
| S7 | −66.3047 | −0.07065 | −0.02908 | 0.041965 | −0.11679 | 0.174957 | −0.12258 | 0.040671 | −0.00488 |
| S8 | 19.54898 | −0.06049 | 0.012663 | −0.10426 | 0.186276 | −0.22707 | 0.175833 | −0.07314 | 0.012434 |
| S9 | −5.93087 | −0.02712 | −0.00151 | 0.063515 | −0.12587 | 0.092909 | −0.02991 | 0.003292 | 0 |
| S10 | 33.02479 | −0.09413 | 0.02661 | 0.047806 | −0.07202 | 0.04396 | −0.01237 | 0.001304 | 0 |
| S11 | −51.3785 | 0.001924 | −0.10804 | 0.11432 | −0.08252 | 0.035053 | −0.00798 | 0.000753 | 0 |
| S12 | −31.504 | −0.00904 | −0.00561 | 0.001398 | −0.00039 | 9.31E−05 | −1.2E−05 | 5.9E−07 | 0 |
| S13 | −0.47616 | −0.19617 | 0.090781 | −0.02708 | 0.005169 | −0.00061 | 4.35E−05 | −1.7E−06 | 2.73E−08 |
| S14 | −0.78006 | −0.14942 | 0.059181 | −0.01981 | 0.004571 | −0.00067 | 5.95E−05 | −2.9E−06 | 5.85E−08 |

Fifth Example

Figure 9:
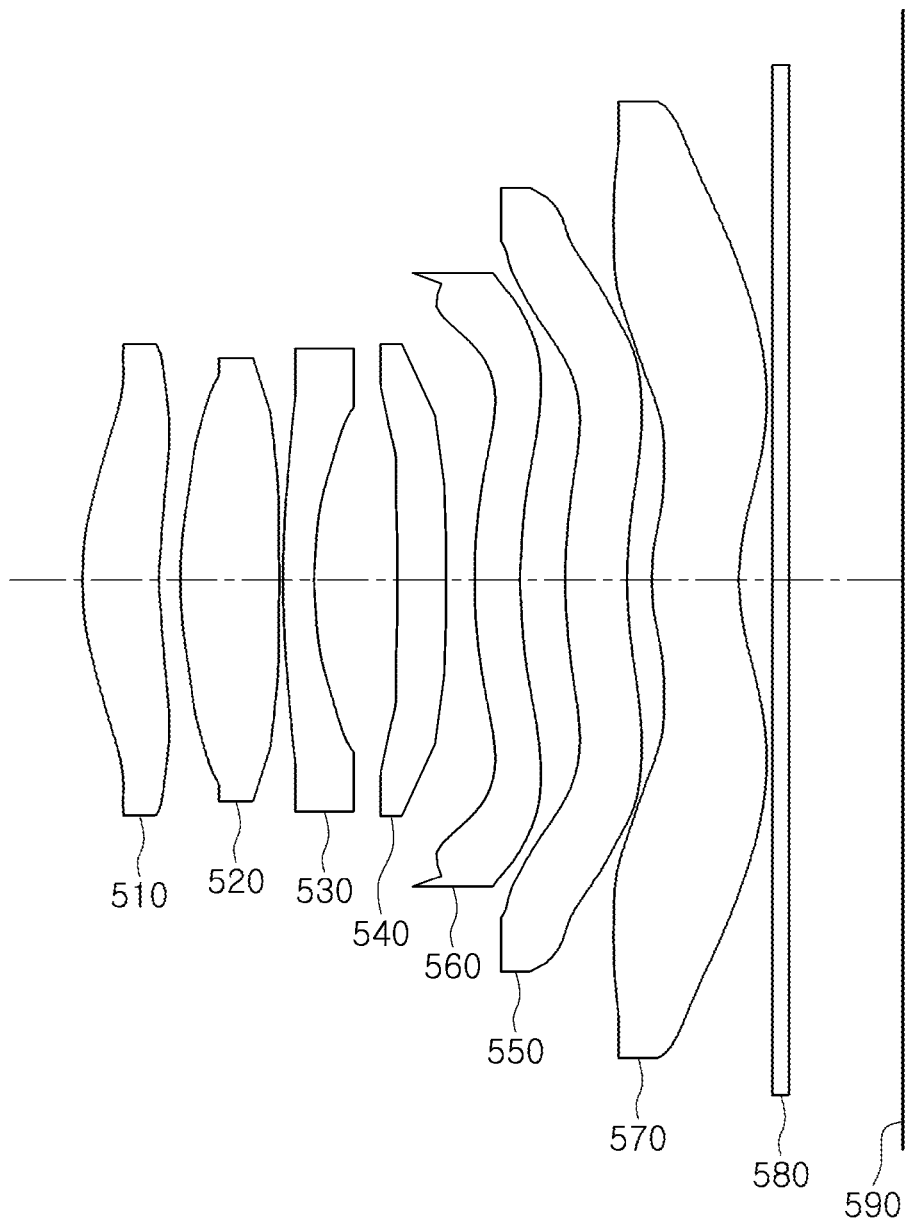
FIG. 9 is a view illustrating a fifth example of an optical imaging system.
Figure 10:
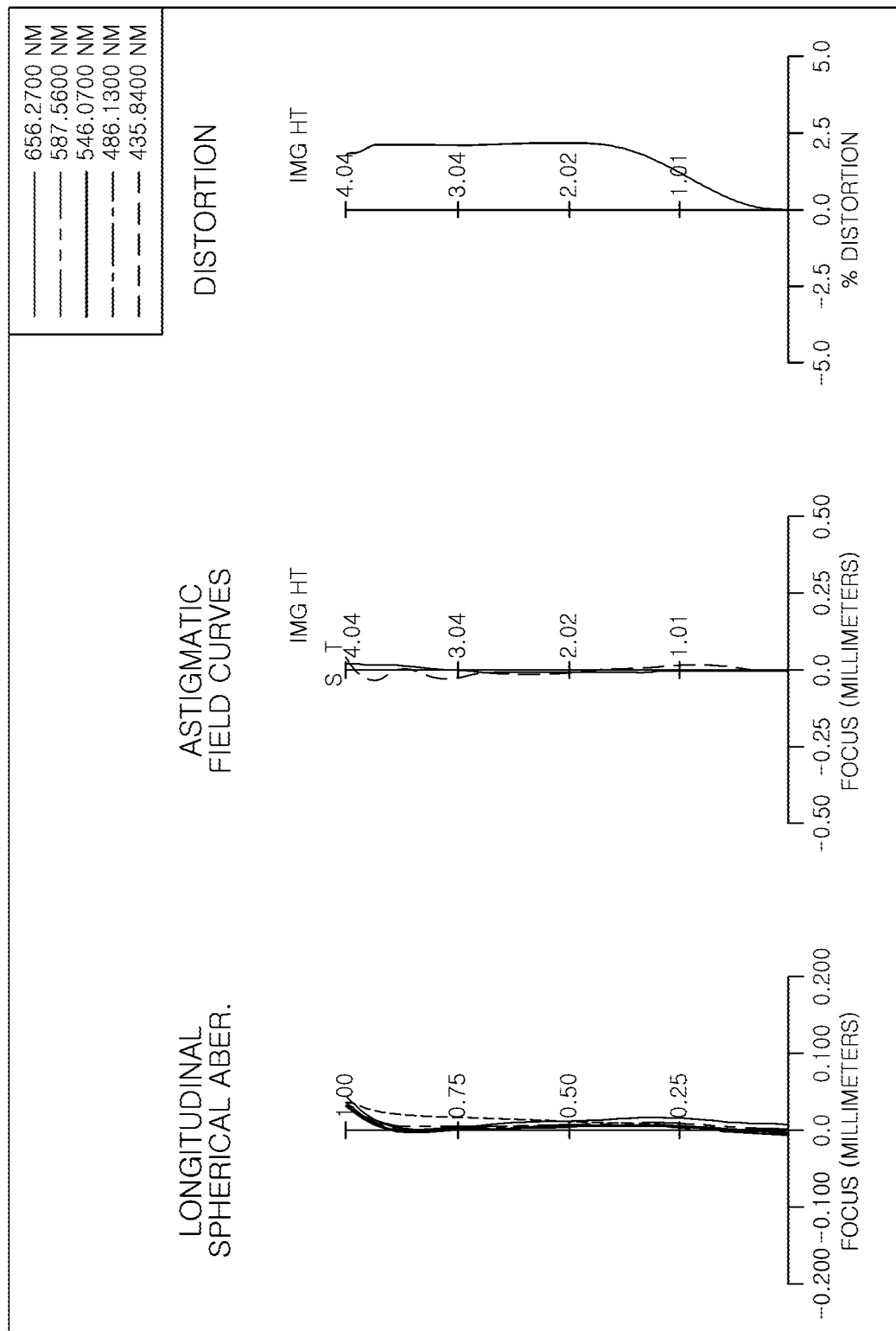
FIG. 10 illustrates aberration curves of the optical imaging system of FIG. 9.

FIG. 9 is a view illustrating a fifth example of an optical imaging system, and FIG. 10 illustrates aberration curves of the optical imaging system of FIG. 9.

The fifth example of the optical imaging system includes a first lens 510, a second lens 520, a third lens 530, a fourth lens 540, a fifth lens 550, a sixth lens 560, a seventh lens 570, a filter 580, an image sensor 590, and a stop (not shown) disposed between the second lens 520 and the third lens 530.

The first lens 510 has a positive refractive power, a paraxial region of an object-side surface thereof is convex, and a paraxial region of an image-side surface thereof is concave.

The second lens 520 has a positive refractive power, and a paraxial region of each of an object-side surface and an image-side surface thereof is convex.

The third lens 530 has a negative refractive power, a paraxial region of an object-side surface thereof is convex, and a paraxial region of an image-side surface thereof is concave.

The fourth lens 540 has a positive refractive power, a paraxial region of an object-side surface thereof is concave, and a paraxial region of an image-side surface thereof is convex.

The fifth lens 550 has a positive refractive power, a paraxial region of an object-side surface thereof is convex, and a paraxial region of an image-side surface thereof is concave.

The sixth lens 560 has a negative refractive power, a paraxial region of an object-side surface thereof is convex, and a paraxial region of an image-side surface thereof is concave.

The seventh lens 570 has a positive refractive power, a paraxial region of an object-side surface thereof is convex, and a paraxial region of an image-side surface thereof is concave.

Two inflection points are formed on the object-side surface of the seventh lens 570. In particular, the object-side surface of the seventh lens 570 is convex in the paraxial region, becomes concave in a region outside the paraxial region, and becomes convex toward an edge thereof.

In addition, one inflection point is formed on the image-side surface of the seventh lens 570. In particular, the image-side surface of the seventh lens 570 is concave in the paraxial region, and becomes convex toward an edge thereof.

Although not illustrated in FIG. 9, the stop is disposed at a distance of 1.425 mm from the object-side surface of the first lens 510 toward the imaging plane of the optical imaging system. This distance is equal to TTL-SL and can be calculated from the values of TTL and SL for Example 5 listed in Table 57 that appears later in this application.

Table 9 below shows physical properties of the lenses and other elements of the optical imaging system of FIG. 9, and Table 10 below shows aspherical surface coefficients of the lenses of FIG. 9. Both surfaces of all of the lenses of FIG. 9 are aspherical.

TABLE 9

| Surface No. | Element | Radius of Curvature | Thickness/ Distance | Index of Refraction | Abbe Number | Effective Aperture Radius |
|---|---|---|---|---|---|---|
| S1 | First | 2.370605 | 0.543075 | 1.546 | 56.114 | 1.572 |
| S2 | Lens | 3.837673 | 0.151623 | | | 1.517 |

TABLE 9-continued

| Surface No. | Element | Radius of Curvature | Thickness/ Distance | Index of Refraction | Abbe Number | Effective Aperture Radius |
|---|---|---|---|---|---|---|
| S3 | Second | 3.432869 | 0.707828 | 1.546 | 56.114 | 1.478 |
| S4 | Lens | −17.0251 | 0.022468 | | | 1.428 |
| S5 | Third | 5.142878 | 0.224676 | 1.679 | 19.236 | 1.300 |
| S6 | Lens | 2.533326 | 0.588782 | | | 1.230 |
| S7 | Fourth | −1446.17 | 0.340433 | 1.679 | 19.236 | 1.404 |
| S8 | Lens | −1446.17 | 0.207036 | | | 1.600 |
| S9 | Fifth | 3.643447 | 0.326355 | 1.546 | 56.114 | 1.857 |
| S10 | Lens | 3.822446 | 0.317149 | | | 2.199 |
| S11 | Sixth | 3.850899 | 0.440632 | 1.679 | 19.236 | 2.415 |
| S12 | Lens | 3.049364 | 0.177387 | | | 2.808 |
| S13 | Seventh | 1.743028 | 0.613274 | 1.537 | 53.955 | 3.115 |
| S14 | Lens | 1.56E+00 | 0.246638 | | | 3.314 |
| S15 | Filter | Infinity | 0.11 | 1.5187 | 64.1664 | 3.654985 |
| S16 | | Infinity | 0.8098264 | | | 3.687604 |
| S17 | Imaging Plane | Infinity | | | | 4.07527 |

TABLE 10

| | K | A | B | C | D |
|---|---|---|---|---|---|
| S1 | −7.5196 | 0.0476 | −0.039 | 0.0108 | −0.0002 |
| S2 | −19.661 | −0.0106 | −0.0481 | 0.0183 | 0.0105 |
| S3 | 0.042 | −0.0249 | −0.0196 | 0.0094 | 0.0041 |
| S4 | 0 | 0.0098 | −0.0507 | 0.0341 | 0.0229 |
| S5 | −5.6502 | −0.0476 | 0.0152 | −0.0398 | 0.11 |
| S6 | 0.5327 | −0.067 | 0.0583 | −0.0705 | 0.0922 |
| S7 | 0 | −0.0158 | −0.0083 | −0.0305 | 0.0756 |
| S8 | 0 | −0.0099 | −0.0427 | 0.0077 | 0.0285 |
| S9 | −44.395 | 0.1048 | −0.1251 | 0.08 | −0.0437 |
| S10 | −4.0715 | −0.0175 | 0.0211 | −0.0368 | 0.0252 |
| S11 | −1.1211 | 0.0034 | −0.0742 | 0.0637 | −0.0381 |
| S12 | 0.0464 | −0.092 | 0.0339 | −0.0168 | 0.0044 |
| S13 | −0.795 | −0.2987 | 0.11 | −0.0259 | 0.0046 |
| S14 | −1.3233 | −0.199 | 0.0846 | −0.0285 | 0.0073 |

| | E | F | G | H | J |
|---|---|---|---|---|---|
| S1 | −0.006 | 0.0045 | −0.0012 | 0.0001 | 0 |
| S2 | −0.0109 | 0.0039 | −0.0006 | 3E−05 | 0 |
| S3 | 0.0108 | −0.014 | 0.0056 | −0.0008 | 0 |
| S4 | −0.0518 | 0.0341 | −0.0103 | 0.0012 | 0 |
| S5 | −0.1327 | 0.082 | −0.0252 | 0.0031 | 0 |
| S6 | −0.0854 | 0.0499 | −0.0161 | 0.0024 | 0 |
| S7 | −0.0736 | 0.035 | −0.0077 | 0.0005 | 0 |
| S8 | −0.0272 | 0.01 | −0.0013 | 0 | 0 |
| S9 | 0.0187 | −0.0058 | 0.001 | −7E−05 | 0 |
| S10 | −0.01 | 0.0024 | −0.0003 | 2E−05 | 0 |
| S11 | 0.0134 | −0.0026 | 0.0003 | −1E−05 | 0 |
| S12 | −0.0005 | 1E−05 | 3E−06 | −2E−07 | 0 |
| S13 | −0.0007 | 7E−05 | −5E−06 | 2E−07 | −5E−09 |
| S14 | −0.0013 | 0.0002 | −1E−05 | 5E−07 | −9E−09 |

Sixth Example

Figure 11:
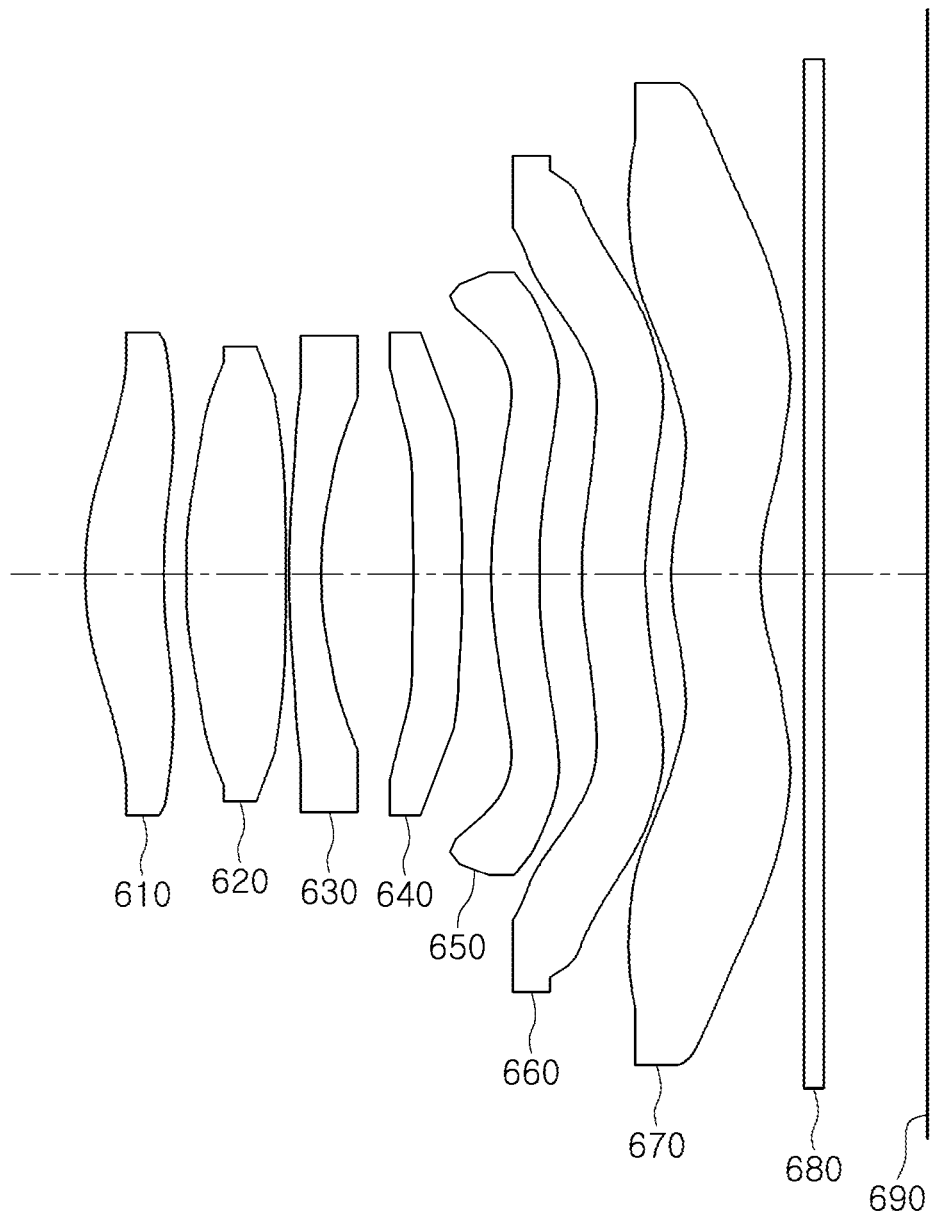
FIG. 11 is a view illustrating a sixth example of an optical imaging system.
Figure 12:
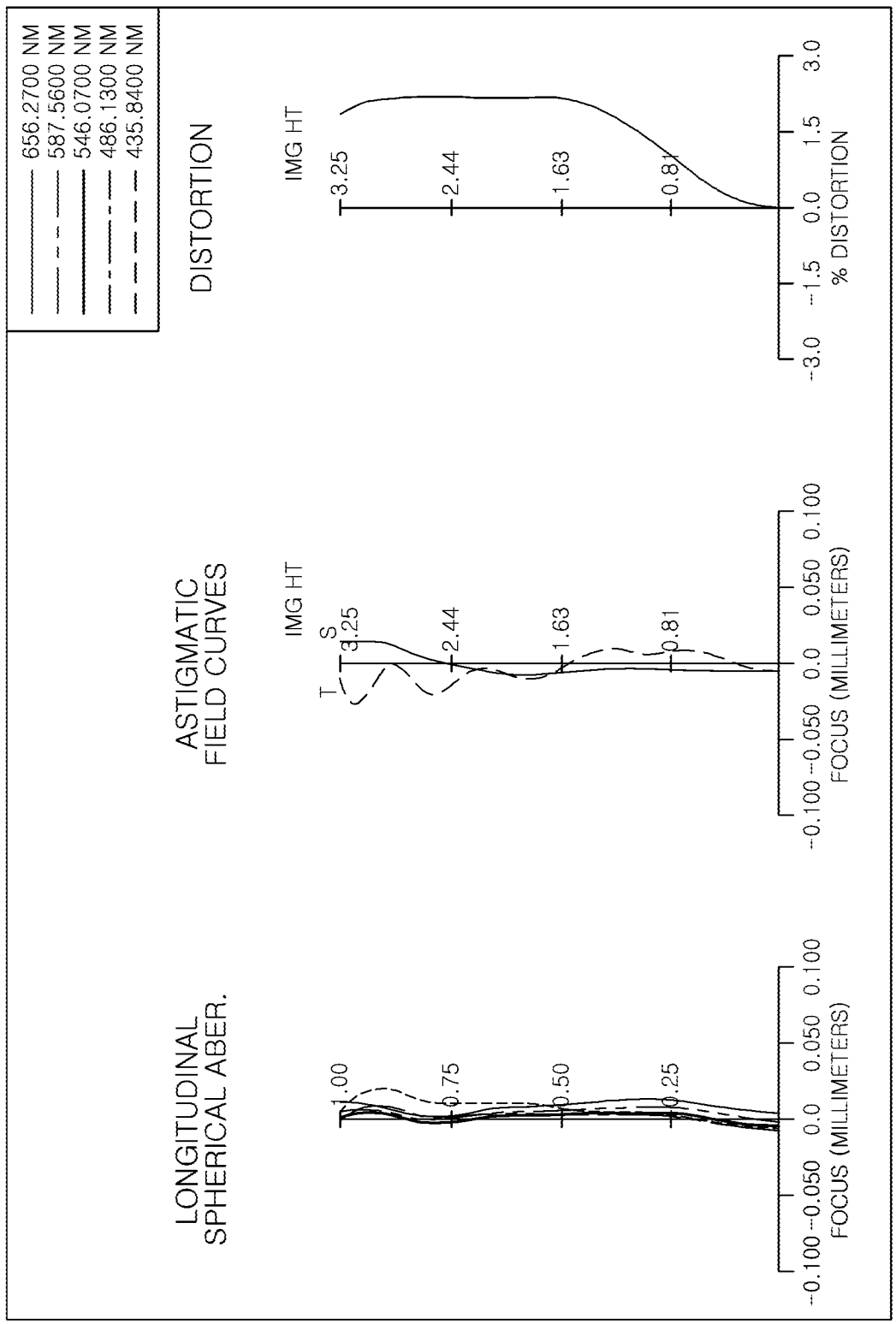
FIG. 12 illustrates aberration curves of the optical imaging system of FIG. 11.

FIG. 11 is a view illustrating a sixth example of an optical imaging system, and FIG. 12 illustrates aberration curves of the optical imaging system of FIG. 11.

The sixth example of the optical imaging system includes a first lens 610, a second lens 620, a third lens 630, a fourth lens 640, a fifth lens 650, a sixth lens 660, a seventh lens 670, a filter 680, an image sensor 690, and a stop (not shown) disposed between the second lens 620 and the third lens 630.

The first lens 610 has a positive refractive power, a paraxial region of an object-side surface thereof is convex, and a paraxial region of an image-side surface thereof is concave.

The second lens 620 has a positive refractive power, and a paraxial region of each of an object-side surface and an image-side surface thereof is convex.

The third lens 630 has a negative refractive power, a paraxial region of an object-side surface thereof is convex, and a paraxial region of an image-side surface thereof is concave.

The fourth lens 640 has a negative refractive power, a paraxial region of an object-side surface thereof is concave, and a paraxial region of an image-side surface thereof is convex.

The fifth lens 650 has a positive refractive power, a paraxial region of an object-side surface thereof is convex, and a paraxial region of an image-side surface thereof is concave.

The sixth lens 660 has a negative refractive power, a paraxial region of an object-side surface thereof is convex, and a paraxial region of an image-side surface thereof is concave.

The seventh lens 670 has a positive refractive power, a paraxial region of an object-side surface thereof is convex, and a paraxial region of an image-side surface thereof is concave.

Two inflection points are formed on the object-side surface of the seventh lens 670. In particular, the object-side surface of the seventh lens 670 is convex in the paraxial region, becomes concave in a region outside the paraxial region, and becomes convex toward an edge thereof.

In addition, one inflection point is formed on the image-side surface of the seventh lens 670. In particular, the image-side surface of the seventh lens 670 is concave in the paraxial region, and becomes convex toward an edge thereof.

Although not illustrated in FIG. 11, the stop is disposed at a distance of 1.169 mm from the object-side surface of the first lens 610 toward the imaging plane of the optical imaging system. This distance is equal to TTL-SL and can be calculated from the values of TTL and SL for Example 6 listed in Table 57 that appears later in this application.

Table 11 below shows physical properties of the lenses and other elements of the optical imaging system of FIG. 11, and Table 12 below shows aspherical surface coefficients of the lenses of FIG. 11. Both surfaces of all of the lenses of FIG. 11 are aspherical.

TABLE 11

| Surface No. | Element | Radius of Curvature | Thickness/ Distance | Index of Refraction | Abbe Number | Effective Aperture Radius |
|---|---|---|---|---|---|---|
| S1 | First | 1.951165 | 0.448752 | 1.546 | 56.114 | 1.307 |
| S2 | Lens | 3.115162 | 0.125992 | | | 1.253 |
| S3 | Second | 2.868611 | 0.575289 | 1.546 | 56.114 | 1.214 |
| S4 | Lens | −12.9825 | 0.018563 | | | 1.180 |
| S5 | Third | 4.506414 | 0.185629 | 1.679 | 19.236 | 1.074 |
| S6 | Lens | 2.196855 | 0.519693 | | | 1.016 |
| S7 | Fourth | −2108.87 | 0.279556 | 1.679 | 19.236 | 1.179 |
| S8 | Lens | −6755.44 | 0.171507 | | | 1.338 |
| S9 | Fifth | 3.113522 | 0.273438 | 1.546 | 56.114 | 1.528 |
| S10 | Lens | 3.267187 | 0.241671 | | | 1.808 |
| S11 | Sixth | 3.22281 | 0.364954 | 1.679 | 19.236 | 1.996 |
| S12 | Lens | 2.538835 | 0.143764 | | | 2.320 |
| S13 | Seventh | 1.445077 | 0.51219 | 1.537 | 53.955 | 2.500 |
| S14 | Lens | 1.27E+00 | 0.250094 | | | 2.738 |
| S15 | Filter | Infinity | 0.11 | 1.5187 | 64.1664 | 2.939872 |
| S16 | | Infinity | 0.5978514 | | | 2.970893 |
| S17 | Imaging Plane | Infinity | | | | 3.250775 |

TABLE 12

| | K | A | B | C | D | E | F | G | H | J |
|---|---|---|---|---|---|---|---|---|---|---|
| S1 | −7.5279 | 0.0857 | −0.105 | 0.0528 | −0.0256 | −0.0221 | 0.0379 | −0.0166 | 0.0023 | 0 |
| S2 | −19.893 | −0.0142 | −0.1337 | 0.0682 | 0.0621 | −0.0783 | 0.0306 | −0.0031 | −0.0006 | 0 |
| S3 | −0.0142 | −0.0449 | −0.0418 | −0.0147 | 0.1136 | 0.012 | −0.1333 | 0.0892 | −0.0193 | 0 |
| S4 | 0 | 0.0281 | −0.189 | 0.276 | −0.0808 | −0.2297 | 0.2908 | −0.1382 | 0.024 | 0 |
| S5 | −6.2325 | −0.0763 | −0.0054 | −0.0795 | 0.6054 | −1.1875 | 1.107 | −0.5047 | 0.0912 | 0 |
| S6 | 0.4782 | −0.115 | 0.1396 | −0.2676 | 0.5637 | −0.7991 | 0.6898 | −0.325 | 0.0682 | 0 |
| S7 | 0 | −0.0188 | −0.0772 | 0.0717 | 0.0184 | −0.081 | 0.0225 | 0.0277 | −0.0139 | 0 |
| S8 | 0 | −0.0127 | −0.1356 | 0.0837 | 0.0781 | −0.1502 | 0.0847 | −0.0163 | 0 | 0 |
| S9 | −49.08 | 0.1815 | −0.3205 | 0.2837 | −0.2161 | 0.1317 | −0.0595 | 0.0158 | −0.0017 | 0 |
| S10 | −5.4303 | −0.0205 | 0.025 | −0.1003 | 0.1046 | −0.0624 | 0.0222 | −0.0043 | 0.0003 | 0 |
| S11 | −1.136 | 0.0314 | −0.2615 | 0.3261 | −0.2695 | 0.133 | −0.0369 | 0.0053 | −0.0003 | 0 |
| S12 | 0.0272 | −0.1293 | 0.0241 | 5E−05 | −0.0123 | 0.0085 | −0.0024 | 0.0003 | −2E−05 | 0 |
| S13 | −0.8 | −0.5247 | 0.2994 | −0.1227 | 0.0414 | −0.0108 | 0.002 | −0.0002 | 2E−05 | −4E−07 |
| S14 | −1.3207 | −0.3666 | 0.2425 | −0.1248 | 0.0468 | −0.0121 | 0.002 | −0.0002 | 1E−05 | −3E−07 |

Seventh Example

Figure 13:
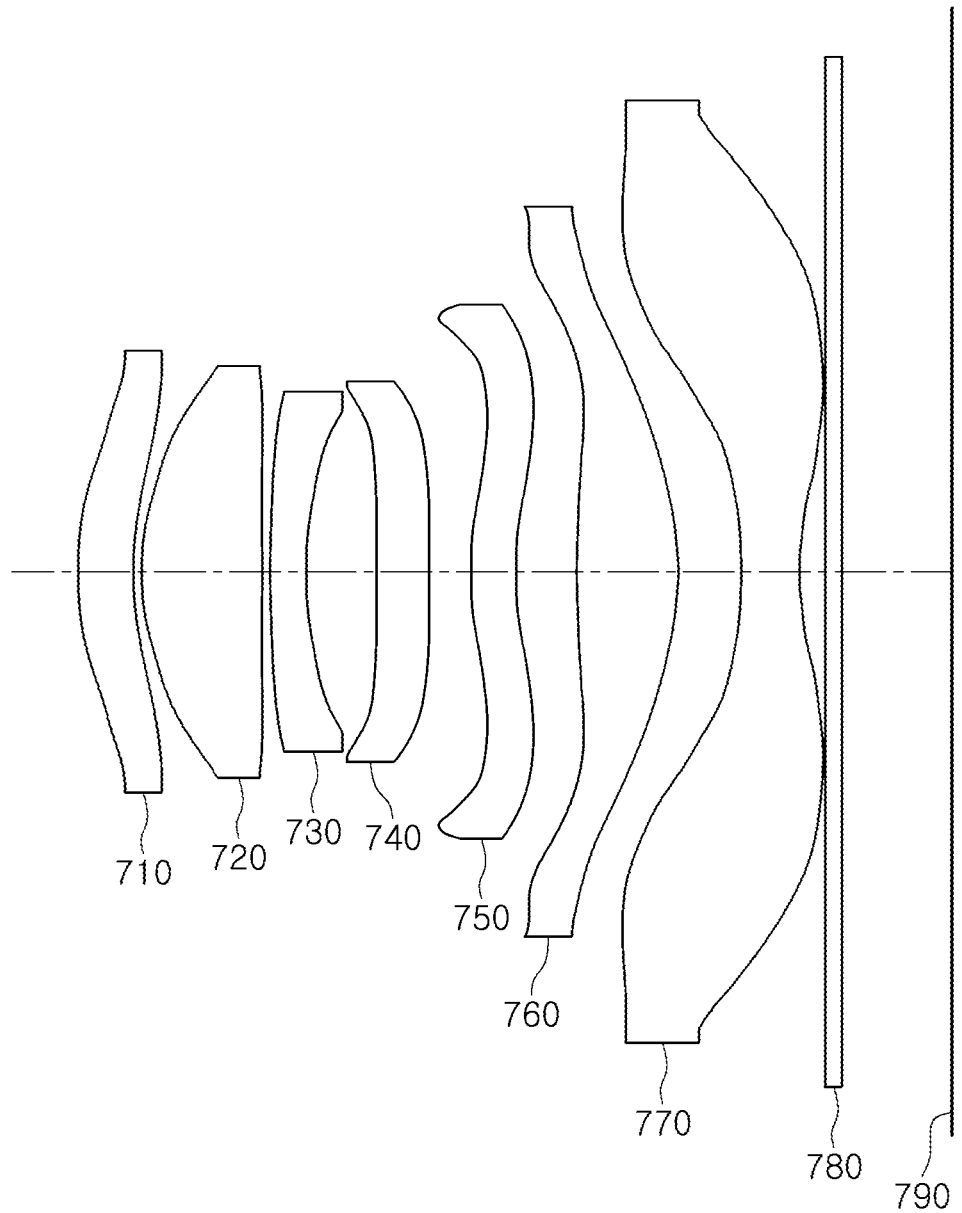
FIG. 13 is a view illustrating a seventh example of an optical imaging system.
Figure 14:
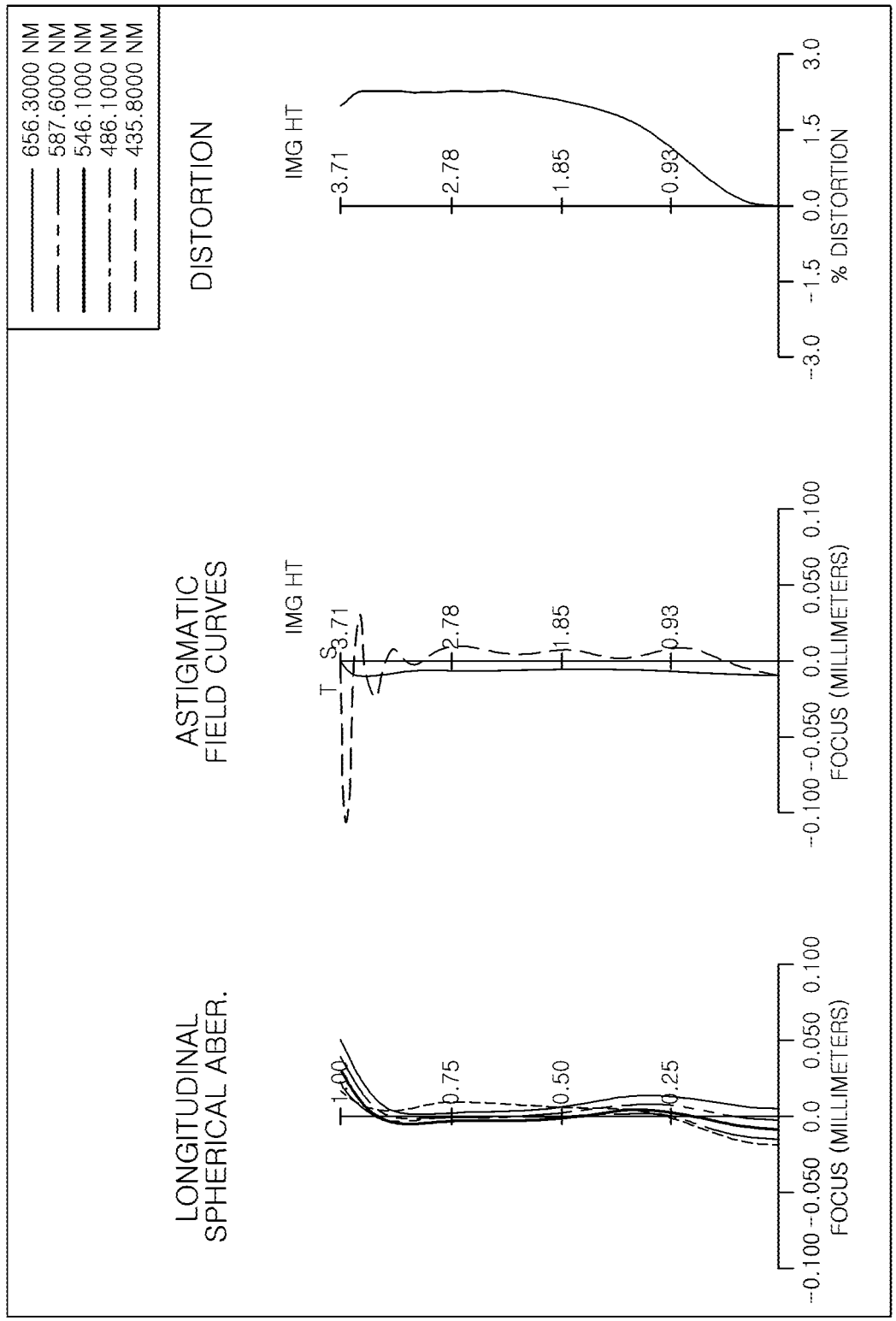
FIG. 14 illustrates aberration curves of the optical imaging system of FIG. 13.

FIG. 13 is a view illustrating a seventh example of an optical imaging system, and FIG. 14 illustrates aberration curves of the optical imaging system of FIG. 13.

The seventh example of the optical imaging system includes a first lens 710, a second lens 720, a third lens 730, a fourth lens 740, a fifth lens 750, a sixth lens 760, a seventh lens 770, a filter 780, an image sensor 790, and a stop (not shown) disposed between the first lens 710 and the second lens 720.

The first lens 710 has a negative refractive power, a paraxial region of an object-side surface thereof is convex, and a paraxial region of an image-side surface thereof is concave.

The second lens 720 has a positive refractive power, a paraxial region of an object-side surface thereof is convex, and a paraxial region of an image-side surface thereof is concave.

The third lens 730 has a negative refractive power, a paraxial region of an object-side surface thereof is convex, and a paraxial region of an image-side surface thereof is concave.

The fourth lens 740 has a negative refractive power, a paraxial region of an object-side surface thereof is convex, and a paraxial region of an image-side surface thereof is concave.

The fifth lens 750 has a positive refractive power, a paraxial region of an object-side surface thereof is convex, and a paraxial region of an image-side surface thereof is concave.

The sixth lens 760 has a positive refractive power, and a paraxial region of each of an object-side surface and an image-side surface thereof is convex.

The seventh lens 770 has a negative refractive power, and a paraxial region of each of each of an object-side surface and an image-side surface thereof is concave.

One inflection point is formed on the object-side surface of the seventh lens 770. In particular, the object-side surface of the seventh lens 770 is concave in the paraxial region, and becomes convex toward an edge thereof.

In addition, one inflection point is formed on the image-side surface of the seventh lens 770. In particular, the image-side surface of the seventh lens 770 is concave in the paraxial region, and becomes convex toward an edge thereof.

Although not illustrated in FIG. 13, the stop is disposed at a distance of 0.383 mm from the object-side surface of the first lens 710 toward the imaging plane of the optical imaging system. This distance is equal to TTL-SL and can be calculated from the values of TTL and SL for Example 7 listed in Table 57 that appears later in this application.

Table 13 below shows physical properties of the lenses and other elements of the optical imaging system of FIG. 13, and Table 14 below shows aspherical surface coefficients of the lenses of FIG. 13. Both surfaces of all of the lenses of FIG. 13 are aspherical.

TABLE 13

| Surface No. | Element | Radius of Curvature | Thickness/ Distance | Index of Refraction | Abbe Number | Effective Aperture Radius |
|---|---|---|---|---|---|---|
| S1 | First | 2.182354 | 0.332873 | 1.546 | 56.114 | 1.380 |
| S2 | Lens | 1.943873 | 0.05 | | | 1.369 |
| S3 | Second | 1.685732 | 0.732159 | 1.546 | 56.114 | 1.335 |
| S4 | Lens | 28.37273 | 0.05 | | | 1.264 |
| S5 | Third | 7.153573 | 0.22 | 1.679 | 19.236 | 1.185 |
| S6 | Lens | 2.922347 | 0.426406 | | | 1.050 |
| S7 | Fourth | 46.9146 | 0.312126 | 1.646 | 23.528 | 1.112 |
| S8 | Lens | 17.58601 | 0.26165 | | | 1.268 |
| S9 | Fifth | 2.265526 | 0.27 | 1.646 | 23.528 | 1.774 |
| S10 | Lens | 2.314346 | 0.373051 | | | 1.839 |
| S11 | Sixth | 8.518581 | 0.607812 | 1.546 | 56.114 | 2.160 |
| S12 | Lens | −1.98711 | 0.378187 | | | 2.308 |
| S13 | Seventh | −4.7165 | 0.36 | 1.546 | 56.114 | 2.780 |
| S14 | Lens | 1.89E+00 | 0.145735 | | | 2.998 |
| S15 | Filter | Infinity | 0.11 | 1.5187 | 64.1664 | 3.352752 |
| S16 | | Infinity | 0.67 | | | 3.384589 |
| S17 | Imaging Plane | Infinity | | | | 3.712027 |

TABLE 14

| | K | A | B | C | D | E | F | G | H |
|---|---|---|---|---|---|---|---|---|---|
| S1 | −3.5715 | 0.0005 | 0.0011 | −0.0181 | 0.0025 | 0.0107 | −0.0084 | 0.0026 | −0.0003 |
| S2 | −9.1496 | −0.0513 | −0.0055 | 0.0116 | 0.0161 | −0.0207 | 0.0078 | −0.001 | 0 |
| S3 | −2.5622 | −0.0879 | 0.1115 | −0.1204 | 0.1625 | −0.1325 | 0.0578 | −0.0118 | 0.0006 |
| S4 | −90 | −0.078 | 0.2103 | −0.4384 | 0.6397 | −0.6153 | 0.3736 | −0.1288 | 0.0189 |
| S5 | 0 | −0.1133 | 0.2975 | −0.5447 | 0.7496 | −0.7199 | 0.4525 | −0.1642 | 0.0257 |
| S6 | 4.6946 | −0.0705 | 0.1434 | −0.2144 | 0.1998 | −0.0956 | −0.0142 | 0.0399 | −0.0137 |
| S7 | 0 | −0.0972 | 0.1221 | −0.3303 | 0.5457 | −0.6222 | 0.4555 | −0.1995 | 0.0405 |
| S8 | 0 | −0.1596 | 0.2027 | −0.3281 | 0.3412 | −0.2472 | 0.1212 | −0.0385 | 0.0064 |
| S9 | −18.27 | −0.0564 | −0.0069 | 0.0518 | −0.0566 | 0.0228 | −0.0011 | −0.0019 | 0.0004 |
| S10 | −15.127 | −0.0603 | −0.0145 | 0.0594 | −0.0601 | 0.0318 | −0.0096 | 0.0015 | −1E−04 |
| S11 | 0 | 0.0027 | −0.0398 | 0.025 | −0.0137 | 0.005 | −0.001 | 1E−04 | −4E−06 |
| S12 | −1.1693 | 0.1224 | −0.1006 | 0.0535 | −0.0195 | 0.005 | −0.0008 | 8E−05 | −3E−06 |
| S13 | −4.4446 | −0.097 | −0.0137 | 0.0358 | −0.0141 | 0.0028 | −0.0003 | 2E−05 | −5E−07 |
| S14 | −8.7431 | −0.0906 | 0.0342 | −0.009 | 0.0017 | −0.0002 | 2E−05 | −1E−06 | 3E−08 |

Eighth Example

Figure 15:
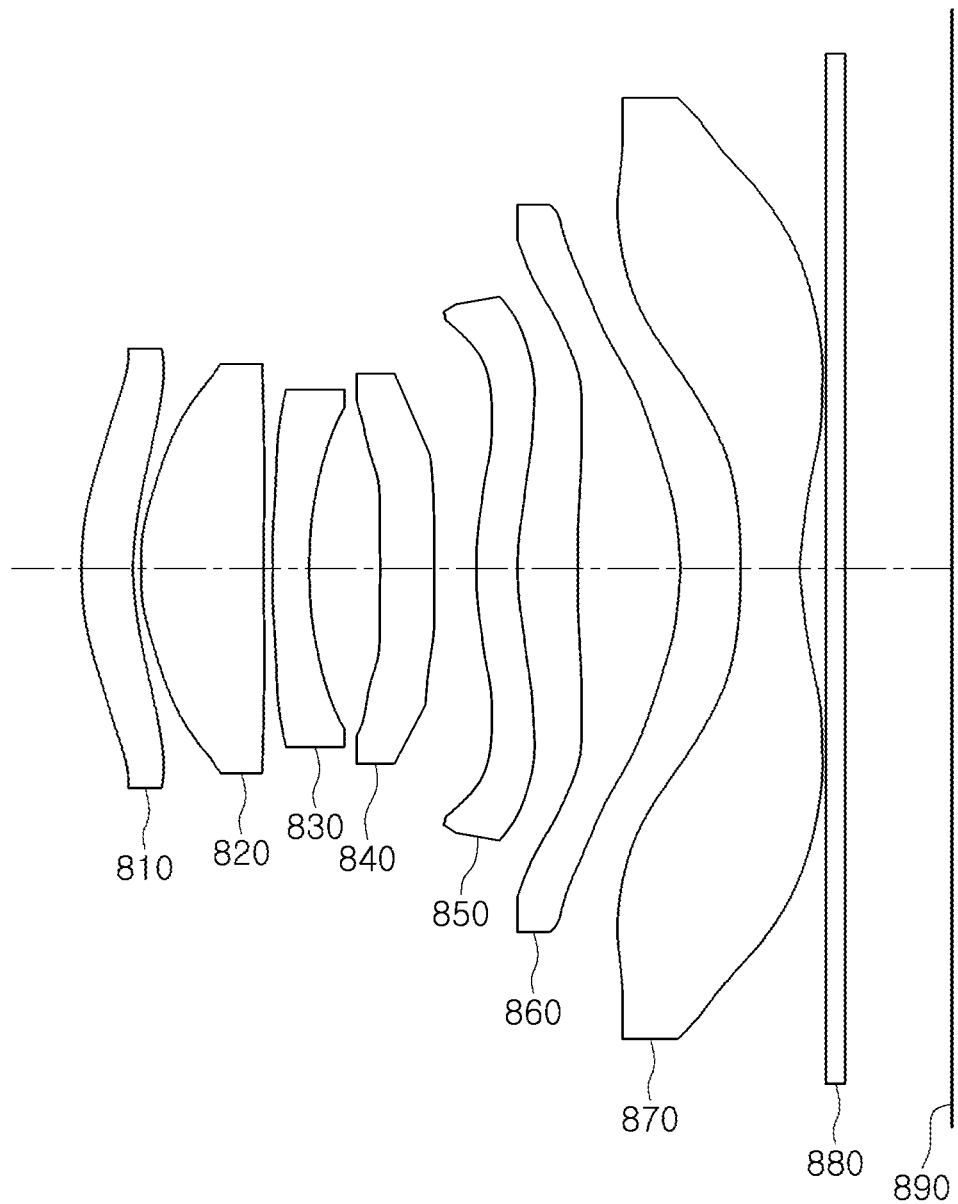
FIG. 15 is a view illustrating an eighth example of an optical imaging system.
Figure 16:
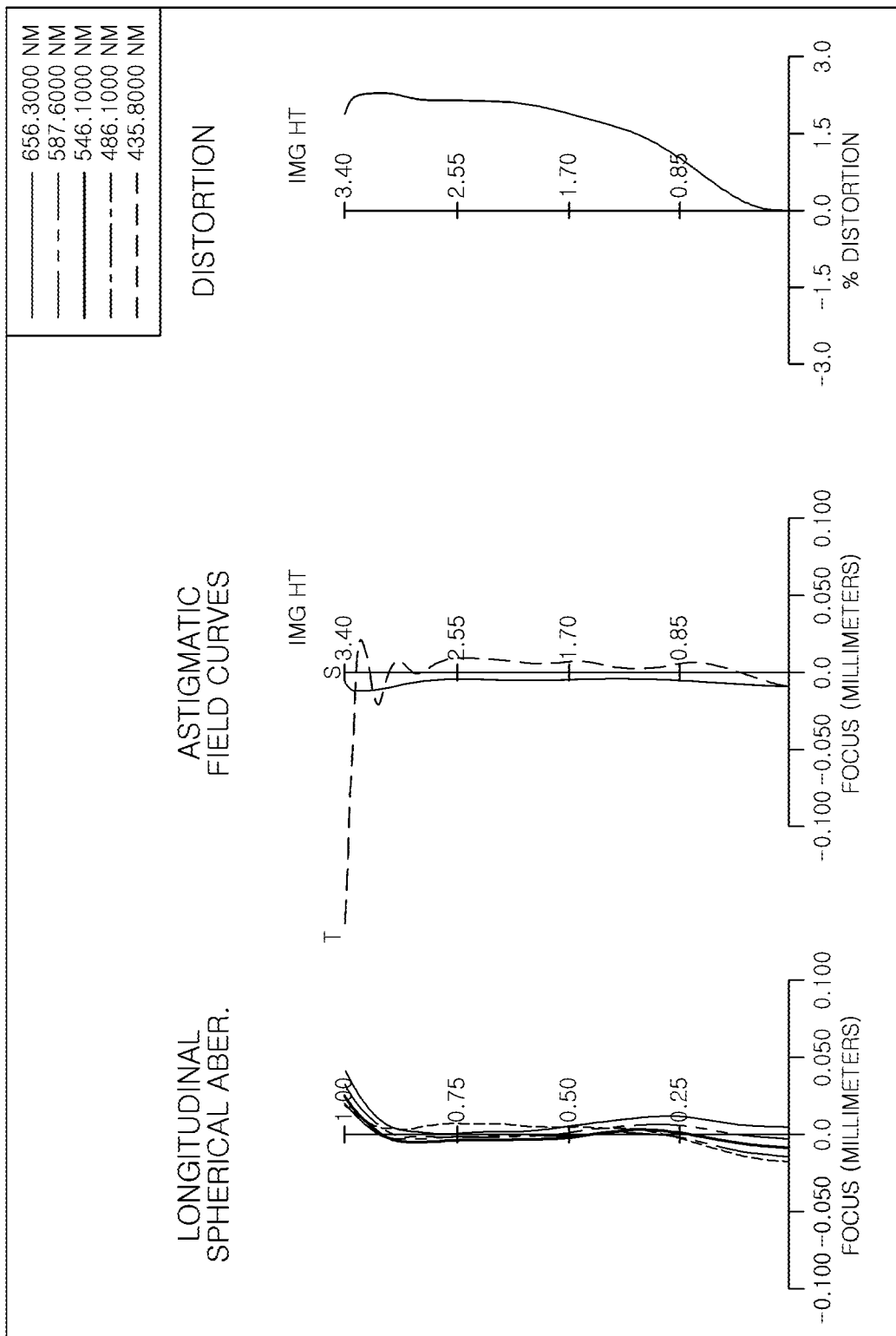
FIG. 16 illustrates aberration curves of the optical imaging system of FIG. 15.

FIG. 15 is a view illustrating an eighth example of an optical imaging system, and FIG. 16 illustrates aberration curves of the optical imaging system of FIG. 15.

The eighth example of the optical imaging system includes a first lens 810, a second lens 820, a third lens 830, a fourth lens 840, a fifth lens 850, a sixth lens 860, a seventh lens 870, a filter 880, an image sensor 890, and a stop (not shown) disposed between the first lens 810 and the second lens 820.

The first lens 810 has a negative refractive power, a paraxial region of an object-side surface thereof is convex, and a paraxial region of an image-side surface thereof is concave.

The second lens 820 has a positive refractive power, a paraxial region of an object-side surface thereof is convex, and a paraxial region of an image-side surface thereof is concave.

The third lens 830 has a negative refractive power, a paraxial region of an object-side surface thereof is convex, and a paraxial region of an image-side surface thereof is concave.

The fourth lens 840 has a negative refractive power, a paraxial region of an object-side surface thereof is convex, and a paraxial region of an image-side surface thereof is concave.

The fifth lens 850 has a positive refractive power, a paraxial region of an object-side surface thereof is convex, and a paraxial region of an image-side surface thereof is concave.

The sixth lens 860 has a positive refractive power, and a paraxial region of each of an object-side surface and an image-side surface thereof is convex.

The seventh lens 870 has a negative refractive power, and a paraxial region of each of an object-side surface and an image-side surface thereof is concave.

One inflection point is formed on the object-side surface of the seventh lens 870. In particular, the object-side surface of the seventh lens 870 is concave in the paraxial region, and becomes convex toward an edge thereof.

In addition, one inflection point is formed on the image-side surface of the seventh lens 870. In particular, the image-side surface of the seventh lens 870 is concave in the paraxial region, and becomes convex toward an edge thereof.

Although not illustrated in FIG. 15, the stop is disposed at a distance of 0.336 mm from the object-side surface of the first lens 810 toward the imaging plane of the optical imaging system. This distance is equal to TTL-SL and can be calculated from the values of TTL and SL for Example 8 listed in Table 57 that appears later in this application.

Table 15 below shows physical properties of the lenses and other elements of the optical imaging system of FIG. 15, and Table 16 below shows aspherical surface coefficients of the lenses of FIG. 15. Both surfaces of all of the lenses of FIG. 15 are aspherical.

TABLE 15

| Surface No. | Element | Radius of Curvature | Thickness/ Distance | Index of Refraction | Abbe Number | Effective Aperture Radius |
|---|---|---|---|---|---|---|
| S1 | First | 2.002076 | 0.290476 | 1.546 | 56.114 | 1.275 |
| S2 | Lens | 1.735025 | 0.046207 | | | 1.265 |
| S3 | Second | 1.510849 | 0.69189 | 1.546 | 56.114 | 1.234 |
| S4 | Lens | 25.17448 | 0.050782 | | | 1.156 |
| S5 | Third | 6.622812 | 0.20331 | 1.679 | 19.236 | 1.088 |
| S6 | Lens | 2.690882 | 0.397038 | | | 0.970 |
| S7 | Fourth | 404.2399 | 0.304853 | 1.646 | 23.528 | 1.031 |
| S8 | Lens | 26.39909 | 0.238795 | | | 1.192 |
| S9 | Fifth | 2.030671 | 0.231034 | 1.646 | 23.528 | 1.495 |
| S10 | Lens | 2.049104 | 0.337714 | | | 1.721 |
| S11 | Sixth | 9.000096 | 0.577572 | 1.546 | 56.114 | 1.996 |
| S12 | Lens | −1.67925 | 0.339723 | | | 2.084 |
| S13 | Seventh | −3.83664 | 0.33269 | 1.546 | 56.114 | 2.569 |
| S14 | Lens | 1.71E+00 | 0.146102 | | | 2.784 |
| S15 | Filter | Infinity | 0.11 | 1.5187 | 64.1664 | 3.104605 |
| S16 | Imaging | Infinity | 0.603297 | | | 3.133872 |
| S17 | Plane | Infinity | | | | 3.409206 |

TABLE 16

| | K | A | B | C | D | E | F | G | H |
|---|---|---|---|---|---|---|---|---|---|
| S1 | −3.5658 | −0.0001 | 0.0048 | −0.0338 | 0.0058 | 0.0258 | −0.024 | 0.0087 | −0.0012 |
| S2 | −8.9286 | −0.0617 | −0.0072 | 0.019 | 0.0308 | −0.0458 | 0.0196 | −0.0029 | 0 |
| S3 | −2.4366 | −0.118 | 0.178 | −0.2127 | 0.3039 | −0.2613 | 0.1138 | −0.0182 | −0.0012 |
| S4 | 100 | −0.0932 | 0.2737 | −0.6752 | 1.2227 | −1.4655 | 1.1 | −0.4621 | 0.0813 |
| S5 | 0 | −0.1401 | 0.3995 | −0.8103 | 1.2941 | −1.4787 | 1.1095 | −0.4775 | 0.0877 |
| S6 | 4.6754 | −0.0913 | 0.2084 | −0.3503 | 0.3957 | −0.2854 | 0.067 | 0.0558 | −0.0336 |
| S7 | 0 | −0.1191 | 0.1586 | −0.5241 | 1.0591 | −1.4826 | 1.3333 | −0.7155 | 0.1765 |
| S8 | 0 | −0.2012 | 0.3026 | −0.6033 | 0.8015 | −0.7547 | 0.4799 | −0.1903 | 0.0367 |
| S9 | −18.968 | −0.0705 | −0.017 | 0.0854 | −0.095 | 0.0372 | 0.0031 | −0.007 | 0.0016 |
| S10 | −15.615 | −0.0761 | −0.0114 | 0.0715 | −0.083 | 0.0509 | −0.0182 | 0.0035 | −0.0003 |
| S11 | 0 | −0.0083 | −0.0355 | 0.0253 | −0.0245 | 0.0145 | −0.0045 | 0.0007 | −5E−05 |
| S12 | −1.1609 | 0.1552 | −0.1513 | 0.1068 | −0.0571 | 0.0215 | −0.005 | 0.0006 | −3E−05 |
| S13 | −4.7786 | −0.1272 | −0.0055 | 0.0492 | −0.0232 | 0.0053 | −0.0007 | 4E−05 | −1E−06 |
| S14 | −8.9618 | −0.1184 | 0.0565 | −0.0195 | 0.0048 | −0.0009 | 1E−04 | −6E−06 | 2E−07 |

Ninth Example

Figure 17:
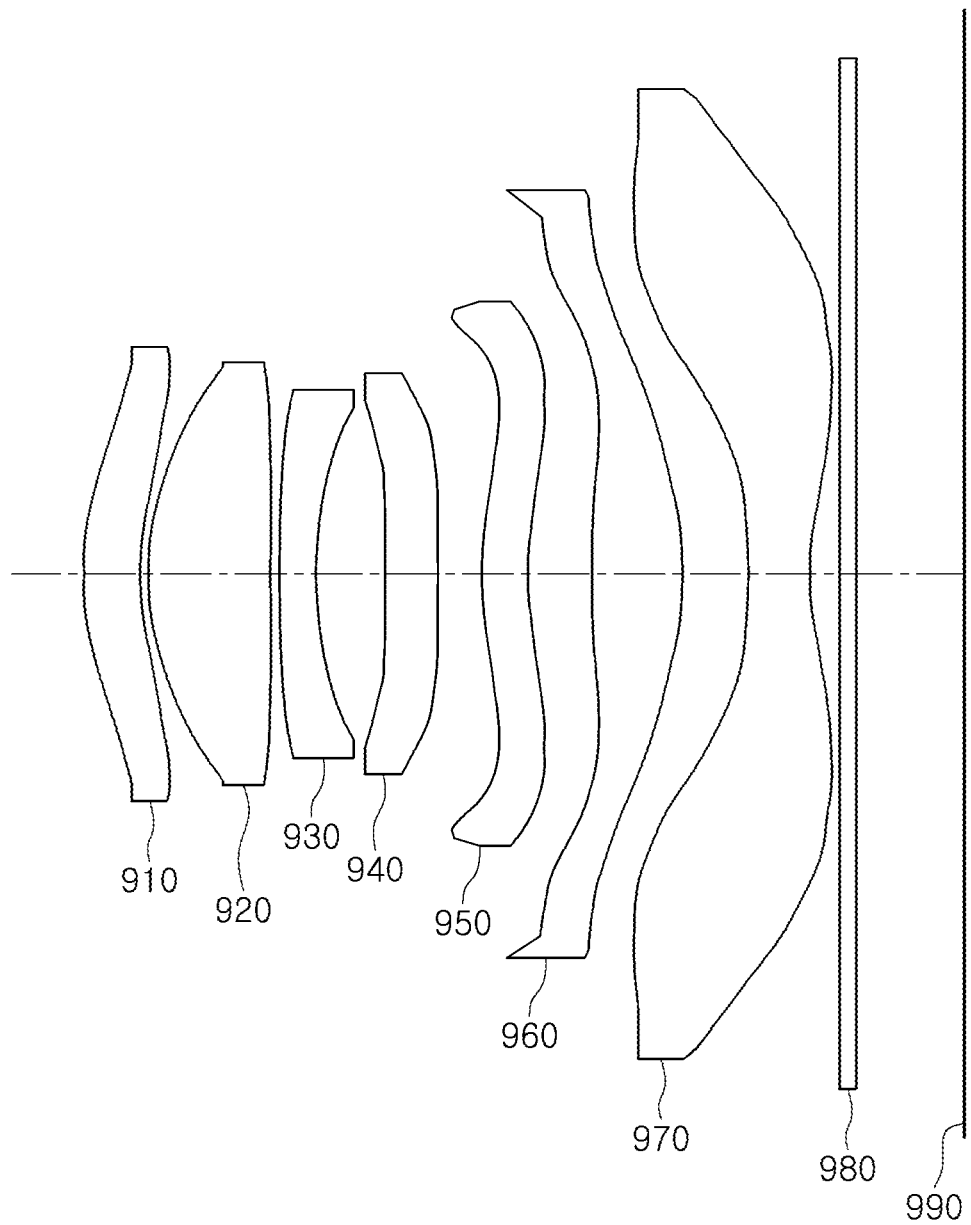
FIG. 17 is a view illustrating a ninth example of an optical imaging system.
Figure 18:
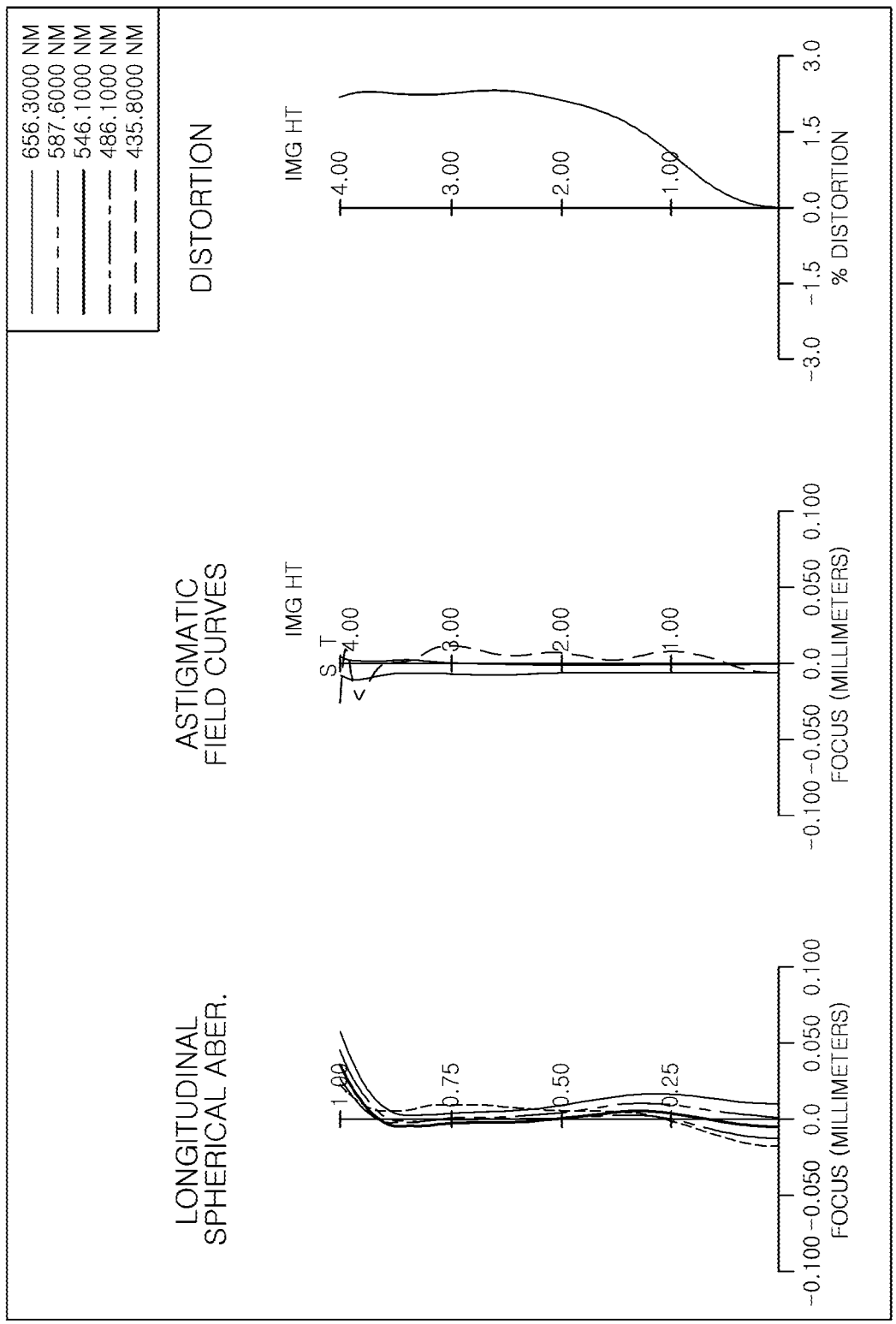
FIG. 18 illustrates aberration curves of the optical imaging system of FIG. 17.

FIG. 17 is a view illustrating a ninth example of an optical imaging system, and FIG. 18 illustrates aberration curves of the optical imaging system of FIG. 17.

The ninth example of the optical imaging system includes a first lens 910, a second lens 920, a third lens 930, a fourth lens 940, a fifth lens 950, a sixth lens 960, a seventh lens 970, a filter 980, an image sensor 990, and a stop (not shown) disposed between the first lens 910 and the second lens 920.

The first lens 910 has a negative refractive power, a paraxial region of an object-side surface thereof is convex, and a paraxial region of an image-side surface thereof is concave.

The second lens 920 has a positive refractive power, a paraxial region of an object-side surface thereof is convex, and a paraxial region of an image-side surface thereof is concave.

The third lens 930 has a negative refractive power, a paraxial region of an object-side surface thereof is convex, and a paraxial region of an image-side surface thereof is concave.

The fourth lens 940 has a negative refractive power, a paraxial region of an object-side surface thereof is convex, and a paraxial region of an image-side surface thereof is concave.

The fifth lens 950 has a positive refractive power, a paraxial region of an object-side surface thereof is convex, and a paraxial region of an image-side surface thereof is concave.

The sixth lens 960 has a positive refractive power, and a paraxial region of each of an object-side surface and an image-side surface thereof is convex.

The seventh lens 970 has a negative refractive power, and a paraxial region of each of each of an object-side surface and an image-side surface thereof is concave.

One inflection point is formed on the object-side surface of the seventh lens 970. In particular, the object-side surface of the seventh lens 970 is concave in the paraxial region, and becomes convex toward an edge thereof.

In addition, one inflection point is formed on the image-side surface of the seventh lens 970. In particular, the image-side surface of the seventh lens 970 is concave in the paraxial region, and becomes convex toward an edge thereof.

Although not illustrated in FIG. 17, the stop is disposed at a distance of 0.423 mm from the object-side surface of the first lens 910 toward the imaging plane of the optical imaging system. This distance is equal to TTL-SL and can be calculated from the values of TTL and SL for Example 9 listed in Table 57 that appears later in this application.

Table 17 below shows physical properties of the lenses and other elements of the optical imaging system of FIG. 17, and Table 18 below shows aspherical surface coefficients of the lenses of FIG. 17. Both surfaces of all of the lenses of FIG. 17 are aspherical.

The third lens 1030 has a negative refractive power, a paraxial region of an object-side surface thereof is convex, and a paraxial region of an image-side surface thereof is concave.

The fourth lens 1040 has a positive refractive power, a paraxial region of an object-side surface thereof is convex, and a paraxial region of an image-side surface thereof is concave.

TABLE 17

| Surface No. | Element | Radius of Curvature | Thickness/ Distance | Index of Refraction | Abbe Number | Effective Aperture Radius |
|---|---|---|---|---|---|---|
| S1 | First | 2.368882 | 0.367771 | 1.546 | 56.114 | 1.537 |
| S2 | Lens | 2.149833 | 0.055693 | | | 1.509 |
| S3 | Second | 1.901715 | 0.8054 | 1.546 | 56.114 | 1.470 |
| S4 | Lens | 34.69271 | 0.055693 | | | 1.395 |
| S5 | Third | 8.116881 | 0.245048 | 1.679 | 19.236 | 1.315 |
| S6 | Lens | 3.249705 | 0.44958 | | | 1.170 |
| S7 | Fourth | 27.77257 | 0.345117 | 1.646 | 23.528 | 1.242 |
| S8 | Lens | 15.68604 | 0.292205 | | | 1.430 |
| S9 | Fifth | 2.481018 | 0.30074 | 1.646 | 23.528 | 1.793 |
| S10 | Lens | 2.530918 | 0.421042 | | | 2.058 |
| S11 | Sixth | 8.852122 | 0.594719 | 1.546 | 56.114 | 2.406 |
| S12 | Lens | −2.33268 | 0.433709 | | | 2.591 |
| S13 | Seventh | −5.6504 | 0.400987 | 1.546 | 56.114 | 3.097 |
| S14 | Lens | 2.11E+00 | 0.196308 | | | 3.252 |
| S15 | Filter | Infinity | 0.11 | 1.5187 | 64.1664 | 3.633461 |
| S16 | | Infinity | 0.713029 | | | 3.664237 |
| S17 | Imaging Plane | Infinity | | | | 4.005175 |

TABLE 18

| | K | A | B | C | D | E | F | G | H |
|---|---|---|---|---|---|---|---|---|---|
| S1 | −3.6056 | 0.0006 | 0.0002 | −0.0091 | 0.0008 | 0.0037 | −0.0023 | 0.0006 | −6E−05 |
| S2 | −9.0241 | −0.0381 | −0.0034 | 0.0057 | 0.0064 | −0.0066 | 0.0021 | −0.0002 | 0 |
| S3 | −2.5303 | −0.0646 | 0.0638 | −0.0489 | 0.0502 | −0.0297 | 0.0079 | −0.0003 | −0.0002 |
| S4 | −90 | −0.061 | 0.1445 | −0.2496 | 0.2927 | −0.227 | 0.1117 | −0.0313 | 0.0037 |
| S5 | 0 | −0.0873 | 0.1992 | −0.3055 | 0.3359 | −0.2538 | 0.1258 | −0.0363 | 0.0045 |
| S6 | 4.7161 | −0.0546 | 0.0965 | −0.1239 | 0.0985 | −0.0415 | 0.0003 | 0.0073 | −0.0021 |
| S7 | 0 | −0.0683 | 0.0579 | −0.1095 | 0.1139 | −0.0757 | 0.0284 | −0.0061 | 0.0009 |
| S8 | 0 | −0.1131 | 0.1074 | −0.1248 | 0.0808 | −0.0284 | 0.0031 | 0.0006 | −1E−05 |
| S9 | −17.253 | −0.0425 | −0.0026 | 0.0281 | −0.0272 | 0.0102 | −0.0011 | −0.0003 | 7E−05 |
| S10 | −15.241 | −0.0436 | −0.0118 | 0.0343 | −0.0279 | 0.0119 | −0.0029 | 0.0004 | −2E−05 |
| S11 | 0 | 0.0034 | −0.0267 | 0.0138 | −0.0061 | 0.0018 | −0.0003 | 2E−05 | −8E−07 |
| S12 | −1.2097 | 0.0895 | −0.0603 | 0.0269 | −0.0083 | 0.0018 | −0.0003 | 2E−05 | −7E−07 |
| S13 | −4.5375 | −0.0806 | 0.0002 | 0.0144 | −0.005 | 0.0008 | −8E−05 | 4E−06 | −8E−08 |
| S14 | −9.2133 | −0.0675 | 0.0218 | −0.005 | 0.0008 | −1E−04 | 8E−06 | −4E−07 | 7E−09 |

Tenth Example

Figure 19:
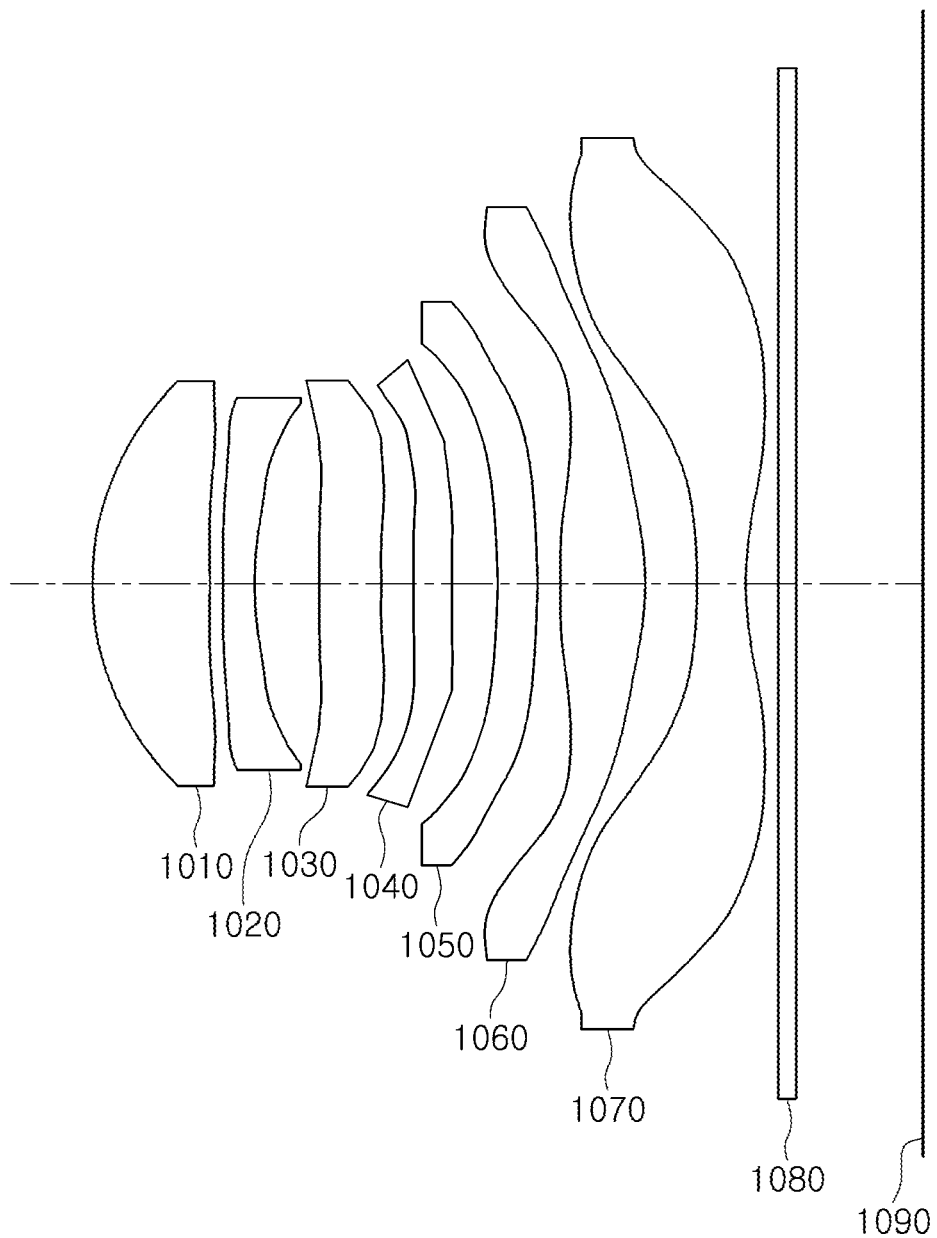
FIG. 19 is a view illustrating a tenth example of an optical imaging system.
Figure 20:
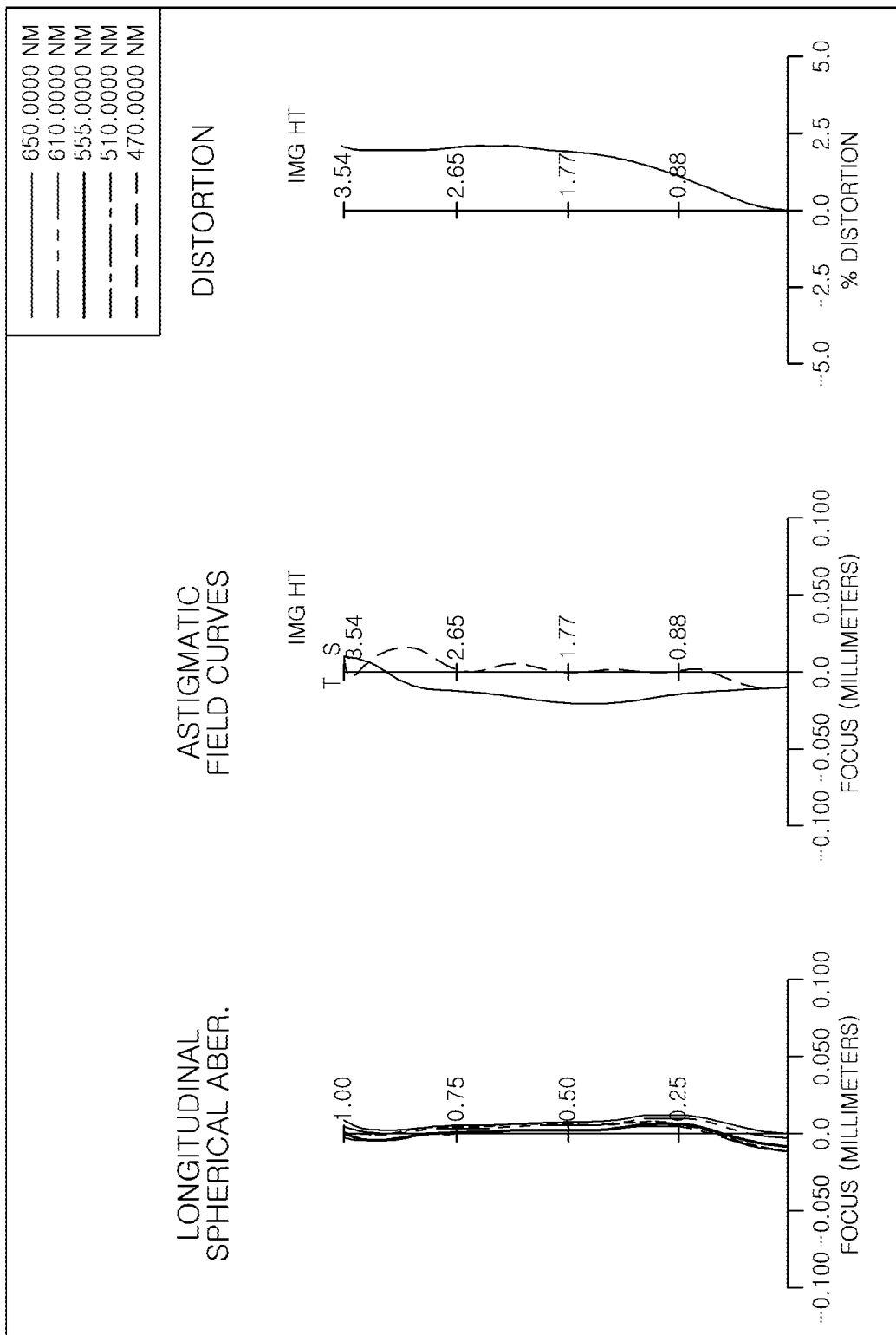
FIG. 20 illustrates aberration curves of the optical imaging system of FIG. 19.

FIG. 19 is a view illustrating a tenth example of an optical imaging system, and FIG. 20 illustrates aberration curves of the optical imaging system of FIG. 19.

The tenth example of the optical imaging system includes a first lens 1010, a second lens 1020, a third lens 1030, a fourth lens 1040, a fifth lens 1050, a sixth lens 1060, a seventh lens 1070, a filter 1080, an image sensor 1090, and a stop (not shown) disposed between the first lens 1010 and the second lens 1020.

The first lens 1010 has a positive refractive power, a paraxial region of an object-side surface thereof is convex, and a paraxial region of an image-side surface thereof is concave.

The second lens 1020 has a negative refractive power, a paraxial region of an object-side surface thereof is convex, and a paraxial region of an image-side surface thereof is concave.

The fifth lens 1050 has a negative refractive power, a paraxial region of an object-side surface thereof is concave, and a paraxial region of an image-side surface thereof is convex.

The sixth lens 1060 has a positive refractive power, and a paraxial region of each of an object-side surface and an image-side surface thereof is convex.

The seventh lens 1070 has a negative refractive power, and a paraxial region of each of an object-side surface and an image-side surface thereof is concave.

One inflection point is formed on the object-side surface of the seventh lens 1070. In particular, the object-side surface of the seventh lens 1070 is concave in the paraxial region, and becomes convex toward an edge thereof.

In addition, one inflection point is formed on the image-side surface of the seventh lens 1070. In particular, the image-side surface of the seventh lens 1070 is concave in the paraxial region, and becomes convex toward an edge thereof.

Although not illustrated in FIG. 19, the stop is disposed at a distance of 0.731 mm from the object-side surface of the first lens 1010 toward the imaging plane of the optical imaging system. This distance is equal to TTL-SL and can be calculated from the values of TTL and SL for Example 10 listed in Table 57 that appears later in this application.

Table 19 below shows physical properties of the lenses and other elements of the optical imaging system of FIG. 19, and Table 20 below shows aspherical surface coefficients of the lenses of FIG. 19. Both surfaces of all of the lenses of FIG. 19 are aspherical.

Eleventh Example

Figure 21:
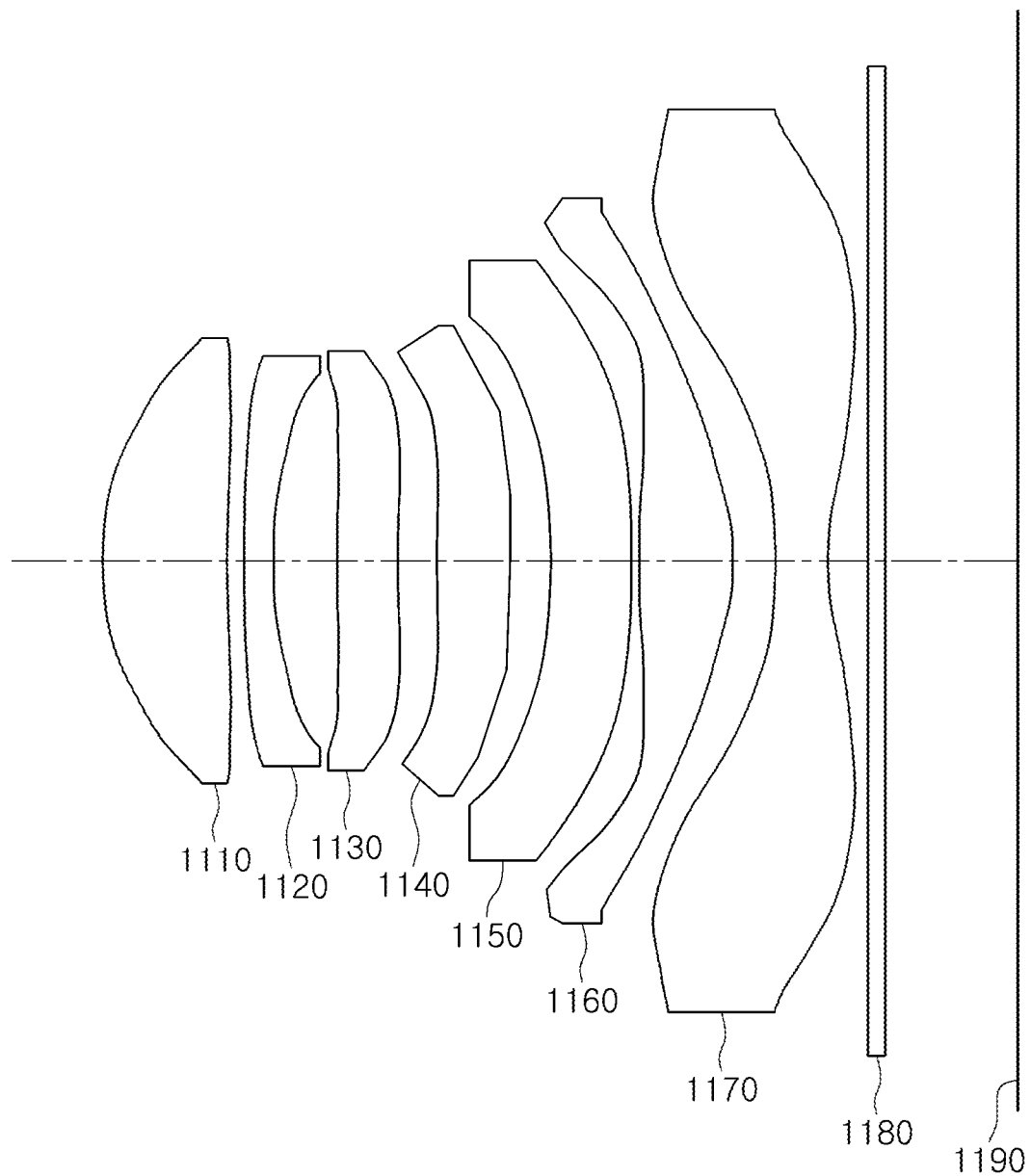
FIG. 21 is a view illustrating an eleventh example of an optical imaging system.
Figure 22:
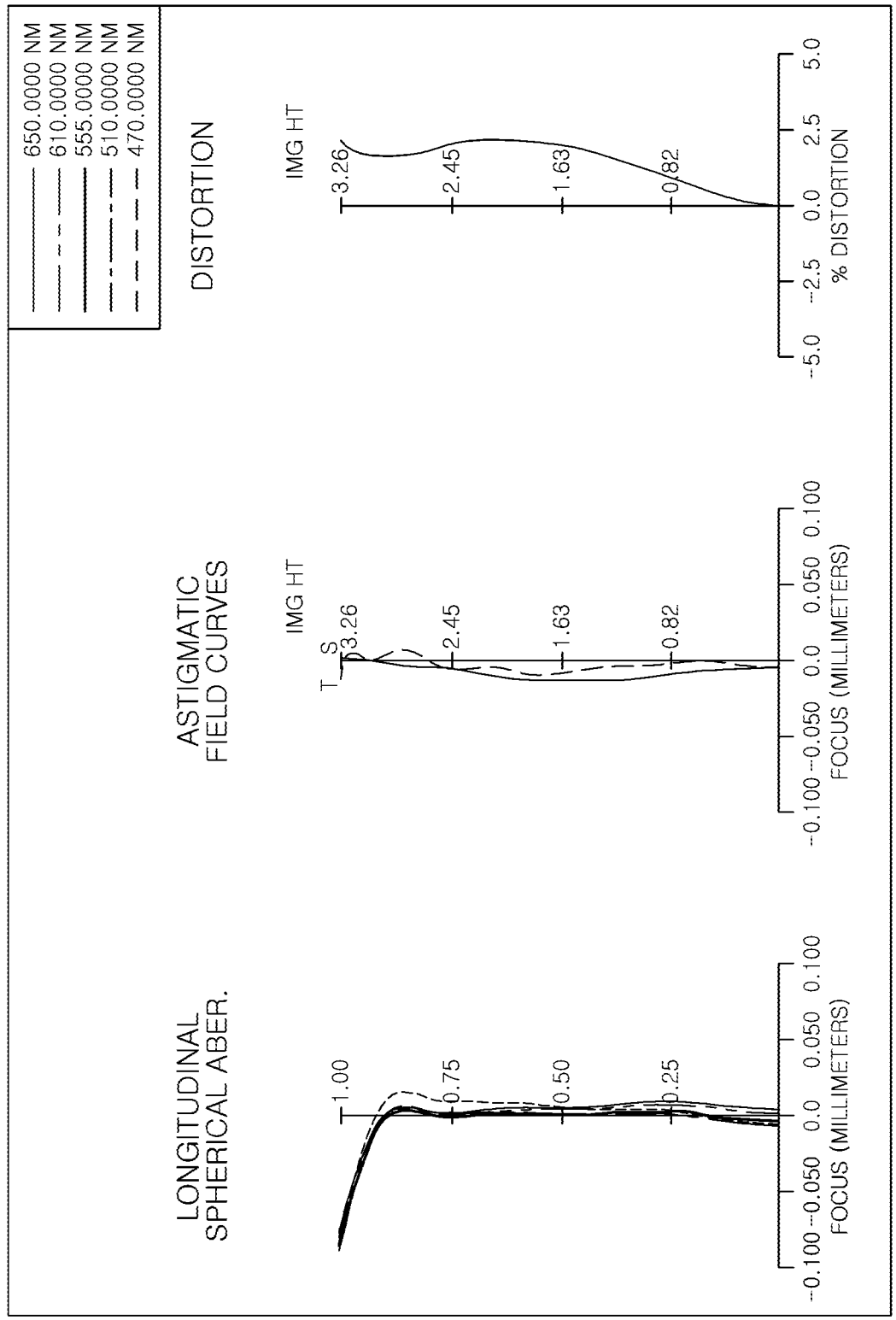
FIG. 22 illustrates aberration curves of the optical imaging system of FIG. 21.

FIG. 21 is a view illustrating an eleventh example of an optical imaging system, and FIG. 22 illustrates aberration curves of the optical imaging system of FIG. 21.

The eleventh example of the optical imaging system includes a first lens 1110, a second lens 1120, a third lens 1130, a fourth lens 1140, a fifth lens 1150, a sixth lens 1160, a seventh lens 1170, a filter 1180, an image sensor 1190, and a stop (not shown) disposed between the first lens 1110 and the second lens 1120.

TABLE 19

| Surface No. | Element | Radius of Curvature | Thickness/ Distance | Index of Refraction | Abbe Number | Effective Aperture Radius |
|---|---|---|---|---|---|---|
| S1 | First | 1.732331 | 0.731243 | 1.546 | 56.114 | 1.250 |
| S2 | Lens | 12.53699 | 0.070023 | | | 1.181 |
| S3 | Second | 5.589296 | 0.2 | 1.667 | 20.353 | 1.147 |
| S4 | Lens | 2.573966 | 0.39715 | | | 1.100 |
| S5 | Third | 8.065523 | 0.384736 | 1.546 | 56.114 | 1.128 |
| S6 | Lens | 7.836681 | 0.192591 | | | 1.247 |
| S7 | Fourth | 6.687158 | 0.244226 | 1.546 | 56.114 | 1.276 |
| S8 | Lens | 30.32847 | 0.271297 | | | 1.374 |
| S9 | Fifth | −3.28742 | 0.24968 | 1.667 | 20.353 | 1.481 |
| S10 | Lens | −4.51593 | 0.138845 | | | 1.734 |
| S11 | Sixth | 5.679879 | 0.519865 | 1.546 | 56.114 | 2.150 |
| S12 | Lens | −1.89003 | 0.316634 | | | 2.318 |
| S13 | Seventh | −3.93255 | 0.3 | 1.546 | 56.114 | 2.640 |
| S14 | Lens | 1.741826 | 0.193709 | | | 2.747 |
| S15 | Filter | Infinity | 0.11 | 1.518 | 64.166 | 3.146 |
| S16 | | Infinity | 0.78 | | | 3.177045639 |
| S17 | Imaging Plane | Infinity | | | | 3.536356437 |

TABLE 20

| | K | A | B | C | D |
|---|---|---|---|---|---|
| S1 | −0.7464 | 0.01386 | 0.03443 | −0.0749 | 0.10292 |
| S2 | 36.6688 | −0.0823 | 0.19496 | −0.3067 | 0.36336 |
| S3 | −1.3559 | −0.1603 | 0.33047 | −0.4059 | 0.33245 |
| S4 | −0.4109 | −0.0907 | 0.14443 | 0.1155 | −0.7969 |
| S5 | 0 | −0.0739 | 0.04629 | −0.1203 | 0.11651 |
| S6 | 0 | −0.0932 | 0.00341 | 0.05212 | −0.1827 |
| S7 | 25.1476 | −0.1235 | −0.1887 | 0.37626 | −0.554 |
| S8 | −99 | −9E−05 | −0.3274 | 0.35885 | −0.3195 |
| S9 | −70.894 | 0.02055 | 0.04825 | −0.5284 | 0.75832 |
| S10 | 2.28319 | 0.17594 | −0.3448 | 0.22829 | −0.0716 |
| S11 | −99 | 0.11875 | −0.2169 | 0.16747 | −0.0871 |
| S12 | −3.3067 | 0.16436 | −0.1849 | 0.1159 | −0.049 |
| S13 | −2.4772 | −0.1026 | −0.0482 | 0.07401 | −0.0308 |
| S14 | −1.1028 | −0.2935 | 0.20325 | −0.1127 | 0.04574 |

| | E | F | G | H | J |
|---|---|---|---|---|---|
| S1 | −0.0706 | 0.01727 | 0.00423 | −0.0023 | 0 |
| S2 | −0.323 | 0.19024 | −0.0632 | 0.00855 | 0 |
| S3 | −0.1787 | 0.06728 | −0.0166 | 0.00178 | 0 |
| S4 | 1.50089 | −1.4406 | 0.72187 | −0.147 | 0 |
| S5 | −0.0578 | −0.0089 | 0.02328 | −0.0057 | 0 |
| S6 | 0.24566 | −0.2173 | 0.11261 | −0.0241 | 0 |
| S7 | 0.67306 | −0.5796 | 0.27819 | −0.0538 | 0 |
| S8 | 0.34506 | −0.2608 | 0.09954 | −0.0144 | 0 |
| S9 | −0.4915 | 0.16359 | −0.0271 | 0.00175 | 0 |
| S10 | 0.01095 | −0.0007 | −4E−06 | 1.4E−06 | 0 |
| S11 | 0.02755 | −0.0049 | 0.00045 | −2E−05 | 0 |
| S12 | 0.01383 | −0.0024 | 0.00023 | −9E−06 | 0 |
| S13 | 0.00666 | −0.0008 | 5.5E−05 | −2E−06 | 0 |
| S14 | −0.0129 | 0.0024 | −0.0003 | 1.8E−05 | −5E−07 |

The first lens 1110 has a positive refractive power, a paraxial region of an object-side surface thereof is convex, and a paraxial region of an image-side surface thereof is concave.

The second lens 1120 has a negative refractive power, a paraxial region of an object-side surface thereof is convex, and a paraxial region of an image-side surface thereof is concave.

The third lens 1130 has a negative refractive power, a paraxial region of an object-side surface thereof is convex, and a paraxial region of an image-side surface thereof is concave.

The fourth lens 1140 has a positive refractive power, a paraxial region of an object-side surface thereof is convex, and a paraxial region of an image-side surface thereof is concave.

The fifth lens 1150 has a negative refractive power, a paraxial region of an object-side surface thereof is concave, and a paraxial region of an image-side surface thereof is convex.

The sixth lens 1160 has a positive refractive power, and a paraxial region of each of an object-side surface and an image-side surface thereof is convex.

The seventh lens 1170 has a negative refractive power, and a paraxial region of each of an object-side surface and a paraxial region of an image-side surface thereof is concave.

One inflection point is formed on the object-side surface of the seventh lens 1170. In particular, the object-side surface of the seventh lens 1170 is concave in the paraxial region, and becomes convex toward an edge thereof.

In addition, one inflection point is formed on the image-side surface of the seventh lens 1170. In particular, the image-side surface of the seventh lens 1170 is concave in the paraxial region, and becomes convex toward an edge thereof.

Although not illustrated in FIG. 21, the stop is disposed at a distance of 0.731 mm from the object-side surface of the first lens 1110 toward the imaging plane of the optical imaging system. This distance is equal to TTL-SL and can be calculated from the values of TTL and SL for Example 11 listed in Table 57 that appears later in this application.

Table 21 below shows physical properties of the lenses and other elements of the optical imaging system of FIG. 21, and Table 22 below shows aspherical surface coefficients of the lenses of FIG. 21. Both surfaces of all of the lenses of FIG. 21 are aspherical.

TABLE 21

| Surface No. | Element | Radius of Curvature | Thickness/ Distance | Index of Refraction | Abbe Number | Effective Aperture Radius |
|---|---|---|---|---|---|---|
| S1 | First | 1.770763 | 0.730711 | 1.546 | 56.114 | 1.320 |
| S2 | Lens | 14.17202 | 0.100163 | | | 1.273 |
| S3 | Second | 5.668898 | 0.18 | 1.667 | 20.353 | 1.211 |
| S4 | Lens | 2.64742 | 0.372112 | | | 1.100 |
| S5 | Third | 8.43642 | 0.362306 | 1.546 | 56.114 | 1.132 |
| S6 | Lens | 7.970624 | 0.229099 | | | 1.239 |
| S7 | Fourth | 6.86515 | 0.42272 | 1.546 | 56.114 | 1.274 |
| S8 | Lens | 36.76921 | 0.245464 | | | 1.393 |
| S9 | Fifth | −3.17407 | 0.478139 | 1.667 | 20.353 | 1.445 |
| S10 | Lens | −4.17541 | 0.041087 | | | 1.772 |
| S11 | Sixth | 7.099919 | 0.552516 | 1.546 | 56.114 | 2.150 |
| S12 | Lens | −1.53067 | 0.261423 | | | 2.068 |
| S13 | Seventh | −2.51307 | 0.3 | 1.546 | 56.114 | 2.414 |
| S14 | Lens | 1.797456 | 0.23426 | | | 2.679 |
| S15 | Filter | Infinity | 0.11 | 1.518 | 64.166 | 2.907 |
| S16 | | Infinity | 0.7799997 | | | 2.935720549 |
| S17 | Imaging Plane | Infinity | | | | 3.264729521 |

TABLE 22

| | K | A | B | C | D |
|---|---|---|---|---|---|
| S1 | −0.7681 | 0.01965 | −0.0023 | 0.03216 | −0.0725 |
| S2 | 45.8003 | −0.0479 | 0.07745 | −0.054 | −0.0476 |
| S3 | −2.8609 | −0.1305 | 0.23846 | −0.2908 | 0.23698 |
| S4 | −0.8781 | −0.0856 | 0.15126 | −0.0468 | −0.2774 |
| S5 | 0 | −0.0618 | −0.0157 | 0.07733 | −0.2544 |
| S6 | 0 | −0.0948 | −0.0485 | 0.1701 | −0.3674 |
| S7 | 24.7714 | −0.1253 | −0.0916 | 0.07902 | 0.06606 |
| S8 | −99 | −0.022 | −0.2346 | 0.17869 | −0.0276 |
| S9 | −49.881 | −0.0321 | 0.01104 | −0.3632 | 0.63755 |
| S10 | 1.50394 | 0.14944 | −0.3234 | 0.26404 | −0.1034 |
| S11 | −99 | 0.05255 | −0.154 | 0.1443 | −0.0834 |
| S12 | −2.9382 | 0.0764 | −0.0567 | 0.02305 | −0.0064 |
| S13 | −5.8244 | −0.0197 | −0.1042 | 0.09438 | −0.036 |
| S14 | −0.9447 | −0.2204 | 0.12723 | −0.0644 | 0.02544 |

TABLE 22-continued

|     | E       | F       | G       | H       | J     |
|-----|---------|---------|---------|---------|-------|
| S1  | 0.09393 | −0.0692 | 0.02709 | −0.0045 | 0     |
| S2  | 0.13354 | −0.1194 | 0.05034 | −0.0084 | 0     |
| S3  | −0.1031 | 0.0108  | 0.00969 | −0.003  | 0     |
| S4  | 0.65417 | −0.6619 | 0.33681 | −0.0673 | 0     |
| S5  | 0.39332 | −0.3533 | 0.18049 | −0.0399 | 0     |
| S6  | 0.41646 | −0.2753 | 0.10654 | −0.0195 | 0     |
| S7  | −0.3032 | 0.34529 | −0.1688 | 0.03094 | 0     |
| S8  | −0.0274 | 0.02137 | −0.0097 | 0.00223 | 0     |
| S9  | −0.478  | 0.17949 | −0.0322 | 0.002   | 0     |
| S10 | 0.01233 | 0.00452 | −0.0017 | 0.00016 | 0     |
| S11 | 0.02708 | −0.0048 | 0.00044 | −2E−05  | 0     |
| S12 | 0.0012  | −0.0001 | 8.7E−06 | −2E−07  | 0     |
| S13 | 0.00755 | −0.0009 | 6E−05   | −2E−06  | 0     |
| S14 | −0.0072 | 0.00137 | −0.0002 | 1.1E−05 | −3E−07|

Twelfth Example

Figure 23:
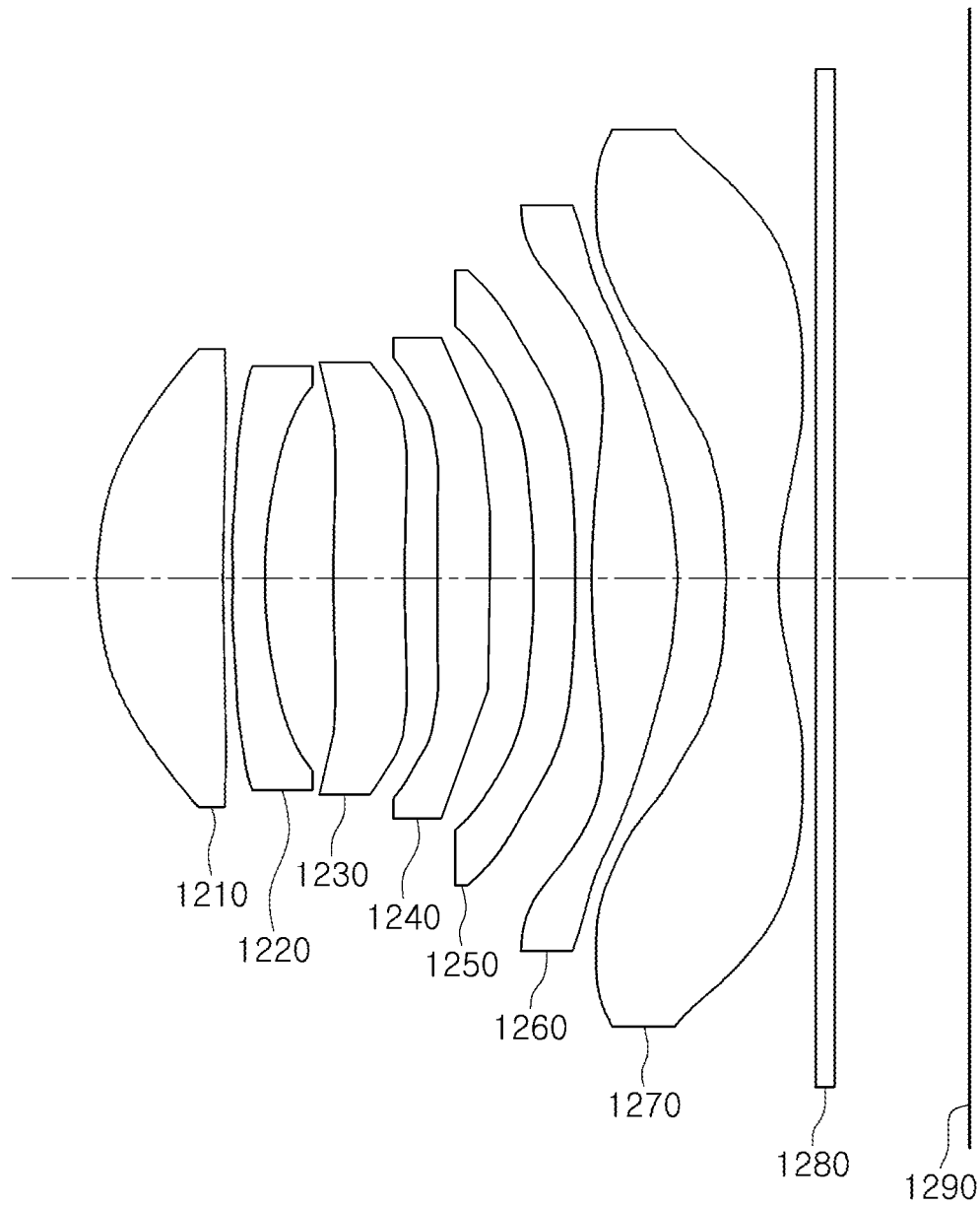
FIG. 23 is a view illustrating a twelfth example of an optical imaging system.
Figure 24:
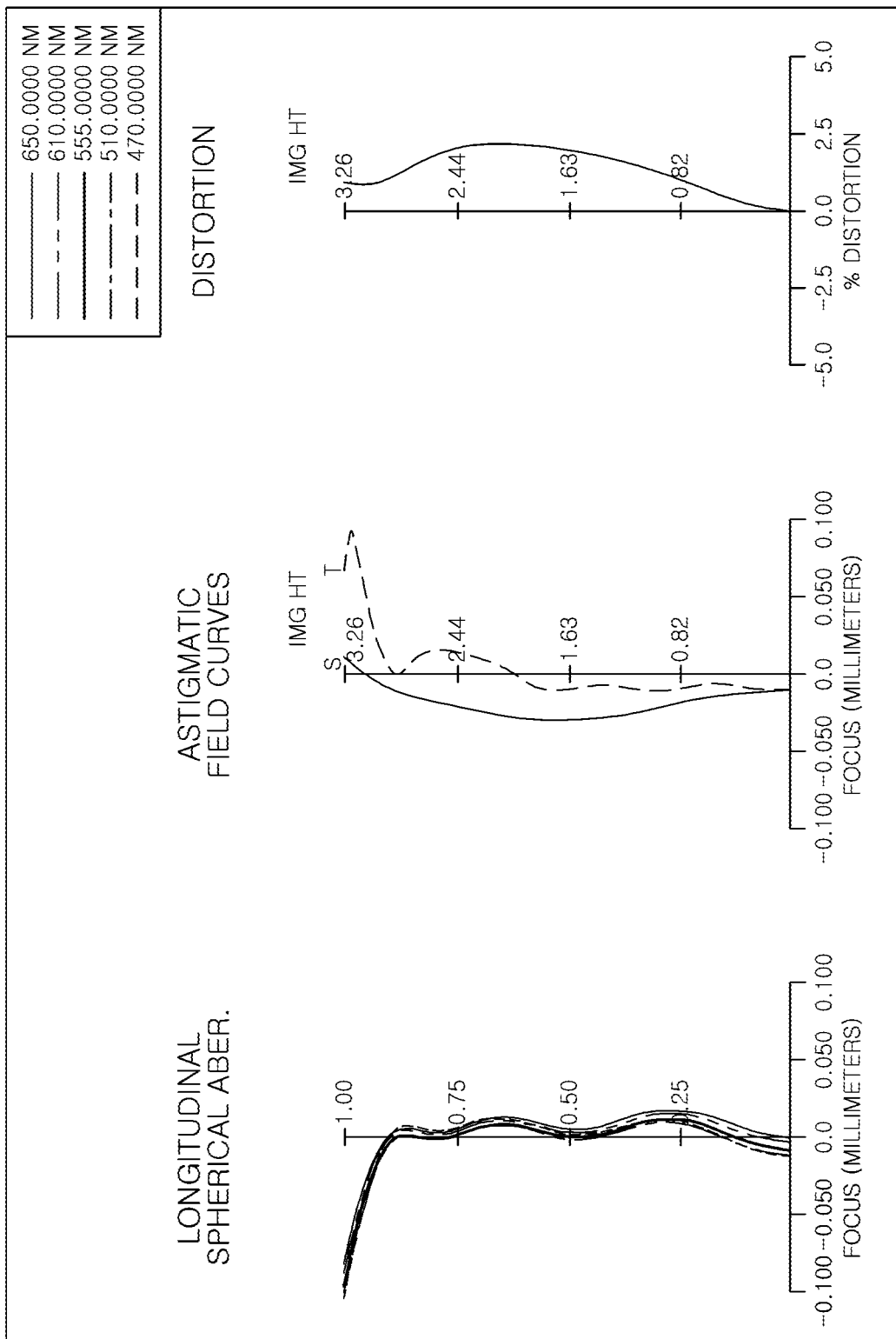
FIG. 24 illustrates aberration curves of the optical imaging system of FIG. 23.

FIG. 23 is a view illustrating a twelfth example of an optical imaging system, and FIG. 24 illustrates aberration curves of the optical imaging system of FIG. 23.

The twelfth example of the optical imaging system includes a first lens 1210, a second lens 1220, a third lens 1230, a fourth lens 1240, a fifth lens 1250, a sixth lens 1260, a seventh lens 1270, a filter 1280, an image sensor 1290, and a stop (not shown) disposed between the first lens 1210 and the second lens 1220.

The first lens 1210 has a positive refractive power, a paraxial region of an object-side surface thereof is convex, and a paraxial region of an image-side surface thereof is concave.

The second lens 1220 has a negative refractive power, a paraxial region of an object-side surface thereof is convex, and a paraxial region of an image-side surface thereof is concave.

The third lens 1230 has a negative refractive power, a paraxial region of an object-side surface thereof is convex, and a paraxial region of an image-side surface thereof is concave.

The fourth lens 1240 has a positive refractive power, a paraxial region of an object-side surface thereof is convex, and a paraxial region of an image-side surface thereof is concave.

The fifth lens 1250 has a negative refractive power, a paraxial region of an object-side surface thereof is concave, and a paraxial region of an image-side surface thereof is convex.

The sixth lens 1260 has a positive refractive power, and a paraxial region of each of an object-side surface and an image-side surface thereof is convex.

The seventh lens 1270 has a negative refractive power, and a paraxial region of each of an object-side surface and an image-side surface thereof is concave.

One inflection point is formed on the object-side surface of the seventh lens 1270. In particular, the object-side surface of the seventh lens 1270 is concave in the paraxial region, and becomes convex toward an edge thereof.

In addition, one inflection point is formed on the image-side surface of the seventh lens 1270. In particular, the image-side surface of the seventh lens 1270 is concave in the paraxial region, and becomes convex toward an edge thereof.

Although not illustrated in FIG. 23, the stop is disposed at a distance of 0.727 mm from the object-side surface of the first lens 1210 toward the imaging plane of the optical imaging system. This distance is equal to TTL-SL and can be calculated from the values of TTL and SL for Example 12 listed in Table 57 that appears later in this application.

Table 23 below shows physical properties of the lenses and other elements of the optical imaging system of FIG. 23, and Table 24 below shows aspherical surface coefficients of the lenses of FIG. 23. Both surfaces of all of the lenses of FIG. 23 are aspherical.

TABLE 23

| Surface No. | Element | Radius of Curvature | Thickness/ Distance | Index of Refraction | Abbe Number | Effective Aperture Radius |
|-----|---------|-----------|----------|-------|---------|-------|
| S1  | First   | 1.725845  | 0.726326 | 1.546 | 56.114  | 1.310 |
| S2  | Lens    | 12.83315  | 0.055329 |       |         | 1.274 |
| S3  | Second  | 5.358298  | 0.181707 | 1.667 | 20.353  | 1.218 |
| S4  | Lens    | 2.541322  | 0.401791 |       |         | 1.100 |
| S5  | Third   | 8.435541  | 0.408349 | 1.546 | 56.114  | 1.131 |
| S6  | Lens    | 7.874557  | 0.186858 |       |         | 1.245 |
| S7  | Fourth  | 6.705131  | 0.298547 | 1.546 | 56.114  | 1.272 |
| S8  | Lens    | 27.19617  | 0.256118 |       |         | 1.379 |
| S9  | Fifth   | −3.28751  | 0.241636 | 1.667 | 20.353  | 1.449 |
| S10 | Lens    | −4.34069  | 0.090002 |       |         | 1.647 |
| S11 | Sixth   | 5.401728  | 0.493563 | 1.546 | 56.114  | 2.150 |
| S12 | Lens    | −1.72062  | 0.282074 |       |         | 2.138 |
| S13 | Seventh | −3.99594  | 0.300688 | 1.546 | 56.114  | 2.363 |
| S14 | Lens    | 1.586532  | 0.212709 |       |         | 2.585 |
| S15 | Filter  | Infinity  | 0.11     | 1.518 | 64.166  | 2.904 |

TABLE 23-continued

| Surface No. | Element | Radius of Curvature | Thickness/ Distance | Index of Refraction | Abbe Number | Effective Aperture Radius |
|---|---|---|---|---|---|---|
| S16 | | Infinity | 0.78 | | | 2.93204801 |
| S17 | Imaging Plane | Infinity | | | | 3.282195737 |

TABLE 24

| | K | A | B | C | D |
|---|---|---|---|---|---|
| S1 | −0.7633 | 0.01527 | 0.01019 | 0.0604 | −0.2258 |
| S2 | 36.2518 | −0.0857 | 0.28623 | −0.6478 | 0.9663 |
| S3 | −2.2692 | −0.1619 | 0.40214 | −0.7024 | 0.86766 |
| S4 | −0.5501 | −0.0782 | 0.07842 | 0.32154 | −1.2153 |
| S5 | 0 | −0.0637 | 0.03982 | −0.1864 | 0.37638 |
| S6 | 0 | −0.099 | 0.02 | 0.02036 | −0.1635 |
| S7 | 25.107 | −0.1211 | −0.2111 | 0.49819 | −0.7382 |
| S8 | −99 | 0.00624 | −0.3995 | 0.51975 | −0.4722 |
| S9 | −69.265 | 0.08083 | −0.1563 | −0.2824 | 0.61355 |
| S10 | 3.04238 | 0.24647 | −0.5089 | 0.39539 | −0.1641 |
| S11 | −99 | 0.12569 | −0.2316 | 0.18601 | −0.0999 |
| S12 | −3.663 | 0.14498 | −0.1575 | 0.09504 | −0.0383 |
| S13 | −2.6499 | −0.0877 | −0.0968 | 0.12134 | −0.0535 |
| S14 | −1.0624 | −0.3185 | 0.22606 | −0.1296 | 0.05544 |

| | E | F | G | H | J |
|---|---|---|---|---|---|
| S1 | 0.35306 | −0.2845 | 0.11676 | −0.0196 | 0 |
| S2 | −0.9184 | 0.52698 | −0.1654 | 0.02147 | 0 |
| S3 | −0.7104 | 0.37031 | −0.1094 | 0.01364 | 0 |
| S4 | 1.98953 | −1.7497 | 0.81604 | −0.1565 | 0 |
| S5 | −0.5082 | 0.40475 | −0.1698 | 0.02998 | 0 |
| S6 | 0.24341 | −0.2157 | 0.1109 | −0.0238 | 0 |
| S7 | 0.7709 | −0.5844 | 0.26919 | −0.0523 | 0 |
| S8 | 0.40416 | −0.2607 | 0.09371 | −0.0133 | 0 |
| S9 | −0.4491 | 0.15873 | −0.0272 | 0.00181 | 0 |
| S10 | 0.04036 | −0.006 | 0.00051 | −2E−05 | 0 |
| S11 | 0.03252 | −0.0059 | 0.00056 | −2E−05 | 0 |
| S12 | 0.01029 | −0.0017 | 0.00015 | −6E−06 | 0 |
| S13 | 0.01276 | −0.0017 | 0.00013 | −4E−06 | 0 |
| S14 | −0.0167 | 0.00337 | −0.0004 | 3.1E−05 | −1E−06 |

Thirteenth Example

Figure 25:
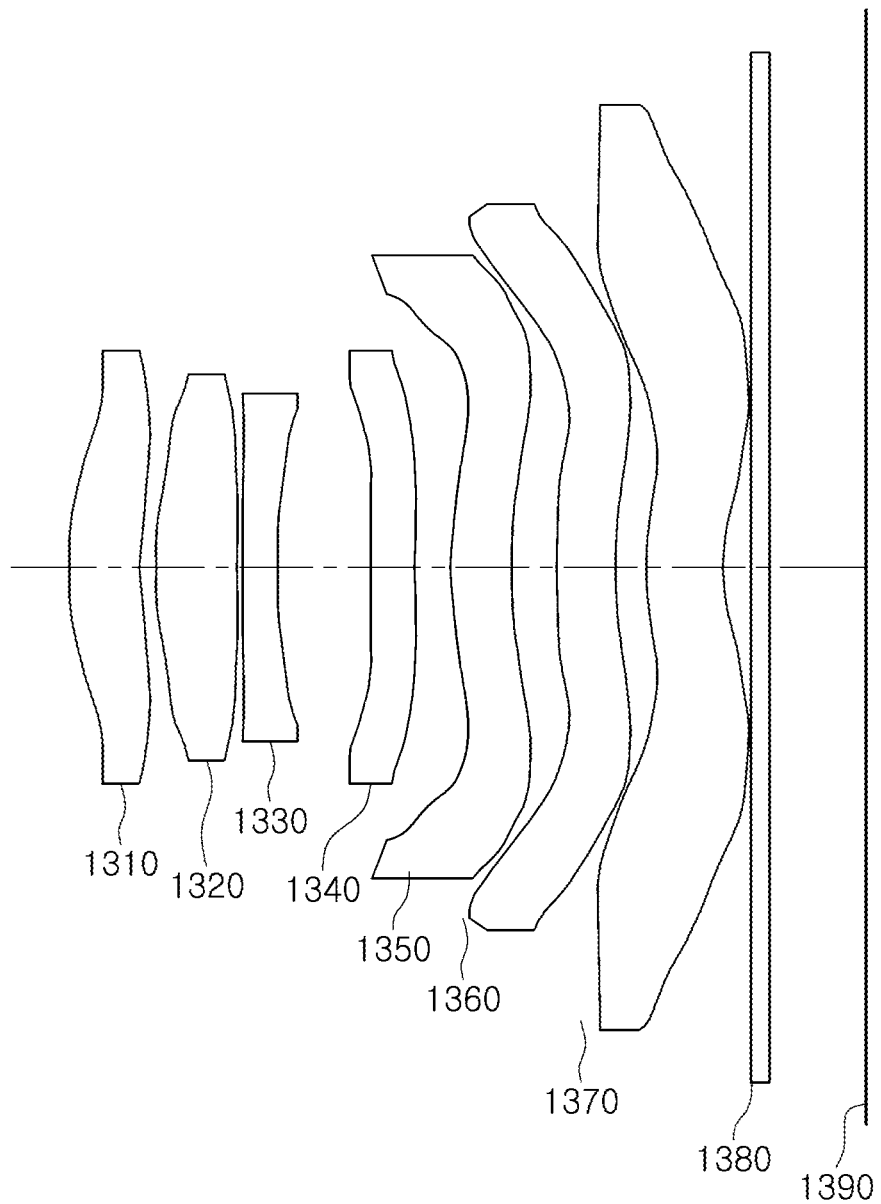
FIG. 25 is a view illustrating a thirteenth example of an optical imaging system.
Figure 26:
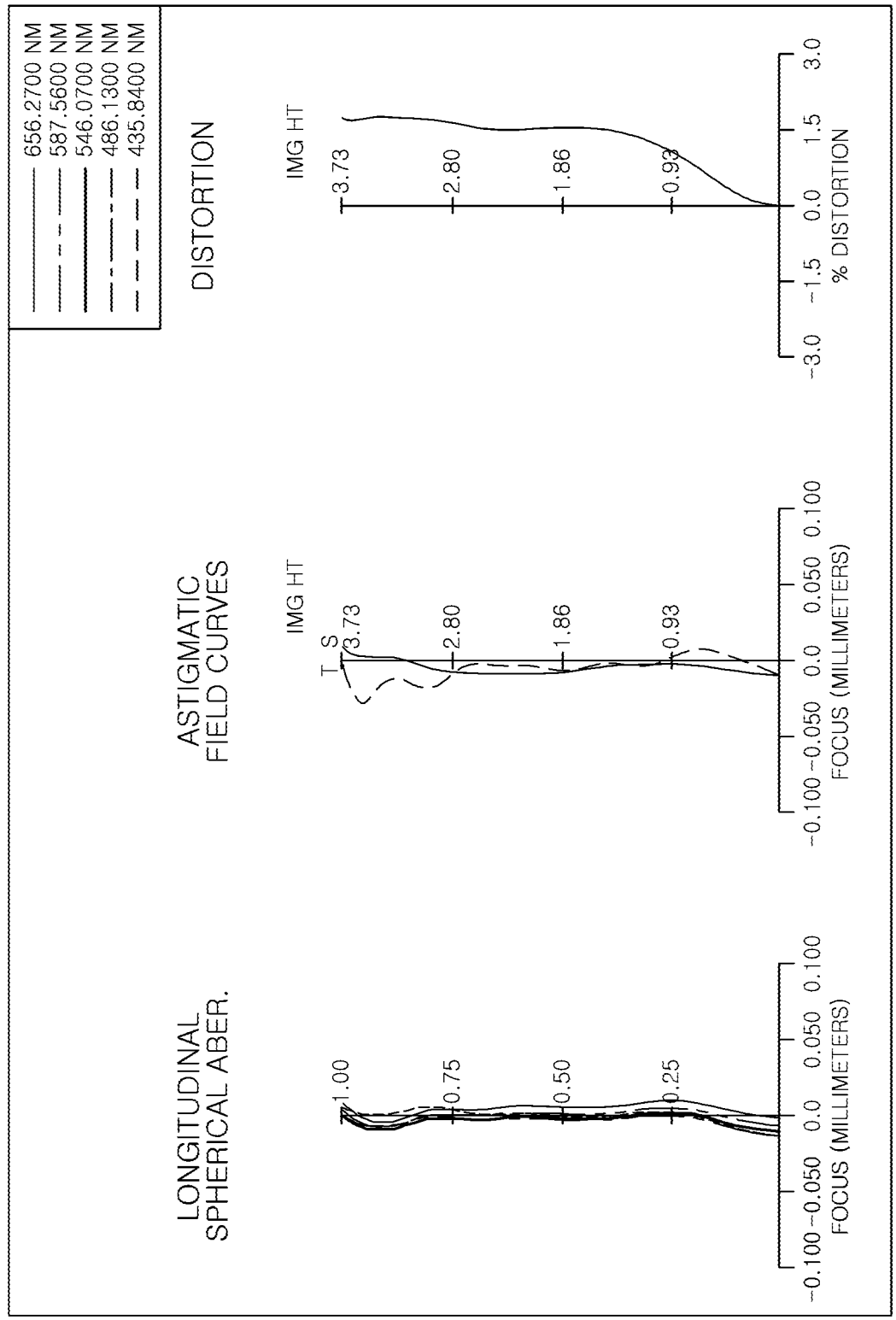
FIG. 26 illustrates aberration curves of the optical imaging system of FIG. 25.

FIG. 25 is a view illustrating a thirteenth example of an optical imaging system, and FIG. 26 illustrates aberration curves of the optical imaging system of FIG. 25.

The thirteenth example of the optical imaging system includes a first lens 1310, a second lens 1320, a third lens 1330, a fourth lens 1340, a fifth lens 1350, a sixth lens 1360, a seventh lens 1370, a filter 1380, an image sensor 1390, and a stop (not shown) disposed between the second lens 1320 and the third lens 1330.

The first lens 1310 has a positive refractive power, a paraxial region of an object-side surface thereof is convex, and a paraxial region of an image-side surface thereof is concave.

The second lens 1320 has a positive refractive power, and a paraxial region of each of an object-side surface and an image-side surface thereof is convex.

The third lens 1330 has a negative refractive power, a paraxial region of an object-side surface thereof is convex, and a paraxial region of an image-side surface thereof is concave.

The fourth lens 1340 has a negative refractive power, a paraxial region of an object-side surface thereof is convex, and a paraxial region of an image-side surface thereof is concave.

The fifth lens 1350 has a positive refractive power, a paraxial region of an object-side surface thereof is convex, and a paraxial region of an image-side surface thereof is concave.

The sixth lens 1360 has a negative refractive power, a paraxial region of an object-side surface thereof is convex, and a paraxial region of an image-side surface thereof is concave.

The seventh lens 1370 has a negative refractive power, a paraxial region of an object-side surface thereof is convex, and a paraxial region of an image-side surface thereof is concave.

Two inflection points are formed on the object-side surface of the seventh lens 1370. In particular, the object-side surface of the seventh lens 1370 is convex in the paraxial region, becomes concave in a region outside the paraxial region, and becomes convex toward an edge thereof.

One inflection point is formed on the image-side surface of the seventh lens 1370. In particular, the image-side surface of the seventh lens 1370 is concave in the paraxial region, and becomes convex toward an edge thereof.

Although not illustrated in FIG. 25, the stop is disposed at a distance of 1.158 mm from the object-side surface of the first lens 1310 toward the imaging plane of the optical imaging system. This distance is equal to TTL-SL and can be calculated from the values of TTL and SL for Example 13 listed in Table 57 that appears later in this application.

Table 25 below shows physical properties of the lenses and other elements of the optical imaging system of FIG. 25, and Table 26 below shows aspherical surface coefficients of the lenses of FIG. 25. Both surfaces of all of the lenses of FIG. 25 are aspherical.

TABLE 25

| Surface No. | Element | Radius of Curvature | Thickness/ Distance | Index of Refraction | Abbe Number | Effective Aperture Radius |
|---|---|---|---|---|---|---|
| S1 | First | 2.141 | 0.481 | 1.546 | 56.114 | 1.450 |
| S2 | Lens | 3.251 | 0.110 | | | 1.350 |
| S3 | Second | 3.253 | 0.542 | 1.546 | 56.114 | 1.285 |
| S4 | Lens | −15.773 | 0.025 | | | 1.232 |
| S5 | Third | 8.425 | 0.230 | 1.679 | 19.236 | 1.157 |
| S6 | Lens | 3.514 | 0.625 | | | 1.095 |
| S7 | Fourth | 25.986 | 0.296 | 1.679 | 19.236 | 1.265 |
| S8 | Lens | 15.894 | 0.230 | | | 1.452 |
| S9 | Fifth | 3.048 | 0.400 | 1.546 | 56.114 | 1.675 |
| S10 | Lens | 3.616 | 0.290 | | | 2.092 |
| S11 | Sixth | 3.762 | 0.400 | 1.679 | 19.236 | 2.153 |
| S12 | Lens | 2.792 | 0.204 | | | 2.476 |
| S13 | Seventh | 1.614 | 0.510 | 1.537 | 53.955 | 2.938 |
| S14 | Lens | 1.326 | 0.196 | | | 3.102 |
| S15 | Filter | Infinity | 0.110 | 1.518 | 64.197 | 3.420 |
| S16 | | Infinity | 0.65 | | | 3.450 |
| S17 | Imaging Plane | Infinity | | | | 3.730 |

TABLE 26

| | K | A | B | C | D |
|---|---|---|---|---|---|
| S1 | −8.038 | 0.07067 | −0.0797 | 0.03339 | 0.00722 |
| S2 | −20.594 | −0.0019 | −0.1494 | 0.20409 | −0.2922 |
| S3 | −0.0908 | −0.0339 | −0.0641 | 0.13679 | −0.2821 |
| S4 | −0.4822 | −0.0436 | 0.17605 | −0.3256 | 0.19989 |
| S5 | −1.1841 | −0.1073 | 0.25445 | −0.4683 | 0.49912 |
| S6 | 0.87331 | −0.0693 | 0.03569 | 0.20478 | −0.8833 |
| S7 | −0.4999 | −0.0314 | 0.01347 | −0.2894 | 0.97164 |
| S8 | −1E−06 | −0.0273 | −0.1177 | 0.21199 | −0.2544 |
| S9 | −41.843 | 0.16235 | −0.3487 | 0.40163 | −0.3105 |
| S10 | −5.1424 | 0.03971 | −0.1364 | 0.15688 | −0.1229 |
| S11 | −2.1666 | 0.03558 | −0.1809 | 0.19853 | −0.1438 |
| S12 | −0.0207 | −0.1043 | 0.02386 | −0.0063 | −0.0007 |
| S13 | −0.7948 | −0.4128 | 0.18634 | −0.0516 | 0.01005 |
| S14 | −1.3226 | −0.3105 | 0.17125 | −0.0712 | 0.02129 |

| | E | F | G | H | J |
|---|---|---|---|---|---|
| S1 | −0.0491 | 0.04654 | −0.0186 | 0.00318 | −0.0002 |
| S2 | 0.37549 | −0.3085 | 0.14861 | −0.0387 | 0.0042 |
| S3 | 0.49215 | −0.4815 | 0.26054 | −0.0746 | 0.00881 |
| S4 | 0.1916 | −0.4291 | 0.32034 | −0.1141 | 0.01622 |
| S5 | −0.2863 | 0.05651 | 0.03245 | −0.0229 | 0.00442 |
| S6 | 1.73278 | −1.9742 | 1.34645 | −0.5106 | 0.08302 |
| S7 | −1.7181 | 1.79234 | −1.1152 | 0.38365 | −0.0563 |
| S8 | 0.21565 | −0.1264 | 0.04694 | −0.0093 | 0.0007 |
| S9 | 0.13962 | −0.027 | −0.0038 | 0.00264 | −0.0003 |
| S10 | 0.06333 | −0.0212 | 0.0044 | −0.0005 | 2.6E−05 |
| S11 | 0.06411 | −0.0173 | 0.00275 | −0.0002 | 9E−06 |
| S12 | 0.00066 | −3E−06 | −4E−05 | 7.3E−06 | −4E−07 |
| S13 | −0.0015 | 0.00016 | −1E−05 | 6.2E−07 | −1E−08 |
| S14 | −0.0043 | 0.00058 | −5E−05 | 2.3E−06 | −5E−08 |

Fourteenth Example

Figure 27:
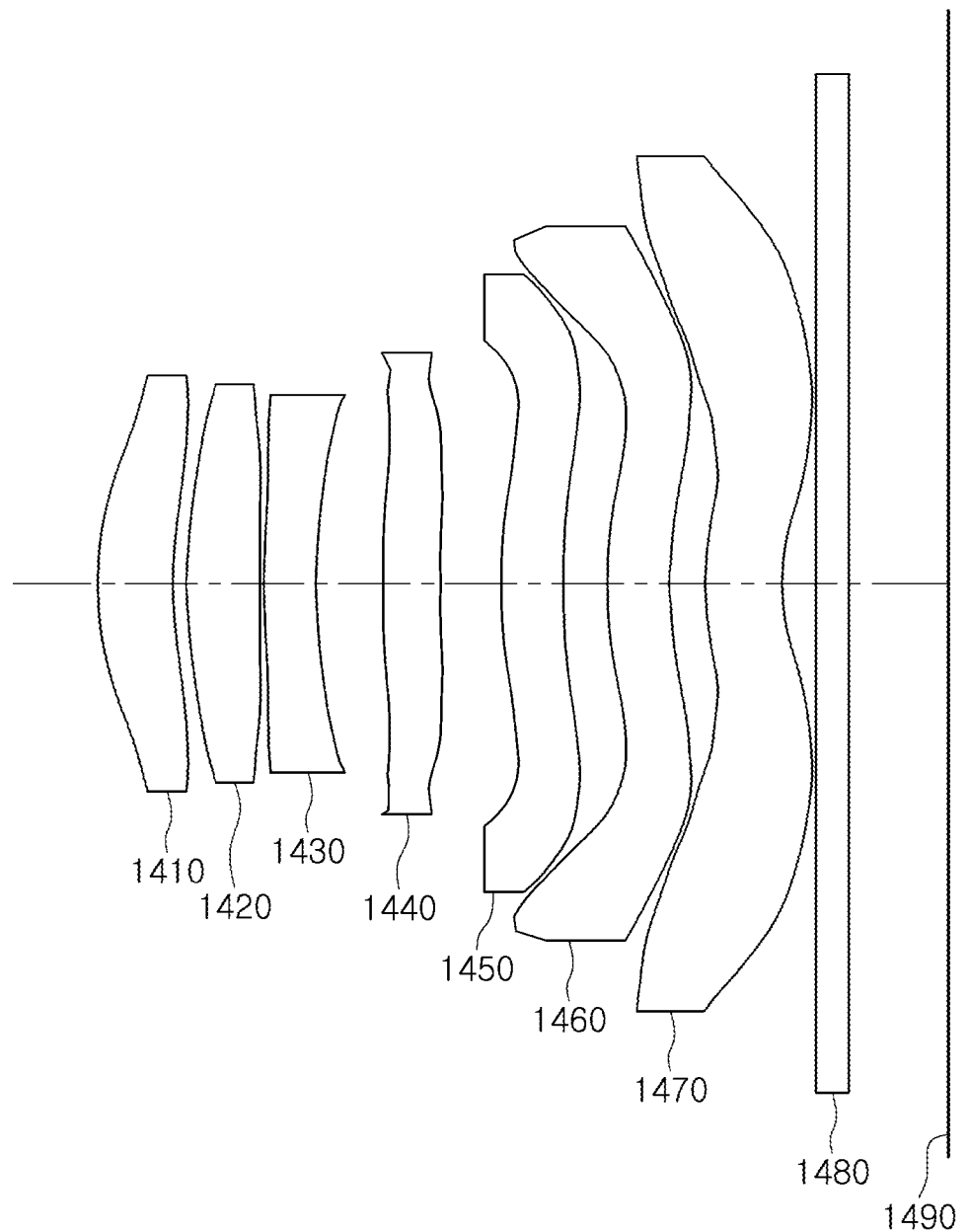
FIG. 27 is a view illustrating a fourteenth example of an optical imaging system.
Figure 28:
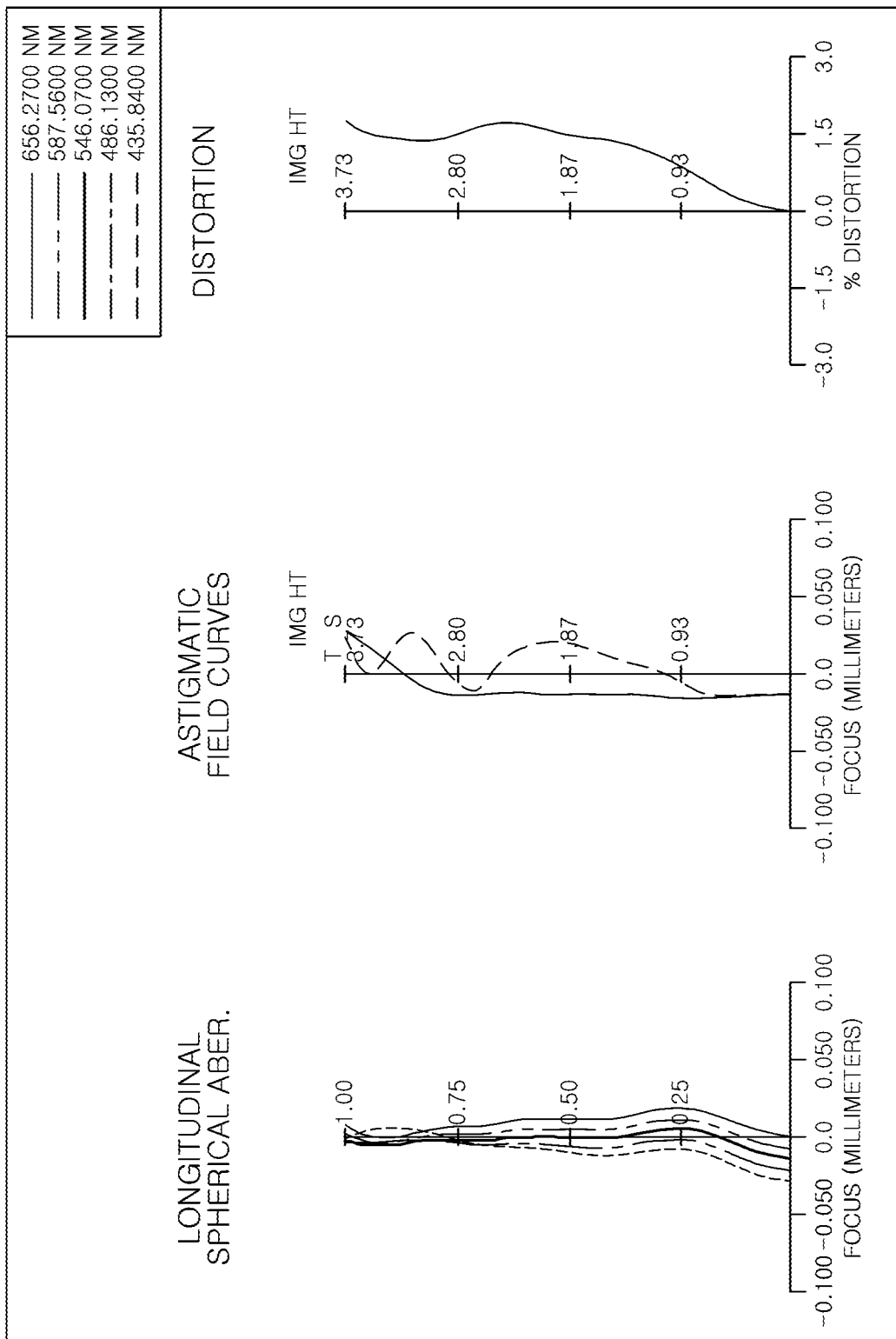
FIG. 28 illustrates aberration curves of the optical imaging system of FIG. 27.

FIG. 27 is a view illustrating a fourteenth example of an optical imaging system, and FIG. 28 illustrates aberration curves of the optical imaging system of FIG. 27.

The fourteenth optical imaging system includes a first lens 1410, a second lens 1420, a third lens 1430, a fourth lens 1440, a fifth lens 1450, a sixth lens 1460, a seventh lens 1470, a filter 1480, an image sensor 1490, and a stop (not shown) disposed between the second lens 1420 and the third lens 1430.

The first lens 1410 has a positive refractive power, a paraxial region of an object-side surface thereof is convex, and a paraxial region of an image-side surface thereof is concave.

The second lens 1420 has a positive refractive power, a paraxial region of an object-side surface thereof is convex, and a paraxial region of an image-side surface thereof is concave.

The third lens 1430 has a negative refractive power, a paraxial region of an object-side surface thereof is convex, and a paraxial region of an image-side surface thereof is concave.

The fourth lens 1440 has a positive refractive power, a paraxial region of an object-side surface thereof is convex, and a paraxial region of an image-side surface thereof is concave.

The fifth lens 1450 has a positive refractive power, a paraxial region of an object-side surface thereof is convex, and a paraxial region of an image-side surface thereof is concave.

The sixth lens 1460 has a negative refractive power, a paraxial region of an object-side surface thereof is convex, and a paraxial region of an image-side surface thereof is concave.

The seventh lens 1470 has a negative refractive power, a paraxial region of an object-side surface thereof is convex, and a paraxial region of an image-side surface thereof is concave.

One inflection point is formed on the object-side surface of the seventh lens 1470. In particular, the object-side surface of the seventh lens 1470 is convex in the paraxial region, and becomes concave toward an edge thereof.

In addition, one inflection point is formed on the image-side surface of the seventh lens 1470. In particular, the image-side surface of the seventh lens 1470 is concave in the paraxial region, and becomes convex toward an edge thereof.

Although not illustrated in FIG. 27, the stop is disposed at a distance of 1.080 mm from the object-side surface of the first lens 1410 toward the imaging plane of the optical imaging system. This distance is equal to TTL-SL and can be calculated from the values of TTL and SL for Example 14 listed in Table 57 that appears later in this application.

Table 27 below shows physical properties of the lenses and other elements of the optical imaging system of FIG. 27, and Table 28 below shows aspherical surface coefficients of the lenses of FIG. 27. Both surfaces of all of the lenses of FIG. 27 are aspherical.

TABLE 27

| Surface No. | Element | Radius of Curvature | Thickness/ Distance | Index of Refraction | Abbe Number | Effective Aperture Radius |
|---|---|---|---|---|---|---|
| S1 | First | 2.136724381 | 0.486053 | 1.546 | 56.114 | 1.360 |
| S2 | Lens | 2.889766837 | 0.087572 | | | 1.331 |
| S3 | Second | 3.197028762 | 0.481363 | 1.546 | 56.114 | 1.301 |
| S4 | Lens | 109.2678078 | 0.025 | | | 1.264 |
| S5 | Third | 8.21648334 | 0.333222 | 1.679 | 19.236 | 1.218 |
| S6 | Lens | 3.643026543 | 0.428709 | | | 1.229 |
| S7 | Fourth | 5.149363024 | 0.374385 | 1.546 | 56.114 | 1.353 |
| S8 | Lens | 7.983541153 | 0.393693 | | | 1.392 |
| S9 | Fifth | 3.813432353 | 0.4 | 1.546 | 56.114 | 1.576 |
| S10 | Lens | 4.85043033 | 0.288816 | | | 2.010 |
| S11 | Sixth | 3.891285923 | 0.4 | 1.546 | 56.114 | 1.916 |
| S12 | Lens | 3.082484661 | 0.229858 | | | 2.371 |
| S13 | Seventh | 1.601117752 | 0.493312 | 1.546 | 56.114 | 2.526 |
| S14 | Lens | 1.214247159 | 0.218016 | | | 2.787 |
| S15 | Filter | Infinity | 0.21 | 1.518 | 64.197 | 3.238 |
| S16 | | Infinity | 0.649932 | | | 3.316 |
| S17 | Imaging Plane | Infinity | | | | 3.728 |

TABLE 28

| | K | A | B | C | D |
|---|---|---|---|---|---|
| S1 | −1 | −0.0136 | 0.02467 | −0.0811 | 0.09254 |
| S2 | −13.222 | 0.01839 | −0.091 | −0.0856 | 0.30551 |
| S3 | −1.2237 | −0.0255 | 0.01296 | −0.2994 | 0.64916 |
| S4 | −7.0515 | −0.018 | 0.09424 | −0.4684 | 1.19648 |
| S5 | 8.98852 | −0.0606 | 0.14701 | −0.5476 | 1.41458 |
| S6 | 1.65557 | −0.053 | 0.06637 | −0.1724 | 0.48815 |
| S7 | −4.3409 | −0.0524 | −0.0067 | 0.12439 | −0.3711 |
| S8 | 5.85886 | −0.0866 | 0.12995 | −0.4361 | 0.91566 |
| S9 | −43.521 | 0.08526 | −0.1755 | 0.22567 | −0.2234 |
| S10 | −3.1047 | 0.0435 | −0.1427 | 0.1592 | −0.1109 |
| S11 | −16.199 | 0.12636 | −0.2435 | 0.25714 | −0.2182 |
| S12 | 0.17584 | −0.0767 | 0.07339 | −0.0745 | 0.03369 |
| S13 | −0.8173 | −0.4272 | 0.20439 | −0.0489 | 0.00204 |
| S14 | −1.397 | −0.3515 | 0.23363 | −0.1198 | 0.04471 |

| | E | F | G | H | J |
|---|---|---|---|---|---|
| S1 | −0.0456 | −0.0139 | 0.02747 | −0.0118 | 0.0017 |
| S2 | −0.3421 | 0.22925 | −0.0976 | 0.02376 | −0.0025 |
| S3 | −0.662 | 0.40893 | −0.1567 | 0.03316 | −0.0029 |
| S4 | −1.7785 | 1.59837 | −0.8543 | 0.24924 | −0.0305 |
| S5 | −2.2793 | 2.23564 | −1.2976 | 0.41058 | −0.0546 |
| S6 | −0.9461 | 1.10918 | −0.7563 | 0.27857 | −0.0429 |
| S7 | 0.55033 | −0.4701 | 0.22801 | −0.0561 | 0.0052 |
| S8 | −1.2163 | 1.00858 | −0.506 | 0.14047 | −0.0165 |
| S9 | 0.15386 | −0.0732 | 0.02213 | −0.0038 | 0.00029 |
| S10 | 0.05004 | −0.0153 | 0.00308 | −0.0004 | 1.9E−05 |
| S11 | 0.11759 | −0.0381 | 0.00724 | −0.0007 | 3.2E−05 |
| S12 | −0.008 | 0.00106 | −7E−05 | 2.3E−06 | −1E−08 |
| S13 | 0.00211 | −0.0006 | 8.5E−05 | −6E−06 | 1.6E−07 |
| S14 | −0.0113 | 0.00187 | −0.0002 | 1.1E−05 | −3E−07 |

Fifteenth Example

Figure 29:
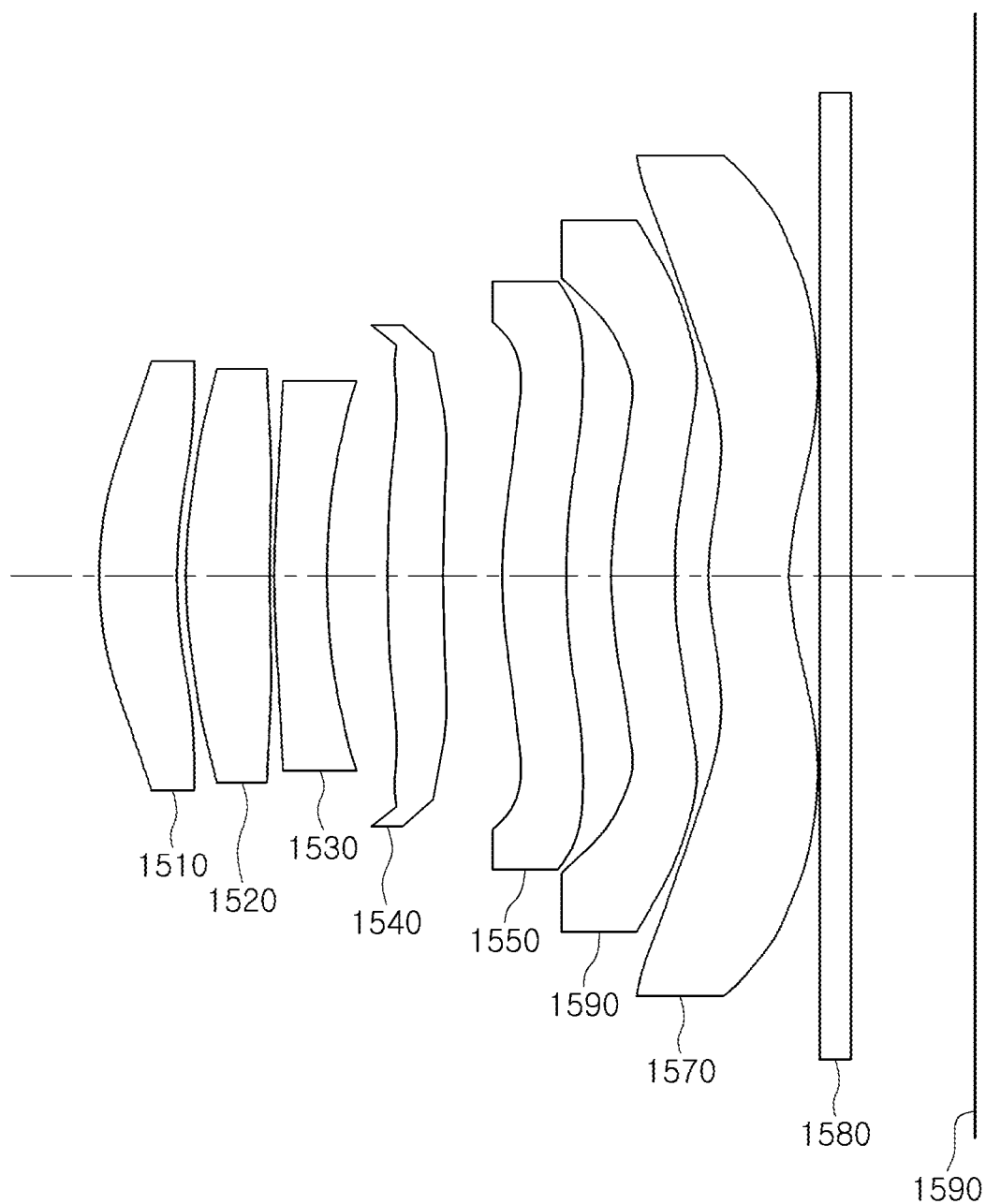
FIG. 29 is a view illustrating a fifteenth example of an optical imaging system.
Figure 30:
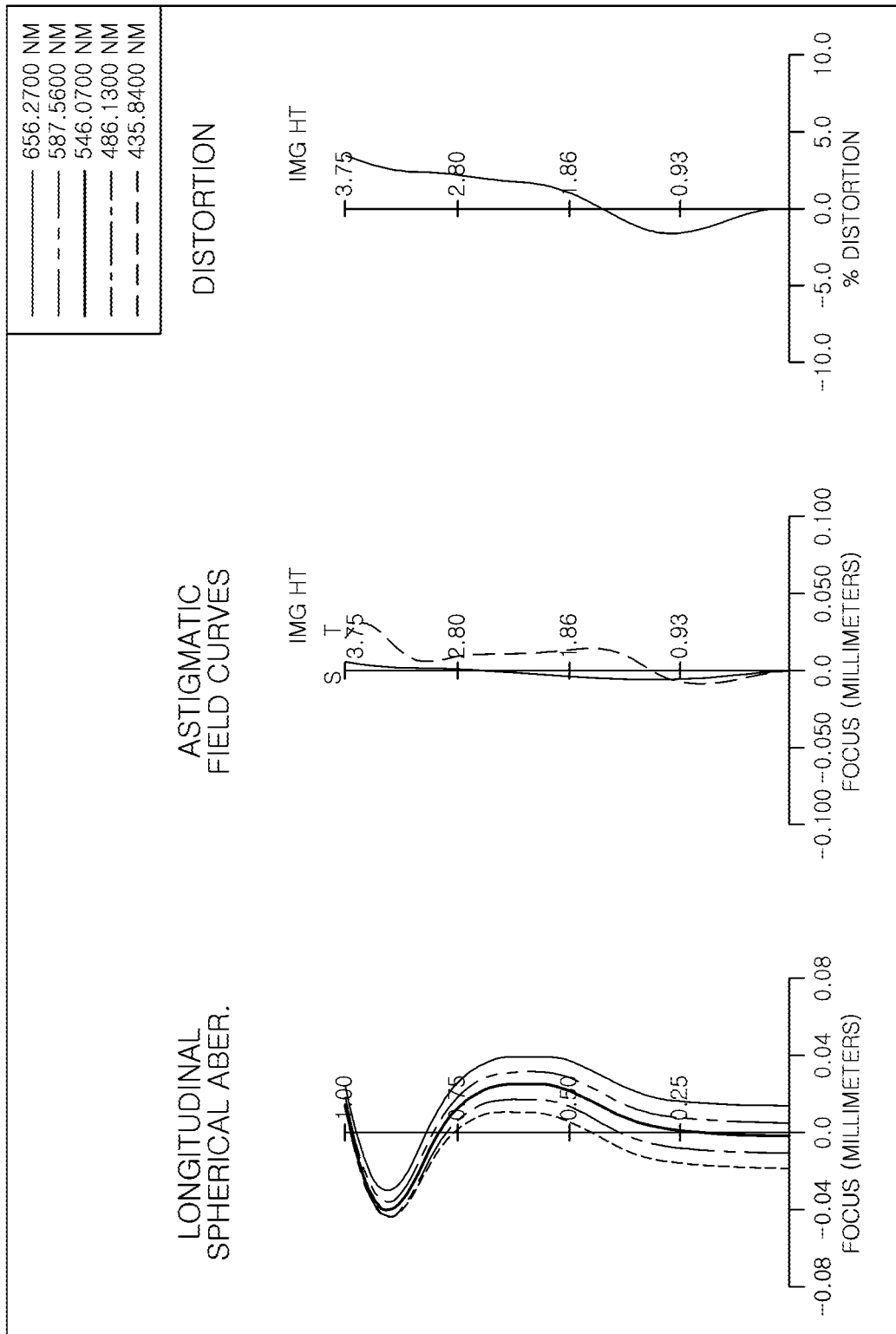
FIG. 30 illustrates aberration curves of the optical imaging system of FIG. 29.

FIG. 29 is a view illustrating a fifteenth example of an optical imaging system, and FIG. 30 illustrates aberration curves of the optical imaging system of FIG. 29.

The fifteenth example of the optical imaging system includes a first lens 1510, a second lens 1520, a third lens 1530, a fourth lens 1540, a fifth lens 1550, a sixth lens 1560, a seventh lens 1570, a filter 1580, an image sensor 1590, and a stop (not shown) disposed between the second lens 1520 and the third lens 1530.

The first lens 1510 has a positive refractive power, a paraxial region of an object-side surface thereof is convex, and a paraxial region of an image-side surface thereof is concave.

The second lens 1520 has a positive refractive power, a paraxial region of an object-side surface thereof is convex, and a paraxial region of an image-side surface thereof is concave.

The third lens 1530 has a negative refractive power, a paraxial region of an object-side surface thereof is convex, and a paraxial region of an image-side surface thereof is concave.

The fourth lens 1540 has a positive refractive power, a paraxial region of an object-side surface thereof is convex, and a paraxial region of an image-side surface thereof is concave.

The fifth lens 1550 has a positive refractive power, a paraxial region of an object-side surface thereof is convex, and a paraxial region of an image-side surface thereof is concave.

The sixth lens 1560 has a negative refractive power, a paraxial region of an object-side surface thereof is convex, and a paraxial region of an image-side surface thereof is concave.

The seventh lens 1570 has a negative refractive power, a paraxial region of an object-side surface thereof is convex, and a paraxial region of an image-side surface thereof is concave.

One inflection point is formed on the object-side surface of the seventh lens 1570. In particular, the object-side surface of the seventh lens 1570 is convex in the paraxial region, and becomes concave toward an edge thereof.

In addition, one inflection point is formed on the image-side surface of the seventh lens 1570. In particular, the image-side surface of the seventh lens 1570 is concave in the paraxial region, and becomes convex toward an edge thereof.

Although not illustrated in FIG. 29, the stop is disposed at a distance of 1.178 mm from the object-side surface of the first lens 1510 toward the imaging plane of the optical imaging system. This distance is equal to TTL-SL and can be calculated from the values of TTL and SL for Example 15 listed in Table 57 that appears later in this application.

Table 29 below shows physical properties of the lenses and other elements of the optical imaging system of FIG. 29, and Table 30 below shows aspherical surface coefficients of the lenses of FIG. 29. Both surfaces of all of the lenses of FIG. 29 are aspherical.

TABLE 29

| Surface No. | Element | Radius of Curvature | Thickness/ Distance | Index of Refraction | Abbe Number | Effective Aperture Radius |
|---|---|---|---|---|---|---|
| S1 | First | 2.367386627 | 0.52496 | 1.546 | 56.114 | 1.449 |
| S2 | Lens | 3.194732034 | 0.05968 | | | 1.420 |
| S3 | Second | 3.420339572 | 0.567044 | 1.546 | 56.114 | 1.396 |
| S4 | Lens | 70.97375214 | 0.026546 | | | 1.328 |
| S5 | Third | 7.778333323 | 0.350469 | 1.679 | 19.236 | 1.286 |
| S6 | Lens | 3.816229093 | 0.409426 | | | 1.313 |
| S7 | Fourth | 5.591688642 | 0.369187 | 1.546 | 56.114 | 1.426 |
| S8 | Lens | 7.993916661 | 0.39653 | | | 1.495 |
| S9 | Fifth | 4.100335907 | 0.426003 | 1.546 | 56.114 | 1.707 |
| S10 | Lens | 5.37283934 | 0.303377 | | | 1.986 |
| S11 | Sixth | 4.360928988 | 0.424063 | 1.679 | 19.236 | 1.999 |
| S12 | Lens | 3.568454408 | 0.223456 | | | 2.401 |
| S13 | Seventh | 1.78787121 | 0.541352 | 1.546 | 56.114 | 2.495 |
| S14 | Lens | 1.397505481 | 0.200463 | | | 2.837 |
| S15 | Filter | Infinity | 0.21 | 1.518 | 64.197 | 3.186 |
| S16 | | Infinity | 0.832254 | | | 3.255759682 |
| S17 | Imaging Plane | Infinity | | | | 3.785091526 |

TABLE 30

| | K | A | B | C | D |
|---|---|---|---|---|---|
| S1 | −1 | −0.006 | −0.0037 | −0.012 | 0.01197 |
| S2 | −13.101 | 0.01484 | −0.0546 | −0.0452 | 0.12694 |
| S3 | −1.2472 | −0.0205 | 0.01627 | −0.1488 | 0.25175 |
| S4 | −7.0515 | −0.0205 | 0.10486 | −0.3805 | 0.75149 |
| S5 | 8.9156 | −0.0324 | −0.0045 | 0.06384 | −0.1003 |
| S6 | 1.66379 | −0.0267 | −0.1125 | 0.59826 | −1.3543 |
| S7 | −4.619 | −0.0378 | −0.0049 | 0.06442 | −0.1511 |

TABLE 30-continued

| | | | | | |
|---|---|---|---|---|---|
| S8 | 5.61159 | −0.0667 | 0.14302 | −0.4869 | 0.93128 |
| S9 | −44.124 | 0.05707 | −0.0758 | 0.04539 | −0.0145 |
| S10 | −4.9813 | 0.03529 | −0.0999 | 0.10243 | −0.0647 |
| S11 | −15.42 | 0.09903 | −0.1649 | 0.14824 | −0.1003 |
| S12 | 0.17905 | −0.0585 | 0.05308 | −0.0451 | 0.01769 |
| S13 | −0.825 | −0.303 | 0.11661 | −0.0228 | 0.00114 |
| S14 | −1.3872 | −0.2937 | 0.18771 | −0.0863 | 0.0269 |

| | E | F | G | H | J |
|---|---|---|---|---|---|
| S1 | 0.01356 | −0.0351 | 0.02669 | −0.009 | 0.00115 |
| S2 | −0.1111 | 0.05601 | −0.0175 | 0.00311 | −0.0002 |
| S3 | −0.2171 | 0.12177 | −0.045 | 0.00972 | −0.0009 |
| S4 | −0.8792 | 0.62566 | −0.2656 | 0.06174 | −0.006 |
| S5 | 0.05665 | 0.00724 | −0.0234 | 0.01032 | −0.0015 |
| S6 | 1.7261 | −1.3193 | 0.59994 | −0.1494 | 0.01566 |
| S7 | 0.17871 | −0.1225 | 0.04791 | −0.0096 | 0.00073 |
| S8 | −1.0571 | 0.72412 | −0.2938 | 0.06506 | −0.006 |
| S9 | 0.00087 | 5.3E−05 | 0.00022 | −8E−05 | 9.1E−06 |
| S10 | 0.02598 | −0.0068 | 0.0011 | −0.0001 | 4E−06 |
| S11 | 0.04259 | −0.0109 | 0.00165 | −0.0001 | 4.7E−06 |
| S12 | −0.0038 | 0.00049 | −4E−05 | 1.5E−06 | −3E−08 |
| S13 | 0.00047 | −0.0001 | 1.2E−05 | −7E−07 | 1.5E−08 |
| S14 | −0.0055 | 0.00073 | −6E−05 | 2.7E−06 | −5E−08 |

Sixteenth Example

Figure 31:
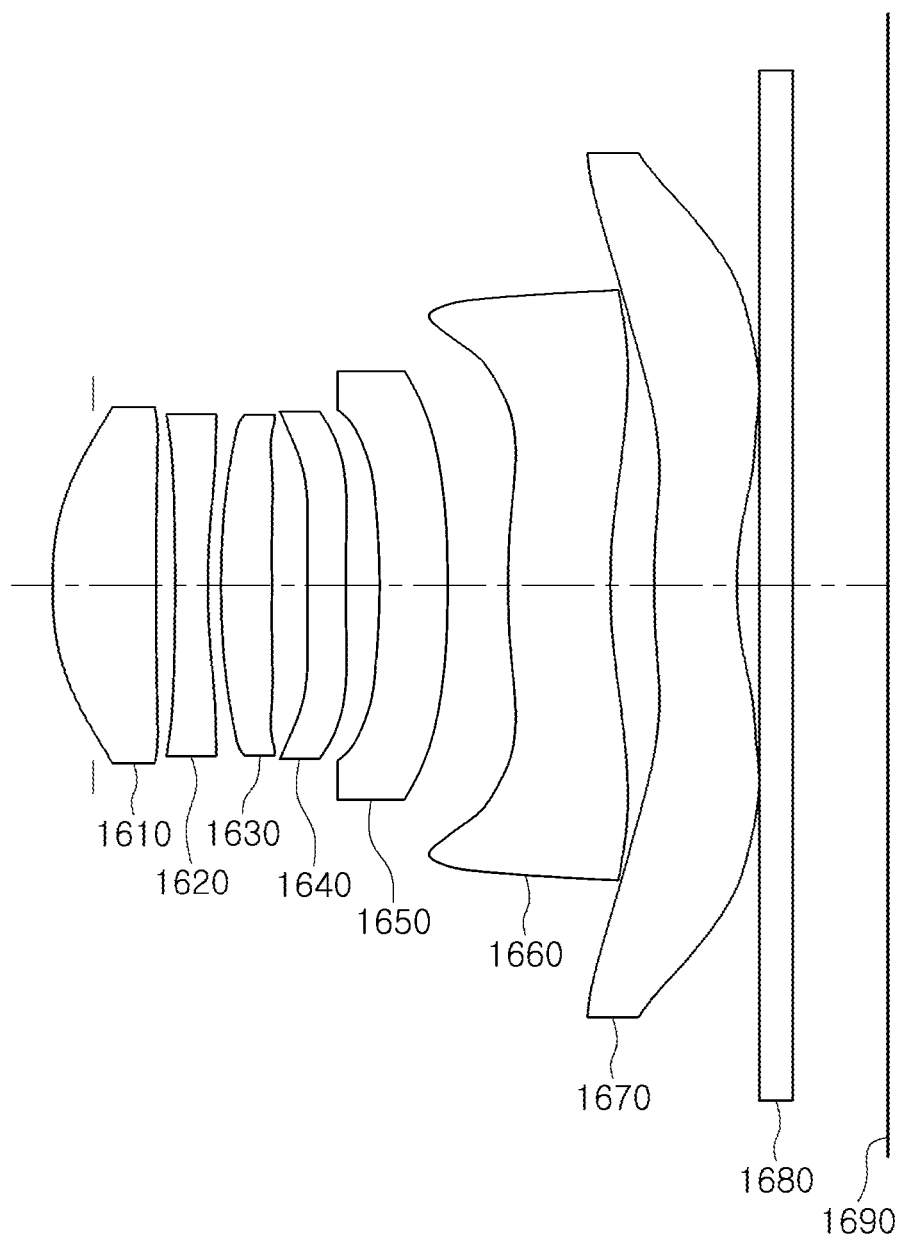
FIG. 31 is a view illustrating a sixteenth example of an optical imaging system.
Figure 32:
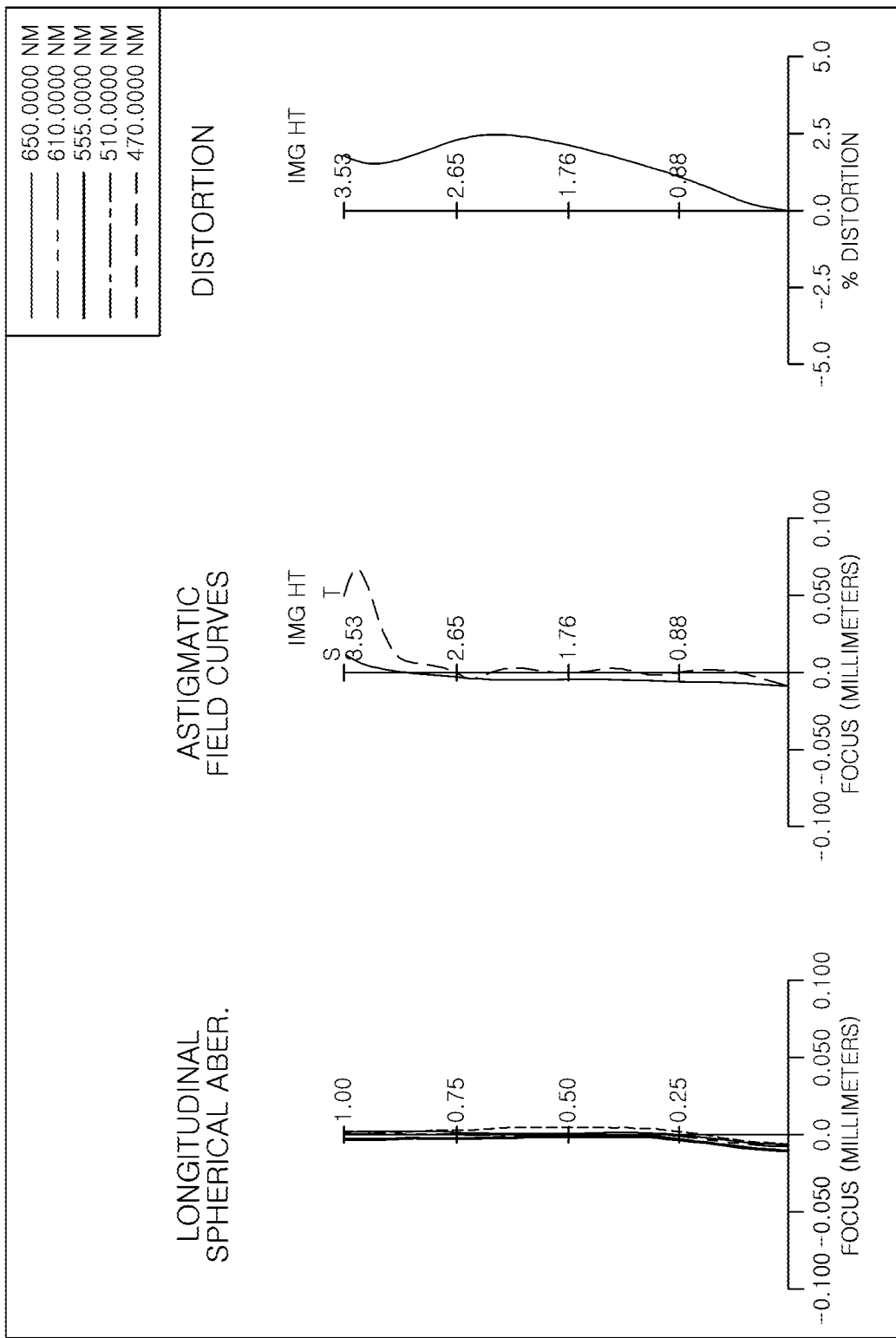
FIG. 32 illustrates aberration curves of the optical imaging system of FIG. 31.

FIG. 31 is a view illustrating a sixteenth example of an optical imaging system, and FIG. 32 illustrates aberration curves of the optical imaging system of FIG. 31.

The sixteenth example of the optical imaging system includes a first lens 1610, a second lens 1620, a third lens 1630, a fourth lens 1640, a fifth lens 1650, a sixth lens 1660, a seventh lens 1670, a filter 1680, an image sensor 1690, and a stop (not shown) disposed in front of the first lens 1610.

The first lens 1610 has a positive refractive power, a paraxial region of an object-side surface thereof is convex, and a paraxial region of an image-side surface thereof is concave.

The second lens 1620 has a negative refractive power, a paraxial region of an object-side surface thereof is convex, and a paraxial region of an image-side surface thereof is concave.

The third lens 1630 has a positive refractive power, a paraxial region of an object-side surface thereof is convex, and a paraxial region of an image-side surface thereof is concave.

The fourth lens 1640 has a positive refractive power, a paraxial region of an object-side surface thereof is convex, and a paraxial region of an image-side surface thereof is concave.

The fifth lens 1650 has a negative refractive power, a paraxial region of an object-side surface thereof is concave, and a paraxial region of an image-side surface thereof is convex.

The sixth lens 1660 has a negative refractive power, a paraxial region of an object-side surface thereof is convex, and a paraxial region of an image-side surface thereof is concave.

The seventh lens 1670 has a negative refractive power, a paraxial region of an object-side surface thereof is convex, and a paraxial region of an image-side surface thereof is concave.

One inflection point is formed on the object-side surface of the seventh lens 1670. In particular, the object-side surface of the seventh lens 1670 is convex in the paraxial region, and becomes concave toward an edge thereof.

In addition, one inflection point is formed on the image-side surface of the seventh lens 1670. In particular, the image-side surface of the seventh lens 1670 is concave in the paraxial region, and becomes convex toward an edge thereof.

Although not illustrated in FIG. 31, the stop is disposed at a distance of 0.250 mm from the object-side surface of the first lens 1610 toward the imaging plane of the optical imaging system. This distance is equal to TTL-SL and can be calculated from the values of TTL and SL for Example 16 listed in Table 57 that appears later in this application.

Table 31 below shows physical properties of the lenses and other elements of the optical imaging system of FIG. 31, and Table 32 below shows aspherical surface coefficients of the lenses of FIG. 31. Both surfaces of all of the lenses of FIG. 31 are aspherical.

TABLE 31

| Surface No. | Element | Radius of Curvature | Thickness/ Distance | Index of Refraction | Abbe Number | Effective Aperture Radius |
|---|---|---|---|---|---|---|
| S1 | First | 1.721083 | 0.634874 | 1.5441 | 56.1138 | 1.100 |
| S2 | Lens | 11.45706 | 0.121172 | | | 1.071 |
| S3 | Second | 119.1721 | 0.203286 | 1.6612 | 20.3532 | 1.057 |
| S4 | Lens | 4.475787 | 0.084345 | | | 1.043 |
| S5 | Third | 4.525763 | 0.310946 | 1.5441 | 56.1138 | 1.051 |
| S6 | Lens | 20.60825 | 0.215768 | | | 1.015 |
| S7 | Fourth | 13.21519 | 0.236935 | 1.5441 | 56.1138 | 1.019 |
| S8 | Lens | 16.27332 | 0.210349 | | | 1.070 |

TABLE 31-continued

| Surface No. | Element | Radius of Curvature | Thickness/ Distance | Index of Refraction | Abbe Number | Effective Aperture Radius |
|---|---|---|---|---|---|---|
| S9 | Fifth | −6.57315 | 0.41188 | 1.651 | 21.4942 | 1.076 |
| S10 | Lens | −10.4553 | 0.371031 | | | 1.320 |
| S11 | Sixth | 3.477886 | 0.631775 | 1.5441 | 56.1138 | 1.556 |
| S12 | Lens | 3.199354 | 0.267164 | | | 2.337 |
| S13 | Seventh | 2.880384 | 0.505977 | 1.5441 | 56.1138 | 2.489 |
| S14 | Lens | 1.71E+00 | 0.138438 | | | 2.666 |
| S15 | Filter | Infinity | 0.21 | 1.5182 | 64.1973 | 3.102058013 |
| S16 | | Infinity | 0.59 | | | 3.177033741 |
| S17 | Imaging Plane | Infinity | | | | 3.529142415 |

TABLE 32

| | K | A | B | C | D | E | F | G | H |
|---|---|---|---|---|---|---|---|---|---|
| S1 | 0.0432 | −0.0088 | 0.0131 | −0.0627 | 0.1199 | −0.1345 | 0.077 | −0.018 | −0.0004 |
| S2 | −26.097 | −0.0562 | 0.051 | −0.0514 | 0.0595 | −0.0683 | 0.0462 | −0.0139 | −7E−05 |
| S3 | −99 | −0.1283 | 0.1953 | −0.2779 | 0.5135 | −0.8812 | 0.9662 | −0.5723 | 0.1395 |
| S4 | −16.567 | −0.0971 | 0.1552 | −0.3608 | 0.985 | −2.059 | 2.5647 | −1.6683 | 0.4378 |
| S5 | −1.6774 | −0.0377 | 0.065 | −0.4515 | 1.687 | −3.5163 | 4.2391 | −2.6607 | 0.6752 |
| S6 | 57.913 | −0.0559 | 0.0533 | −0.341 | 1.3373 | −2.8539 | 3.4811 | −2.2114 | 0.5781 |
| S7 | −66.305 | −0.1749 | −0.0635 | 0.0963 | −0.2061 | 0.5819 | −0.9 | 0.6874 | −0.1979 |
| S8 | 19.549 | −0.1228 | −0.0686 | 0.0207 | 0.1647 | −0.2695 | 0.1725 | −0.0616 | 0.0161 |
| S9 | 29.709 | −0.0709 | 0.0826 | −0.3062 | 0.6009 | −0.6459 | 0.3344 | −0.0761 | 0 |
| S10 | −31.338 | −0.1255 | 0.1076 | −0.1494 | 0.1908 | −0.1423 | 0.0506 | −0.0065 | 0 |
| S11 | −46.453 | 0.0038 | −0.1455 | 0.1534 | −0.126 | 0.0705 | −0.0225 | 0.0029 | 0 |
| S12 | −31.504 | 0.0093 | −0.0326 | 0.0149 | −0.0033 | 0.0003 | −1E−05 | −7E−07 | 0 |
| S13 | −0.5233 | −0.2947 | 0.1709 | −0.0627 | 0.0154 | −0.0025 | 0.0003 | −1E−05 | 3E−07 |
| S14 | −0.8257 | −0.2584 | 0.1353 | −0.0565 | 0.0166 | −0.0032 | 0.0004 | −3E−05 | 7E−07 |

Seventeenth Example

Figure 33:
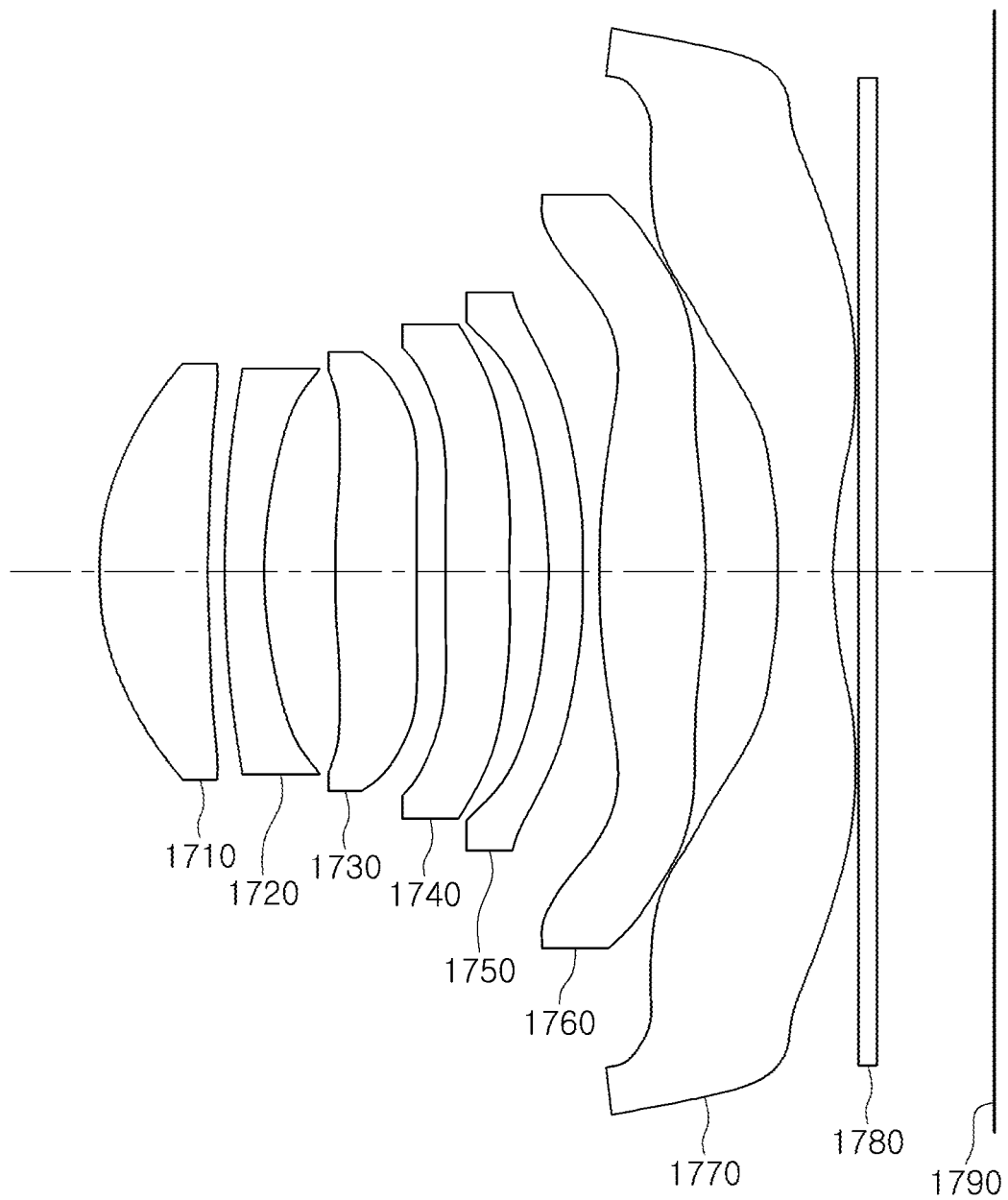
FIG. 33 is a view illustrating a seventeenth example of an optical imaging system.
Figure 34:
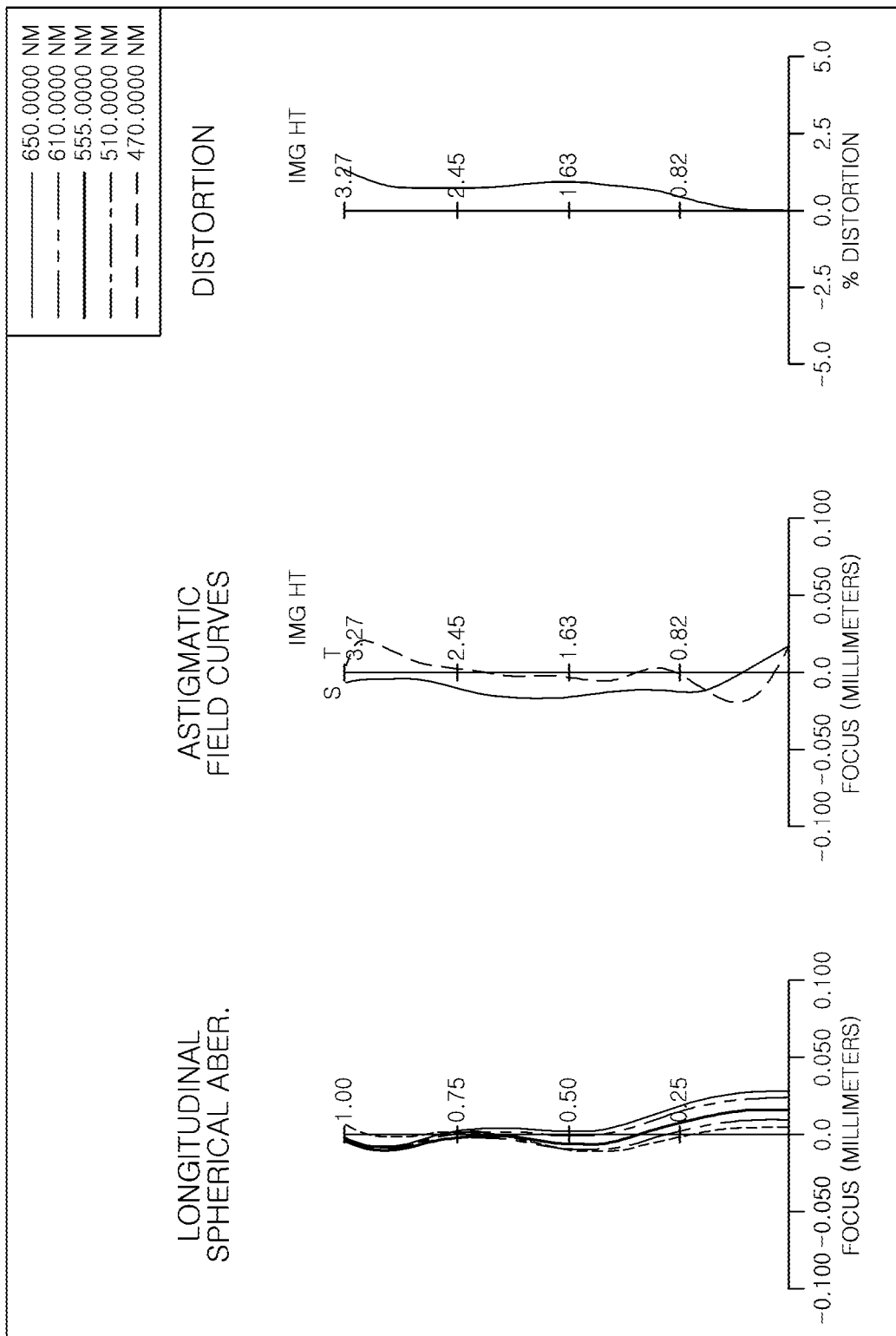
FIG. 34 illustrates aberration curves of the optical imaging system of FIG. 33.

FIG. 33 is a view illustrating a seventeenth example of an optical imaging system, and FIG. 34 illustrates aberration curves of the optical imaging system of FIG. 33.

The seventeenth example of the optical imaging system includes a first lens 1710, a second lens 1720, a third lens 1730, a fourth lens 1740, a fifth lens 1750, a sixth lens 1760, a seventh lens 1770, a filter 1780, an image sensor 1790, and a stop (not shown) disposed between the first lens 1710 and the second lens 1720.

The first lens 1710 has a positive refractive power, a paraxial region of an object-side surface thereof is convex, and a paraxial region of an image-side surface thereof is concave.

The second lens 1720 has a negative refractive power, a paraxial region of an object-side surface thereof is convex, and a paraxial region of an image-side surface thereof is concave.

The third lens 1730 has a positive refractive power, a paraxial region of an object-side surface thereof is convex, and a paraxial region of an image-side surface thereof is concave.

The fourth lens 1740 has a positive refractive power, and a paraxial region of each of an object-side surface and an image-side surface thereof is convex.

The fifth lens 1750 has a negative refractive power, a paraxial region of an object-side surface thereof is concave, and a paraxial region of an image-side surface thereof is convex.

The sixth lens 1760 has a positive refractive power, and a paraxial region of each of an object-side surface and an image-side surface thereof is convex.

The seventh lens 1770 has a negative refractive power, and a paraxial region of each of an object-side surface and an image-side surface thereof is concave.

One inflection point is formed on the object-side surface of the seventh lens 1770. In particular, the object-side surface of the seventh lens 1770 is concave in the paraxial region, and becomes convex toward an edge thereof.

In addition, one inflection point is formed on the image-side surface of the seventh lens 1770. In particular, the image-side surface of the seventh lens 1770 is concave in the paraxial region, and becomes convex toward an edge thereof.

Although not illustrated in FIG. 33, the stop is disposed at a distance of 0.624 mm from the object-side surface of the first lens 1710 toward the imaging plane of the optical imaging system. This distance is equal to TTL-SL and can be calculated from the values of TTL and SL for Example 17 listed in Table 57 that appears later in this application.

Table 33 below shows physical properties of the lenses and other elements of the optical imaging system of FIG. 33, and Table 34 below shows aspherical surface coefficients of the lenses of FIG. 33. Both surfaces of all of the lenses of FIG. 33 are aspherical.

TABLE 33

| Surface No. | Element | Radius of Curvature | Thickness/ Distance | Index of Refraction | Abbe Number | Effective Aperture Radius |
|---|---|---|---|---|---|---|
| S1 | First | 1.777275 | 0.623828 | 1.5441 | 56.1138 | 1.217 |
| S2 | Lens | 6.456568 | 0.1 | | | 1.158 |
| S3 | Second | 4.41033 | 0.236253 | 1.6612 | 20.3532 | 1.157 |
| S4 | Lens | 2.658351 | 0.413785 | | | 1.184 |
| S5 | Third | 6.587882 | 0.464049 | 1.5441 | 56.1138 | 1.177 |
| S6 | Lens | 10.52328 | 0.17773 | | | 1.282 |
| S7 | Fourth | 13.47488 | 0.362661 | 1.5441 | 56.1138 | 1.306 |
| S8 | Lens | −20.23 | 0.232536 | | | 1.444 |
| S9 | Fifth | −3.18309 | 0.2 | 1.6612 | 20.3532 | 1.456 |
| S10 | Lens | −4.21505 | 0.1 | | | 1.625 |
| S11 | Sixth | 6.764633 | 0.608917 | 1.5441 | 56.1138 | 2.207 |
| S12 | Lens | −2.87919 | 0.421093 | | | 2.145 |
| S13 | Seventh | −6.99582 | 0.32 | 1.5441 | 56.1138 | 2.280 |
| S14 | Lens | 1.69E+00 | 0.14847 | | | 3.165 |
| S15 | Filter | Infinity | 0.11 | 1.5183 | 64.1664 | 2.850141022 |
| S16 | | Infinity | 0.680678 | | | 2.888122651 |
| S17 | Imaging Plane | Infinity | | | | 3.276451571 |

TABLE 34

| | K | A | B | C | D |
|---|---|---|---|---|---|
| S1 | −0.5383 | 0.0108 | 0.0209 | −0.0477 | 0.0729 |
| S2 | 5.8135 | −0.0459 | 0.0189 | 0.0248 | −0.0559 |
| S3 | −10.011 | −0.085 | 0.066 | 0.02 | −0.0808 |
| S4 | −0.1875 | −0.0544 | 0.0068 | 0.26 | −0.6655 |
| S5 | 0 | −0.0569 | 0.0063 | −0.0275 | −0.0046 |
| S6 | 0 | −0.0775 | −0.0976 | 0.271 | −0.5329 |
| S7 | 47.015 | −0.0863 | −0.1024 | 0.2298 | −0.2721 |
| S8 | −99 | −0.0603 | −0.0348 | 0.057 | −0.0468 |
| S9 | −99 | −0.2672 | 0.6153 | −0.9745 | 0.9138 |
| S10 | −0.0701 | 0.0268 | −0.0377 | −0.0253 | 0.035 |
| S11 | −97.721 | 0.1556 | −0.2109 | 0.1424 | −0.0678 |
| S12 | −1.5998 | 0.2298 | −0.1811 | 0.0905 | −0.0342 |
| S13 | 4.8341 | −0.1142 | −0.0024 | 0.0306 | −0.013 |
| S14 | −1.0993 | −0.2618 | 0.1449 | −0.0599 | 0.0171 |

| | E | F | G | H | J |
|---|---|---|---|---|---|
| S1 | −0.06 | 0.0243 | −0.0027 | −0.0007 | 0 |
| S2 | 0.0486 | −0.026 | 0.0094 | −0.0019 | 0 |
| S3 | 0.0756 | −0.0332 | 0.0069 | −0.0006 | 0 |
| S4 | 0.9329 | −0.7519 | 0.3313 | −0.061 | 0 |
| S5 | 0.0401 | −0.0485 | 0.0264 | −0.0053 | 0 |
| S6 | 0.5567 | −0.3323 | 0.1128 | −0.0176 | 0 |
| S7 | 0.1091 | 0.0392 | −0.0378 | 0.0065 | 0 |
| S8 | 0.0241 | −0.007 | 0.001 | −6E−05 | 0 |
| S9 | −0.5236 | 0.1786 | −0.0332 | 0.0026 | 0 |
| S10 | −0.0133 | 0.0024 | −0.0002 | 7E−06 | 0 |
| S11 | 0.02 | −0.0033 | 0.0003 | −1E−05 | 0 |
| S12 | 0.0088 | −0.0014 | 0.0001 | −4E−06 | 0 |
| S13 | 0.0027 | −0.0003 | 2E−05 | −5E−07 | 0 |
| S14 | −0.0032 | 0.0004 | −3E−05 | 1E−06 | −2E−08 |

Eighteenth Example

Figure 35:
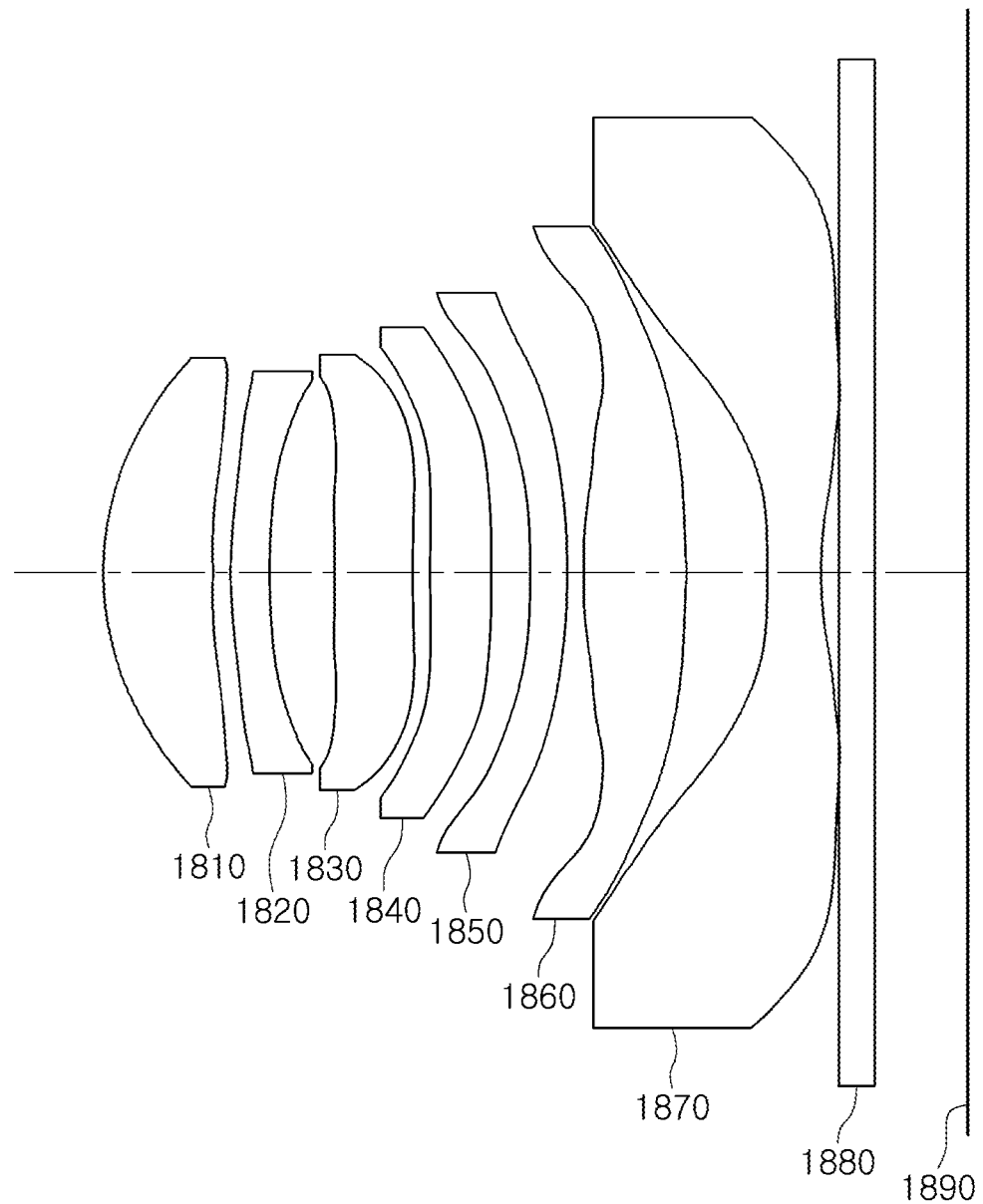
FIG. 35 is a view illustrating an eighteenth example of an optical imaging system.
Figure 36:
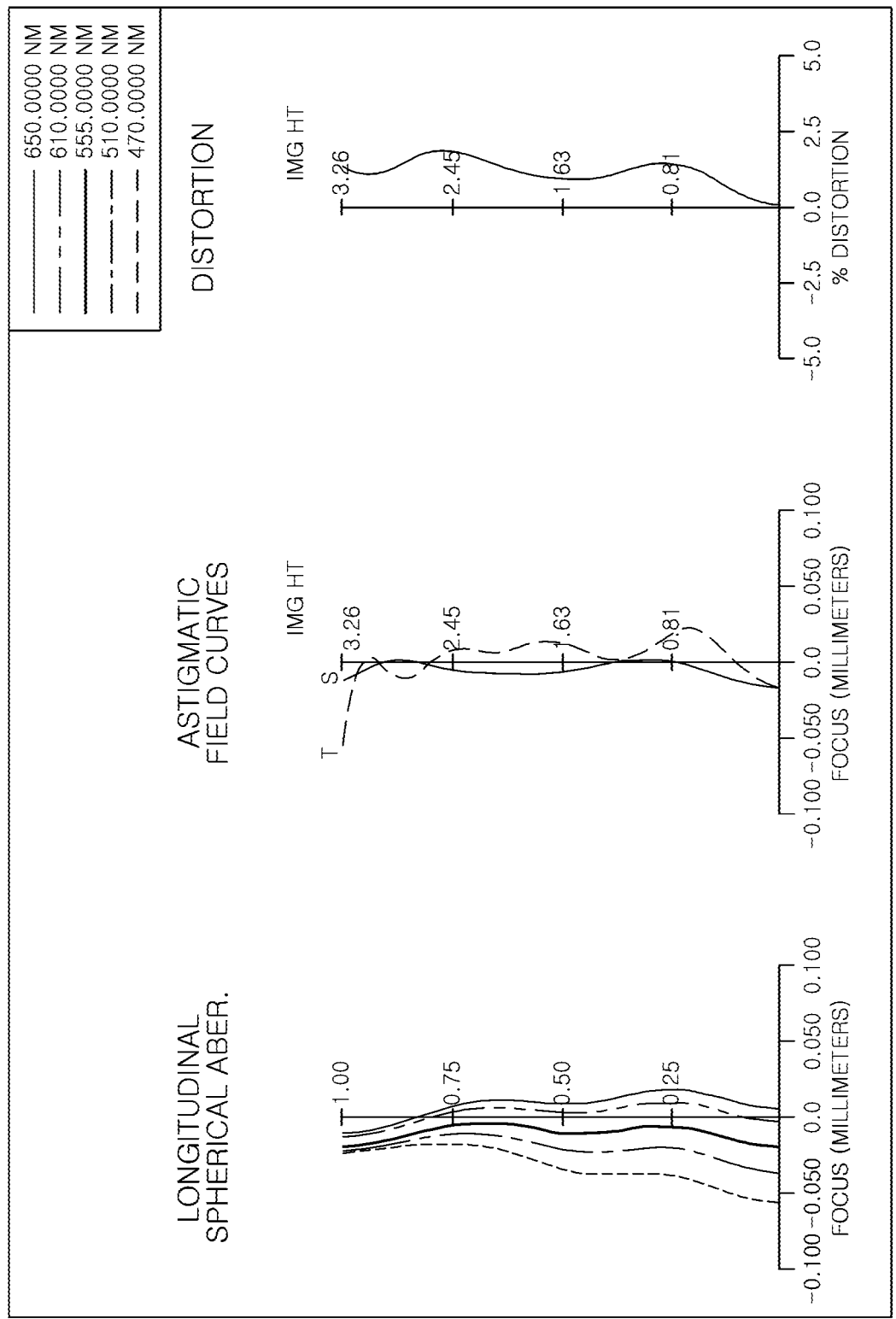
FIG. 36 illustrates aberration curves of the optical imaging system of FIG. 35.

FIG. 35 is a view illustrating an eighteenth example of an optical imaging system, and FIG. 36 illustrates aberration curves of the optical imaging system of FIG. 35.

The eighteenth example of the optical imaging system includes a first lens 1810, a second lens 1820, a third lens 1830, a fourth lens 1840, a fifth lens 1850, a sixth lens 1860, a seventh lens 1870, a filter 1880, an image sensor 1890, and a stop (not shown) disposed between the first lens 1810 and the second lens 1820.

The first lens 1810 has a positive refractive power, a paraxial region of an object-side surface thereof is convex, and a paraxial region of an image-side surface thereof is concave.

The second lens 1820 has a negative refractive power, a paraxial region of an object-side surface thereof is convex, and a paraxial region of an image-side surface thereof is concave.

The third lens 1830 has a negative refractive power, a paraxial region of an object-side surface thereof is convex, and a paraxial region of an image-side surface thereof is concave.

The fourth lens 1840 has a positive refractive power, a paraxial region of an object-side surface thereof is convex, and a paraxial region of an image-side surface thereof is concave.

The fifth lens 1850 has a positive refractive power, a paraxial region of an object-side surface thereof is concave, and a paraxial region of an image-side surface thereof is convex.

The sixth lens 1860 has a positive refractive power, and a paraxial region of each of an object-side surface and an image-side surface thereof is convex.

The seventh lens 1870 has a negative refractive power, and a paraxial region of each of an object-side surface and an image-side surface thereof is concave.

No inflection point is formed on the object-side surface of the seventh lens 1870.

In addition, one inflection point is formed on the image-side surface of the seventh lens 1870. In particular, the image-side surface of the seventh lens 1870 is concave in the paraxial region, and becomes convex toward an edge thereof.

Although not illustrated in FIG. 35, the stop is disposed at a distance of 0.641 mm from the object-side surface of the first lens 1810 toward the imaging plane of the optical imaging system. This distance is equal to TTL-SL and can be calculated from the values of TTL and SL for Example 18 listed in Table 57 that appears later in this application.

Table 35 below shows physical properties of the lenses and other elements of the optical imaging system of FIG. 35, and Table 36 below shows aspherical surface coefficients of the lenses of FIG. 35. Both surfaces of all of the lenses of FIG. 35 are aspherical.

TABLE 35

| Surface No. | Element | Radius of Curvature | Thickness/ Distance | Index of Refraction | Abbe Number | Effective Aperture Radius |
|---|---|---|---|---|---|---|
| S1 | First | 1.797739 | 0.640884 | 1.5441 | 56.1138 | 1.270 |
| S2 | Lens | 3.742203 | 0.119077 | | | 1.211 |
| S3 | Second | 3.057321 | 0.22 | 1.6612 | 20.3532 | 1.190 |
| S4 | Lens | 2.795092 | 0.393079 | | | 1.130 |
| S5 | Third | 10.62153 | 0.464034 | 1.5441 | 56.1138 | 1.153 |
| S6 | Lens | 9.026562 | 0.1 | | | 1.289 |
| S7 | Fourth | 7.987624 | 0.36214 | 1.5441 | 56.1138 | 1.328 |
| S8 | Lens | 138.7678 | 0.233384 | | | 1.454 |
| S9 | Fifth | −4.1765 | 0.219829 | 1.6612 | 20.3532 | 1.518 |
| S10 | Lens | −4.13945 | 0.1 | | | 1.656 |
| S11 | Sixth | 4.613403 | 0.608917 | 1.5441 | 56.1138 | 2.000 |
| S12 | Lens | −3.59211 | 0.472598 | | | 2.038 |
| S13 | Seventh | −7.00157 | 0.32 | 1.5441 | 56.1138 | 2.049 |
| S14 | Lens | 1.69E+00 | 0.110689 | | | 2.685 |
| S15 | Filter | Infinity | 0.21 | 1.5183 | 64.1664 | 2.941536401 |
| S16 | | Infinity | 0.549988 | | | 3.008025404 |
| S17 | Imaging Plane | Infinity | | | | 3.291609937 |

TABLE 36

| | K | A | B | C | D | E | F | G | H | J |
|---|---|---|---|---|---|---|---|---|---|---|
| S1 | −0.812 | 0.0136 | 0.0311 | −0.0769 | 0.1226 | −0.1099 | 0.0531 | −0.0116 | 0.0005 | 0 |
| S2 | −6.6917 | −0.0631 | 0.0174 | 0.0714 | −0.1648 | 0.1763 | −0.1086 | 0.0376 | −0.0059 | 0 |
| S3 | −14.579 | −0.0707 | 0.0068 | 0.1319 | −0.2129 | 0.173 | −0.0715 | 0.0127 | −0.0005 | 0 |
| S4 | −0.188 | −0.0614 | −0.0138 | 0.3338 | −0.7392 | 0.9251 | −0.6781 | 0.276 | −0.0477 | 0 |
| S5 | 0 | −0.0572 | 0.0435 | −0.1733 | 0.2724 | −0.2421 | 0.0931 | −0.0042 | −0.0038 | 0 |
| S6 | 0 | −0.1356 | −0.0309 | 0.2183 | −0.5547 | 0.6931 | −0.486 | 0.1856 | −0.0304 | 0 |
| S7 | 30.023 | −0.2107 | 0.0007 | 0.1568 | −0.2854 | 0.2586 | −0.1154 | 0.0236 | −0.0019 | 0 |
| S8 | −99 | −0.1858 | −0.0192 | 0.2616 | −0.4111 | 0.3392 | −0.1538 | 0.0357 | −0.0033 | 0 |
| S9 | −98.995 | −0.2935 | 0.5043 | −0.5157 | 0.2657 | −0.0658 | 0.0056 | 0.0005 | −8E−05 | 0 |
| S10 | −0.0701 | −0.0775 | 0.2223 | −0.2703 | 0.1529 | −0.0452 | 0.0073 | −0.0006 | 2E−05 | 0 |
| S11 | −97.878 | 0.1479 | −0.1956 | 0.1288 | −0.0598 | 0.0172 | −0.0028 | 0.0002 | −8E−06 | 0 |
| S12 | 1.4166 | 0.1234 | −0.1416 | 0.087 | −0.0341 | 0.0088 | −0.0014 | 0.0001 | −4E−06 | 0 |
| S13 | 9.5503 | −0.2864 | 0.1096 | 0.0149 | −0.0214 | 0.0064 | −0.0009 | 6E−05 | −2E−06 | 0 |
| S14 | −1.2786 | −0.3076 | 0.1777 | −0.0626 | 0.0143 | −0.0022 | 0.0002 | −1E−05 | 5E−07 | −7E−09 |

Nineteenth Example

Figure 37:
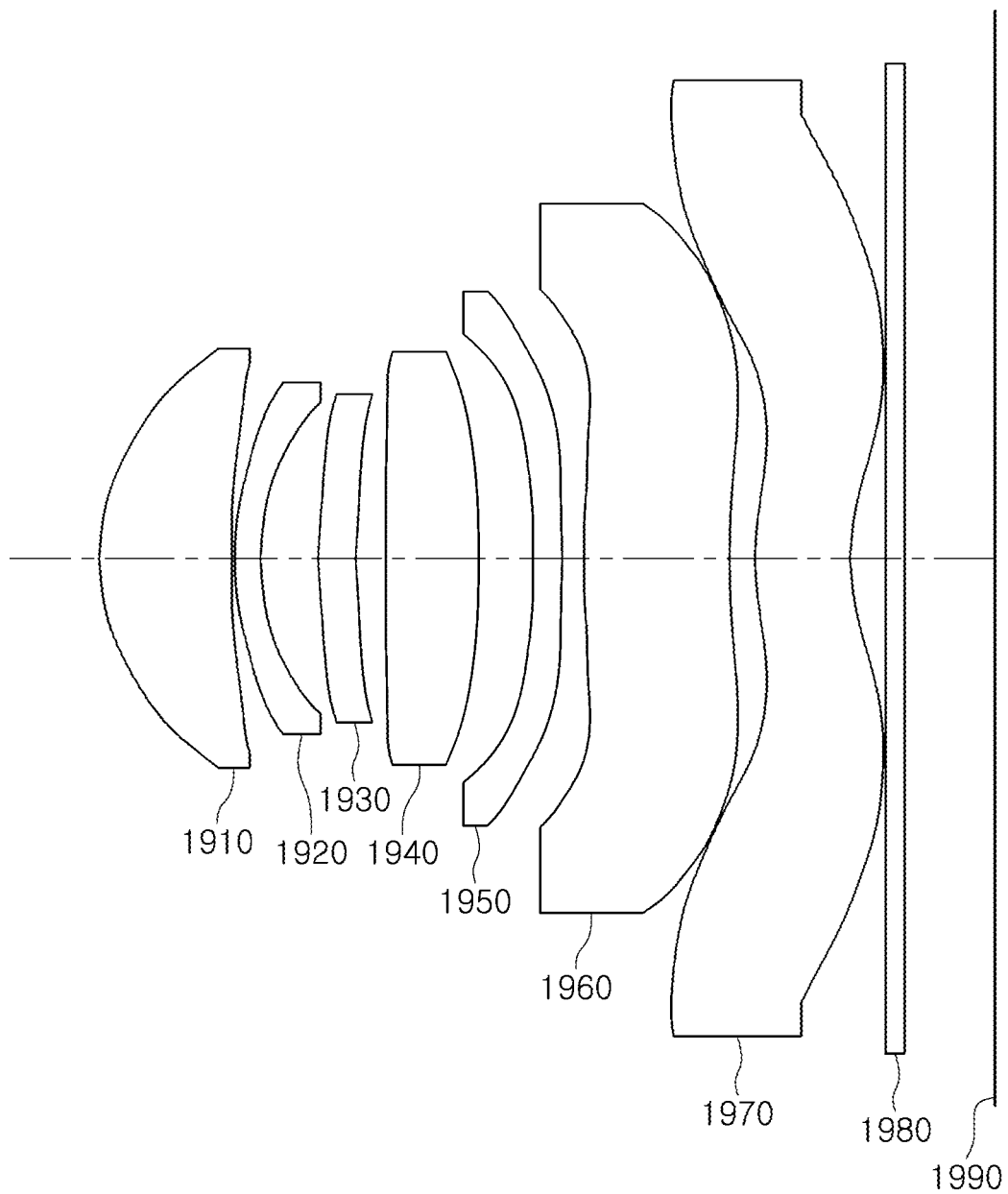
FIG. 37 is a view illustrating a nineteenth example of an optical imaging system.
Figure 38:
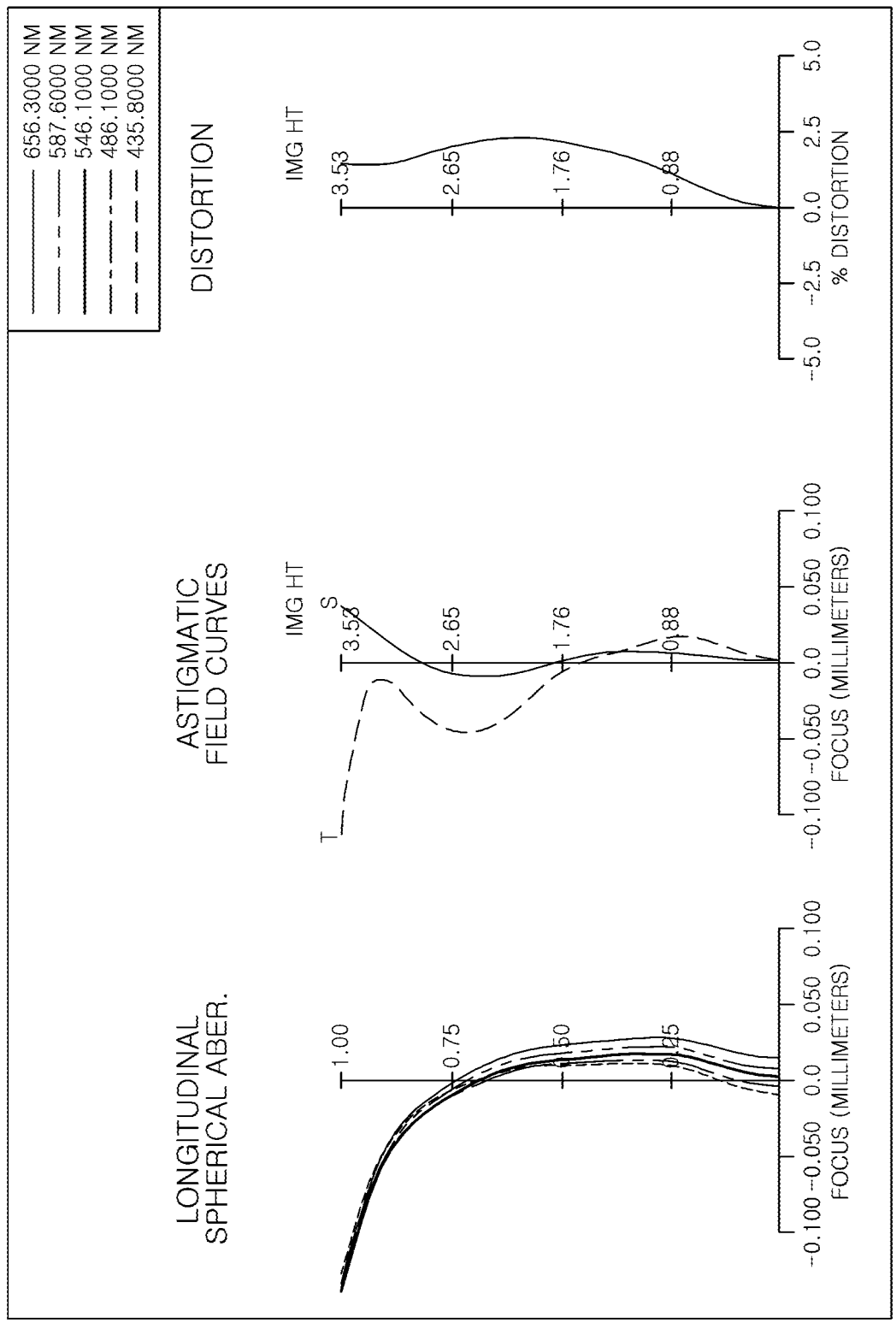
FIG. 38 illustrates aberration curves of the optical imaging system of FIG. 37.

FIG. 37 is a view illustrating a nineteenth example of an optical imaging system, and FIG. 38 illustrates aberration curves of the optical imaging system of FIG. 37.

The nineteenth example of the optical imaging system includes a first lens 1910, a second lens 1920, a third lens 1930, a fourth lens 1940, a fifth lens 1950, a sixth lens 1960, a seventh lens 1970, a filter 1980, an image sensor 1990, and a stop (not shown) disposed between the second lens 1920 and the third lens 1930.

The first lens 1910 has a positive refractive power, a paraxial region of an object-side surface thereof is convex, and a paraxial region of an image-side surface thereof is concave.

The second lens 1920 has a negative refractive power, a paraxial region of an object-side surface thereof is convex, and a paraxial region of an image-side surface thereof is concave.

The third lens 1930 has a negative refractive power, a paraxial region of an object-side surface thereof is convex, and a paraxial region of an image-side surface thereof is concave.

The fourth lens 1940 has a positive refractive power, and a paraxial region of each of an object-side surface and an image-side surface thereof is convex.

The fifth lens 1950 has a negative refractive power, a paraxial region of an object-side surface thereof is concave, and a paraxial region of an image-side surface thereof is convex.

The sixth lens 1960 has a negative refractive power, a paraxial region of an object-side surface thereof is convex, and a paraxial region of an image-side surface thereof is concave.

The seventh lens 1970 has a negative refractive power, a paraxial region of an object-side surface thereof is convex, and a paraxial region of an image-side surface thereof is concave.

One inflection point is formed on the object-side surface of the seventh lens 1970. In particular, the object-side surface of the seventh lens 1970 is convex in the paraxial region, and becomes concave toward an edge thereof.

In addition, one inflection point is formed on the image-side surface of the seventh lens 1970. In particular, the image-side surface of the seventh lens 1970 is concave in the paraxial region, and becomes convex toward an edge thereof.

Although not illustrated in FIG. 37, the stop is disposed at a distance of 0.950 mm from the object-side surface of the first lens 1910 toward the imaging plane of the optical imaging system. This distance is equal to TTL-SL and can be calculated from the values of TTL and SL for Example 19 listed in Table 57 that appears later in this application.

Table 37 below shows physical properties of the lenses and other elements of the optical imaging system of FIG. 37, and Table 38 below shows aspherical surface coefficients of the lenses of FIG. 37. Both surfaces of all of the lenses of FIG. 37 are aspherical.

TABLE 37

| Surface No. | Element | Radius of Curvature | Thickness/ Distance | Index of Refraction | Abbe Number | Effective Aperture Radius |
|---|---|---|---|---|---|---|
| S1 | First | 1.672254 | 0.7738 | 1.55 | 56.11 | 1.35 |
| S2 | Lens | 6.857015 | 0.02 | | | 1.26 |
| S3 | Second | 2.191778 | 0.15 | 1.66 | 20.40 | 1.14 |
| S4 | Lens | 1.616242 | 0.342515 | | | 1.00 |
| S5 | Third | 4.211432 | 0.212112 | 1.66 | 20.40 | 0.99 |
| S6 | Lens | 3.706663 | 0.17539 | | | 1.07 |
| S7 | Fourth | 13.05984 | 0.552722 | 1.55 | 56.11 | 1.17 |
| S8 | Lens | −10.8786 | 0.321736 | | | 1.34 |
| S9 | Fifth | −7.26453 | 0.16548 | 1.65 | 21.49 | 1.45 |
| S10 | Lens | −20.0451 | 0.129473 | | | 1.73 |
| S11 | Sixth | 6.652839 | 0.862773 | 1.65 | 21.49 | 1.73 |
| S12 | Lens | 6.231677 | 0.142 | | | 2.30 |
| S13 | Seventh | 2.11211 | 0.562819 | 1.54 | 55.71 | 3.10 |
| S14 | Lens | 1.545997 | 0.207518 | | | 2.87 |
| S15 | Filter | Infinity | 0.11 | 1.52 | 64.20 | 3.16 |
| S16 | | Infinity | 0.530999 | | | 3.20 |
| S17 | Imaging Plane | Infinity | | | | 3.54 |

TABLE 38

| | K | A | B | C | D | E | F | G | H |
|---|---|---|---|---|---|---|---|---|---|
| S1 | −0.0875 | 0.0043 | 0.0051 | −0.0107 | 0.0157 | −0.0116 | 0.0042 | −0.0006 | 0 |
| S2 | 25.239 | −0.0649 | 0.2073 | −0.4137 | 0.472 | −0.3196 | 0.119 | −0.019 | 0 |
| S3 | −1.7461 | −0.1041 | 0.3118 | −0.5508 | 0.6169 | −0.4129 | 0.1566 | −0.0264 | 0 |
| S4 | −0.0238 | −0.0685 | 0.11 | −0.0081 | −0.2137 | 0.4018 | −0.2921 | 0.0875 | 0 |
| S5 | 0.8405 | −0.0823 | 0.0538 | −0.0046 | −0.0765 | 0.1601 | −0.1299 | 0.0421 | 0 |
| S6 | 6.608 | −0.1086 | 0.0588 | −0.0507 | 0.048 | −0.0168 | 0.001 | 0.0003 | 0 |
| S7 | 21.918 | −0.0385 | −0.0011 | 0.0112 | −0.0177 | 0.0301 | −0.0163 | 0.0027 | 0 |
| S8 | 25.736 | −0.0248 | −0.0082 | −0.0047 | 0.0083 | −0.0029 | 0.0004 | −2E−05 | 0 |
| S9 | 1.6857 | −0.0267 | 0.0322 | −0.1034 | 0.0865 | −0.0378 | 0.0096 | −0.0012 | 0 |
| S10 | 69.409 | −0.0298 | 0.003 | −0.0334 | 0.0256 | −0.0076 | 0.001 | −5E−05 | 0 |
| S11 | −52.836 | 0.0057 | −0.0573 | 0.0402 | −0.0183 | 0.0046 | −0.0006 | 3E−05 | 0 |
| S12 | −34.09 | −0.0239 | −0.0095 | 0.0073 | −0.0028 | 0.0006 | −6E−05 | 3E−06 | 0 |
| S13 | −0.9427 | −0.2417 | 0.0607 | −0.0015 | −0.0024 | 0.0006 | −7E−05 | 4E−06 | −8E−08 |
| S14 | −1.0048 | −0.2102 | 0.0796 | −0.0236 | 0.0052 | −0.0008 | 7E−05 | −3E−06 | 7E−08 |

Twentieth Example

Figure 39:
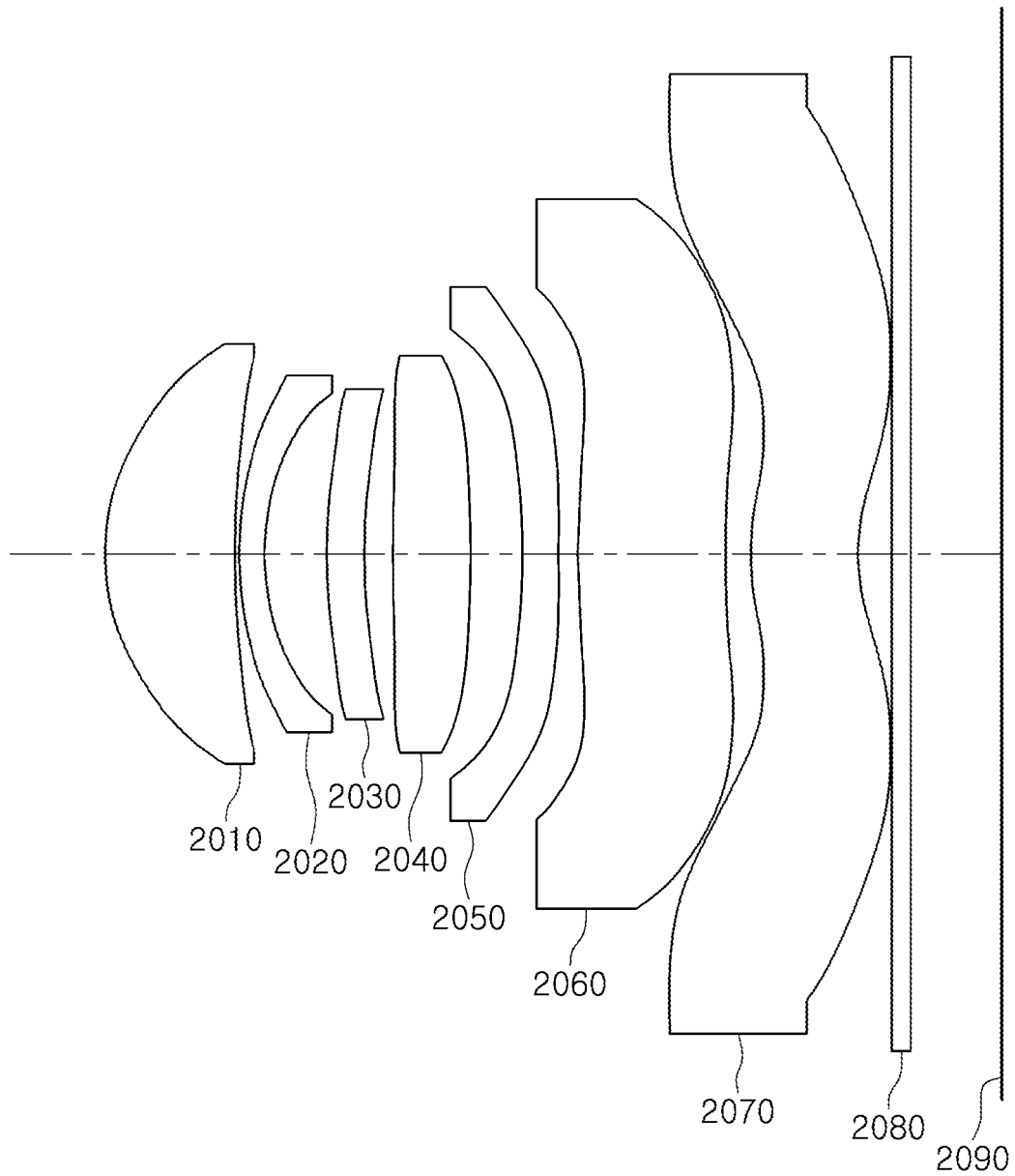
FIG. 39 is a view illustrating a twentieth example of an optical imaging system.
Figure 40:
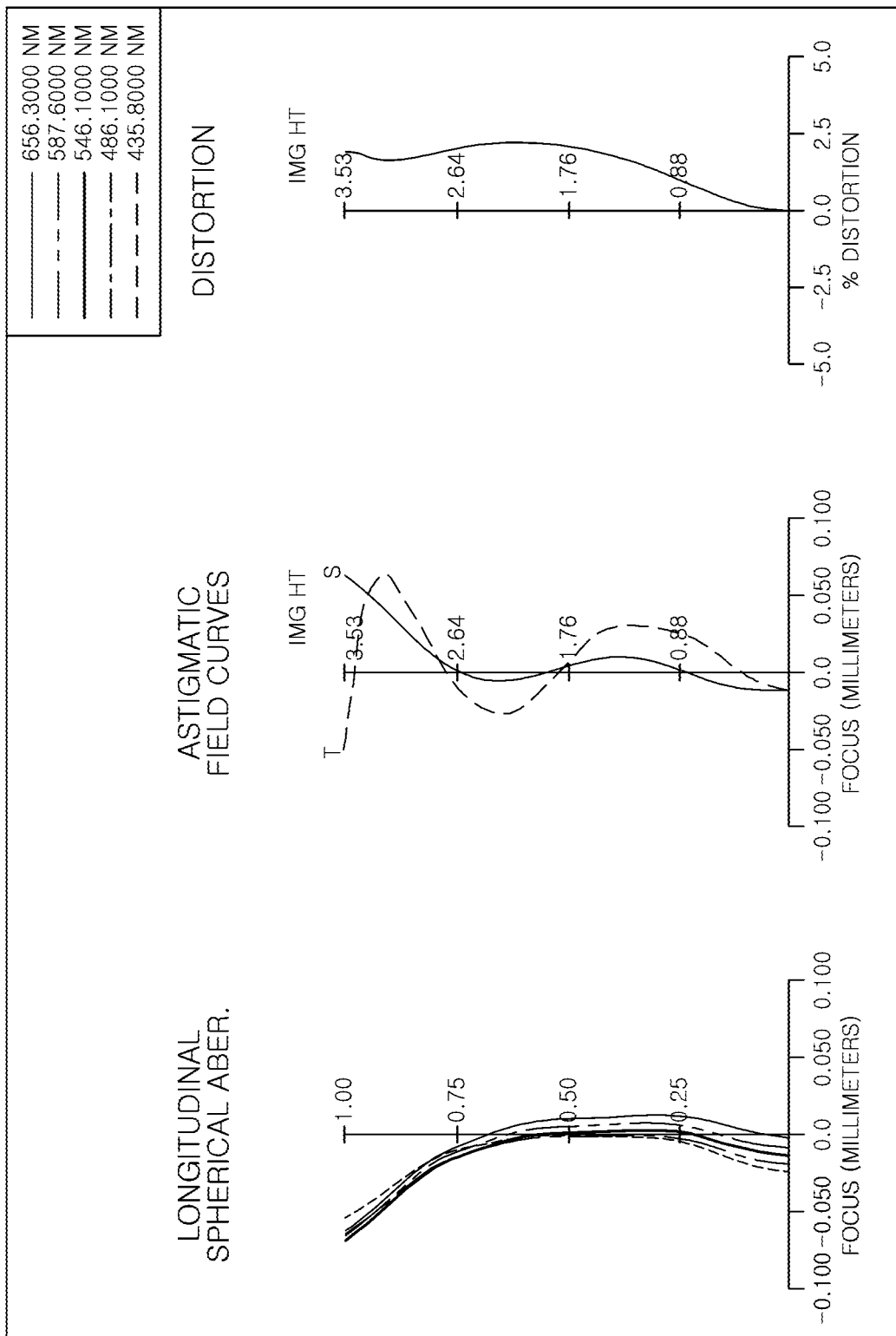
FIG. 40 illustrates aberration curves of the optical imaging system of FIG. 39.

FIG. 39 is a view illustrating a twentieth example of an optical imaging system, and FIG. 40 illustrates aberration curves of the optical imaging system of FIG. 39.

The twentieth example of the optical imaging system includes a first lens 2010, a second lens 2020, a third lens 2030, a fourth lens 2040, a fifth lens 2050, a sixth lens 2060, a seventh lens 2070, a filter 2080, an image sensor 2090, and a stop (not shown) disposed between the second lens 2020 and the third lens 2030.

The first lens 2010 has a positive refractive power, a paraxial region of an object-side surface thereof is convex, and a paraxial region of an image-side surface thereof is concave.

The second lens 2020 has a negative refractive power, a paraxial region of an object-side surface thereof is convex, and a paraxial region of an image-side surface thereof is concave.

The third lens 2030 has a negative refractive power, a paraxial region of an object-side surface thereof is convex, and a paraxial region of an image-side surface thereof is concave.

The fourth lens 2040 has a positive refractive power, and a paraxial region of each of an object-side surface and an image-side surface thereof is convex.

The fifth lens 2050 has a negative refractive power, a paraxial region of an object-side surface thereof is concave, and a paraxial region of an image-side surface thereof is convex.

The sixth lens 2060 has a negative refractive power, a paraxial region of an object-side surface thereof is convex, and a paraxial region of an image-side surface thereof is concave.

The seventh lens 2070 has a negative refractive power, a paraxial region of an object-side surface thereof is convex, and a paraxial region of an image-side surface thereof is concave.

One inflection point is formed on the object-side surface of the seventh lens 2070. In particular, the object-side surface of the seventh lens 2070 is convex in the paraxial region, and becomes concave toward an edge thereof.

In addition, one inflection point is formed on the image-side surface of the seventh lens 2070. In particular, the image-side surface of the seventh lens 2070 is concave in the paraxial region, and becomes convex toward an edge thereof.

Although not illustrated in FIG. 39, the stop is disposed at a distance of 0.940 mm from the object-side surface of the first lens 2010 toward the imaging plane of the optical imaging system. This distance is equal to TTL-SL and can be calculated from the values of TTL and SL for Example 20 listed in Table 57 that appears later in this application.

Table 39 below shows physical properties of the lenses and other elements of the optical imaging system of FIG. 39, and Table 40 below shows aspherical surface coefficients of the lenses of FIG. 39. Both surfaces of all of the lenses of FIG. 39 are aspherical.

TABLE 39

| Surface No. | Element | Radius of Curvature | Thickness/ Distance | Index of Refraction | Abbe Number | Effective Aperture Radius |
|---|---|---|---|---|---|---|
| S1 | First | 1.672254 | 0.763038 | 1.55 | 56.11 | 1.36 |
| S2 | Lens | 6.857015 | 0.02 | | | 1.28 |
| S3 | Second | 2.191778 | 0.15 | 1.66 | 20.40 | 1.16 |
| S4 | Lens | 1.616242 | 0.376845 | | | 1.03 |
| S5 | Third | 4.211432 | 0.216572 | 1.66 | 20.40 | 0.99 |
| S6 | Lens | 3.706663 | 0.1647 | | | 1.06 |
| S7 | Fourth | 13.05984 | 0.453662 | 1.55 | 56.11 | 1.15 |
| S8 | Lens | −10.8786 | 0.306645 | | | 1.29 |
| S9 | Fifth | −7.26453 | 0.212383 | 1.65 | 21.49 | 1.46 |
| S10 | Lens | −20.0451 | 0.110875 | | | 1.73 |
| S11 | Sixth | 6.652839 | 0.862773 | 1.65 | 21.49 | 1.73 |
| S12 | Lens | 6.231677 | 0.152019 | | | 2.30 |
| S13 | Seventh | 2.11211 | 0.629635 | 1.54 | 55.71 | 3.10 |
| S14 | Lens | 1.545997 | 0.195628 | | | 2.89 |
| S15 | Filter | Infinity | 0.11 | 1.52 | 64.20 | 3.18 |
| S16 | | Infinity | 0.536692 | | | 3.22 |
| S17 | Imaging Plane | Infinity | | | | 3.53 |

TABLE 40

| | K | A | B | C | D | E | F | G | H |
|---|---|---|---|---|---|---|---|---|---|
| S1 | −0.0875 | 0.0043 | 0.0051 | −0.0107 | 0.0157 | −0.0116 | 0.0042 | −0.0006 | 0 |
| S2 | 25.239 | −0.0649 | 0.2073 | −0.4137 | 0.472 | −0.3196 | 0.119 | −0.019 | 0 |
| S3 | −1.7461 | −0.1041 | 0.3118 | −0.5508 | 0.6169 | −0.4129 | 0.1566 | −0.0264 | 0 |
| S4 | −0.0238 | −0.0685 | 0.11 | −0.0081 | −0.2137 | 0.4018 | −0.2921 | 0.0875 | 0 |
| S5 | 0.8405 | −0.0823 | 0.0538 | −0.0046 | −0.0765 | 0.1601 | −0.1299 | 0.0421 | 0 |
| S6 | 6.608 | −0.1086 | 0.0588 | −0.0507 | 0.048 | −0.0168 | 0.001 | 0.0003 | 0 |
| S7 | 21.918 | −0.0385 | −0.0011 | 0.0112 | −0.0177 | 0.0301 | −0.0163 | 0.0027 | 0 |
| S8 | 25.736 | −0.0248 | −0.0082 | −0.0047 | 0.0083 | −0.0029 | 0.0004 | −2E−05 | 0 |
| S9 | 1.6857 | −0.0267 | 0.0322 | −0.1034 | 0.0865 | −0.0378 | 0.0096 | −0.0012 | 0 |
| S10 | 69.409 | −0.0298 | 0.003 | −0.0334 | 0.0256 | −0.0076 | 0.001 | −5E−05 | 0 |
| S11 | −52.836 | 0.0057 | −0.0573 | 0.0402 | −0.0183 | 0.0046 | −0.0006 | 3E−05 | 0 |
| S12 | −34.09 | −0.0239 | −0.0095 | 0.0073 | −0.0028 | 0.0006 | −6E−05 | 3E−06 | 0 |
| S13 | −0.9427 | −0.2417 | 0.0607 | −0.0015 | −0.0024 | 0.0006 | −7E−05 | 4E−06 | −8E−08 |
| S14 | −1.0048 | −0.2102 | 0.0796 | −0.0236 | 0.0052 | −0.0008 | 7E−05 | −3E−06 | 7E−08 |

Twenty-First Example

Figure 41:
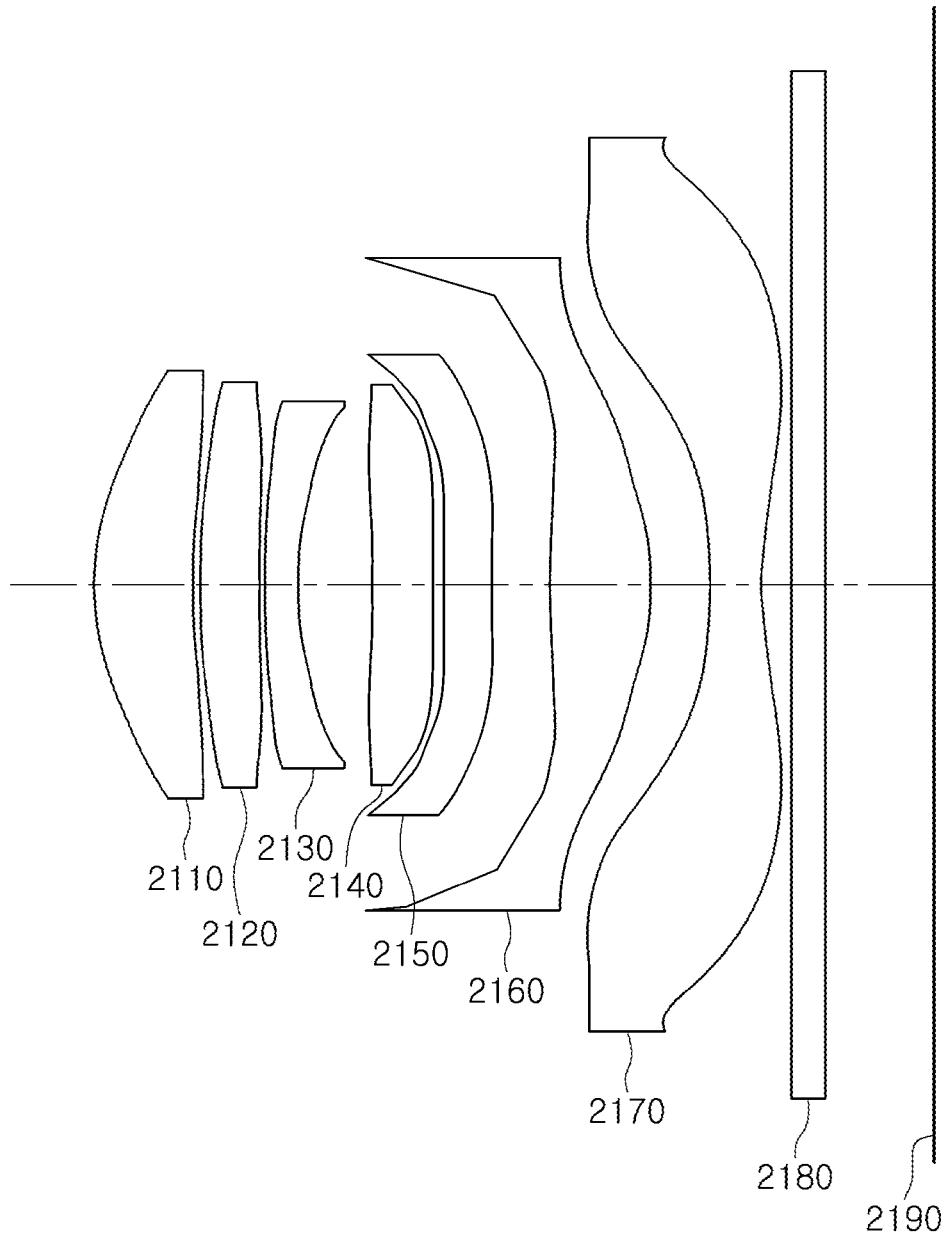
FIG. 41 is a view illustrating a twenty-first example of an optical imaging system.
Figure 42:
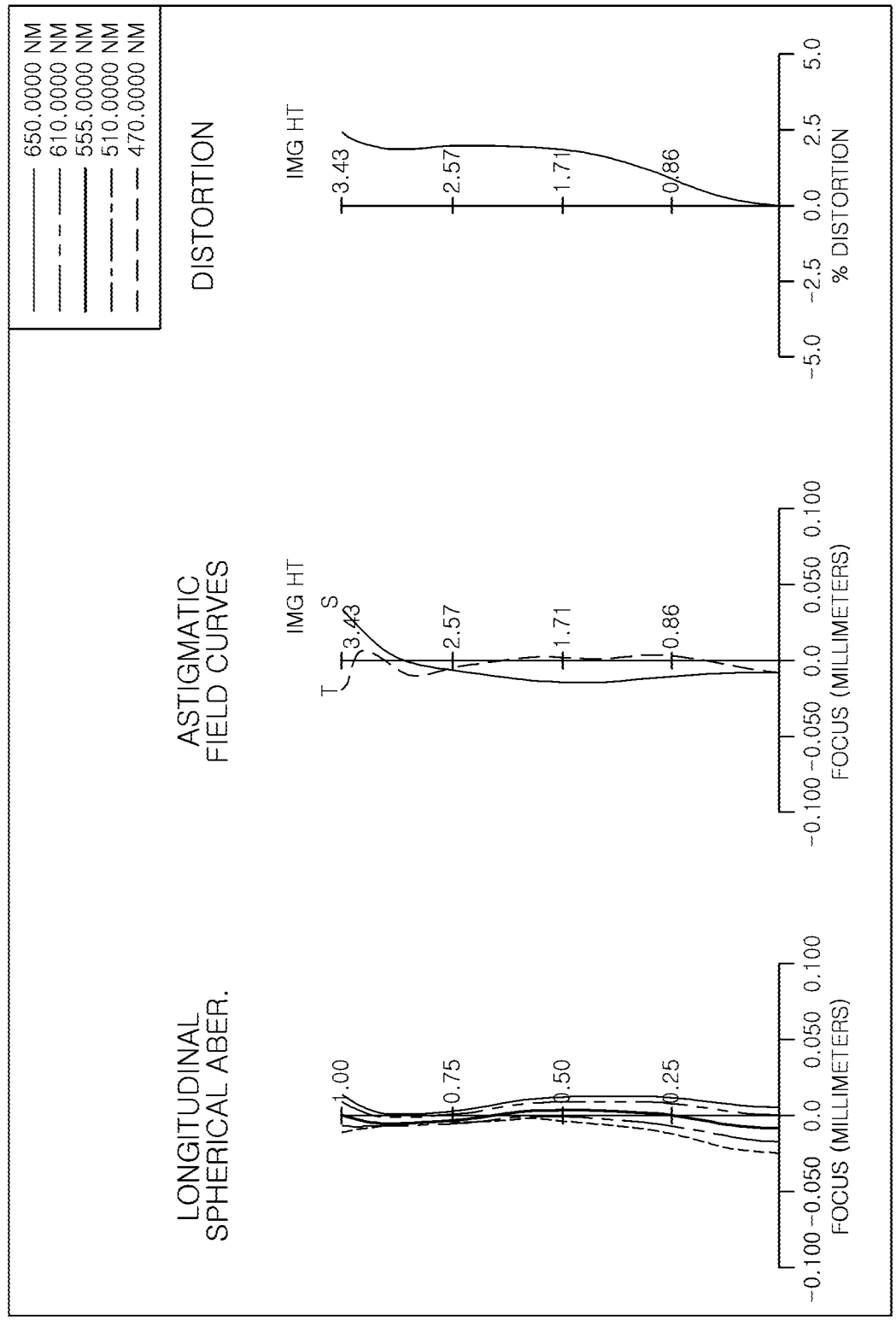
FIG. 42 illustrates aberration curves of the optical imaging system of FIG. 41.

FIG. 41 is a view illustrating a twenty-first example of an optical imaging system, and FIG. 42 illustrates aberration curves of the optical imaging system of FIG. 41.

The twenty-first example of the optical imaging system includes a first lens 2110, a second lens 2120, a third lens 2130, a fourth lens 2140, a fifth lens 2150, a sixth lens 2160, a seventh lens 2170, a filter 2180, an image sensor 2190, and a stop (not shown) disposed between the second lens 2120 and the third lens 2130.

The first lens 2110 has a positive refractive power, a paraxial region of an object-side surface thereof is convex, and a paraxial region of an image-side surface thereof is concave.

The second lens 2120 has a positive refractive power, a paraxial region of an object-side surface thereof is convex, and a paraxial region of an image-side surface thereof is concave.

The third lens 2130 has a negative refractive power, a paraxial region of an object-side surface thereof is convex, and a paraxial region of an image-side surface thereof is concave.

The fourth lens 2140 has a negative refractive power, a paraxial region of an object-side surface thereof is convex, and a paraxial region of an image-side surface thereof is concave.

The fifth lens 2150 has a positive refractive power, a paraxial region of an object-side surface thereof is convex, and a paraxial region of an image-side surface thereof is concave.

The sixth lens 2160 has a positive refractive power, and a paraxial region of each of an object-side surface and an image-side surface thereof is convex.

The seventh lens 2170 has a negative refractive power, and a paraxial region of each of an object-side surface and an image-side surface thereof is concave.

One inflection point is formed on the object-side surface of the seventh lens 2170. In particular, the object-side surface of the seventh lens 2170 is concave in the paraxial region, and becomes convex toward an edge thereof.

In addition, one inflection point is formed on the image-side surface of the seventh lens 2170. In particular, the image-side surface of the seventh lens 2170 is concave in the paraxial region, and becomes convex toward an edge thereof.

Although not illustrated in FIG. 41, the stop is disposed at a distance of 1.002 mm from the object-side surface of the first lens 2110 toward the imaging plane of the optical imaging system. This distance is equal to TTL-SL and can be calculated from the values of TTL and SL for Example 21 listed in Table 57 that appears later in this application.

Table 41 below shows physical properties of the lenses and other elements of the optical imaging system of FIG. 41, and Table 42 below shows aspherical surface coefficients of the lenses of FIG. 41. Both surfaces of all of the lenses of FIG. 41 are aspherical.

TABLE 41

| Surface No. | Element | Radius of Curvature | Thickness/ Distance | Index of Refraction | Abbe Number | Effective Aperture Radius |
|---|---|---|---|---|---|---|
| S1 | First | 1.804711 | 0.576863 | 1.544 | 56.114 | 1.270 |
| S2 | Lens | 5.010949 | 0.040641 | | | 1.230 |
| S3 | Second | 4.809505 | 0.35454 | 1.544 | 56.114 | 1.204 |
| S4 | Lens | 14.18784 | 0.03 | | | 1.158 |
| S5 | Third | 3.659167 | 0.2 | 1.661 | 20.350 | 1.087 |
| S6 | Lens | 2.148667 | 0.424854 | | | 1.050 |
| S7 | Fourth | 21.5791 | 0.365358 | 1.544 | 56.114 | 1.050 |
| S8 | Lens | 9.699008 | 0.061882 | | | 1.187 |
| S9 | Fifth | 6.23061 | 0.282527 | 1.639 | 21.525 | 1.212 |
| S10 | Lens | 8.496966 | 0.34789 | | | 1.367 |
| S11 | Sixth | 10.18469 | 0.58471 | 1.544 | 56.114 | 1.650 |
| S12 | Lens | −1.51715 | 0.356227 | | | 1.934 |
| S13 | Seventh | −2.7118 | 0.3 | 1.544 | 56.114 | 2.303 |
| S14 | Lens | 2.063638 | 0.164562 | | | 2.650 |
| S15 | Filter | Infinity | 0.21 | 1.518 | 64.197 | 2.938 |
| S16 | | Infinity | 0.639942 | | | 2.969 |
| S17 | Imaging Plane | Infinity | | | | 3.261 |

TABLE 42

| | K | A | B | C | D | E | F | G | H |
|---|---|---|---|---|---|---|---|---|---|
| S1 | −1.5984 | 0.02201 | 0.00112 | −0.0095 | 0.00713 | −0.0076 | 0.00279 | −0.0002 | 0 |
| S2 | 0 | −0.0267 | −0.08 | 0.12037 | −0.1085 | 0.07767 | −0.0361 | 0.00741 | 0 |
| S3 | 0 | 0.01852 | −0.0944 | 0.1151 | −0.0877 | 0.07128 | −0.0433 | 0.01041 | 0 |
| S4 | 93.0315 | −0.0833 | 0.30018 | −0.6564 | 0.78727 | −0.5697 | 0.2292 | −0.0392 | 0 |
| S5 | −11.518 | −0.2115 | 0.48742 | −0.8074 | 0.95087 | −0.7204 | 0.32387 | −0.0644 | 0 |
| S6 | −4.4222 | −0.0999 | 0.19853 | −0.0999 | −0.0975 | 0.27732 | −0.2246 | 0.0743 | 0 |
| S7 | 0 | −0.0315 | −0.1501 | 0.44969 | −1.0958 | 1.44445 | −1.0093 | 0.2957 | 0 |
| S8 | 0 | −0.1532 | −0.084 | 0.36754 | −0.5986 | 0.47504 | −0.1986 | 0.03659 | 0 |
| S9 | −76.367 | −0.2472 | −0.1038 | 0.53081 | −0.6528 | 0.42248 | −0.1503 | 0.02265 | 0 |
| S10 | 0 | −0.1927 | −0.1015 | 0.31685 | −0.3163 | 0.19124 | −0.0703 | 0.01153 | 0 |
| S11 | 0 | 0.02452 | −0.0539 | −0.0674 | 0.10823 | −0.0625 | 0.01679 | −0.0017 | 0 |
| S12 | −1.5099 | 0.20226 | −0.1451 | 0.00041 | 0.04309 | −0.0194 | 0.00346 | −0.0002 | 0 |
| S13 | −6.0002 | 0.00897 | −0.1914 | 0.15961 | −0.0593 | 0.01227 | −0.0015 | 9.7E−05 | −3E−06 |
| S14 | −0.8696 | −0.1901 | 0.07654 | −0.0229 | 0.00487 | −0.0008 | 8.7E−05 | −6E−06 | 2.5E−07 |

Twenty-Second Example

Figure 43:
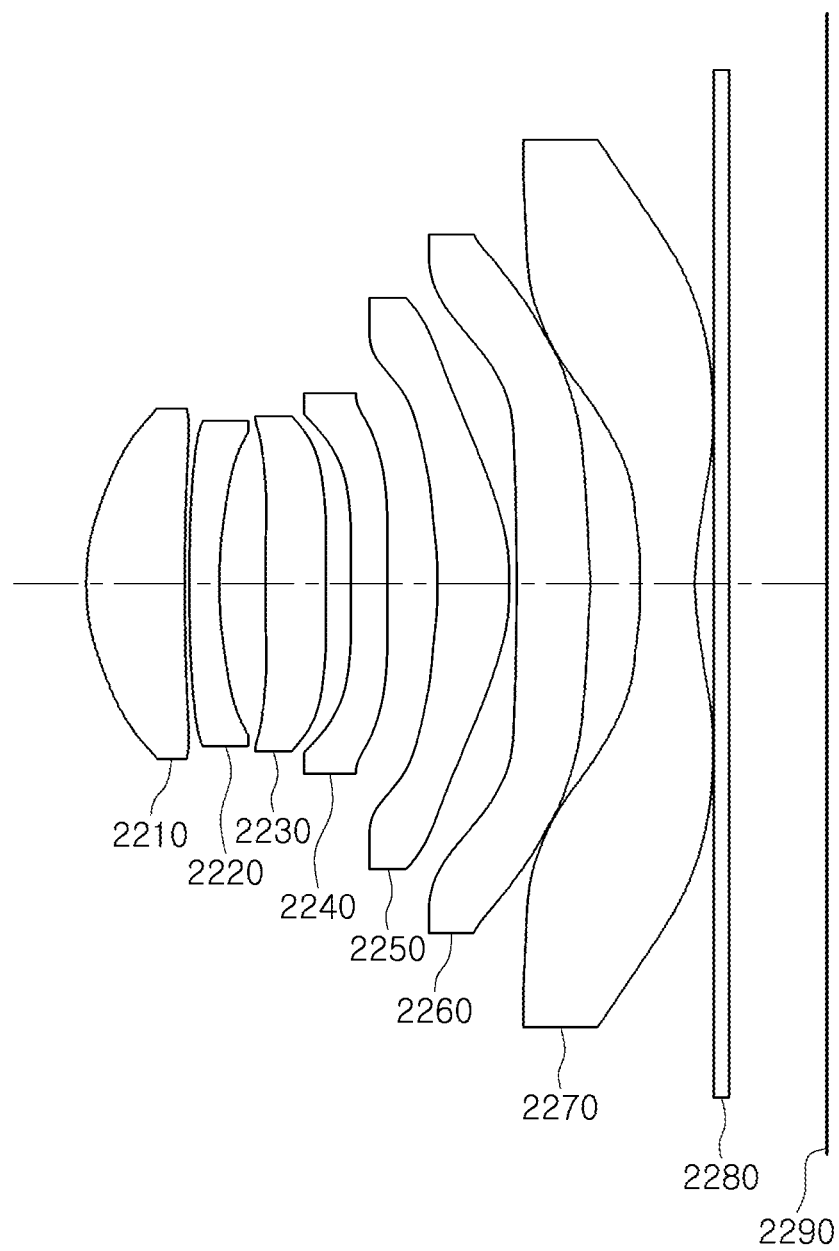
FIG. 43 is a view illustrating a twenty-second example of an optical imaging system.
Figure 44:
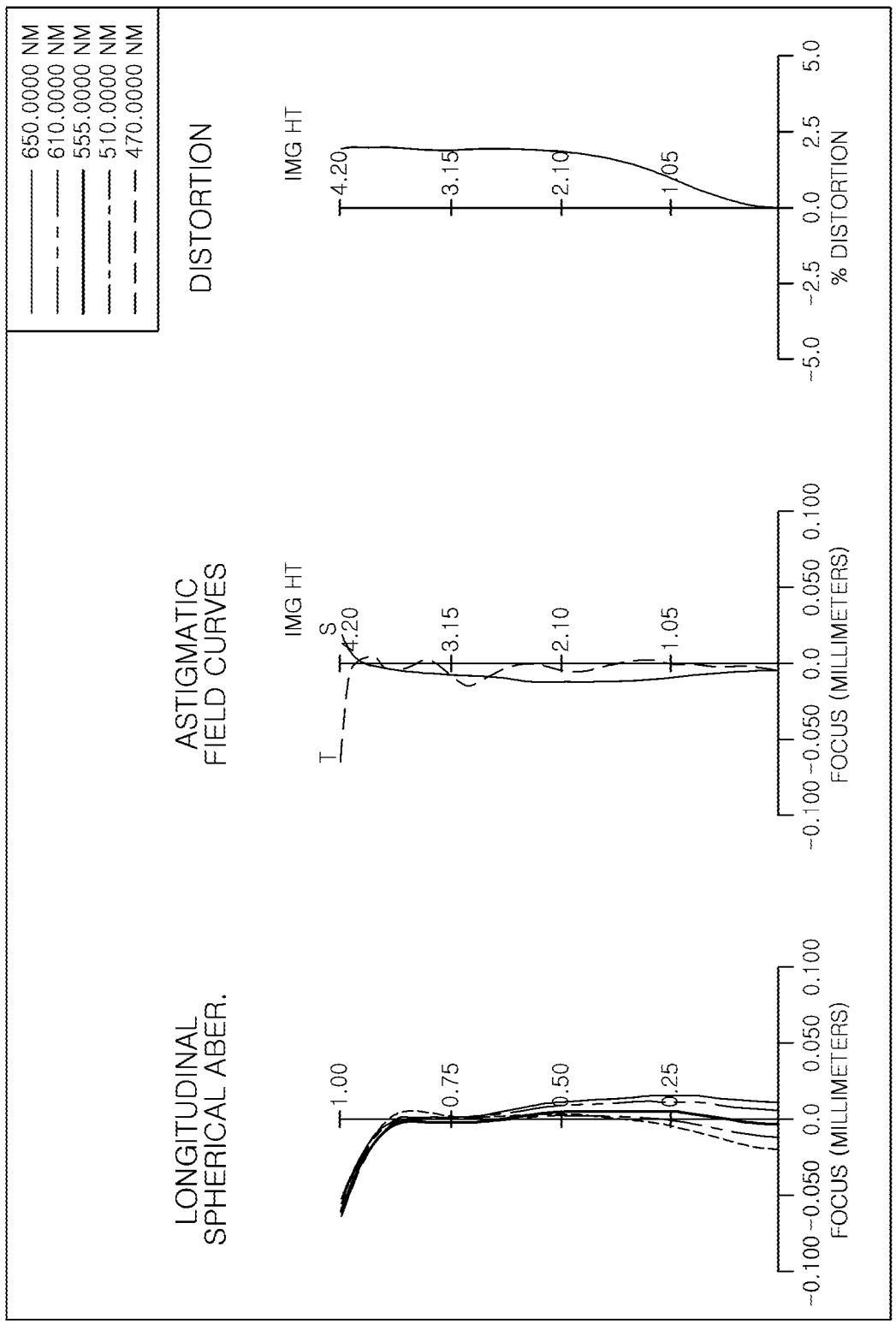
FIG. 44 illustrates aberration curves of the optical imaging system of FIG. 43.

FIG. 43 is a view illustrating a twenty-second example of an optical imaging system, and FIG. 44 illustrates aberration curves of the optical imaging system of FIG. 43.

The twenty-second optical imaging system includes a first lens 2210, a second lens 2220, a third lens 2230, a fourth lens 2240, a fifth lens 2250, a sixth lens 2260, a seventh lens 2270, a filter 2280, an image sensor 2290, a first stop (not shown) disposed between the first lens 2210 and the second lens 2220, and a second stop (not shown) disposed between the second lens 2220 and the third lens 2230.

The first lens 2210 has a positive refractive power, a paraxial region of an object-side surface thereof is convex, and a paraxial region of an image-side surface thereof is concave.

The second lens 2220 has a negative refractive power, a paraxial region of an object-side surface thereof is convex, and a paraxial region of an image-side surface thereof is concave.

The third lens 2230 has a positive refractive power, a paraxial region of an object-side surface thereof is convex, and a paraxial region of an image-side surface thereof is concave.

The fourth lens 2240 has a positive refractive power, a paraxial region of an object-side surface thereof is convex, and a paraxial region of an image-side surface thereof is concave.

The fifth lens 2250 has a positive refractive power, a paraxial region of an object-side surface thereof is concave, and a paraxial region of an image-side surface thereof is convex.

The sixth lens 2260 has a positive refractive power, a paraxial region of an object-side surface thereof is concave, and a paraxial region of an image-side surface thereof is convex.

The seventh lens 2270 has a negative refractive power, and a paraxial region of each of an object-side surface and an image-side surface thereof is concave.

No inflection point is formed on the object-side surface of the seventh lens 2270.

In addition, one inflection point is formed on the image-side surface of the seventh lens 2270. In particular, the image-side surface of the seventh lens 2270 is concave in the paraxial region, and becomes convex toward an edge thereof.

Although not illustrated in FIG. 43, the first stop is disposed at a distance of 0.745 mm from the object-side surface of the first lens 2210 toward the imaging plane of the optical imaging system. This distance is equal to TTL-SL and can be calculated from the values of TTL and SL for Example 22 listed in Table 57 that appears later in this application.

Table 43 below shows physical properties of the lenses and other elements of the optical imaging system of FIG. 43, and Table 44 below shows aspherical surface coefficients of the lenses of FIG. 43. The first stop disposed between the first lens 2210 and the second lens 2220 as discussed above is not shown in Table 43. Both surfaces of all of the lenses of FIG. 43 are aspherical.

TABLE 43

| Surface No. | Element | Radius of Curvature | Thickness/ Distance | Index of Refraction | Abbe Number | Effective Aperture Radius |
|---|---|---|---|---|---|---|
| S1 | First | 1.900246 | 0.745113 | 1.546 | 56.114 | 1.333 |
| S2 | Lens | 12.01797 | 0.031785 | | | 1.275 |
| S3 | Second | 7.105147 | 0.228148 | 1.667 | 20.353 | 1.244 |
| S4 | Lens | 3.509972 | 0.348758 | | | 1.141 |
| S5 | Second Stop | Infinity | 0 | | | 1.205 |
| S6 | Third | 24.3886 | 0.459414 | 1.546 | 56.114 | 1.175 |
| S7 | Lens | 62.53356 | 0.180582 | | | 1.274 |
| S8 | Fourth | 11.10403 | 0.28 | 1.667 | 20.353 | 1.280 |
| S9 | Lens | 13.72056 | 0.379284 | | | 1.448 |
| S10 | Fifth | −4.77188 | 0.546513 | 1.546 | 56.114 | 1.853 |
| S11 | Lens | −1.71685 | 0.051852 | | | 2.170 |
| S12 | Sixth | −6.60097 | 0.558512 | 1.546 | 56.114 | 2.409 |
| S13 | Lens | −4.17937 | 0.372518 | | | 2.655 |
| S14 | Seventh | −4.57649 | 0.414815 | 1.546 | 56.114 | 3.009 |
| S15 | Lens | 2.2E+00 | 0.141964 | | | 3.37037 |
| S16 | Filter | Infinity | 0.114074 | 1.518 | 64.16641 | 3.864216 |
| S17 | | Infinity | 0.746675 | | | 3.903345 |
| S18 | Imaging Plane | Infinity | | | | 4.326018 |

TABLE 44

| | K | A | B | C | D | E | F | G | H | J |
|---|---|---|---|---|---|---|---|---|---|---|
| S1 | −0.9474 | 0.01532 | 0.01685 | −0.037 | 0.06054 | −0.0609 | 0.03661 | −0.0123 | 0.0017 | 0 |
| S2 | −30.447 | −0.1419 | 0.43283 | −0.798 | 0.97201 | −0.7804 | 0.38946 | −0.1078 | 0.01244 | 0 |
| S3 | 6.01402 | −0.1777 | 0.51041 | −0.9603 | 1.25601 | −1.0984 | 0.60482 | −0.1853 | 0.02373 | 0 |
| S4 | −0.421 | −0.0597 | 0.1562 | −0.2512 | 0.29455 | −0.2097 | 0.07608 | −0.0015 | −0.0042 | 0 |
| S6 | 0 | −0.0469 | 0.01011 | −0.0076 | −0.0395 | 0.08831 | −0.0878 | 0.04425 | −0.0087 | 0 |
| S7 | 0 | −0.116 | 0.09293 | −0.2202 | 0.37209 | −0.3982 | 0.24503 | −0.0797 | 0.01043 | 0 |
| S8 | −7.5 | −0.1862 | 0.04273 | −0.0355 | −0.0447 | 0.21236 | −0.2603 | 0.13349 | −0.0249 | 0 |
| S9 | −43.343 | −0.1172 | 0.0133 | 0.00326 | −0.0126 | 0.03781 | −0.0404 | 0.01766 | −0.0026 | 0 |
| S10 | −44.496 | −0.0891 | 0.14043 | −0.1469 | 0.09433 | −0.0347 | 0.00517 | 0.00026 | −0.0001 | 0 |
| S11 | −1.6506 | 0.07781 | −0.0605 | 0.03731 | −0.0172 | 0.00587 | −0.0013 | 0.00015 | −7E−06 | 0 |
| S12 | 2.03896 | 0.16692 | −0.1825 | 0.11151 | −0.0456 | 0.01136 | −0.0016 | 0.00012 | −4E−06 | 0 |
| S13 | −0.4347 | 0.15501 | −0.1544 | 0.08127 | −0.0271 | 0.00578 | −0.0008 | 5.4E−05 | −2E−06 | 0 |
| S14 | −2.5068 | −0.0042 | −0.0908 | 0.05928 | −0.017 | 0.00273 | −0.0003 | 1.3E−05 | −3E−07 | 0 |
| S15 | −1.4448 | −0.1279 | 0.04264 | −0.0109 | 0.00223 | −0.0004 | 4E−05 | −3E−06 | 1.2E−07 | −2E−09 |

Twenty-Third Example

Figure 45:
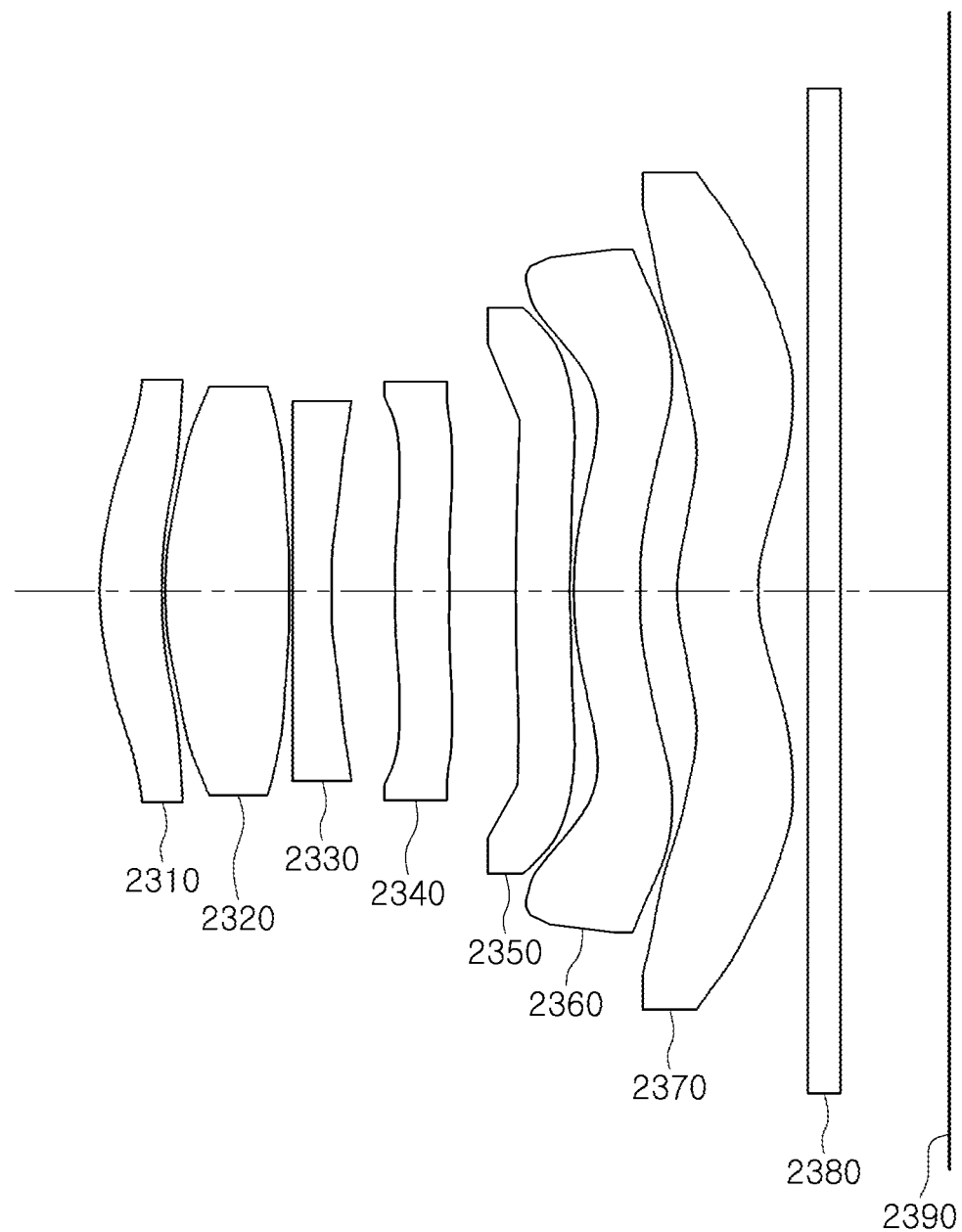
FIG. 45 is a view illustrating a twenty-third example of an optical imaging system.
Figure 46:
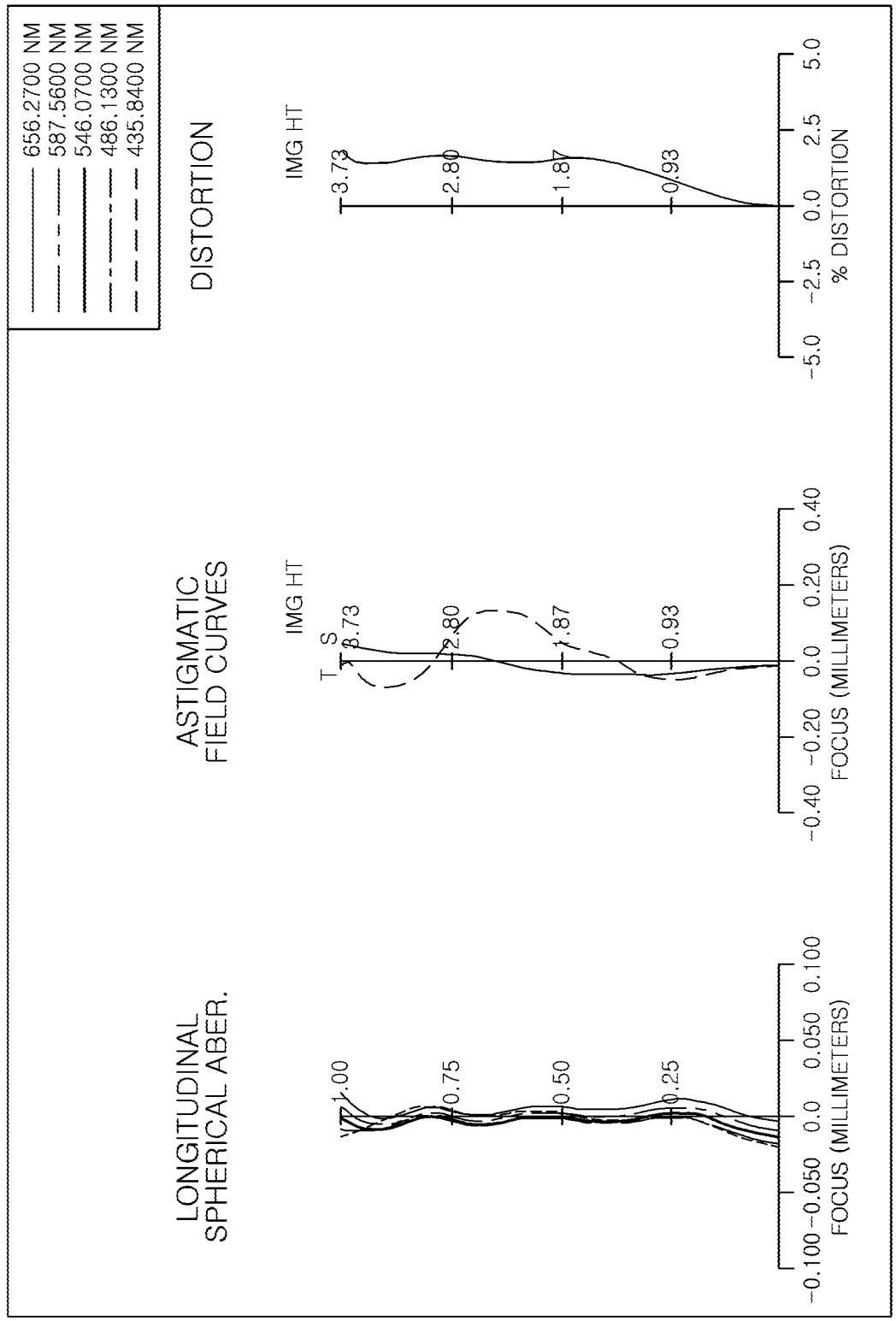
FIG. 46 illustrates aberration curves of the optical imaging system of FIG. 45.

FIG. 45 is a view illustrating a twenty-third example of an optical imaging system, and FIG. 46 illustrates aberration curves of the optical imaging system of FIG. 45.

The twenty-third example of the optical imaging system includes a first lens 2310, a second lens 2320, a third lens 2330, a fourth lens 2340, a fifth lens 2350, a sixth lens 2360, a seventh lens 2370, a filter 2380, an image sensor 2390, and a stop (not shown) disposed between the second lens 2320 and the third lens 2330.

The first lens 2310 has a positive refractive power, a paraxial region of an object-side surface thereof is convex, and a paraxial region of an image-side surface thereof is concave.

The second lens 2320 has a positive refractive power, and a paraxial region of each of an object-side surface and an image-side surface thereof is convex.

The third lens 2330 has a negative refractive power, a paraxial region of an object-side surface thereof is convex, and a paraxial region of an image-side surface thereof is concave.

The fourth lens 2340 has a positive refractive power, a paraxial region of an object-side surface thereof is convex, and a paraxial region of an image-side surface thereof is concave.

The fifth lens 2350 has a negative refractive power, a paraxial region of an object-side surface thereof is convex, and a paraxial region of an image-side surface thereof is concave.

The sixth lens 2360 has a positive refractive power, a paraxial region of an object-side surface thereof is convex, and a paraxial region of an image-side surface thereof is concave.

The seventh lens 2370 has a positive refractive power, a paraxial region of an object-side surface thereof is convex, and a paraxial region of an image-side surface thereof is concave.

One inflection point is formed on the object-side surface of the seventh lens 2370. In particular, the object-side surface of the seventh lens 2370 is convex in the paraxial region, and becomes concave toward an edge thereof.

In addition, one inflection point is formed on the image-side surface of the seventh lens 2370. In particular, the image-side surface of the seventh lens 2370 is concave in the paraxial region, and becomes convex toward an edge thereof.

Although not illustrated in FIG. 45, the stop is disposed at a distance of 1.250 mm from the object-side surface of the first lens 2310 toward the imaging plane of the optical imaging system. This distance is equal to TTL-SL and can be calculated from the values of TTL and SL for Example 23 listed in Table 57 that appears later in this application.

Table 45 below shows physical properties of the lenses and other elements of the optical imaging system of FIG. 45, and Table 46 below shows aspherical surface coefficients of the lenses of FIG. 45. Both surfaces of all of the lenses of FIG. 45 are aspherical.

TABLE 45

| Surface No. | Element | Radius of Curvature | Thickness/ Distance | Index of Refraction | Abbe Number | Effective Aperture Radius |
|---|---|---|---|---|---|---|
| S1 | First | 2.266953728 | 0.4 | 1.546 | 56.114 | 1.380 |
| S2 | Lens | 2.669137967 | 0.0250635 | | | 1.337 |
| S3 | Second | 2.623824881 | 0.8 | 1.546 | 56.114 | 1.337 |
| S4 | Lens | −11.8758231 | 0.025 | | | 1.298 |
| S5 | Third | 19.00320484 | 0.2526007 | 1.679 | 19.236 | 1.202 |
| S6 | Lens | 4.067642359 | 0.4108424 | | | 1.242 |
| S7 | Fourth | 6.69913266 | 0.35 | 1.679 | 19.236 | 1.265 |
| S8 | Lens | 7.219976522 | 0.4295582 | | | 1.369 |
| S9 | Fifth | 21.53098541 | 0.35 | 1.546 | 56.114 | 1.600 |
| S10 | Lens | 7.891788096 | 0.025 | | | 1.853 |
| S11 | Sixth | 2.50304521 | 0.43 | 1.546 | 56.114 | 1.908 |
| S12 | Lens | 2.4092608 | 0.2398918 | | | 2.372 |
| S13 | Seventh | 1.327452067 | 0.5253623 | 1.546 | 56.114 | 2.507 |
| S14 | Lens | 1.19470686 | 0.3215245 | | | 2.738 |
| S15 | Filter | Infinity | 0.21 | 1.518 | 64.197 | 3.205 |
| S16 | | Infinity | 0.7051565 | | | 3.285 |
| S17 | Imaging Plane | Infinity | | | | 3.781 |

TABLE 46

| | K | A | B | C | D | E | F | G | H | J |
|---|---|---|---|---|---|---|---|---|---|---|
| S1 | −1 | 0.00124 | −0.0631 | 0.08838 | −0.0759 | −0.0183 | 0.08244 | −0.0602 | 0.01898 | −0.0023 |
| S2 | −11.056 | 0.03802 | 0.1354 | −0.9871 | 1.56411 | −1.0995 | 0.32652 | 0.01084 | −0.0287 | 0.00476 |
| S3 | −0.7436 | −0.0807 | 0.57903 | −1.9725 | 2.93458 | −2.2115 | 0.82233 | −0.0859 | −0.0317 | 0.00756 |
| S4 | −7.2488 | −0.1245 | 0.58766 | −1.6544 | 2.89527 | −3.2415 | 2.31185 | −1.0127 | 0.24733 | −0.0257 |
| S5 | 12.3372 | −0.1601 | 0.47507 | −0.9119 | 1.14181 | −0.9059 | 0.42126 | −0.0904 | −0.0021 | 0.0031 |
| S6 | −0.7614 | −0.0925 | 0.17494 | −0.2349 | 0.22825 | −0.1666 | 0.07717 | −0.0124 | −0.0054 | 0.00212 |
| S7 | −12.018 | 0.04701 | −0.734 | 2.69199 | −5.8982 | 8.06267 | −6.9318 | 3.6331 | −1.0592 | 0.13158 |
| S8 | 5.83969 | −0.055 | 0.02382 | −0.178 | 0.4679 | −0.6732 | 0.58024 | −0.2983 | 0.08447 | −0.0101 |
| S9 | −43.467 | 0.02077 | −0.0298 | 0.06441 | −0.1157 | 0.10183 | −0.0488 | 0.0125 | −0.0016 | 7.1E−05 |
| S10 | −10.152 | −0.0392 | 0.01463 | 0.02558 | −0.0749 | 0.06753 | −0.0305 | 0.00743 | −0.0009 | 4.7E−05 |
| S11 | −16.19 | 0.09146 | −0.1594 | 0.2045 | −0.2282 | 0.1461 | −0.0541 | 0.01173 | −0.0014 | 6.9E−05 |
| S12 | −0.0871 | −0.1985 | 0.32772 | −0.3309 | 0.18662 | −0.0647 | 0.01412 | −0.0019 | 0.00014 | −4E−06 |
| S13 | −0.8728 | −0.462 | 0.28732 | −0.1331 | 0.04466 | −0.0104 | 0.00163 | −0.0002 | 9.4E−06 | −2E−07 |
| S14 | −1.5388 | −0.3036 | 0.18437 | −0.0807 | 0.02315 | −0.0042 | 0.00046 | −3E−05 | 1E−06 | −1E−08 |

Twenty-Fourth Example

Figure 47:
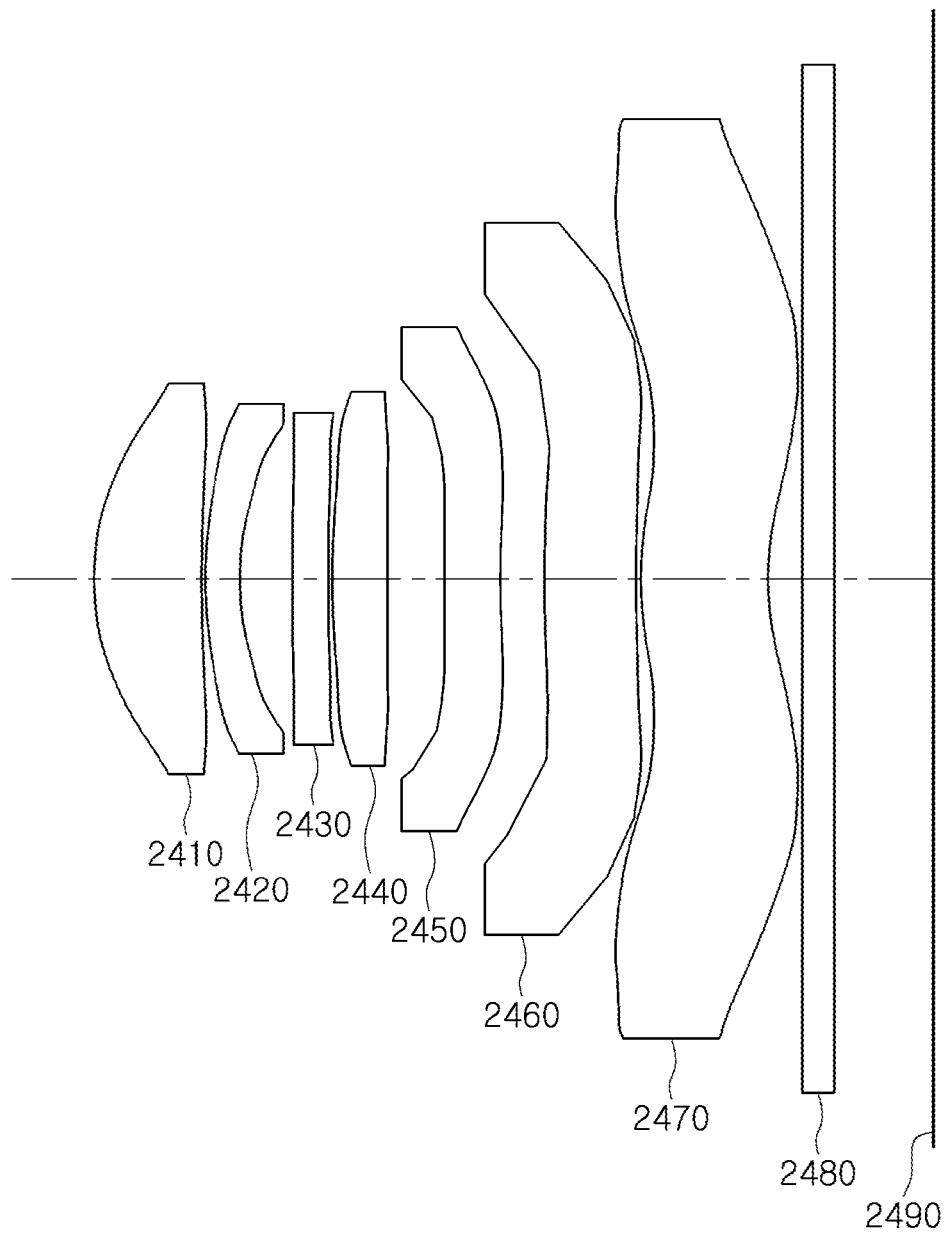
FIG. 47 is a view illustrating a twenty-fourth example of an optical imaging system.
Figure 48:
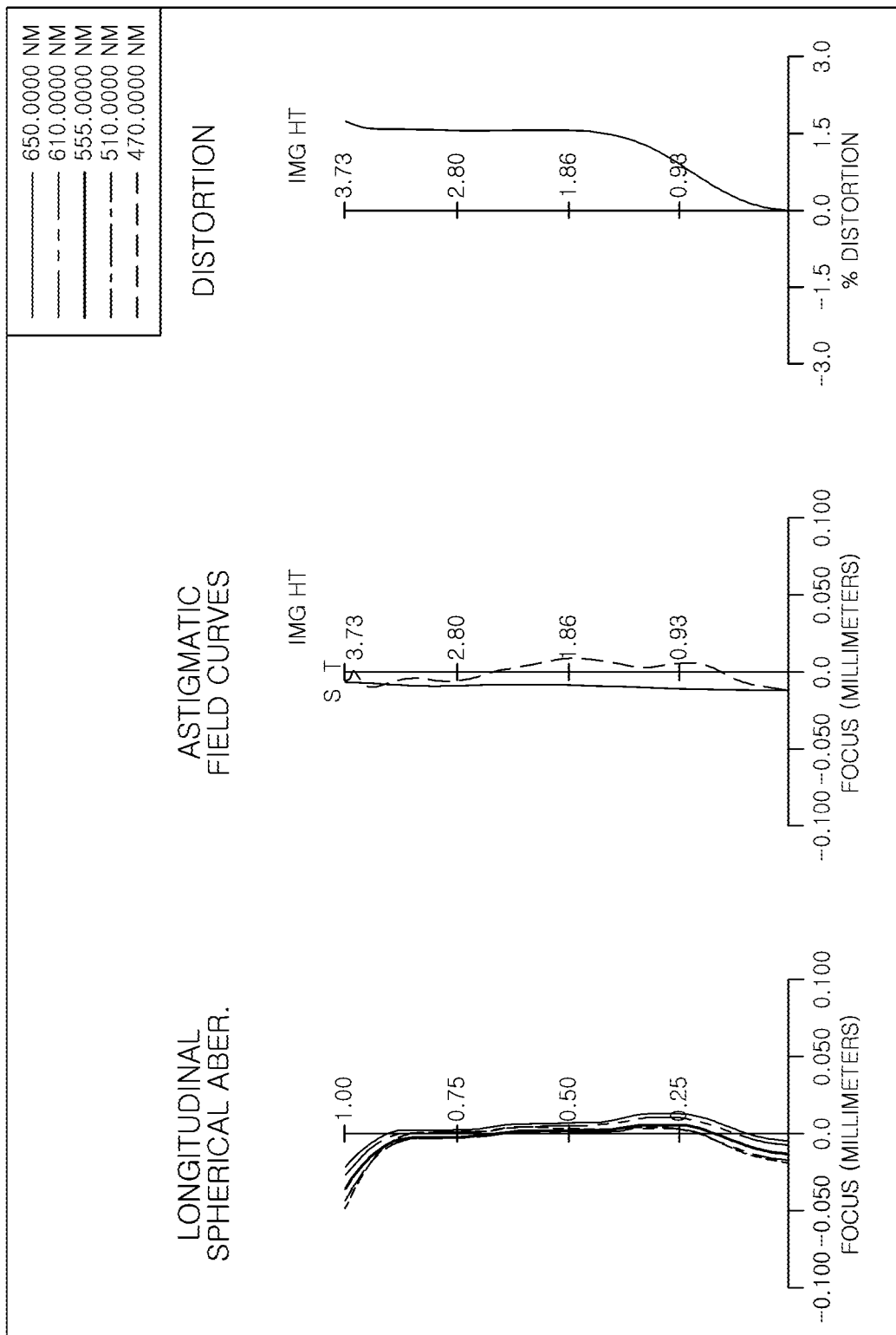
FIG. 48 illustrates aberration curves of the optical imaging system of FIG. 47.

FIG. 47 is a view illustrating a twenty-fourth example of an optical imaging system, and FIG. 48 illustrates aberration curves of the optical imaging system of FIG. 47.

The twenty-fourth example of the optical imaging system includes a first lens 2410, a second lens 2420, a third lens 2430, a fourth lens 2440, a fifth lens 2450, a sixth lens 2460, a seventh lens 2470, a filter 2480, an image sensor 2490, and a stop (not shown) disposed between the second lens 2420 and the third lens 2430.

The first lens 2410 has a positive refractive power, a paraxial region of an object-side surface thereof is convex, and a paraxial region of an image-side surface thereof is concave.

The second lens 2420 has a negative refractive power, a paraxial region of an object-side surface thereof is convex, and a paraxial region of an image-side surface thereof is concave.

The third lens 2430 has a negative refractive power, a paraxial region of an object-side surface thereof is convex, and a paraxial region of an image-side surface thereof is concave.

The fourth lens 2440 has a positive refractive power, a paraxial region of an object-side surface thereof is convex, and a paraxial region of an image-side surface thereof is concave.

The fifth lens 2450 has a negative refractive power, a paraxial region of an object-side surface thereof is convex, and a paraxial region of an image-side surface thereof is concave.

The sixth lens 2460 has a negative refractive power, and a paraxial region of each of an object-side surface and an image-side surface thereof is concave.

The seventh lens 2470 has a positive refractive power, a paraxial region of an object-side surface thereof is convex, and a paraxial region of an image-side surface thereof is concave.

Two inflection points are formed on the object-side surface of the seventh lens 2470. In particular, the object-side surface of the seventh lens 2470 is convex in the paraxial region, becomes concave in a region outside the paraxial region, and becomes convex toward an edge thereof.

In addition, one inflection point is formed on the image-side surface of the seventh lens 2470. In particular, the image-side surface of the seventh lens 2470 is concave in the paraxial region, and becomes convex toward an edge thereof.

Although not illustrated in FIG. 47, the stop is disposed at a distance of 0.951 mm from the object-side surface of the first lens 2410 toward the imaging plane of the optical imaging system. This distance is equal to TTL-SL and can be calculated from the values of TTL and SL for Example 24 listed in Table 57 that appears later in this application.

Table 47 below shows physical properties of the lenses and other elements of the optical imaging system of FIG. 47, and Table 48 below shows aspherical surface coefficients of the lenses of FIG. 47. Both surfaces of all of the lenses of FIG. 47 are aspherical.

Twenty-Fifth Example

Figure 49:
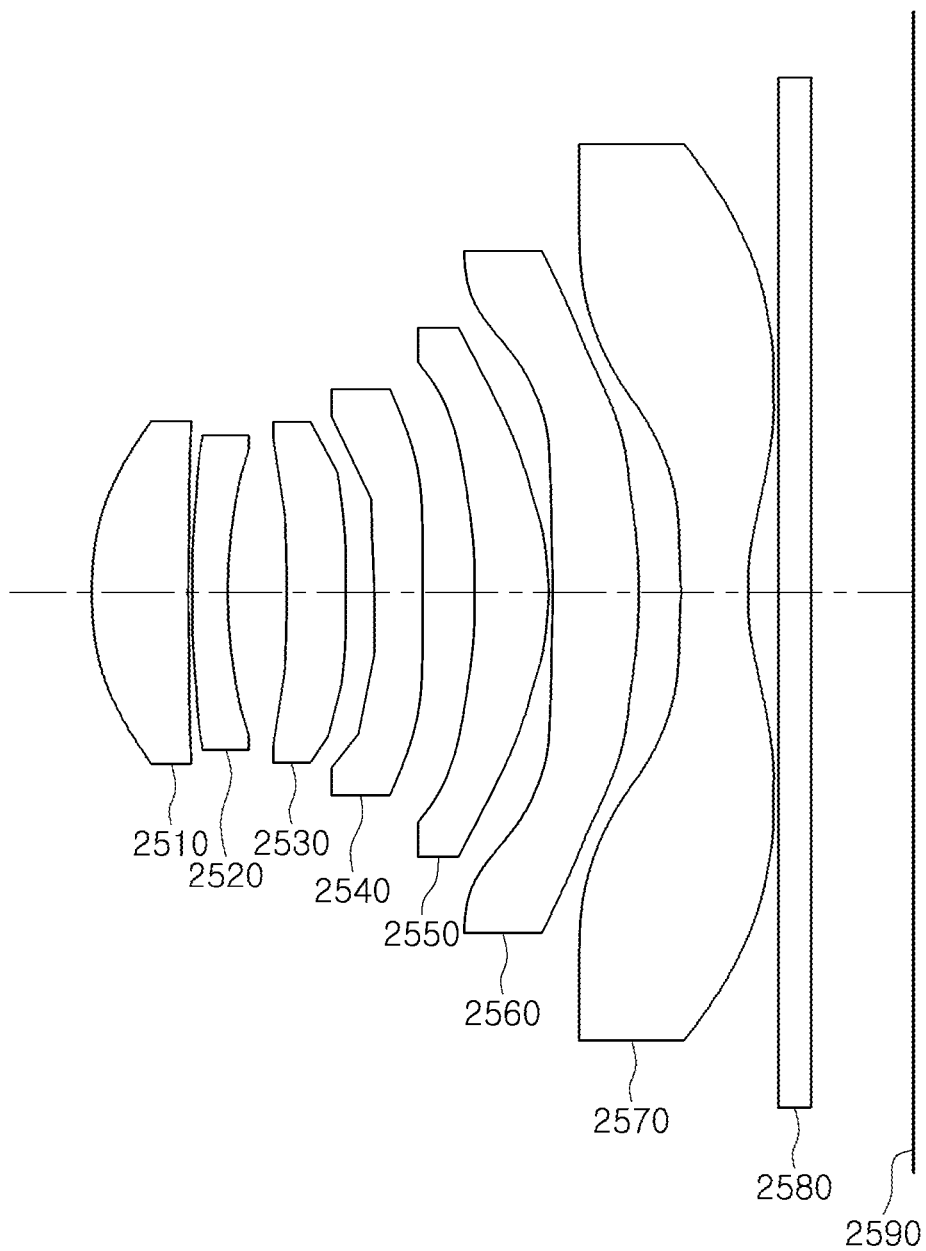
FIG. 49 is a view illustrating a twenty-fifth example of an optical imaging system.
Figure 50:
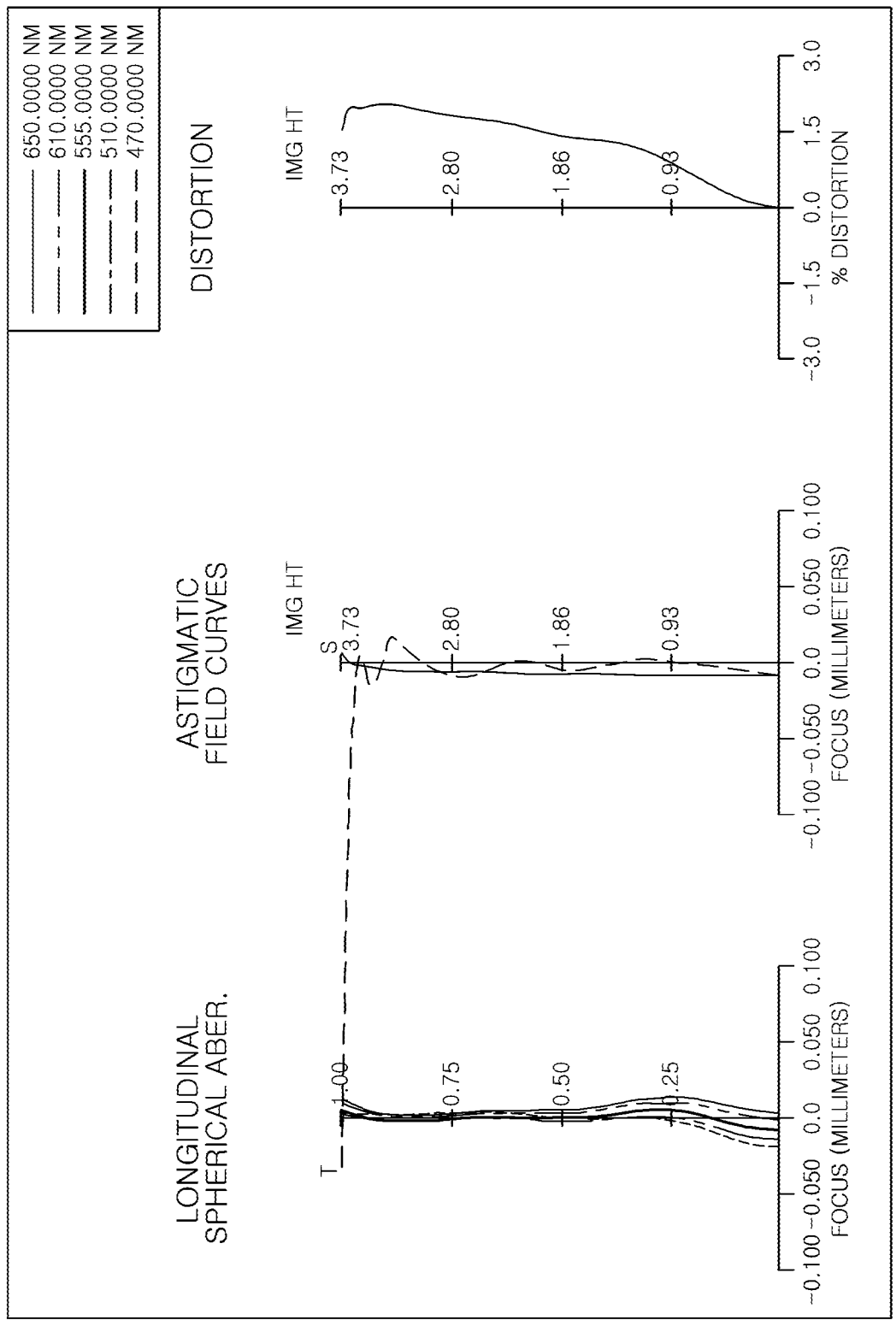
FIG. 50 illustrates aberration curves of the optical imaging system of FIG. 49.

FIG. 49 is a view illustrating a twenty-fifth example of an optical imaging system, and FIG. 50 illustrates aberration curves of the optical imaging system of FIG. 49.

The twenty-fifth example of the optical imaging system includes a first lens 2510, a second lens 2520, a third lens 2530, a fourth lens 2540, a fifth lens 2550, a sixth lens 2560, a seventh lens 2570, a filter 2580, an image sensor 2590, and a stop (not shown) disposed between the second lens 2520 and the third lens 2530.

The first lens 2510 has a positive refractive power, a paraxial region of an object-side surface thereof is convex, and a paraxial region of an image-side surface thereof is concave.

The second lens 2520 has a negative refractive power, a paraxial region of an object-side surface thereof is convex, and a paraxial region of an image-side surface thereof is concave.

The third lens 2530 has a positive refractive power, a paraxial region of an object-side surface thereof is concave, and a paraxial region of an image-side surface thereof is convex.

TABLE 47

| Surface No. | Element | Radius of Curvature | Thickness/ Distance | Index of Refraction | Abbe Number | Effective Aperture Radius |
|---|---|---|---|---|---|---|
| S1 | First | 1.747305824 | 0.6964434 | 1.546 | 56.114 | 1.280 |
| S2 | Lens | 9.408357314 | 0.025 | | | 1.247 |
| S3 | Second | 2.976586304 | 0.23 | 1.667 | 20.353 | 1.150 |
| S4 | Lens | 1.956424017 | 0.3428009 | | | 1.007 |
| S5 | Third | 16.8676436 | 0.2300239 | 1.667 | 20.353 | 1.032 |
| S6 | Lens | 16.01257049 | 0.0294424 | | | 1.089 |
| S7 | Fourth | 7.314351738 | 0.356959 | 1.546 | 56.114 | 1.130 |
| S8 | Lens | 17.39191974 | 0.3707783 | | | 1.228 |
| S9 | Fifth | 11.56172447 | 0.3608202 | 1.656 | 21.525 | 1.317 |
| S10 | Lens | 6.918405514 | 0.2917084 | | | 1.657 |
| S11 | Sixth | −97.16346173 | 0.5907913 | 1.656 | 21.525 | 1.878 |
| S12 | Lens | 17.27666898 | 0.0301253 | | | 2.338 |
| S13 | Seventh | 1.932241094 | 0.8257708 | 1.546 | 56.114 | 2.961 |
| S14 | Lens | 1.739016534 | 0.2207138 | | | 3.015 |
| S15 | Filter | Infinity | 0.21 | 1.518 | 64.197 | 3.305 |
| S16 | | Infinity | 0.6498919 | | | 3.375 |
| S17 | Imaging Plane | Infinity | | | | 3.731 |

TABLE 48

| | K | A | B | C | D | E | F | G | H | J |
|---|---|---|---|---|---|---|---|---|---|---|
| S1 | −0.3029 | 0.00034 | 0.02484 | −0.0645 | 0.08868 | −0.0757 | 0.0373 | −0.0109 | 0.00139 | 0 |
| S2 | 0.99973 | −0.0385 | 0.05948 | −0.0639 | 0.00521 | 0.0552 | −0.0624 | 0.02956 | −0.0054 | 0 |
| S3 | −1.759 | −0.0559 | 0.07693 | −0.084 | 0.09591 | −0.0711 | 0.03087 | −0.0026 | −0.0012 | 0 |
| S4 | −0.2233 | −0.022 | −0.0153 | 0.13577 | −0.2648 | 0.33105 | −0.2167 | 0.05099 | 0.00976 | 0 |
| S5 | −0.8179 | −0.0092 | −0.0103 | −0.1607 | 0.63034 | −1.1881 | 1.27457 | −0.7449 | 0.18468 | 0 |
| S6 | −0.0005 | 0.01997 | −0.1312 | 0.11419 | −0.0014 | 0.0632 | −0.1761 | 0.13356 | −0.0335 | 0 |
| S7 | −31.717 | 0.02656 | −0.0935 | −0.0104 | 0.2126 | −0.2049 | 0.0541 | 0.02004 | −0.0098 | 0 |
| S8 | −1.0151 | −0.0315 | 0.02884 | −0.0714 | 0.09345 | −0.1394 | 0.17678 | −0.1344 | 0.05241 | −0.0076 |
| S9 | 0.382 | −0.1094 | 0.03271 | −0.0826 | 0.21377 | −0.3162 | 0.24272 | −0.0962 | 0.01564 | 0 |
| S10 | −27.524 | −0.0394 | −0.117 | 0.16282 | −0.1238 | 0.05513 | −0.0144 | 0.00227 | −0.0002 | 0 |
| S11 | 23.2031 | 0.18019 | −0.2793 | 0.22076 | −0.1258 | 0.0475 | −0.0113 | 0.00159 | −0.0001 | 0 |
| S12 | −49.948 | 0.03358 | −0.0362 | 0.00983 | −0.0011 | −0.0001 | 7.6E−05 | −1E−05 | 6.1E−07 | 0 |
| S13 | −1.8504 | −0.2437 | 0.10759 | −0.031 | 0.00661 | −0.001 | 0.0001 | −6E−06 | 1.5E−07 | 0 |
| S14 | −0.8299 | −0.173 | 0.06293 | −0.0196 | 0.00438 | −0.0006 | 5.8E−05 | −3E−06 | 6.1E−08 | 0 |

The fourth lens 2540 has a negative refractive power, a paraxial region of an object-side surface thereof is convex, and a paraxial region of an image-side surface thereof is concave.

The fifth lens 2550 has a positive refractive power, a paraxial region of an object-side surface thereof is concave, and a paraxial region of an image-side surface thereof is convex.

be calculated from the values of TTL and SL for Example 25 listed in Table 57 that appears later in this application.

Table 49 below shows physical properties of the lenses and other elements of the optical imaging system of FIG. 49, and Table 50 below shows aspherical surface coefficients of the lenses of FIG. 49. Both surfaces of all of the lenses of FIG. 49 are aspherical.

TABLE 49

| Surface No. | Element | Radius of Curvature | Thickness/ Distance | Index of Refraction | Abbe Number | Effective Aperture Radius |
|---|---|---|---|---|---|---|
| S1 | First | 1.76028791 | 0.6171815 | 1.546 | 56.114 | 1.100 |
| S2 | Lens | 14.12333348 | 0.025 | | | 1.040 |
| S3 | Second | 5.834118934 | 0.23 | 1.667 | 20.353 | 1.011 |
| S4 | Lens | 3.122671446 | 0.3733379 | | | 0.919 |
| S5 | Third | −49.94173366 | 0.3798697 | 1.546 | 56.114 | 0.995 |
| S6 | Lens | −15.18699611 | 0.1809039 | | | 1.096 |
| S7 | Fourth | 23.36800299 | 0.3031664 | 1.667 | 20.353 | 1.124 |
| S8 | Lens | 12.20982926 | 0.3354305 | | | 1.309 |
| S9 | Fifth | −4.394771982 | 0.4728905 | 1.546 | 56.114 | 1.471 |
| S10 | Lens | −1.598299305 | 0.025 | | | 1.698 |
| S11 | Sixth | −6.081499124 | 0.5446656 | 1.546 | 56.114 | 1.822 |
| S12 | Lens | −3.014533539 | 0.2724323 | | | 2.192 |
| S13 | Seventh | −6.149442968 | 0.42237 | 1.546 | 56.114 | 2.462 |
| S14 | Lens | 1.636694252 | 0.1933361 | | | 2.880 |
| S15 | Filter | Infinity | 0.21 | 1.518 | 64.197 | 3.223 |
| S16 | | Infinity | 0.6544156 | | | 3.300 |
| S17 | Imaging Plane | Infinity | | | | 3.728 |

TABLE 50

| | K | A | B | C | D | E | F | G | H | J |
|---|---|---|---|---|---|---|---|---|---|---|
| S1 | −1.0054 | 0.02246 | 0.02216 | −0.0696 | 0.16036 | −0.2238 | 0.18065 | −0.0791 | 0.01412 | 0 |
| S2 | −1.5097 | −0.1275 | 0.3975 | −0.6982 | 0.68012 | −0.322 | 0.02875 | 0.02904 | −0.0076 | 0 |
| S3 | 6.02943 | −0.163 | 0.45041 | −0.8514 | 1.05249 | −0.8203 | 0.42351 | −0.138 | 0.0213 | 0 |
| S4 | −0.8846 | −0.0449 | 0.03929 | 0.15739 | −0.6934 | 1.31707 | −1.3069 | 0.67995 | −0.143 | 0 |
| S5 | 0 | −0.0513 | −0.0193 | −0.016 | 0.00429 | 0.00341 | −0.0155 | 0.03192 | −0.0128 | 0 |
| S6 | 0 | −0.1089 | −0.0569 | 0.35761 | −0.9255 | 1.19468 | −0.8604 | 0.33221 | −0.0547 | 0 |
| S7 | −7.5 | −0.2139 | −0.0107 | 0.17878 | −0.1827 | −0.1159 | 0.3046 | −0.1897 | 0.04049 | 0 |
| S8 | −43.341 | −0.1402 | −0.061 | 0.2777 | −0.4123 | 0.3523 | −0.1857 | 0.05641 | −0.0071 | 0 |
| S9 | −35.081 | −0.0602 | 0.07357 | −0.1046 | 0.10843 | −0.0726 | 0.02553 | −0.0041 | 0.00022 | 0 |
| S10 | −1.5734 | 0.16205 | −0.2197 | 0.18955 | −0.107 | 0.03959 | −0.0091 | 0.00113 | −6E−05 | 0 |
| S11 | 0.51533 | 0.21373 | −0.3167 | 0.23989 | −0.1217 | 0.03837 | −0.0069 | 0.00066 | −3E−05 | 0 |
| S12 | −1.1466 | 0.19671 | −0.2565 | 0.15417 | −0.0532 | 0.01146 | −0.0015 | 0.00012 | −4E−06 | 0 |
| S13 | −0.9056 | −0.0077 | −0.2094 | 0.18829 | −0.0749 | 0.01671 | −0.0022 | 0.00015 | −5E−06 | 0 |
| S14 | −1.2797 | −0.2192 | 0.10065 | −0.0338 | 0.00878 | −0.0018 | 0.00026 | −2E−05 | 1.3E−06 | −3E−08 |

The sixth lens 2560 has a positive refractive power, a paraxial region of an object-side surface thereof is concave, and a paraxial region of an image-side surface thereof is convex.

The seventh lens 2570 has a negative refractive power, and a paraxial region of each of an object-side surface and an image-side surface thereof is concave.

No inflection point is formed on the object-side surface of the seventh lens 2570.

In addition, one inflection point is formed on the image-side surface of the seventh lens 2570. In particular, the image-side surface of the seventh lens 2570 is concave in the paraxial region, and becomes convex toward an edge thereof.

Figure 51:
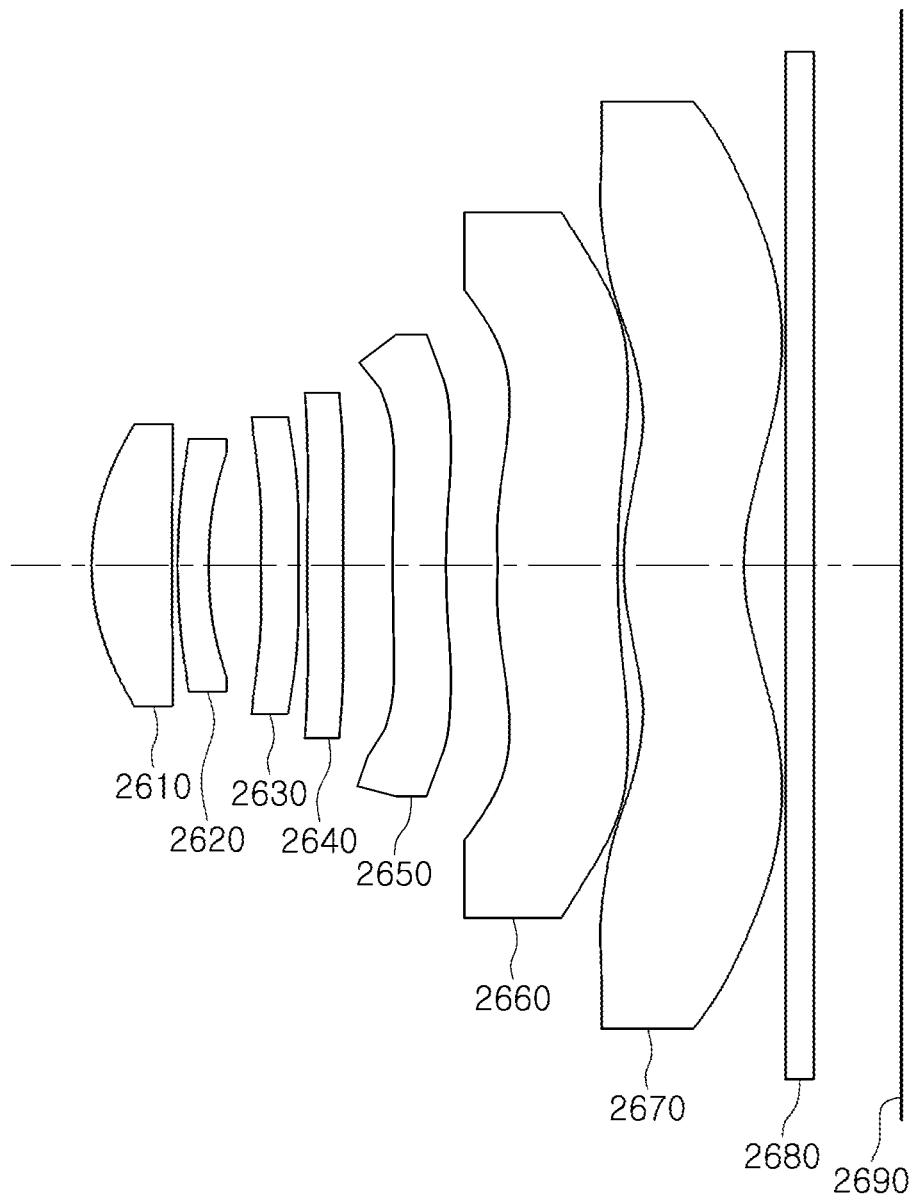
FIG. 51 is a view illustrating a twenty-sixth example of an optical imaging system.
Figure 52:
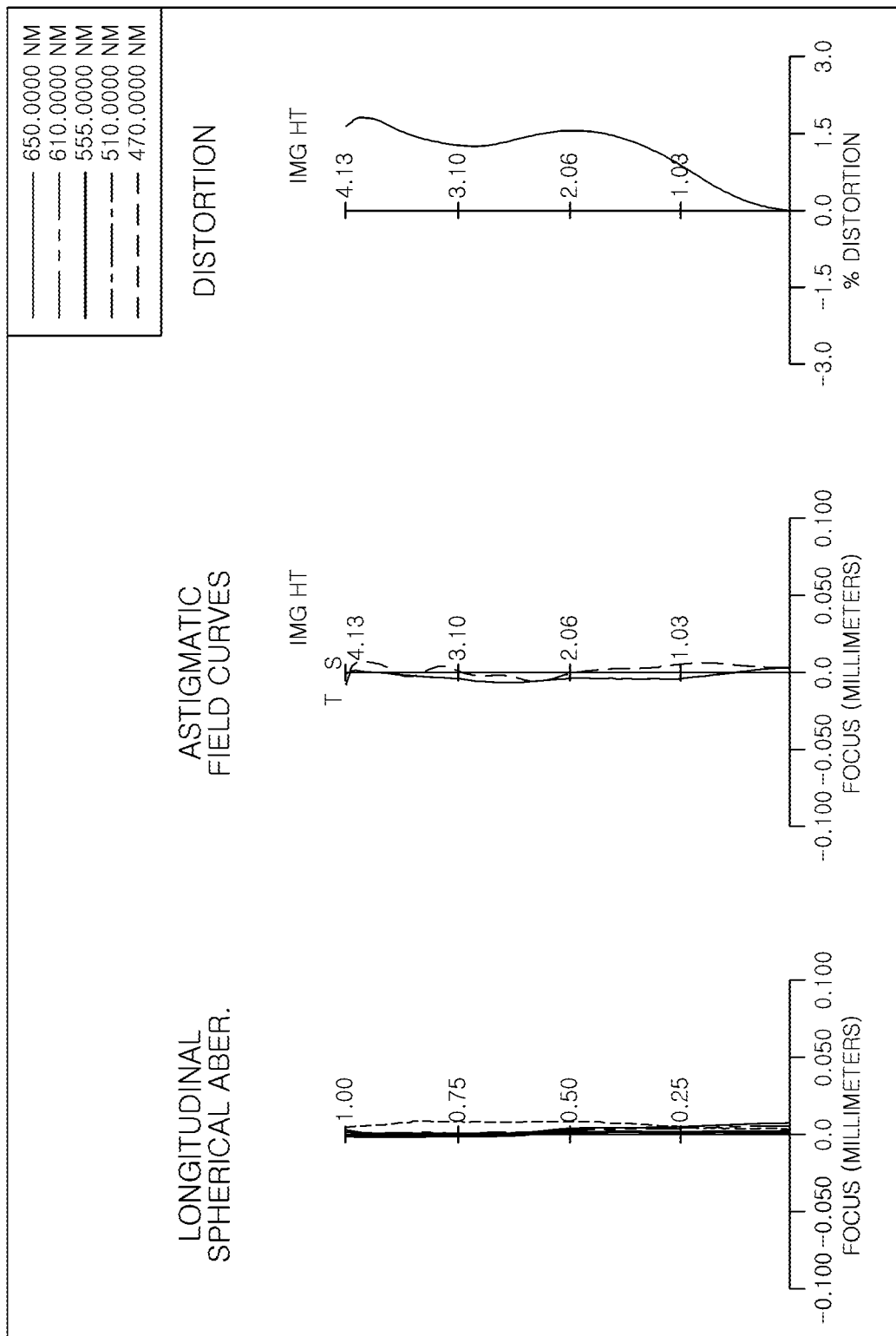
FIG. 52 illustrates aberration curves of the optical imaging system of FIG. 51.

Although not illustrated in FIG. 49, the stop is disposed at a distance of 0.872 mm from the object-side surface of the first lens 2510 toward the imaging plane of the optical imaging system. This distance is equal to TTL-SL and can Twenty-Sixth Example FIG. 51 is a view illustrating a twenty-sixth example of an optical imaging system, and FIG. 52 illustrates aberration curves of the optical imaging system of FIG. 51.

The twenty-sixth example of the optical imaging system includes a first lens 2610, a second lens 2620, a third lens 2630, a fourth lens 2640, a fifth lens 2650, a sixth lens 2660, a seventh lens 2670, a filter 2680, an image sensor 2690, and a stop (not shown) disposed between the second lens 2620 and the third lens 2630.

The first lens 2610 has a positive refractive power, a paraxial region of an object-side surface thereof is convex, and a paraxial region of an image-side surface thereof is concave.

The second lens 2620 has a negative refractive power, a paraxial region of an object-side surface thereof is convex, and a paraxial region of an image-side surface thereof is concave.

The third lens 2630 has a positive refractive power, a paraxial region of an object-side surface thereof is concave. and a paraxial region of an image-side surface thereof is convex.

The fourth lens 2640 has a positive refractive power, a paraxial region of an object-side surface thereof is convex, and a paraxial region of an image-side surface thereof is concave.

The fifth lens 2650 has a negative refractive power, a paraxial region of an object-side surface thereof is convex, and a paraxial region of an image-side surface thereof is concave.

The sixth lens 2660 has a positive refractive power, a paraxial region of an object-side surface thereof is convex, and a paraxial region of an image-side surface thereof is concave.

The seventh lens 2670 has a positive refractive power, a paraxial region of an object-side surface thereof is convex, and a paraxial region of an image-side surface thereof is concave.

Two inflection points are formed on the object-side surface of the seventh lens 2670. In particular, the object-side surface of the seventh lens 2670 is convex in the paraxial region, becomes concave in a region outside the paraxial region, and becomes convex toward an edge thereof.

In addition, one inflection point is formed on the image-side surface of the seventh lens 2670. In particular, the image-side surface of the seventh lens 2670 is concave in the paraxial region, and becomes convex toward an edge thereof.

Although not illustrated in FIG. 51, the stop is disposed at a distance of 0.866 mm from the object-side surface of the first lens 2610 toward the imaging plane of the optical imaging system. This distance is equal to TTL-SL and can be calculated from the values of TTL and SL for Example 26 listed in Table 57 that appears later in this application.

Table 51 below shows physical properties of the lenses and other elements of the optical imaging system of FIG. 51, and Table 52 below shows aspherical surface coefficients of the lenses of FIG. 51. Both surfaces of all of the lenses of FIG. 51 are aspherical.

TABLE 51

| Surface No. | Element | Radius of Curvature | Thickness/ Distance | Index of Refraction | Abbe Number | Effective Aperture Radius |
|---|---|---|---|---|---|---|
| S1 | First | 1.882954913 | 0.5871918 | 1.546 | 56.114 | 1.050 |
| S2 | Lens | 18.07331507 | 0.0491976 | | | 0.962 |
| S3 | Second | 4.599463678 | 0.23 | 1.667 | 20.353 | 0.934 |
| S4 | Lens | 2.546377474 | 0.3929389 | | | 0.837 |
| S5 | Third | −21.75460448 | 0.2744632 | 1.546 | 56.114 | 1.100 |
| S6 | Lens | −13.51443301 | 0.0611157 | | | 1.106 |
| S7 | Fourth | 25.33486158 | 0.2655293 | 1.546 | 56.114 | 1.200 |
| S8 | Lens | 25.33602848 | 0.3710469 | | | 1.285 |
| S9 | Fifth | 9.468188048 | 0.3930453 | 1.656 | 21.525 | 1.500 |
| S10 | Lens | 5.10288098 | 0.3790363 | | | 1.754 |
| S11 | Sixth | 6.416223875 | 0.888499 | 1.546 | 56.114 | 2.041 |
| S12 | Lens | 6.352062001 | 0.0460253 | | | 2.631 |
| S13 | Seventh | 1.966539749 | 0.8854198 | 1.536 | 55.656 | 3.050 |
| S14 | Lens | 1.769884599 | 0.3097825 | | | 3.456 |
| S15 | Filter | Infinity | 0.21 | 1.518 | 64.197 | 3.768 |
| S16 | | Infinity | 0.65 | | | 3.829 |
| S17 | Imaging Plane | Infinity | | | | 4.129 |

TABLE 52

| | K | A | B | C | D | E | F | G | H | J |
|---|---|---|---|---|---|---|---|---|---|---|
| S1 | −0.1525 | 0.00346 | 0.00541 | −0.0238 | 0.05874 | −0.0925 | 0.08078 | −0.0376 | 0.00687 | 0 |
| S2 | −36.188 | −0.0554 | 0.19103 | −0.4954 | 0.90918 | −1.1194 | 0.84898 | −0.3546 | 0.06168 | 0 |
| S3 | −0.1164 | −0.0883 | 0.22642 | −0.5273 | 0.9947 | −1.274 | 1.01042 | −0.4343 | 0.07596 | 0 |
| S4 | 0.3326 | −0.0462 | 0.09702 | −0.2316 | 0.5455 | −0.848 | 0.78539 | −0.3759 | 0.07082 | 0 |
| S5 | 51.7577 | −0.0119 | −0.0911 | 0.36173 | −0.9067 | 1.38454 | −1.3014 | 0.68351 | −0.1493 | 0 |
| S6 | 42.1637 | 0.0924 | −0.5269 | 1.35579 | −2.2584 | 2.50931 | −1.8107 | 0.76109 | −0.139 | 0 |
| S7 | −4.7579 | 0.13357 | −0.5938 | 1.26101 | −1.8115 | 1.7924 | −1.1666 | 0.44267 | −0.0728 | 0 |
| S8 | −3.4393 | 0.04714 | −0.1842 | 0.28859 | −0.3575 | 0.32734 | −0.1971 | 0.06695 | −0.0093 | 0 |
| S9 | −8.5449 | −0.0502 | −0.0588 | 0.15989 | −0.2027 | 0.13981 | −0.0542 | 0.01046 | −0.0007 | 0 |
| S10 | −18.064 | −0.044 | −0.0734 | 0.14254 | −0.1303 | 0.06906 | −0.0217 | 0.00378 | −0.0003 | 0 |
| S11 | −4.6497 | 0.06328 | −0.1193 | 0.08822 | −0.0426 | 0.01348 | −0.0028 | 0.00037 | −2E−05 | 0 |
| S12 | −50 | 0.03403 | −0.0497 | 0.02457 | −0.0072 | 0.00126 | −0.0001 | 6.9E−06 | −2E−07 | 0 |
| S13 | −2.4291 | −0.1201 | 0.01667 | 0.00224 | −0.0009 | 0.00011 | −6E−06 | 1.3E−07 | 8.8E−10 | 0 |
| S14 | −1.0032 | −0.1111 | 0.02485 | −0.0032 | −0.0001 | 0.00013 | −2E−05 | 1.9E−06 | −8E−08 | 1.4E−09 |

Twenty-Seventh Example

Figure 53:
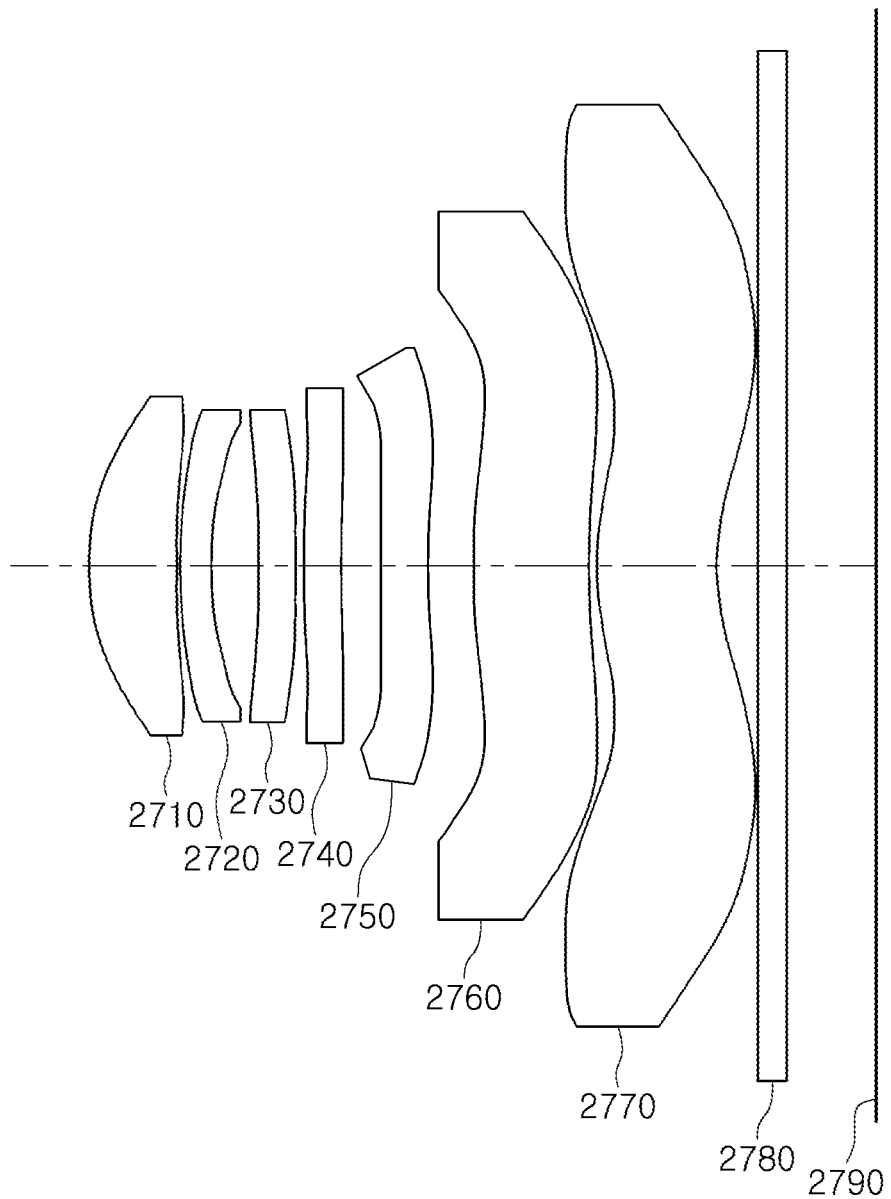
FIG. 53 is a view illustrating a twenty-seventh example of an optical imaging system.
Figure 54:
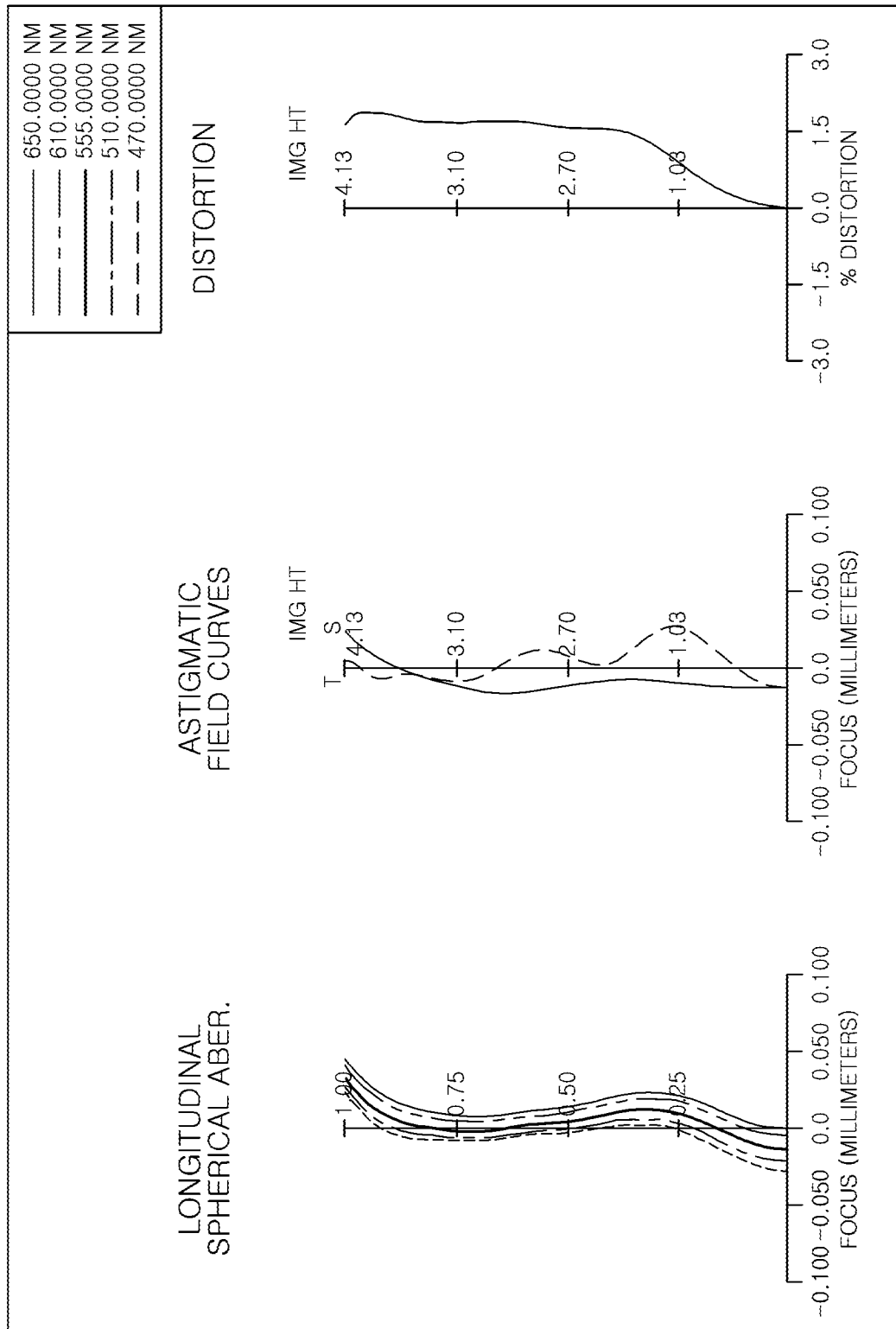
FIG. 54 illustrates aberration curves of the optical imaging system of FIG. 53.

FIG. 53 is a view illustrating a twenty-seventh example of an optical imaging system, and FIG. 54 illustrates aberration curves of the optical imaging system of FIG. 53.

The twenty-seventh example of the optical imaging system includes a first lens 2710, a second lens 2720, a third lens 2730, a fourth lens 2740, a fifth lens 2750, a sixth lens 2760, a seventh lens 2770, a filter 2780, an image sensor 2790, and a stop (not shown) disposed between the second lens 2720 and the third lens 2730.

The first lens 2710 has a positive refractive power, a paraxial region of an object-side surface thereof is convex, and a paraxial region of an image-side surface thereof is concave.

The second lens 2720 has a negative refractive power, a paraxial region of an object-side surface thereof is convex, and a paraxial region of an image-side surface thereof is concave.

The third lens 2730 has a positive refractive power, a paraxial region of an object-side surface thereof is concave, and a paraxial region of an image-side surface thereof is convex.

The fourth lens 2740 has a positive refractive power, a paraxial region of an object-side surface thereof is convex, and a paraxial region of an image-side surface thereof is concave.

The fifth lens 2750 has a negative refractive power, a paraxial region of an object-side surface thereof is convex, and a paraxial region of an image-side surface thereof is concave.

The sixth lens 2760 has a positive refractive power, a paraxial region of an object-side surface thereof is convex, and a paraxial region of an image-side surface thereof is concave.

The seventh lens 2770 has a positive refractive power, a paraxial region of an object-side surface thereof is convex, and a paraxial region of an image-side surface thereof is concave.

Two inflection points are formed on the object-side surface of the seventh lens 2770. In particular, the object-side surface of the seventh lens 2770 is convex in the paraxial region, becomes concave in a region outside the paraxial region, and becomes convex toward an edge thereof.

In addition, one inflection point is formed on the image-side surface of the seventh lens 2770. In particular, the image-side surface of the seventh lens 2770 is concave in the paraxial region, and becomes convex toward an edge thereof.

Although not illustrated in FIG. 53, the stop is disposed at a distance of 0.904 mm from the object-side surface of the first lens 2710 toward the imaging plane of the optical imaging system. This distance is equal to TTL-SL and can be calculated from the values of TTL and SL for Example 27 listed in Table 57 that appears later in this application.

Table 53 below shows physical properties of the lenses and other elements of the optical imaging system of FIG. 53, and Table 54 below shows aspherical surface coefficients of the lenses of FIG. 53. Both surfaces of all of the lenses of FIG. 53 are aspherical.

TABLE 53

| Surface No. | Element | Radius of Curvature | Thickness/ Distance | Index of Refraction | Abbe Number | Effective Aperture Radius |
|---|---|---|---|---|---|---|
| S1 | First | 1.898698558 | 0.6486367 | 1.546 | 56.114 | 1.260 |
| S2 | Lens | 7.35678597 | 0.025 | | | 1.216 |
| S3 | Second | 3.87893073 | 0.23 | 1.667 | 20.353 | 1.161 |
| S4 | Lens | 2.762008891 | 0.3408168 | | | 1.053 |
| S5 | Third | −50.1241934 | 0.2818618 | 1.546 | 56.114 | 1.120 |
| S6 | Lens | −14.98893663 | 0.0597334 | | | 1.158 |
| S7 | Fourth | 12.04981408 | 0.269789 | 1.546 | 56.114 | 1.220 |
| S8 | Lens | 12.56574443 | 0.2918619 | | | 1.320 |
| S9 | Fifth | 9.592575983 | 0.35 | 1.667 | 20.353 | 1.520 |
| S10 | Lens | 5.27478585 | 0.3343756 | | | 1.762 |
| S11 | Sixth | 6.87350249 | 0.8484117 | 1.546 | 56.114 | 2.052 |
| S12 | Lens | 7.493319886 | 0.0591105 | | | 2.641 |
| S13 | Seventh | 2.033708385 | 0.8835732 | 1.536 | 55.656 | 3.070 |
| S14 | Lens | 1.843638917 | 0.3047846 | | | 3.425 |
| S15 | Filter | Infinity | 0.21 | 1.518 | 64.197 | 3.764 |
| S16 | | Infinity | 0.659116 | | | 3.825 |
| S17 | Imaging Plane | Infinity | | | | 4.134 |

TABLE 54

| | K | A | B | C | D | E | F | G | H | J |
|---|---|---|---|---|---|---|---|---|---|---|
| S1 | −0.1061 | −0.0082 | 0.0469 | −0.0925 | 0.08107 | −0.0129 | −0.032 | 0.02237 | −0.0047 | 0 |
| S2 | −36.188 | −0.0502 | 0.16245 | −0.4029 | 0.69307 | −0.7643 | 0.50209 | −0.1789 | 0.02641 | 0 |
| S3 | 0.0036 | −0.0795 | 0.20571 | −0.548 | 1.07416 | −1.291 | 0.90975 | −0.3412 | 0.05201 | 0 |
| S4 | 0.40382 | −0.0325 | 0.08844 | −0.3009 | 0.70037 | −0.9194 | 0.67381 | −0.2424 | 0.03077 | 0 |
| S5 | 51.7577 | 0.00548 | −0.1746 | 0.50176 | −0.9395 | 1.14417 | −0.9144 | 0.4407 | −0.0937 | 0 |
| S6 | 42.1637 | 0.09529 | −0.4992 | 1.03966 | −1.2284 | 0.81694 | −0.2802 | 0.03842 | 4E−06 | 0 |
| S7 | −4.7579 | 0.1185 | −0.4938 | 0.85535 | −0.8643 | 0.51674 | −0.185 | 0.04168 | −0.0054 | 0 |
| S8 | −3.4393 | 0.04916 | −0.194 | 0.31472 | −0.3773 | 0.32494 | −0.1878 | 0.06297 | −0.0088 | 0 |
| S9 | −8.5449 | −0.0638 | 0.02895 | −0.0884 | 0.16492 | −0.171 | 0.09832 | −0.0306 | 0.00409 | 0 |
| S10 | −18.064 | −0.0543 | −0.0172 | 0.03209 | −0.0179 | 0.00397 | 4.6E−06 | −0.0001 | 7.7E−06 | 0 |

TABLE 54-continued

|  | K | A | B | C | D | E | F | G | H | J |
|---|---|---|---|---|---|---|---|---|---|---|
| S11 | −4.6497 | 0.05354 | −0.0909 | 0.06134 | −0.0311 | 0.01102 | −0.0026 | 0.00036 | −2E−05 | 0 |
| S12 | −50 | 0.01031 | −0.0176 | 0.00573 | −0.0015 | 0.0003 | −4E−05 | 2.4E−06 | −6E−08 | 0 |
| S13 | −2.606 | −0.1177 | 0.01922 | −0.0004 | −1E−04 | −1E−05 | 4.5E−06 | −4E−07 | 9.4E−09 | 0 |
| S14 | −1.0102 | −0.0979 | 0.01866 | −0.0024 | 0.00013 | 2.1E−05 | −6E−06 | 5.9E−07 | −3E−08 | 5.6E−10 |

Twenty-Eighth Example

Figure 55:
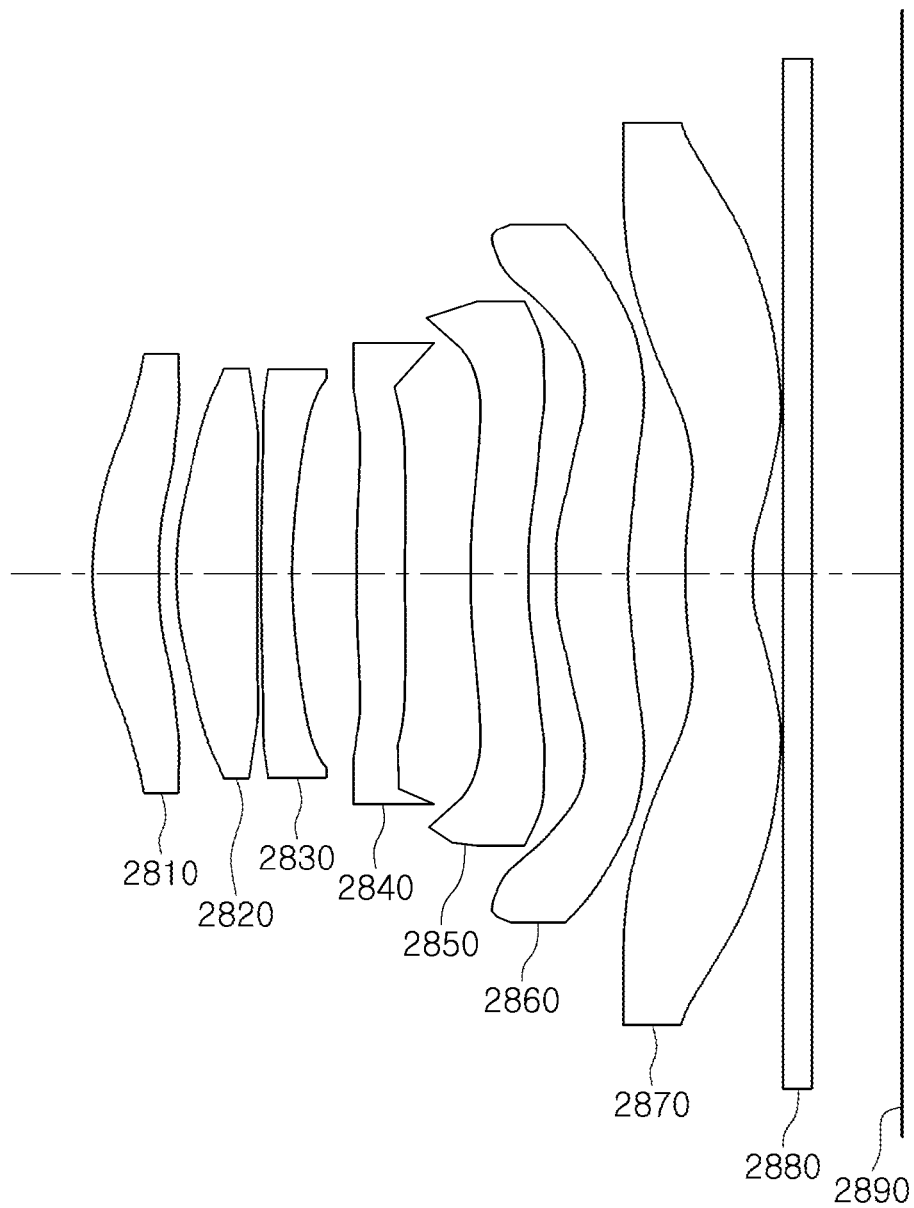
FIG. 55 is a view illustrating a twenty-eighth example of an optical imaging system.
Figure 56:
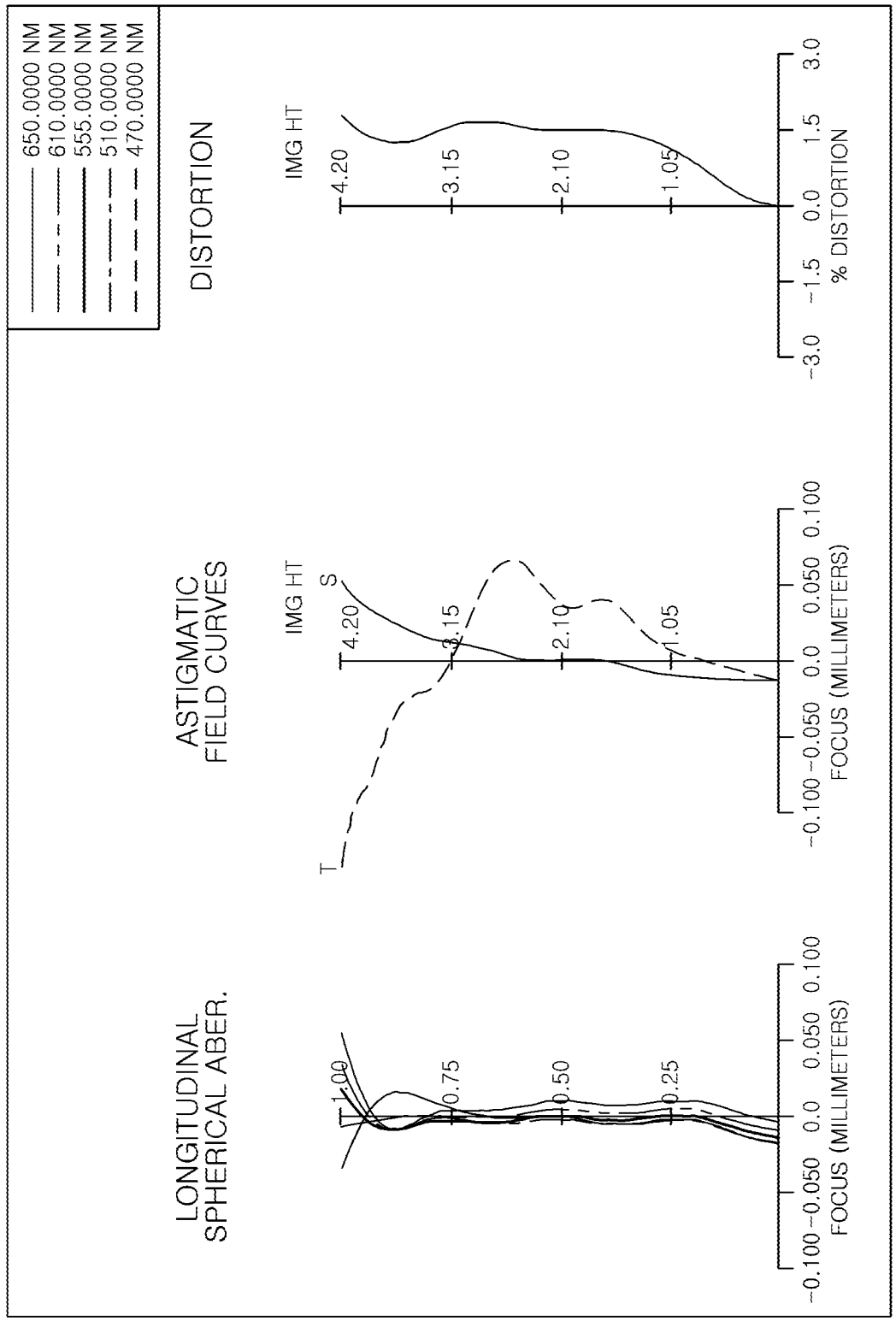
FIG. 56 illustrates aberration curves of the optical imaging system of FIG. 55.

FIG. 55 is a view illustrating a twenty-eighth example of an optical imaging system, and FIG. 56 illustrates aberration curves of the optical imaging system of FIG. 55.

The twenty-eighth example of the optical imaging system includes a first lens 2810, a second lens 2820, a third lens 2830, a fourth lens 2840, a fifth lens 2850, a sixth lens 2860, a seventh lens 2870, a filter 2880, an image sensor 2890, and a stop (not shown) disposed between the second lens 2820 and the third lens 2830.

The first lens 2810 has a positive refractive power, a paraxial region of an object-side surface thereof is convex, and a paraxial region of an image-side surface thereof is concave.

The second lens 2820 has a positive refractive power, a paraxial region of an object-side surface thereof is convex, and a paraxial region of an image-side surface thereof is concave.

The third lens 2830 has a negative refractive power, a paraxial region of an object-side surface thereof is convex, and a paraxial region of an image-side surface thereof is concave.

The fourth lens 2840 has a positive refractive power, a paraxial region of an object-side surface thereof is convex, and a paraxial region of an image-side surface thereof is concave.

The fifth lens 2850 has a negative refractive power, a paraxial region of an object-side surface thereof is convex, and a paraxial region of an image-side surface thereof is concave.

The sixth lens 2860 has a positive refractive power, a paraxial region of an object-side surface thereof is convex, and a paraxial region of an image-side surface thereof is concave.

The seventh lens 2870 has a negative refractive power, a paraxial region of an object-side surface thereof is convex, and a paraxial region of an image-side surface thereof is concave.

One inflection point is formed on the object-side surface of the seventh lens 2870. In particular, the object-side surface of the seventh lens 2870 is convex in the paraxial region, and becomes concave toward an edge thereof.

In addition, one inflection point is formed on the image-side surface of the seventh lens 2870. In particular, the image-side surface of the seventh lens 2870 is concave in the paraxial region, and becomes convex toward an edge thereof.

Although not illustrated in FIG. 55, the stop is disposed at a distance of 1.250 mm from the object-side surface of the first lens 2810 toward the imaging plane of the optical imaging system. This distance is equal to TTL-SL and can be calculated from the values of TTL and SL for Example 28 listed in Table 57 that appears later in this application.

Table 55 below shows physical properties of the lenses and other elements of the optical imaging system of FIG. 55, and Table 56 below shows aspherical surface coefficients of the lenses of FIG. 55. Both surfaces of all of the lenses of FIG. 55 are aspherical.

TABLE 55

| Surface No. | Element | Radius of Curvature | Thickness/ Distance | Index of Refraction | Abbe Number | Effective Aperture Radius |
|---|---|---|---|---|---|---|
| S1 | First | 2.281286206 | 0.4941042 | 1.546 | 56.114 | 1.640 |
| S2 | Lens | 2.718984257 | 0.130834 |  |  | 1.629 |
| S3 | Second | 2.708968394 | 0.6 | 1.546 | 56.114 | 1.595 |
| S4 | Lens | 37.24513877 | 0.025 |  |  | 1.593 |
| S5 | Third | 11.09599614 | 0.23 | 1.679 | 19.236 | 1.522 |
| S6 | Lens | 4.325963413 | 0.4819872 |  |  | 1.450 |
| S7 | Fourth | 8.709066519 | 0.3517002 | 1.656 | 21.525 | 1.514 |
| S8 | Lens | 14.98893268 | 0.4925536 |  |  | 1.555 |
| S9 | Fifth | 5.340621183 | 0.4256859 | 1.679 | 19.236 | 1.840 |
| S10 | Lens | 2.972144757 | 0.1952429 |  |  | 2.415 |
| S11 | Sixth | 2.121089724 | 0.5425262 | 1.546 | 56.114 | 2.362 |
| S12 | Lens | 4.981824211 | 0.4212041 |  |  | 2.717 |
| S13 | Seventh | 2.499873488 | 0.5046002 | 1.546 | 56.114 | 3.169 |
| S14 | Lens | 1.479444218 | 0.222977 |  |  | 3.372 |
| S15 | Filter | Infinity | 0.21 | 1.518 | 64.197 | 3.779 |
| S16 |  | Infinity | 0.6715509 |  |  | 3.848 |
| S17 | Imaging Plane | Infinity |  |  |  | 4.210 |

TABLE 56

|     | K        | A        | B        | C        | D        | E        | F        | G        | H        | J        |
|-----|----------|----------|----------|----------|----------|----------|----------|----------|----------|----------|
| S1  | −0.9867  | −0.0114  | 0.01114  | −0.0538  | 0.09172  | −0.0925  | 0.05422  | −0.0183  | 0.00331  | −0.0003  |
| S2  | −12.035  | 0.04793  | −0.173   | 0.26373  | −0.3194  | 0.25969  | −0.1301  | 0.03858  | −0.0062  | 0.00042  |
| S3  | −0.9455  | −0.0107  | −0.0528  | 0.10537  | −0.1922  | 0.21871  | −0.1388  | 0.04987  | −0.0096  | 0.00078  |
| S4  | 3.03842  | −0.0418  | 0.21624  | −0.5714  | 0.81428  | −0.6941  | 0.36425  | −0.1154  | 0.02022  | −0.0015  |
| S5  | 10.1638  | −0.0842  | 0.25831  | −0.5961  | 0.84391  | −0.7413  | 0.40425  | −0.1328  | 0.02406  | −0.0018  |
| S6  | 2.08088  | −0.0648  | 0.14243  | −0.2905  | 0.40945  | −0.3776  | 0.22243  | −0.0802  | 0.01628  | −0.0014  |
| S7  | −13.097  | −0.0215  | −0.0518  | 0.14502  | −0.2583  | 0.27772  | −0.1843  | 0.07327  | −0.0157  | 0.00138  |
| S8  | 5.85919  | −0.0435  | 0.0377   | −0.0856  | 0.10737  | −0.0887  | 0.04789  | −0.0161  | 0.00312  | −0.0003  |
| S9  | −43.521  | −0.0279  | 0.02278  | 0.01043  | −0.0468  | 0.04676  | −0.0253  | 0.00785  | −0.0013  | 9.2E−05  |
| S10 | −17.628  | −0.0671  | 0.04256  | −0.0048  | −0.0103  | 0.00685  | −0.0022  | 0.00038  | −4E−05   | 1.4E−06  |
| S11 | −9.8081  | 0.04258  | −0.1025  | 0.09185  | −0.0514  | 0.01771  | −0.0039  | 0.00056  | −5E−05   | 1.6E−06  |
| S12 | −0.0695  | 0.00481  | −0.0496  | 0.03792  | −0.0164  | 0.00397  | −0.0005  | 3.5E−05  | −8E−07   | −1E−08   |
| S13 | −0.6908  | −0.2261  | 0.04088  | 0.01294  | −0.0077  | 0.00168  | −0.0002  | 1.5E−05  | −6E−07   | 9.5E−09  |
| S14 | −1.419   | −0.2123  | 0.09039  | −0.0281  | 0.00628  | −0.001   | 9.3E−05  | −6E−06   | 1.8E−07  | −2E−09   |

Table 57 below shows an overall focal length f of the optical imaging system, an overall length TTL of the optical imaging system (a distance along the optical axis from the object-side surface of the first lens to the imaging plane), a distance SL along the optical axis from the stop to the imaging plane, an f-number (F No.) of the optical imaging system (the overall focal length f of the optical imaging system divided by the diameter of an entrance pupil of the optical imaging system, where both f and the diameter of the entrance pupil are expressed in mm), an image height (IMG HT) on the imaging plane (one-half of a diagonal length of the imaging plane), and a field of view (FOV) of the optical imaging system for each of Examples 1-28 described herein. The values of f, TTL, SL, and IMG HT are expressed in mm. The values of F No. are dimensionless values. The values of FOV are expressed in degrees.

TABLE 57

| Example | f     | TTL   | SL    | F No. | IMG HT | FOV   |
|---------|-------|-------|-------|-------|--------|-------|
| 1       | 4.824 | 6.000 | 5.071 | 1.51  | 4.000  | 78.10 |
| 2       | 4.803 | 6.000 | 5.046 | 1.48  | 4.000  | 78.40 |
| 3       | 4.650 | 5.400 | 4.423 | 1.80  | 4.000  | 80.00 |
| 4       | 4.804 | 5.750 | 4.688 | 1.60  | 3.930  | 77.10 |
| 5       | 4.780 | 5.827 | 4.402 | 1.57  | 4.050  | 79.02 |
| 6       | 3.950 | 4.819 | 3.650 | 1.58  | 3.250  | 77.47 |
| 7       | 4.350 | 5.300 | 4.917 | 1.58  | 3.384  | 79.58 |
| 8       | 4.020 | 4.901 | 4.565 | 1.58  | 3.400  | 79.28 |
| 9       | 4.784 | 5.787 | 5.364 | 1.58  | 4.000  | 78.52 |
| 10      | 4.280 | 5.100 | 4.369 | 1.71  | 3.535  | 77.84 |
| 11      | 4.450 | 5.400 | 4.669 | 1.69  | 3.261  | 71.28 |
| 12      | 4.144 | 5.026 | 4.299 | 1.58  | 3.261  | 75.78 |
| 13      | 4.401 | 5.300 | 4.142 | 1.69  | 3.728  | 79.31 |
| 14      | 4.511 | 5.500 | 4.420 | 1.66  | 3.728  | 77.85 |
| 15      | 4.823 | 5.865 | 4.687 | 1.66  | 3.728  | 73.38 |
| 16      | 4.447 | 5.144 | 4.894 | 2.07  | 3.528  | 75.63 |
| 17      | 4.400 | 5.200 | 4.576 | 1.81  | 3.261  | 72.55 |
| 18      | 3.994 | 5.125 | 4.484 | 1.57  | 3.261  | 77.38 |
| 19      | 4.390 | 5.260 | 4.310 | 1.67  | 3.528  | 76.69 |
| 20      | 4.340 | 5.260 | 4.320 | 1.62  | 3.528  | 76.91 |
| 21      | 4.020 | 4.940 | 3.938 | 1.58  | 3.226  | 76.00 |
| 22      | 4.594 | 5.600 | 4.855 | 1.72  | 4.200  | 83.44 |
| 23      | 4.498 | 5.500 | 4.250 | 1.63  | 3.728  | 78.01 |
| 24      | 4.586 | 5.461 | 4.510 | 1.79  | 3.728  | 76.96 |
| 25      | 4.302 | 5.240 | 4.368 | 1.95  | 3.728  | 80.46 |
| 26      | 4.966 | 5.993 | 5.127 | 2.36  | 4.128  | 78.45 |
| 27      | 4.667 | 5.797 | 4.893 | 1.85  | 4.128  | 81.80 |
| 28      | 4.870 | 6.000 | 4.750 | 1.48  | 4.200  | 80.29 |

Table 58 below shows in mm a focal length f1 of the first lens, a focal length f2 of the second lens, a focal length f3 of the third lens, a focal length f4 of the fourth lens, a focal length f5 of the fifth lens, a focal length f6 of the sixth lens, and a focal length f7 of the seventh lens for each of Examples 1-28 described herein.

TABLE 58

| Example | f1       | f2       | f3        | f4          | f5       | f6       | f7       |
|---------|----------|----------|-----------|-------------|----------|----------|----------|
| 1       | 4.756    | −12.434  | 26.345    | −55.140     | −12.854  | 2.765    | −2.459   |
| 2       | 4.773    | −12.361  | 26.634    | −55.618     | −12.673  | 2.699    | −2.432   |
| 3       | 4.178    | −8.893   | 18.275    | 37.848      | −15.676  | 30.527   | −16.070  |
| 4       | 4.277    | −10.455  | 21.003    | 35.561      | −16.519  | 80.332   | −15.182  |
| 5       | 10.035   | 5.292    | −7.613    | 22346862.05 | 86.584   | −27.728  | 146.074  |
| 6       | 8.409    | 4.355    | −6.520    | −4512.292   | 74.369   | −22.452  | 1842.731 |
| 7       | −64.233  | 3.248    | −7.428    | −43.722     | 52.425   | 3.010    | −2.424   |
| 8       | −38.662  | 2.911    | −6.813    | −43.728     | 59.023   | 2.640    | −2.116   |
| 9       | −104.603 | 3.650    | −8.142    | −56.419     | 57.869   | 3.443    | −2.762   |
| 10      | 3.596    | −7.349   | −1245     |             | 15.657   | −19.723  | 2.662    | −2.171   |
| 11      | 3.631    | −7.630   | −365      | 15.385      | −24.532  | 2.360    | −1.874   |
| 12      | 3.570    | −7.440   | −291.941  | 16.218      | −22.370  | 2.450    | −2.041   |
| 13      | 9.952    | 4.985    | −9.042    | −60.959     | 28.461   | −19.130  | −36.205  |
| 14      | 12.217   | 6.017    | −9.925    | 25.358      | 28.723   | −32.884  | −16.737  |
| 15      | 13.664   | 6.556    | −11.435   | 32.295      | 28.328   | −36.885  | −22.967  |
| 16      | 3.626    | −6.978   | 10.551    | 125.381     | −28.155  | −367.720 | −9.031   |
| 17      | 4.290    | −10.606  | 30.978    | 14.871      | −21.133  | 3.784    | −2.465   |
| 18      | 5.677    | −73.551  | −122.716  | 15.510      | 207.375  | 3.799    | −2.466   |
| 19      | 3.840    | −10.270  | −55.690   | 10.940      | −17.400  | −800     | −16.450  |
| 20      | 3.840    | −10.270  | −55.930   | 10.930      | −17.430  | −800     | −17.560  |

TABLE 58-continued

| Example | f1 | f2 | f3 | f4 | f5 | f6 | f7 |
|---|---|---|---|---|---|---|---|
| 21 | 4.858 | 13.152 | −8.241 | −32.625 | 34.583 | 2.462 | −2.100 |
| 22 | 4.030 | −10.672 | 72.926 | 83.723 | 4.620 | 19.296 | −2.686 |
| 23 | 20.370 | 4.011 | −7.669 | 107.453 | −23.005 | 189.703 | 54.850 |
| 24 | 3.808 | −9.408 | −530.750 | 22.837 | −27.105 | −22.324 | 66.015 |
| 25 | 3.620 | −10.428 | 39.821 | −38.762 | 4.342 | 10.303 | −2.323 |
| 26 | 3.802 | −8.955 | 64.595 | 12384.769 | −17.503 | 299.093 | 57.797 |
| 27 | 4.499 | −15.674 | 39.058 | 453.779 | −18.160 | 102.612 | 59.134 |
| 28 | 18.537 | 5.313 | −10.580 | 30.673 | −10.636 | 6.334 | −8.036 |

Table 59 below shows in mm a thickness (L1edgeT) of an edge of the first lens, a thickness (L2edgeT) of the edge of the second lens, a thickness (L3edgeT) of the edge of the third lens, a thickness (L4edgeT) of the edge of the fourth lens, a thickness (L5edgeT) of the edge of the fifth lens, a thickness (L6edgeT) of the edge of the sixth lens, and a thickness (L7edgeT) of the edge of the seventh lens for each of Examples 1-28 described herein.

TABLE 59

| Example | L1edgeT | L2edgeT | L3edgeT | L4edgeT | L5edgeT | L6edgeT | L7edgeT |
|---|---|---|---|---|---|---|---|
| 1 | 0.271 | 0.346 | 0.259 | 0.354 | 0.283 | 0.265 | 0.818 |
| 2 | 0.271 | 0.342 | 0.266 | 0.339 | 0.283 | 0.266 | 0.806 |
| 3 | 0.255 | 0.312 | 0.260 | 0.261 | 0.275 | 0.395 | 0.447 |
| 4 | 0.226 | 0.349 | 0.220 | 0.222 | 0.283 | 0.752 | 0.546 |
| 5 | 0.282 | 0.313 | 0.416 | 0.237 | 0.325 | 0.371 | 0.382 |
| 6 | 0.233 | 0.259 | 0.333 | 0.203 | 0.272 | 0.330 | 0.376 |
| 7 | 0.220 | 0.270 | 0.348 | 0.224 | 0.259 | 0.269 | 0.437 |
| 8 | 0.194 | 0.250 | 0.328 | 0.211 | 0.239 | 0.222 | 0.388 |
| 9 | 0.246 | 0.297 | 0.392 | 0.244 | 0.286 | 0.286 | 0.301 |
| 10 | 0.222 | 0.377 | 0.235 | 0.240 | 0.189 | 0.260 | 0.323 |
| 11 | 0.172 | 0.340 | 0.207 | 0.355 | 0.401 | 0.262 | 0.680 |
| 12 | 0.163 | 0.350 | 0.257 | 0.281 | 0.193 | 0.260 | 0.446 |
| 13 | 0.257 | 0.255 | 0.340 | 0.276 | 0.365 | 0.307 | 0.278 |
| 14 | 0.253 | 0.255 | 0.486 | 0.252 | 0.361 | 0.490 | 0.409 |
| 15 | 0.286 | 0.336 | 0.498 | 0.261 | 0.427 | 0.497 | 0.489 |
| 16 | 0.269 | 0.308 | 0.190 | 0.230 | 0.410 | 0.714 | 0.300 |
| 17 | 0.205 | 0.407 | 0.201 | 0.333 | 0.278 | 0.348 | 0.815 |
| 18 | 0.218 | 0.347 | 0.211 | 0.259 | 0.277 | 0.251 | 0.950 |
| 19 | 0.190 | 0.220 | 0.230 | 0.320 | 0.210 | 0.570 | 0.700 |
| 20 | 0.170 | 0.230 | 0.240 | 0.250 | 0.230 | 0.590 | 0.770 |
| 21 | 0.212 | 0.210 | 0.351 | 0.213 | 0.236 | 0.357 | 0.445 |
| 22 | 0.243 | 0.339 | 0.258 | 0.397 | 0.274 | 0.340 | 0.567 |
| 23 | 0.267 | 0.396 | 0.384 | 0.400 | 0.228 | 0.589 | 0.342 |
| 24 | 0.231 | 0.289 | 0.255 | 0.254 | 0.360 | 0.476 | 0.658 |
| 25 | 0.252 | 0.293 | 0.238 | 0.374 | 0.258 | 0.415 | 0.686 |
| 26 | 0.293 | 0.298 | 0.252 | 0.251 | 0.409 | 0.715 | 0.678 |
| 27 | 0.246 | 0.280 | 0.254 | 0.273 | 0.356 | 0.630 | 0.692 |
| 28 | 0.252 | 0.160 | 0.429 | 0.302 | 0.430 | 0.391 | 0.433 |

Table 60 below shows in mm a sag value (L5S1 sag) at an outer end of the optical portion of the object-side surface of the fifth lens, a sag value (L5S2 sag) at an outer end of the optical portion of the image-side surface of the fifth lens, a thickness (Yc71P1) of the seventh lens at a first inflection point on the object-side surface of the seventh lens, a thickness (Yc71P2) of the seventh lens at a second inflection point on the object-side surface of the seventh lens, and a thickness (Yc72P1) of the seventh lens at a first inflection point on the image-side surface of the seventh lens for each of Examples 1-28 described herein.

TABLE 60

| Example | L5S1 sag | L5S2 sag | Yc71P1 | Yc71P2 | Yc72P1 |
|---|---|---|---|---|---|
| 1 | −0.447 | −0.533 | 1.324 | — | 0.931 |
| 2 | −0.426 | −0.531 | 1.329 | — | 0.929 |
| 3 | −0.392 | −0.434 | 0.613 | 0.621 | 0.71 |
| 4 | −0.404 | −0.356 | 0.837 | 0.815 | 0.946 |
| 5 | 0.197 | 0.199 | 0.678 | 0.803 | 0.795 |
| 6 | 0.200 | 0.202 | 0.568 | 0.67 | 0.667 |
| 7 | 0.115 | 0.139 | 0.93 | — | 0.811 |
| 8 | 0.123 | 0.129 | 0.859 | — | 0.769 |
| 9 | 0.162 | 0.188 | 0.969 | — | 0.881 |
| 10 | −0.466 | −0.526 | 2.933 | — | 4.142 |
| 11 | −0.479 | −0.556 | 3.24 | — | 4.484 |
| 12 | −0.453 | −0.501 | 2.843 | — | 4.129 |
| 13 | 0.210 | 0.245 | 0.569 | 0.641 | 0.67 |
| 14 | 0.102 | 0.142 | 0.562 | — | 0.686 |
| 15 | 0.054 | 0.053 | 0.607 | — | 0.717 |
| 16 | −0.261 | −0.263 | 0.473 | — | 0.631 |
| 17 | −0.485 | −0.407 | 0.89 | — | 0.92 |
| 18 | −0.479 | −0.422 | — | — | 0.781 |
| 19 | −0.410 | −0.430 | 0.8 | — | 1.28 |
| 20 | −0.420 | −0.430 | 0.81 | — | 1.27 |

TABLE 60-continued

| Example | L5S1 sag | L5S2 sag | Yc71P1 | Yc71P2 | Yc72P1 |
|---|---|---|---|---|---|
| 21 | −0.301 | −0.528 | 0.849329 | — | 0.717966 |
| 22 | 0.508 | 0.780 | — | — | 0.888 |
| 23 | 0.176 | 0.302 | 0.595 | — | 0.672 |
| 24 | 0.280 | 0.281 | 0.883 | 0.915 | 0.988 |
| 25 | 0.276 | 0.509 | — | — | 0.968 |
| 26 | 0.092 | 0.103 | 0.955 | 1.103 | 1.128 |
| 27 | 0.179 | 0.173 | 0.964 | 1.114 | 1.13 |
| 28 | 0.261 | 0.256 | 0.587 | — | 0.763 |

Table 61 below shows in mm an inner diameter of each of the first to seventh spacers for each of Examples 1-28 described herein. S1d is an inner diameter of the first spacer SP1, S2d is an inner diameter of the second spacer SP2, S3d is an inner diameter of the third spacer SP3, S4d is an inner diameter of the fourth spacer SP4, S5d is an inner diameter of the fifth spacer SP5, S6d is an inner diameter of the sixth spacer SP6, and S7d is an inner diameter of the seventh spacer SP7.

TABLE 61

| Example | S1d | S2d | S3d | S4d | S5d | S6d | S7d |
|---|---|---|---|---|---|---|---|
| 1 | 2.84 | 2.53 | 2.87 | 3.35 | 4.18 | 6.11 | — |
| 2 | 2.44 | 2.16 | 2.25 | 2.93 | 4.08 | 5.53 | — |
| 3 | 2.44 | 2.16 | 2.25 | 2.93 | 4.08 | 5.53 | — |
| 4 | 2.86 | 2.52 | 2.42 | 2.72 | 3.38 | 5.82 | — |
| 5 | 1.5 | 1.34 | 1.32 | 1.72 | 2.31 | 3.03 | — |
| 6 | 1.24 | 1.15 | 1.03 | 1.48 | 1.9 | 2.46 | — |
| 7 | 1.34 | 1.23 | 1.03 | 1.5 | 1.98 | 2.66 | — |
| 8 | 1.25 | 1.14 | 0.94 | 1.5 | 1.86 | 2.44 | — |
| 9 | 1.49 | 1.39 | 1.16 | 1.7 | 2.21 | 2.95 | — |
| 10 | 2.31 | 2.16 | 2.54 | 2.94 | 4.06 | 4.84 | 5.12 |
| 11 | 2.46 | 2.26 | 2.53 | 2.86 | 3.63 | 4.47 | 4.79 |
| 12 | 2.47 | 2.21 | 2.53 | 2.79 | 3.78 | 4.51 | — |
| 13 | 2.58 | 2.4 | 2.49 | 2.97 | 4.16 | 4.89 | 5.51 |
| 14 | 2.59 | 2.5 | 2.53 | 2.9 | 3.8 | 4.9 | — |
| 15 | 2.77 | 2.61 | 2.79 | 3.12 | 4.03 | 4.89 | — |
| 16 | 2.12 | 2.1 | 2.04 | 2.12 | 2.81 | 4.64 | — |
| 17 | 2.32 | 2.36 | 2.56 | 2.93 | 3.7 | 4.35 | — |
| 18 | 2.41 | 2.3 | 2.66 | 3.03 | 3.76 | — | — |
| 19 | 2.314 | 1.98 | 2.298 | 2.776 | 3.232 | 4.828 | — |
| 20 | 2.49 | 2.02 | 2.27 | 2.48 | 2.03 | 4.71 | — |
| 21 | 2.42 | 2.23 | 2.07 | 2.41 | 3.08 | 4.23 | — |
| 22 | 2.52 | 2.31 | 2.56 | 3.45 | 4.66 | 5.67 | — |
| 23 | 2.71 | 2.53 | 2.52 | 3.03 | 3.78 | 4.83 | — |
| 24 | 2.36 | 2.03 | 2.25 | 2.65 | 3.64 | 5.14 | 5.3 |
| 25 | 2.06 | 1.89 | 2.15 | 2.7 | 3.61 | 4.56 | 4.84 |
| 26 | 1.89 | 1.84 | 2.33 | 2.73 | 3.73 | 5.43 | 6.03 |
| 27 | 2.39 | 2.15 | 2.4 | 2.82 | 3.94 | 5.68 | 6.02 |
| 28 | 3.22 | 3.11 | 2.92 | 3.25 | 4.6 | 5.6 | 6.15 |

Table 62 below shows in $mm^3$ a volume of each of the first to seventh lenses for each of Examples 1-28 described herein. L1v is a volume of the first lens, L2v is a volume of the second lens, L3v is a volume of the third lens, L4v is a volume of the fourth lens, L5v is a volume of the fifth lens, L6v is a volume of the sixth lens, and L7v is a volume of the seventh lens.

TABLE 62

| Example | L1v | L2v | L3v | L4v | L5v | L6v | L7v |
|---|---|---|---|---|---|---|---|
| 1 | 9.275 | 5.4262 | 7.6682 | 9.6317 | 13.3855 | 16.9502 | 47.3187 |
| 2 | 10.25668 | 6.2334 | 7.9096 | 10.6038 | 13.1472 | 15.6863 | 47.1347 |
| 3 | 5.1971 | 5.216 | 5.7114 | 7.6743 | 11.4157 | 17.3987 | 26.6851 |
| 4 | 7.0224 | 7.0394 | 5.8013 | 7.8824 | 11.1935 | 36.4427 | 34.1183 |
| 5 | 8.0184 | 9.5628 | 9.6052 | 8.4128 | 12.0326 | 16.7196 | 28.0267 |
| 6 | 6.3442 | 6.9494 | 7.7597 | 6.2076 | 6.8959 | 10.3364 | 16.5597 |
| 7 | 5.7249 | 8.0179 | 8.3774 | 7.9589 | 10.3434 | 11.1031 | 27.1511 |
| 8 | 5.0799 | 5.7347 | 5.8704 | 6.465 | 6.7471 | 7.523 | 21.0455 |
| 9 | 6.8734 | 9.0897 | 9.3053 | 8.2626 | 10.8967 | 13.6572 | 31.8443 |
| 10 | 5.2342 | 5.0595 | 5.1455 | 4.1402 | 5.9856 | 8.1378 | 19.6812 |
| 11 | 4.9213 | 4.3965 | 4.4008 | 5.9124 | 9.5127 | 7.6205 | 23.7487 |
| 12 | 5.2239 | 4.9915 | 5.6183 | 5.5026 | 5.5766 | 7.2491 | 20.0822 |
| 13 | 5.639 | 4.858 | 6.6748 | 7.1627 | 11.0369 | 11.9357 | 27.1217 |
| 14 | 5.1778 | 5.1427 | 8.2986 | 6.3777 | 12.6369 | 14.9811 | 20.731 |
| 15 | 5.9227 | 6.9971 | 9.1275 | 7.025 | 12.2307 | 15.4792 | 23.2093 |
| 16 | 3.8115 | 4.6714 | 4.0552 | 5.0631 | 11.2844 | 25.7618 | 16.5646 |
| 17 | 4.2347 | 5.5368 | 5.5931 | 7.5471 | 9.4202 | 8.9992 | 27.3258 |
| 18 | 4.6529 | 4.6572 | 6.2312 | 6.7131 | 10.2673 | 11.7401 | 33.5372 |
| 19 | 5.7312 | 3.6543 | 4.1957 | 9.084 | 7.949 | 27.8626 | 30.6587 |
| 20 | 5.4092 | 4.6711 | 5.1562 | 7.663 | 8.7343 | 28.0075 | 34.4019 |
| 21 | 3.7681 | 3.4595 | 4.0278 | 5.0067 | 6.9793 | 11.3507 | 18.8879 |
| 22 | 6.1739 | 5.7042 | 6.968 | 11.8343 | 12.9092 | 21.1543 | 39.7461 |
| 23 | 4.9598 | 8.122 | 7.2222 | 8.2929 | 8.6024 | 18.837 | 19.7464 |
| 24 | 5.4854 | 3.9796 | 4.1274 | 4.6927 | 9.8848 | 20.3357 | 35.3318 |
| 25 | 3.81 | 3.9751 | 3.9272 | 6.1885 | 7.516 | 13.0347 | 31.8586 |
| 26 | 4.7517 | 4.3655 | 6.4562 | 5.0723 | 9.8674 | 36.8705 | 47.4701 |
| 27 | 5.6273 | 4.949 | 5.1423 | 5.0791 | 9.3624 | 31.5832 | 47.9081 |
| 28 | 7.5192 | 7.1322 | 12.3605 | 9.0385 | 17.2925 | 20.5539 | 33.5701 |

Table 63 below shows in mg a weight of each of the first to seventh lenses for each of Examples 1-28 described herein. L1w is a weight of the first lens, L2w is a weight of the second lens, L3w is a weight of the third lens, L4w is a weight of the fourth lens, L5w is a weight of the fifth lens, L6w is a weight of the sixth lens, and L7w is a weight of the seventh lens.

TABLE 63

| Example | L1w | L2w | L3w | L4w | L5w | L6w | L7w |
| --- | --- | --- | --- | --- | --- | --- | --- |
| 1 | 9.646 | 6.674 | 7.975 | 11.847 | 16.732 | 17.628 | 49.211 |
| 2 | 10.667 | 7.667 | 8.226 | 13.043 | 16.434 | 16.314 | 49.020 |
| 3 | 5.405 | 6.416 | 5.940 | 7.981 | 14.270 | 21.748 | 26.952 |
| 4 | 7.303 | 8.658 | 6.033 | 8.198 | 13.992 | 45.553 | 34.459 |
| 5 | 8.339 | 9.945 | 12.007 | 10.516 | 12.514 | 20.900 | 28.307 |
| 6 | 6.598 | 7.227 | 9.700 | 7.760 | 7.172 | 12.921 | 16.725 |
| 7 | 5.954 | 8.339 | 10.472 | 9.710 | 12.619 | 11.547 | 28.237 |
| 8 | 5.283 | 5.964 | 7.338 | 7.887 | 8.231 | 7.824 | 21.887 |
| 9 | 7.148 | 9.453 | 11.632 | 10.080 | 13.294 | 14.203 | 33.118 |
| 10 | 5.444 | 6.223 | 5.351 | 4.306 | 7.362 | 8.463 | 20.468 |
| 11 | 5.118 | 5.408 | 4.577 | 6.149 | 11.701 | 7.925 | 24.699 |
| 12 | 5.433 | 6.140 | 5.843 | 5.723 | 6.859 | 7.539 | 20.885 |
| 13 | 5.865 | 5.052 | 8.344 | 8.953 | 11.478 | 14.920 | 27.393 |
| 14 | 5.385 | 5.348 | 10.373 | 6.633 | 13.142 | 15.580 | 21.560 |
| 15 | 6.160 | 7.277 | 11.409 | 7.306 | 12.720 | 19.349 | 24.138 |
| 16 | 3.964 | 5.746 | 4.217 | 5.266 | 14.106 | 26.792 | 17.227 |
| 17 | 4.404 | 6.810 | 5.817 | 7.849 | 11.587 | 9.359 | 28.419 |
| 18 | 4.839 | 5.728 | 6.480 | 6.982 | 12.629 | 12.210 | 34.879 |
| 19 | 5.960 | 4.495 | 5.161 | 9.447 | 9.936 | 34.828 | 30.965 |
| 20 | 5.626 | 5.745 | 6.342 | 7.970 | 10.918 | 35.009 | 34.746 |
| 21 | 3.919 | 3.598 | 4.954 | 5.207 | 8.724 | 11.805 | 19.643 |
| 22 | 6.421 | 7.016 | 7.247 | 14.556 | 13.426 | 22.000 | 41.336 |
| 23 | 5.158 | 8.447 | 9.028 | 10.366 | 8.946 | 19.590 | 20.536 |
| 24 | 5.705 | 4.895 | 5.077 | 4.880 | 12.356 | 25.420 | 35.685 |
| 25 | 3.962 | 4.889 | 4.084 | 7.612 | 7.817 | 13.556 | 33.133 |
| 26 | 4.942 | 5.370 | 6.714 | 5.275 | 12.334 | 38.345 | 47.945 |
| 27 | 5.852 | 6.087 | 5.348 | 5.282 | 11.516 | 32.847 | 48.387 |
| 28 | 7.819968 | 7.417488 | 15.45063 | 11.29813 | 21.61563 | 21.37606 | 34.9129 |

Table 64 below shows in mm an overall outer diameter (including a rib) of each of the first to seventh lenses for each of Examples 1-28 described herein. L1TR is an overall outer diameter of the first lens, L2TR is an overall outer diameter of the second lens, L3TR is an overall outer diameter of the third lens, L4TR is an overall outer diameter of the fourth lens, L5TR is an overall outer diameter of the fifth lens, L6TR is an overall outer diameter of the sixth lens, and L7TR is an overall outer diameter of the seventh lens.

TABLE 64

| Example | L1TR | L2TR | L3TR | L4TR | L5TR | L6TR | L7TR |
| --- | --- | --- | --- | --- | --- | --- | --- |
| 1 | 4.73 | 4.93 | 5.43 | 6.03 | 7 | 7.4 | 7.6 |
| 2 | 5.02 | 5.22 | 5.52 | 6.32 | 6.94 | 7.34 | 7.54 |
| 3 | 4.22 | 4.42 | 4.72 | 5.52 | 6.44 | 6.84 | 7.04 |
| 4 | 4.82 | 5.02 | 5.32 | 6.02 | 6.74 | 7.14 | 7.34 |
| 5 | 2.44 | 2.54 | 2.69 | 2.9 | 3.19 | 3.44 | 3.62 |
| 6 | 2.29 | 2.4 | 2.54 | 2.63 | 2.78 | 2.91 | 3.04 |
| 7 | 2.46 | 2.58 | 2.69 | 2.8 | 3.17 | 3.31 | 3.47 |
| 8 | 2.19 | 2.32 | 2.44 | 2.57 | 2.74 | 3 | 3.11 |
| 9 | 2.37 | 2.5 | 2.65 | 2.75 | 3.04 | 3.44 | 3.54 |
| 10 | 4.22 | 4.42 | 4.54 | 4.72 | 5.4 | 5.74 | 6.3 |
| 11 | 4.08 | 4.23 | 4.36 | 4.53 | 5.11 | 5.56 | 6.15 |
| 12 | 4.33 | 4.53 | 4.66 | 4.92 | 5.09 | 5.72 | 5.97 |
| 13 | 4.21 | 4.3 | 4.44 | 4.84 | 5.47 | 6.12 | 6.9 |
| 14 | 4.25 | 4.34 | 4.48 | 4.88 | 5.51 | 6.16 | 6.48 |
| 15 | 4.43 | 4.52 | 4.66 | 5.06 | 5.5 | 6.26 | 6.58 |
| 16 | 3.51 | 3.81 | 4.39 | 4.98 | 5.85 | 6.15 | 6.25 |
| 17 | 3.93 | 4.13 | 4.71 | 6.17 | 5.3 | 6.57 | 6.67 |
| 18 | 4.03 | 4.23 | 4.81 | 5.4 | 6.27 | 6.67 | 6.77 |
| 19 | 4.228 | 4.402 | 4.87 | 5.476 | 6.332 | 6.714 | 6.92 |
| 20 | 4.26 | 4.46 | 5.03 | 5.62 | 6.5 | 6.9 | 7.1 |
| 21 | 3.83 | 4.03 | 4.23 | 4.83 | 5.32 | 5.72 | 5.92 |
| 22 | 4.63 | 4.93 | 5.23 | 6.03 | 6.92 | 7.32 | 7.52 |
| 23 | 4.29 | 4.38 | 4.52 | 4.92 | 5.65 | 6.26 | 6.77 |
| 24 | 4.09 | 4.18 | 4.3 | 4.53 | 5.22 | 6.62 | 7.32 |
| 25 | 3.73 | 3.82 | 3.96 | 4.39 | 4.96 | 6 | 6.86 |
| 26 | 3.97 | 4.06 | 4.19 | 4.63 | 5.2 | 7.15 | 8.02 |
| 27 | 4.39 | 4.48 | 4.61 | 5.04 | 5.61 | 7.09 | 7.95 |
| 28 | 4.87 | 4.96 | 5.09 | 5.52 | 6.37 | 7.41 | 7.84 |

Table 65 below shows in mm a maximum thickness of the rib of each of the first to seventh lenses for each of Examples 1-28 described herein. The maximum thickness of the rib is a thickness of a portion of the rib in contact with a spacer. L1rt is a maximum thickness of the rib of the first lens, L2rt is a maximum thickness of the rib of the second lens, L3rt is a maximum thickness of the rib of the third lens, L4rt is a maximum thickness of the rib of the fourth lens, L5rt is a maximum thickness of the rib of the fifth lens, L6rt is a maximum thickness of the rib of the sixth lens, and L7rt is a maximum thickness of the rib of the seventh lens.

TABLE 65

| Example | L1rt | L2rt | L3rt | L4rt | L5rt | L6rt | L7rt |
| --- | --- | --- | --- | --- | --- | --- | --- |
| 1 | 0.61 | 0.37 | 0.33 | 0.32 | 0.37 | 0.465 | 0.895 |
| 2 | 0.585 | 0.395 | 0.34 | 0.41 | 0.305 | 0.343 | 0.91 |
| 3 | 0.435 | 0.425 | 0.39 | 0.41 | 0.345 | 0.375 | 0.53 |
| 4 | 0.435 | 0.495 | 0.22 | 0.29 | 0.325 | 0.81 | 0.595 |
| 5 | 0.6 | 0.58 | 0.56 | 0.47 | 0.34 | 0.4 | 0.47 |
| 6 | 0.54 | 0.5 | 0.52 | 0.42 | 0.21 | 0.39 | 0.4 |
| 7 | 0.39 | 0.44 | 0.47 | 0.36 | 0.42 | 0.38 | 0.47 |
| 8 | 0.54 | 0.37 | 0.41 | 0.33 | 0.37 | 0.27 | 0.42 |

TABLE 65-continued

| Example | L1rt | L2rt | L3rt | L4rt | L5rt | L6rt | L7rt |
|---|---|---|---|---|---|---|---|
| 9 | 0.6 | 0.51 | 0.55 | 0.35 | 0.46 | 0.47 | 0.52 |
| 10 | 0.435 | 0.43 | 0.36 | 0.215 | 0.32 | 0.33 | 0.405 |
| 11 | 0.42 | 0.42 | 0.36 | 0.31 | 0.45 | 0.36 | 0.7 |
| 12 | 0.41 | 0.41 | 0.37 | 0.37 | 0.29 | 0.33 | 0.52 |
| 13 | 0.55 | 0.38 | 0.58 | 0.41 | 0.5 | 0.32 | 0.53 |
| 14 | 0.49 | 0.39 | 0.68 | 0.36 | 0.63 | 0.49 | 0.48 |
| 15 | 0.49 | 0.47 | 0.71 | 0.47 | 0.56 | 0.5 | 0.55 |
| 16 | 0.482 | 0.395 | 0.316 | 0.328 | 0.422 | 0.885 | 0.409 |
| 17 | 0.431 | 0.556 | 0.361 | 0.429 | 0.38 | 0.38 | 0.667 |
| 18 | 0.431 | 0.457 | 0.361 | 0.364 | 0.38 | 0.334 | 0.729 |
| 19 | 0.457 | 0.314 | 0.315 | 0.345 | 0.276 | 0.741 | 0.774 |
| 20 | 0.431 | 0.408 | 0.319 | 0.369 | 0.252 | 0.674 | 0.798 |
| 21 | 0.39 | 0.33 | 0.3 | 0.26 | 0.425 | 0.55 | 0.534 |
| 22 | 0.43 | 0.41 | 0.35 | 0.48 | 0.305 | 0.57 | 0.71 |
| 23 | 0.48 | 0.56 | 0.58 | 0.47 | 0.34 | 0.62 | 0.44 |
| 24 | 0.51 | 0.25 | 0.32 | 0.32 | 0.51 | 0.53 | 0.72 |
| 25 | 0.4 | 0.42 | 0.37 | 0.5 | 0.32 | 0.46 | 0.72 |
| 26 | 0.47 | 0.41 | 0.45 | 0.41 | 0.47 | 0.93 | 0.7 |
| 27 | 0.44 | 0.39 | 0.4 | 0.4 | 0.38 | 0.74 | 0.72 |
| 28 | 0.56 | 0.41 | 0.56 | 0.54 | 0.52 | 0.44 | 0.54 |

Figure 60:
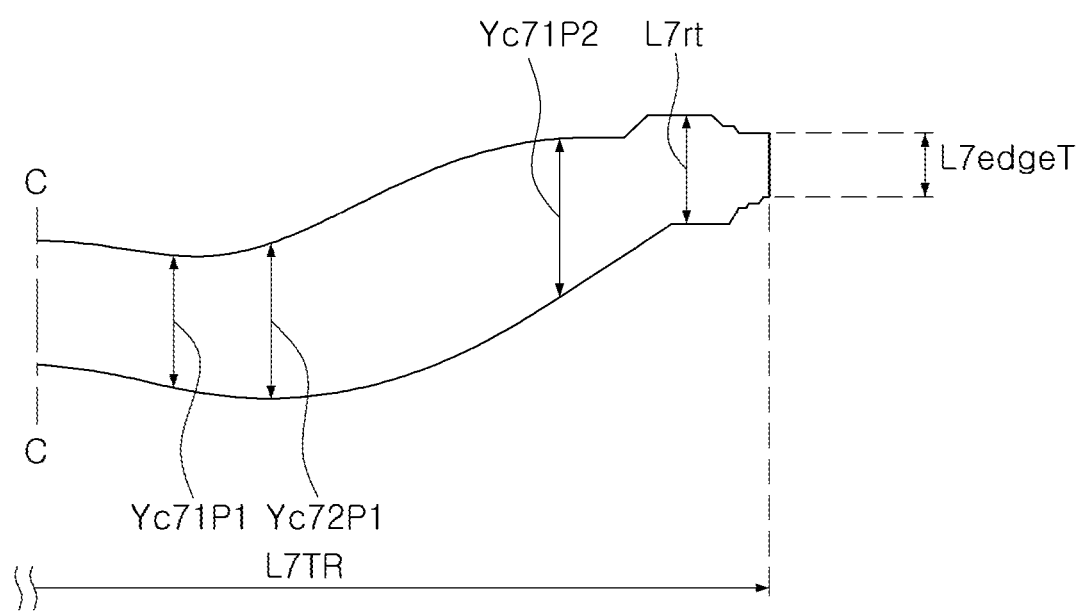
FIG. 60 is a cross-sectional view illustrating an example of a seventh lens.

FIG. 60 is a cross-sectional view illustrating an example of a seventh lens.

FIG. 60 illustrates the overall outer diameter (L7TR) of the seventh lens, the thickness (L7rt) of the flat portion of the rib of the seventh lens, the thickness (L7edgeT) of the edge of the seventh lens, the thickness (Yc71P1) of the seventh lens at the first inflection point on the object-side surface of the seventh lens, the thickness (Yc71P2) of the seventh lens at the second inflection point on the object-side surface of the seventh lens, and the thickness (Yc72P1) of the seventh lens at the first inflection point on the image-side surface of the seventh lens.

The examples described above enable the optical imaging system to be miniaturized and aberrations to be easily corrected to achieve high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power, a convex object-side surface in a paraxial region thereof, and a concave image-side surface in a paraxial region thereof;
   a second lens having a negative refractive power, a convex object-side surface in a paraxial region thereof, and a concave image-side surface in a paraxial region thereof;
   a third lens having a negative refractive power, a convex object-side surface in a paraxial region thereof, and a concave image-side surface in a paraxial region thereof;
   a fourth lens having a positive refractive power and a convex image-side surface in a paraxial region thereof;
   a fifth lens having a negative refractive power;
   a sixth lens having a refractive power and a concave image-side surface in a paraxial region thereof;
   a seventh lens having a negative refractive power,
   wherein the first to seventh lenses are sequentially disposed in ascending numerical order along an optical axis of the optical imaging system from an object side of the optical imaging system toward an imaging plane of the optical imaging system,
   the optical imaging system satisfies SD12<SD34, where SD12 is a distance along the optical axis from the image-side surface of the first lens to the object-side surface of the second lens, SD34 is a distance along the optical axis from the image-side surface of the third lens to an object-side surface of the fourth lens, and SD12 and SD34 are expressed in a same unit of measurement, and
   the optical imaging system further comprises a spacer disposed between the sixth and seventh lenses and satisfies 0.5<S6d/f<1.4, where S6d is an inner diameter of the spacer, f is an overall focal length of the optical imaging system, and S6d and f are expressed in a same unit of measurement.

2. The optical imaging system of claim 1, wherein the optical imaging system satisfies 0.01<R1/R4<1.3, where R1 is a radius of curvature on the optical axis of the object-side surface of the first lens, R4 is a radius of curvature on the optical axis of the image-side surface of the second lens, and R1 and R4 are expressed in a same unit of measurement.

3. The optical imaging system of claim 1, wherein the optical imaging system satisfies 0.05<R1/R6<0.9, where R1 is a radius of curvature on the optical axis of the object-side surface of the first lens, R6 is a radius of curvature on the optical axis of the image-side surface of the third lens, and R1 and R6 are expressed in a same unit of measurement.

4. The optical imaging system of claim 1, wherein the sixth lens has a convex object-side surface in a paraxial region thereof, and
   the optical imaging system satisfies 0.2<R1/R11<1.2, where R1 is a radius of curvature on the optical axis of the object-side surface of the first lens, R11 is a radius of curvature on the optical axis of the object-side surface of the sixth lens, and R1 and R11 are expressed in a same unit of measurement.

5. The optical imaging system of claim 1, wherein the sixth lens has a convex object-side surface in a paraxial region thereof,
   the seventh lens has a concave image-side surface in a paraxial region thereof, and
   the optical imaging system satisfies 0.6<(R11+R14)/(2*R1)<3.0, where R1 is a radius of curvature on the optical axis of the object-side surface of the first lens, R11 is a radius of curvature on the optical axis of the object-side surface of the sixth lens, R14 is a radius of curvature on the optical axis of an image-side surface of the seventh lens, and R1, R11, and R14 are expressed in a same unit of measurement.

6. The optical imaging system of claim 1, wherein the optical imaging system satisfies 0.1<(1/f1+1/f2+1/f3+1/f4+1/f5+1/f6+1/f7)*f<0.8, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f1, f2, f3, f4, f5, f6, f7, and f are expressed in a same unit of measurement.

7. The optical imaging system of claim 1, wherein the optical imaging system satisfies $0.1 < (1/f1+1/f2+1/f3+1/f4+1/f5+1/f6+1/f7)*TTL < 1.0$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, TTL is a distance along the optical axis from the object-side surface of the first lens to the imaging plane, and f1, f2, f3, f4, f5, f6, f7, and TTL are expressed in a same unit of measurement.

8. The optical imaging system of claim 1, wherein the sixth lens has a convex object-side surface in a paraxial region thereof,
the seventh lens has a concave image-side surface in a paraxial region thereof, and
the optical imaging system satisfies $0.2 < TD1/D67 < 0.8$, where TD1 is a thickness along the optical axis of the first lens, D67 is a distance along the optical axis from the object-side surface of the sixth lens to the image-side surface of the seventh lens, and TD1 and D67 are expressed in a same unit of measurement.

9. The optical imaging system of claim 1, wherein the optical imaging system satisfies $SD56 < SD67$, where SD56 is a distance along the optical axis from an image-side surface of the fifth lens to an object-side surface of the sixth lens, SD67 is a distance along the optical axis from the image-side surface of the sixth lens to an object-side surface of the seventh lens, and SD56 and SD67 are expressed in a same unit of measurement.

10. The optical imaging system of claim 1, wherein the optical imaging system satisfies $0.4 < \Sigma TD/TTL < 0.7$, where $\Sigma TD$ is a sum of thicknesses along the optical axis of the first to seventh lenses, TTL is a distance along the optical axis from the object-side surface of the first lens to the imaging plane, and $\Sigma TD$ and TTL are expressed in a same unit of measurement.

11. The optical imaging system of claim 1, wherein the optical imaging system satisfies $0.6 < TTL/(2*IMG\ HT) < 0.9$, where TTL is a distance along the optical axis from the object-side surface of the first lens to the imaging plane, IMG HT is an image height on the imaging plane and is equal to one half of a diagonal length of the imaging plane, and TTL and IMG HT are expressed in a same unit of measurement.

12. The optical imaging system of claim 1, wherein the fourth lens has a convex object-side surface in a paraxial region thereof, the sixth lens has a convex object-side surface in a paraxial region thereof, and the seventh lens has a concave image-side surface in a paraxial region thereof.

13. An optical imaging system comprising:
a first lens having a positive refractive power, a convex object-side surface in a paraxial region thereof, and a concave image-side surface in a paraxial region thereof;
a second lens having a negative refractive power, a convex object-side surface in a paraxial region thereof, and a concave image-side surface in a paraxial region thereof;
a third lens having a negative refractive power, a convex object-side surface in a paraxial region thereof, and a concave image-side surface in a paraxial region thereof;
a fourth lens having a positive refractive power;
a fifth lens having a negative refractive power;
a sixth lens having a refractive power; and
a seventh lens having a negative refractive power,
wherein the first to seventh lenses are sequentially disposed in ascending numerical order along an optical axis of the optical imaging system from an object side of the optical imaging system toward an imaging plane of the optical imaging system,
the fourth lens has a convex object-side surface in a paraxial region thereof, the sixth lens has a convex object-side surface in a paraxial region thereof, and the seventh lens has a concave image-side surface in a paraxial region thereof,
the fourth lens has a convex image-side surface in a paraxial region thereof, and the sixth lens has a concave image-side surface in a paraxial region thereof, and
the optical imaging system further comprises a spacer disposed between the sixth and seventh lenses and satisfies $0.5 < S6d/f < 1.4$, where S6d is an inner diameter of the spacer, f is an overall focal length of the optical imaging system, and S6d and f are expressed in a same unit of measurement.

* * * * *